(12) United States Patent
Tsukuba et al.

(10) Patent No.: US 10,237,564 B1
(45) Date of Patent: Mar. 19, 2019

(54) IMAGE DECODING DEVICE, IMAGE DECODING METHOD, IMAGE CODING DEVICE, AND IMAGE CODING METHOD

(71) Applicant: Sharp Kabushiki Kaisha, Sakai, Osaka (JP)

(72) Inventors: Takeshi Tsukuba, Sakai (JP); Tomohiro Ikai, Sakai (JP); Tomoyuki Yamamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/043,191

(22) Filed: Jul. 24, 2018

Related U.S. Application Data

(63) Continuation of application No. 15/023,442, filed as application No. PCT/JP2014/075868 on Sep. 29, 2014, now Pat. No. 10,075,720.

(30) Foreign Application Priority Data

Oct. 8, 2013 (JP) .................. 2013-211469

(51) Int. Cl.
*H04N 19/00* (2014.01)
*H04N 19/36* (2014.01)
*H04N 19/44* (2014.01)
*H04N 19/30* (2014.01)

(52) U.S. Cl.
CPC ............. *H04N 19/36* (2014.11); *H04N 19/30* (2014.11); *H04N 19/44* (2014.11)

(58) Field of Classification Search
CPC ......... H04N 19/36; H04N 19/30; H04N 19/44
USPC ...................................... 375/240.25
See application file for complete search history.

(56) References Cited

U.S. PATENT DOCUMENTS

2014/0192859 A1\* 7/2014 Haque .................. H04N 19/597
375/240.02

OTHER PUBLICATIONS

Tsukuba et al., "Image Decoding Device, Image Decoding Method, Image Coding Device, and Image Coding Method", U.S. Appl. No. 15/023,442, filed Mar. 21, 2016.

\* cited by examiner

*Primary Examiner* — Jeffery A Williams
(74) *Attorney, Agent, or Firm* — Keating & Bennett, LLP

(57) ABSTRACT

The processing amount and coding amount related to decoding/coding of profile information and level information are reduced. The profile/level information decoded by a PTL (profile/level) information decoder (1021) is specified by the semantics of an i-th reference PTL information specifying index at a relative position between i-th profile/level information and referenced profile/level information.

3 Claims, 67 Drawing Sheets

FIG. 5(a)

| nal_unit( NumBytesInNALunit ) { | Descriptor |
|---|---|
| nal_unit_header( ) | |
| NumBytesInRBSP = 0 | |
| for( i = 2; i < NumBytesInNALunit; i++ ) { | |
| if( i + 2 < NumBytesInNALunit && next_bits( 24 ) = = 0x000003 ) { | |
|   rbsp_byte[ NumBytesInRBSP++ ] | b(8) |
|   rbsp_byte[ NumBytesInRBSP++ ] | b(8) |
|   i += 2 | |
|   emulation_prevention_three_byte /* equal to 0x03 */ | f(8) |
| } else | |
|   rbsp_byte[ NumBytesInRBSP++ ] | b(8) |
| } | |
| } | |

FIG. 5(b)

| nal_unit_header( ) { | Descriptor |
|---|---|
| forbidden_zero_bit | f(1) |
| nal_unit_type | u(6) |
| nuh_layer_id | u(6) |
| nuh_temporal_id_plus1 | u(3) |
| } | |

FIG. 6

| nal_unit_type | Name of nal_unit_type | Content of NAL unit and RBSP syntax structure | NAL unit type class | |
|---|---|---|---|---|
| 0, 1 | TRAIL_N, TRAIL_R | Coded slice segment of a non-TSA, non-STSA trailing picture<br>slice_segment_layer_rbsp( ) | VCL | ⎫<br>⎬ SYNA101 |
| 2, 3 | TSA_N, TSA_R | Coded slice segment of a TSA picture<br>slice_segment_layer_rbsp( ) | VCL | |
| 4, 5 | STSA_N, STSA_R | Coded slice segment of an STSA picture<br>slice_layer_rbsp( ) | VCL | |
| 6, 7 | RADL_N, RADL_R | Coded slice segment of a RADL picture<br>slice_layer_rbsp( ) | VCL | |
| 8, 9 | RASL_N, RASL_R, | Coded slice segment of a RASL picture<br>slice_layer_rbsp( ) | VCL | |
| 10, 12, 14 | RSV_VCL_N10 RSV_VCL_N12 RSV_VCL_N14 | Reserved // reserved non-RAP non-reference VCL NAL unit types | VCL | |
| 11, 13, 15 | RSV_VCL_R11 RSV_VCL_R13 RSV_VCL_R15 | Reserved // reserved non-RAP reference VCL NAL unit types | VCL | ⎭ |
| 16, 17, 18 | BLA_W_LP BLA_W_DLP BLA_N_LP | Coded slice segment of a BLA picture<br>slice_segment_layer_rbsp( ) | VCL | ⎫<br>⎬ SYNA102 |
| 19, 20 | IDR_W_DLP IDR_N_LP | Coded slice segment of an IDR picture<br>slice_segment_layer_rbsp( ) | VCL | |
| 21 | CRA_NUT | Coded slice segment of a CRA picture<br>slice_segment_layer_rbsp( ) | VCL | ⎭ |
| 22, 23 | RSV_RAP_VCL22.. RSV_RAP_VCL23 | Reserved // reserved RAP VCL NAL unit types | VCL | |
| 24..31 | RSV_VCL24.. RSV_VCL31 | Reserved // reserved non-RAP VCL NAL unit types [ | VCL | |
| 32 | VPS_NUT | Video parameter set<br>video_parameter_set_rbsp( ) | non-VCL | ⎫<br>⎬ SYNA103 |
| 33 | SPS_NUT | Sequence parameter set<br>seq_parameter_set_rbsp( ) | non-VCL | |
| 34 | PPS_NUT | Picture parameter set<br>pic_parameter_set_rbsp( ) | non-VCL | ⎭ |
| 35 | AUD_NUT | Access unit delimiter<br>access_unit_delimiter_rbsp( ) | non-VCL | |
| 36 | EOS_NUT | End of sequence<br>end_of_seq_rbsp( ) | non-VCL | |
| 37 | EOB_NUT | End of bitsteam<br>end_of_bitstream_rbsp( ) | non-VCL | |
| 38 | FD_NUT | Filler data<br>filler_data_rbsp( ) | non-VCL | |
| 39, 40 | PREFIX_SEI_NUT SUFFIX_SEI_NUT | Supplemental enhancement information (SEI)<br>sei_rbsp( ) | non-VCL | |
| 41..47 | RSV_NVCL41.. RSV_NVCL47 | Reserved | non-VCL | |
| 48..63 | UNSPEC48.. UNSPEC63 | Unspecified | non-VCL | |

FIG. 7

Video parameter set RBSP syntax

| video_parameter_set_rbsp ( ) { | Descriptor | |
|---|---|---|
| vps_video_parameter_set_id | u(4) | ⎫ |
| vps_reserved_three_2bits | u(2) | ⎬ SYNVPS01 |
| vps_max_layers_minus1 | u(6) | |
| vps_max_sub_layers_minus1 | u(3) | |
| vps_temporal_id_nesting_flag | u(1) | |
| vps_extension_offset //vps_reserved_0xffff_16bits | u(16) | ⎭ |
| profile_tier_level( 1, vps_max_sub_layers_minus1 ) | | } SYNVPS02 |
| ...OMITTED... | | |
| vps_max_layer_id | u(6) | ⎫ |
| vps_num_layer_sets_minus1 | ue(v) | ⎬ SYNVPS03 |
| for( i = 1; i <= vps_num_layer_sets_minus1; i++ ) | | |
| for( j = 0; j <= vps_max_layer_id; j++ ) | | |
| layer_id_included_flag[ i ][ j ] | | ⎭ |
| ...OMITTED... | | |
| vps_extension_flag | u(1) | } SYNVPS04 |
| if( vps_extension_flag ) { | | |
| while( !byte_aligned( ) ) | | ⎫ SYNVPS05 |
| vps_extension_alignment_bit_equal_to_one | u(1) | ⎭ |
| vps_extension( ) | | } SYNVPS06 |
| vps_extension2_flag | u(1) | ⎫ |
| if( vps_extension2_flag ) | | ⎬ SYNVPS07 |
| while( more_rbsp_data( ) ) | | |
| vps_extension_data_flag | | ⎭ |
| } | | |
| rbsp_trailing_bits( ) | | } SYNVPS08 |
| } | | |

FIG. 8

Video parameter set extension syntax

| vps_extension( ) { | Descriptor | |
|---|---|---|
| avc_base_layer_flag | u(1) | ⎫ |
| vps_vui_offset | u(16) | ⎬ SYNVPS0A |
| ...OMITTED... | | ⎭ |
| for( i = 1; i <= vps_max_layers_minus1; i++ ) | | ⎫ |
| for( j = 0; j < i; j++ ) | | ⎬ SYNVPS0B |
|   direct_dependency_flag[ i ][ j ] | u(1) | ⎭ |
| ...OMITTED... | | |
| vps_number_layer_sets_minus1 | u(10) | } SYNVPS0C |
| vps_num_profile_tier_level_minus1 | u(6) | } SYNVPS0D |
| for( i = 1; i <= vps_num_profile_tier_level_minus1; i ++ ) { | | |
| vps_profile_present_flag[ i ] | u(1) | } SYNVPS0E |
| if( !vps_profile_present_flag[ i ] ){ | | |
| ~~profile_ref_minus1[ i ]~~ | ~~u(6)~~ | |
|   profile_ref_delta_index_minus1[ i ] | ue(v) | } SYNVPS0Fa |
|   } | | |
|   profile_tier_level( vps_profile_present_flag[ i ], vps_max_sub_layers_minus1 ) | | } SYNVPS0G |
| } | | |
| numOutputLayerSets = vps_number_layer_sets_minus1 + 1 | | |
| ...OMITTED... | | |
| for( i = 1; i < numOutputLayerSets; i++ ) { | | ⎫ |
| if( i > vps_number_layer_sets_minus1 ) { | | |
|   output_layer_set_idx_minus1[ i ] | u(v) | |
|   lsIdx = output_layer_set_idx_minus1[ i ] + 1 | | |
|   for( j = 0 ; j < NumLayersInIdList[ lsIdx ] − 1; j++) | | ⎬ SYNVPS0H |
|     output_layer_flag[ i ][ j ] | u(1) | |
|   } | | |
|   profile_level_tier_idx[ i ] | u(v) | |
| } | | ⎭ |
| ···OMITTED··· | | |
| direct_dep_type_len_minus2 | ue(v) | ⎫ |
| for( i = 1; i <= vps_max_layers_minus1; i++ ) | | |
| for( j = 0; j < i; j++ ) | | ⎬ SYNVPS0I |
| if( direct_dependency_flag[ i ][ j ] ) | | |
|   direct_dependency_type[ i ][ j ] | u(v) | ⎭ |
| ···OMITTED··· | | } SYNVPS0J |
| } | | |

FIG. 9

Profile, tier, and level syntax

| profile_tier_level( profilePresentFlag, maxNumSubLayersMinus1 ) { | Descriptor | |
|---|---|---|
| if( profilePresentFlag ) { | | |
| general_profile_space | u(2) | |
| general_tier_flag | u(1) | |
| general_profile_idc | u(5) | |
| for( i = 0; i < 32; i++ ) | | |
| general_profile_compatibility_flag[ i ] | u(1) | |
| general_progressive_source_flag | u(1) | SYNPTL01 |
| general_interlaced_source_flag | u(1) | |
| general_non_packed_constraint_flag | u(1) | |
| general_frame_only_constraint_flag | u(1) | |
| general_reserved_zero_44bits | u(44) | |
| } | | |
| general_level_idc | u(8) | SYNPTL02 |
| for( i = 0; i < MaxNumSubLayersMinus1; i++ ) { | | |
| sub_layer_profile_present_flag[ i ] | u(1) | SYNPTL03 |
| sub_layer_level_present_flag[ i ] | u(1) | |
| } | | |
| if( maxNumSubLayersMinus1 > 0 ) | | |
| for( i = maxNumSubLayersMinus1; i < 8; i++ ) | | SYNPTL04 |
| reserved_zero_2bits[ i ] | u(2) | |
| for( i = 0; i < maxNumSubLayersMinus1; i++ ) { | | |
| if( sub_layer_profile_present_flag[ i ] ) { | | |
| sub_layer_profile_space[ i ] | u(2) | |
| sub_layer_tier_flag[ i ] | u(1) | |
| sub_layer_profile_idc[ i ] | u(5) | |
| for( j = 0; j < 32; j++) | | |
| sub_layer_profile_compatibility_flag[ i ][ j ] | u(1) | SYNPTL05 |
| sub_layer_progressive_source_flag[ i ] | u(1) | |
| sub_layer_interlaced_source_flag[ i ] | u(1) | |
| sub_layer_non_packed_constraint_flag[ i ] | u(1) | |
| sub_layer_frame_only_constraint_flag[ i ] | u(1) | |
| sub_layer_reserved_zero_44bits[ i ] | u(44) | |
| } | | |
| if( sub_layer_level_present_flag[ i ] ) | u(8) | SYNPTL06 |
| sub_layer_level_idc[ i ] | | |
| } | | |
| } | | |

SEQUENCE LAYER

PICTURE LAYER

SLICE LAYER

SLICE DATA LAYER

CODING TREE LAYER

CODING UNIT LAYER

FIG. 19(a)

Exp-Golomb bit strings and codeNum in explicit form and used as ue(v)

| Bit string | codeNum |
|---|---|
| 1 | 0 |
| 010 | 1 |
| 011 | 2 |
| 00100 | 3 |
| 00101 | 4 |
| 00110 | 5 |
| 00111 | 6 |
| 0001000 | 7 |
| 0001001 | 8 |
| 0001010 | 9 |
| ... | ... |

FIG. 19(b)

Bit strings with "prefix" and "suffix" bits and assignment to codeNum ranges

| Bit string form | Range of codeNum |
|---|---|
| 1 | 0 |
| 0 1 $x_0$ | 1..2 |
| 0 0 1 $x_0 x_1$ | 3..6 |
| 0 0 0 1 $x_0 x_1 x_2$ | 7..14 |
| 0 0 0 0 1 $x_0 x_1 x_2 x_3$ | 15..30 |
| 0 0 0 0 0 1 $x_0 x_1 x_2 x_3 x_4$ | 31..62 |
| ... | ... |

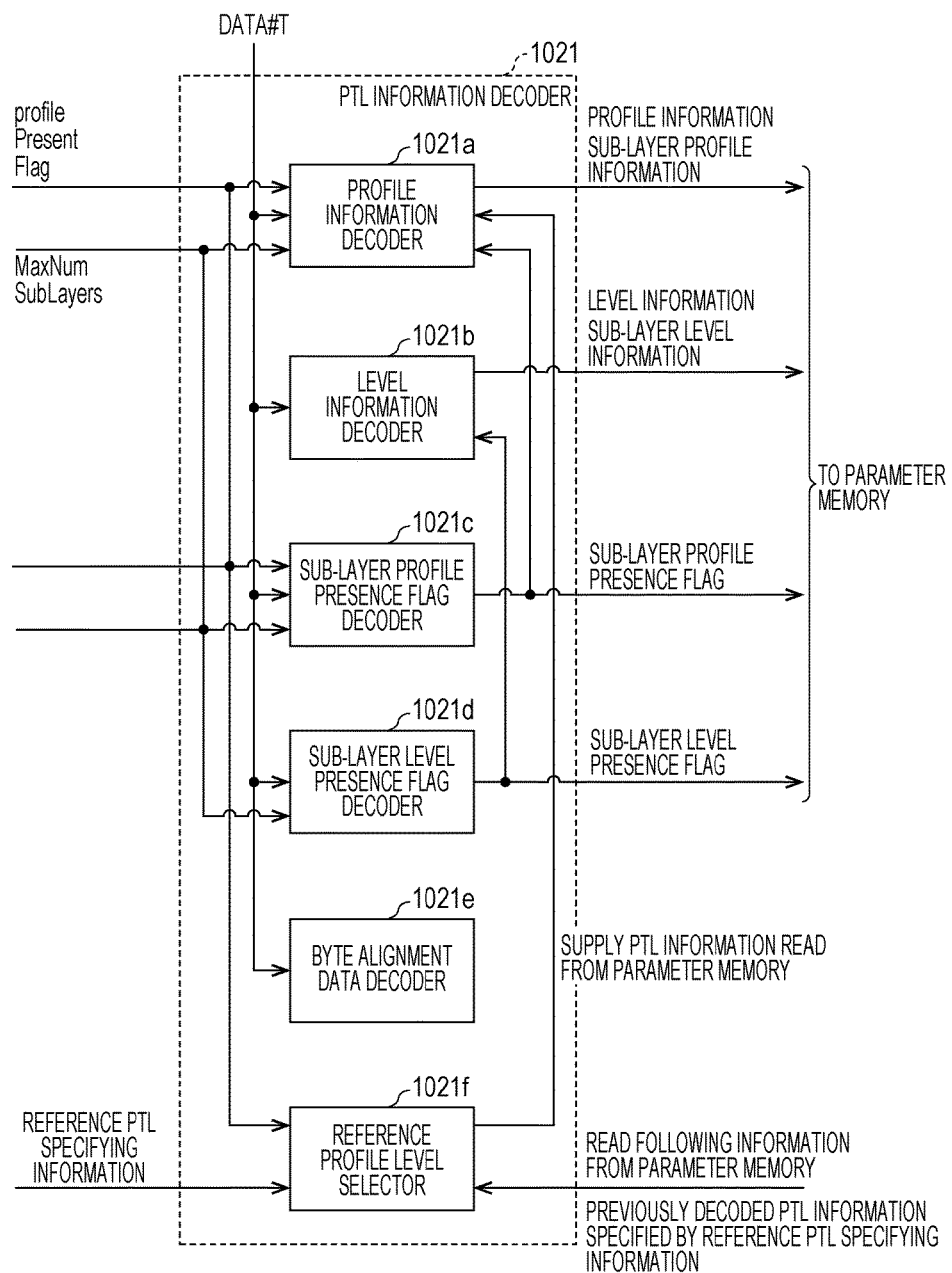

FIG. 22

Video parameter set extension syntax

| vps_extension( ) { | Descriptor | |
|---|---|---|
| avc_base_layer_flag | u(1) | ⎫ SYNVPS0A |
| vps_vui_offset | u(16) | |
| ...OMITTED... | | ⎭ |
| for( i = 1; i <= vps_max_layers_minus1; i++ ) | | ⎫ |
| for( j = 0; j < i; j++ ) | | ⎬ SYNVPS0B |
| direct_dependency_flag[ i ][ j ] | u(1) | ⎭ |
| ...OMITTED... | | |
| vps_number_layer_sets_minus1 | u(10) | } SYNVPS0C |
| vps_num_profile_tier_level_minus1 | u(6) | } SYNVPS0D |
| for( i = 1; i <= vps_num_profile_tier_level_minus1; i++ ) { | | |
| vps_profile_present_flag[ i ] | u(1) | } SYNVPS0E |
| if( !vps_profile_present_flag[ i ] ){ | | |
| profile_ref[ i ] | u(v) | } SYNVPS0Fb |
| ~~profile_ref_minus1[ i ]~~ | ~~u(6)~~ | |
| } | | |
| profile_tier_level( vps_profile_present_flag[ i ], vps_max_sub_layers_minus1 ) | | } SYNVPS0G |
| } | | |
| numOutputLayerSets = vps_number_layer_sets_minus1 + 1 | | |
| ...OMITTED... | | |
| for( i = 1; i < numOutputLayerSets; i++ ) { | | ⎫ |
| if( i > vps_number_layer_sets_minus1 ) { | | |
| output_layer_set_idx_minus1[ i ] | u(v) | |
| lsIdx = output_layer_set_idx_minus1[ i ] + 1 | | |
| for( j = 0 ; j < NumLayersInIdList[ lsIdx ] – 1; j++) | | ⎬ SYNVPS0H |
| output_layer_flag[ i ][ j ] | u(1) | |
| } | | |
| profile_level_tier_idx[ i ] | u(v) | |
| } | | ⎭ |
| ···OMITTED··· | | |
| direct_dep_type_len_minus2 | ue(v) | } SYNVPS0I |
| for( i = 1; i <= vps_max_layers_minus1; i++ ) | | ⎫ |
| for( j = 0; j < i; j++ ) | | ⎬ SYNVPS0J |
| if( direct_dependency_flag[ i ][ j ] ) | | |
| direct_dependency_type[ i ][ j ] | u(v) | ⎭ |
| ···OMITTED··· | | } SYNVPS0K |
| } | | |

FIG. 23

Video parameter set extension syntax

| vps_extension( ) { | Descriptor | |
|---|---|---|
| avc_base_layer_flag | u(1) | ⎫ SYNVPS0A |
| vps_vui_offset | u(16) | ⎬ |
| ... OMITTED ... | | ⎭ |
| for( i = 1; i <= vps_max_layers_minus1; i++ ) | | ⎫ |
| for( j = 0; j < i; j++ ) | | ⎬ SYNVPS0B |
| direct_dependency_flag[ i ][ j ] | u(1) | ⎭ |
| ... OMITTED ... | | |
| vps_number_layer_sets_minus1 | u(10) | ⎬ SYNVPS0C |
| vps_num_profile_tier_level_minus1 | u(6) | ⎬ SYNVPS0D |
| for( i = 1; i <= vps_num_profile_tier_level_minus1; i ++ ) { | | |
| vps_profile_present_flag[ i ] | u(1) | ⎬ SYNVPS0E |
| ~~if( !vps_profile_present_flag[ i ] ){~~ | | |
| ~~profile_ref_minus1[ i ]~~ | ~~u(6)~~ | ⎬ ~~SYNVPS0F~~ |
| } | | |
| profile_tier_level( vps_profile_present_flag[ i ], vps_max_sub_layers_minus1 ) | | ⎬ SYNVPS0G |
| } | | |
| numOutputLayerSets = vps_number_layer_sets_minus1 + 1 | | |
| ... OMITTED ... | | |
| for( i = 1; i < numOutputLayerSets; i++ ) { | | ⎫ |
| if( i > vps_number_layer_sets_minus1 ) { | | ⎪ |
| output_layer_set_idx_minus1[ i ] | u(v) | ⎪ |
| lsIdx = output_layer_set_idx_minus1[ i ] + 1 | | ⎪ |
| for( j = 0 ; j < NumLayersInIdList[ lsIdx ] − 1; j++) | | ⎬ SYNVPS0H |
| output_layer_flag[ i ][ j ] | u(1) | ⎪ |
| } | | ⎪ |
| profile_level_tier_idx[ i ] | u(v) | ⎪ |
| } | | ⎭ |
| ··· OMITTED ··· | | |
| direct_dep_type_len_minus2 | ue(v) | ⎬ SYNVPS0I |
| for( i = 1; i <= vps_max_layers_minus1; i++ ) | | ⎫ |
| for( j = 0; j < i; j++ ) | | ⎬ SYNVPS0J |
| if( direct_dependency_flag[ i ][ j ] ) | | ⎭ |
| direct_dependency_type[ i ][ j ] | u(v) | ⎬ SYNVPS0K |
| ··· OMITTED ··· | | |
| } | | |

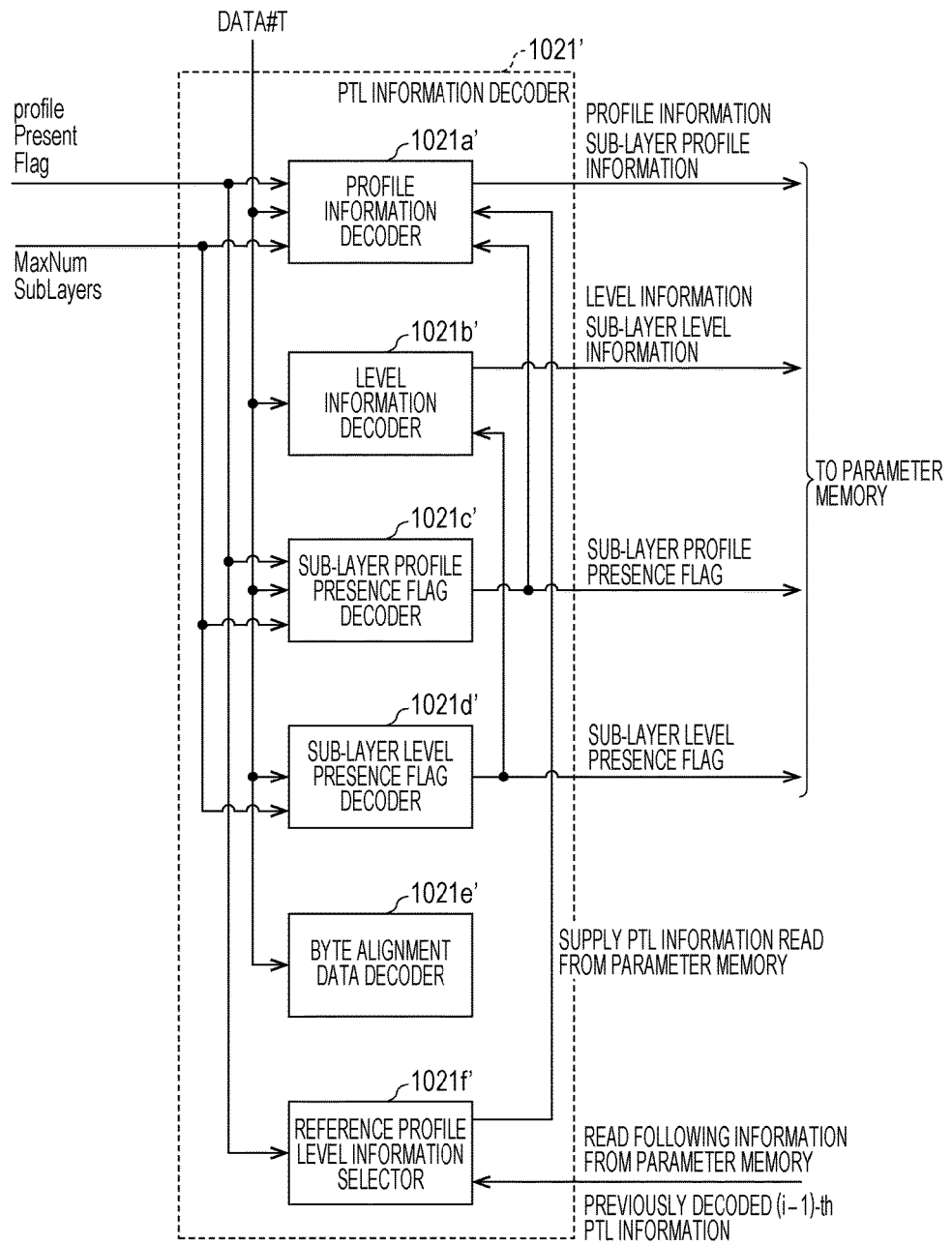

FIG. 28

Video parameter set RBSP syntax

| video_parameter_set_rbsp ( ) { | Descriptor | |
|---|---|---|
| vps_video_parameter_set_id | u(4) | ⎫ |
| vps_reserved_three_2bits | u(2) | ⎬ SYNVPS01 |
| vps_max_layers_minus1 | u(6) | |
| vps_max_sub_layers_minus1 | u(3) | |
| vps_temporal_id_nesting_flag | u(1) | |
| vps_extension_offset //vps_reserved_0xffff_16bits | u(16) | ⎭ |
| ~~profile_tier_level( 1, vps_max_sub_layers_minus1 )~~ | | ⎫ |
| profile_tier_level( 1, 1, vps_max_sub_layers_minus1 ) | | ⎬ SYNVPS02a |
| ...OMITTED... | | ⎭ |
| vps_max_layer_id | u(6) | ⎫ |
| vps_num_layer_sets_minus1 | ue(v) | ⎬ SYNVPS03 |
| for( i = 1; i <= vps_num_layer_sets_minus1; i++ ) | | |
|   for( j = 0; j <= vps_max_layer_id; j++ ) | | ⎭ |
|     layer_id_included_flag[ i ][ j ] | | ⎫ |
| ...OMITTED... | | ⎬ SYNVPS04 |
| vps_extension_flag | u(1) | ⎭ |
| if( vps_extension_flag ) { | | ⎫ SYNVPS05 |
|   while( !byte_aligned( ) ) | | ⎭ |
|     vps_extension_alignment_bit_equal_to_one | u(1) | ⎬ SYNVPS06 |
|   vps_extension( ) | | |
|   vps_extension2_flag | u(1) | ⎫ |
|   if( vps_extension2_flag ) | | ⎬ SYNVPS07 |
|     while( more_rbsp_data( ) ) | | ⎭ |
|       vps_extension_data_flag | | ⎫ |
| } | | ⎬ SYNVPS08 |
| rbsp_trailing_bits( ) | | |
| } | | |

FIG. 29

Video parameter set extension syntax

| vps_extension( ) { | Descriptor | |
|---|---|---|
| avc_base_layer_flag | u(1) | ⎫ SYNVPS0A |
| vps_vui_offset | u(16) | ⎬ |
| ...OMITTED... | | ⎭ |
| for( i = 1; i <= vps_max_layers_minus1; i++ ) | | ⎫ |
| for( j = 0; j < i; j++ ) | | ⎬ SYNVPS0B |
|   direct_dependency_flag[ i ][ j ] | u(1) | ⎭ |
| ...OMITTED... | | |
| vps_number_layer_sets_minus1 | u(10) | } SYNVPS0C |
| vps_num_profile_tier_level_minus1 | u(6) | } SYNVPS0D |
| for( i = 1; i <= vps_num_profile_tier_level_minus1; i++ ) { | | |
|   vps_profile_present_flag[ i ] | u(1) | } SYNVPS0E |
|   <u>vps_level_present_flag[ i ]</u> | <u>u(1)</u> | } SYNVPS0Fc |
|   ~~if( !vps_profile_present_flag[ i ] ){~~ | | |
|   ~~profile_ref_minus1[ i ]~~ | ~~u(6)~~ | |
|   } | | |
|   ~~profile_tier_level( vps_profile_present_flag[ i ], vps_max_sub_layers_minus1 )~~ | | |
|   profile_tier_level( vps_profile_present_flag[ i ],<br>               <u>vps_level_present_flag[ i ],</u><br>               vps_max_sub_layers_minus1 ) | | } SYNVPS0Ga |
| } | | |
| numOutputLayerSets = vps_number_layer_sets_minus1 + 1 | | |
| ...OMITTED... | | |
| for( i = 1; i < numOutputLayerSets; i++ ) { | | ⎫ |
|   if( i > vps_number_layer_sets_minus1 ) { | | ⎪ |
|     output_layer_set_idx_minus1[ i ] | u(v) | ⎪ |
|     lsIdx = output_layer_set_idx_minus1[ i ] + 1 | | ⎬ SYNVPS0H |
|     for( j = 0 ; j < NumLayersInIdList[ lsIdx ] − 1; j++) | | ⎪ |
|       output_layer_flag[ i ][ j ] | u(1) | ⎪ |
|   } | | ⎪ |
|   profile_level_tier_idx[ i ] | u(v) | ⎭ |
| } | | |
| ···OMITTED··· | | |
| direct_dep_type_len_minus2 | ue(v) | } SYNVPS0I |
| for( i = 1; i <= vps_max_layers_minus1; i++ ) | | ⎫ |
|   for( j = 0; j < i; j++) | | ⎬ SYNVPS0J |
|     if( direct_dependency_flag[ i ][ j ] ) | | ⎪ |
|       direct_dependency_type[ i ][ j ] | u(v) | ⎭ |
| ···OMITTED··· | | } SYNVPS0K |
| } | | |

FIG. 32

Profile, tier, and level syntax

| profile_tier_level( profilePresentFlag, levelPresentFlag maxNumSubLayersMinus1 ) { | Descriptor | |
|---|---|---|
| if( profilePresentFlag ) { | | |
| general_profile_space | u(2) | |
| general_tier_flag | u(1) | |
| general_profile_idc | u(5) | |
| for( i = 0; i < 32; i++ ) | | |
| general_profile_compatibility_flag[ i ] | u(1) | |
| general_progressive_source_flag | u(1) | ⎬ SYNPTL01 |
| general_interlaced_source_flag | u(1) | |
| general_non_packed_constraint_flag | u(1) | |
| general_frame_only_constraint_flag | u(1) | |
| general_reserved_zero_44bits | u(44) | |
| } | | |
| if( levelPresentFlag) | | ⎬ SYNPTL02a |
| general_level_idc | u(8) | |
| for( i = 0; i < MaxNumSubLayersMinus1; i++ ) { | | |
| sub_layer_profile_present_flag[ i ] | u(1) | ⎬ SYNPTL03 |
| sub_layer_level_present_flag[ i ] | u(1) | |
| } | | |
| if( maxNumSubLayersMinus1 > 0 ) | | |
| for( i = maxNumSubLayersMinus1; i < 8; i++ ) | | ⎬ SYNPTL04 |
| reserved_zero_2bits[ i ] | u(2) | |
| for( i = 0; i < maxNumSubLayersMinus1; i++ ) { | | |
| if( sub_layer_profile_present_flag[ i ] ) { | | |
| sub_layer_profile_space[ i ] | u(2) | |
| sub_layer_tier_flag[ i ] | u(1) | |
| sub_layer_profile_idc[ i ] | u(5) | |
| for( j = 0; j < 32; j++ ) | | |
| sub_layer_profile_compatibility_flag[ i ][ j ] | u(1) | ⎬ SYNPTL05 |
| sub_layer_progressive_source_flag[ i ] | u(1) | |
| sub_layer_interlaced_source_flag[ i ] | u(1) | |
| sub_layer_non_packed_constraint_flag[ i ] | u(1) | |
| sub_layer_frame_only_constraint_flag[ i ] | u(1) | |
| sub_layer_reserved_zero_44bits[ i ] | u(44) | |
| } | | |
| if( sub_layer_level_present_flag[ i ] ) | | ⎬ SYNPTL06 |
| sub_layer_level_idc[ i ] | u(8) | |
| } | | |
| } | | |

FIG. 36(a) PRE-CORRECTION L0 REFERENCE LIST
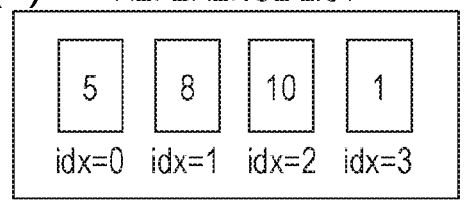
FIG. 36(b) RPL CORRECTION INFORMATION
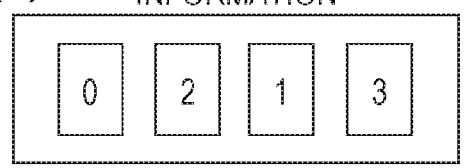
FIG. 36 (c) POST-CORRECTION L0 REFERENCE LIST
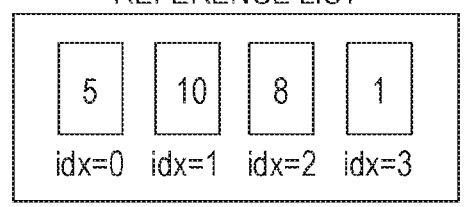

FIG. 39

| seq_parameter_set_rbsp( ) { | Descriptor |
|---|---|
| ... | |
| log2_max_pic_order_cnt_lsb_minus4 | ue(v) |
| ... | |
| (C) { restricted_ref_pic_lists_flag | u(1) |
| if( restricted_ref_pic_lists_flag ) | |
| lists_modification_present_flag | u(1) |
| ... | |
| (A) { num_short_term_ref_pic_sets | ue(v) |
| for( i = 0; i < num_short_term_ref_pic_sets; i++) | |
| short_term_ref_pic_set( i ) | |
| (B) { long_term_ref_pics_present_flag | u(1) |
| if( long_term_ref_pics_present_flag ) { | |
| num_long_term_ref_pics_sps | ue(v) |
| for( i = 0; i < num_long_term_ref_pics_sps; i++ ) { | |
| lt_ref_pic_poc_lsb_sps[ i ] | u(v) |
| used_by_curr_pic_lt_sps_flag[ i ] | u(1) |
| } | |
| } | |
| ... | |
| } | |

(A) SPS SHORT-TERM RPS INFORMATION
(B) SPS LONG-TERM RP INFORMATION
(C) SPS LIST CORRECTION INFORMATION

FIG. 40

| short_term_ref_pic_set( idx ) { | Descriptor |
|---|---|
| num_negative_pics | ue(v) |
| num_positive_pics | ue(v) |
| for( i = 0; i < num_negative_pics; i++ ) { | |
|   delta_poc_s0_minus1[ i ] | ue(v) |
|   used_by_curr_pic_s0_flag[ i ] | u(1) |
| } | |
| for( i = 0; i < num_positive_pics; i++ ) { | |
|   delta_poc_s1_minus1[ i ] | ue(v) |
|   used_by_curr_pic_s1_flag[ i ] | u(1) |
| } | |
| } | |

FIG. 41

| slice_header( ) { | Descriptor |
|---|---|
| ... | |
| if( !dependent_slice_flag ) { | |
| ... | |
| if( !IdrPicFlag ) { | |
| pic_order_cnt_lsb | u(v) |
| short_term_ref_pic_set_sps_flag | u(1) |
| if( !short_term_ref_pic_set_sps_flag ) | |
| short_term_ref_pic_set( num_short_term_ref_pic_sets ) | |
| else | |
| short_term_ref_pic_set_idx | u(v) |
| if( long_term_ref_pics_present_flag ) { | |
| if( num_long_term_ref_pics_sps > 0 ) | |
| num_long_term_sps | ue(v) |
| num_long_term_pics | ue(v) |
| for( i = 0; i < num_long_term_sps + num_long_term_pics; i++ ) { | |
| if( i < num_long_term_sps ) | |
| lt_idx_sps[ i ] | u(v) |
| else { | |
| poc_lsb_lt[ i ] | u(v) |
| used_by_curr_pic_lt_flag[ i ] | u(1) |
| } | |
| delta_poc_msb_present_flag[ i ] | u(1) |
| if( delta_poc_msb_present_flag[ i ] ) | |
| delta_poc_msb_cycle_lt[ i ] | ue(v) |
| } | |
| } | |
| } | |
| ... | |
| } | |

(A) lines span from short_term_ref_pic_set_sps_flag through short_term_ref_pic_set_idx.
(B) lines span from if( long_term_ref_pics_present_flag ) through the closing }.

(A) SH SHORT-TERM RPS INFORMATION
(B) SH LONG-TERM RP INFORMATION

FIG. 42

| slice_header( ) { | Descriptor |
|---|---|
| ... | |
| if( !dependent_slice_flag ) { | |
| ... | |
| if( slice_type == P || slice_type == B ) { | |
| ... | |
| num_ref_idx_active_override_flag | u(1) |
| if( num_ref_idx_active_override_flag ) { | |
| num_ref_idx_l0_active_minus1 | ue(v) |
| if( slice_type == B ) | |
| num_ref_idx_l1_active_minus1 | ue(v) |
| } | |
| if( lists_modification_present_flag ) | |
| ref_pic_list_modification( ) | |
| } | |
| } | |
| ... | |
| } | |

(C) SH LIST CORRECTION INFORMATION

FIG. 43

| ref_pic_list_modification( ) { | Descriptor |
|---|---|
| ref_pic_list_modification_flag_l0 | u(1) |
| if( ref_pic_list_modification_flag_l0 | |
|   for( i = 0; i <= num_ref_idx_l0_active_minus1; i++ ) | |
|     list_entry_l0[ i ] | u(v) |
| if( slice_type == B ) { | |
|   ref_pic_list_modification_flag_l1 | u(1) |
|   if( ref_pic_list_modification_flag_l1 | |
|     for( i = 0; i <= num_ref_idx_l1_active_minus1; i++ ) | |
|       list_entry_l1[ i ] | u(v) |
| } | |
| } | |

FIG. 52(a)

General tier and level limits

| Level | Max luma picture size MaxLumaPS (samples) | Max CPB size MaxCPB (1000 bits) | | Max slice segments per picture MaxSliceSegmentss PerPicture | Max # of tile rows MaxTileRows | Max # of tile columns MaxTileCols |
|---|---|---|---|---|---|---|
| | | Main tier | High tier | | | |
| 1 | 36 864 | 350 | - | 16 | 1 | 1 |
| 2 | 122 880 | 1 500 | - | 16 | 1 | 1 |
| 2.1 | 245 760 | 3 000 | - | 20 | 1 | 1 |
| 3 | 552 960 | 6 000 | - | 30 | 2 | 2 |
| 3.1 | 983 040 | 10 000 | - | 40 | 3 | 3 |
| 4 | 2 228 224 | 12 000 | 30 000 | 75 | 5 | 5 |
| 4.1 | 2 228 224 | 20 000 | 50 000 | 75 | 5 | 5 |
| 5 | 8 912 896 | 25 000 | 100 000 | 200 | 11 | 10 |
| 5.1 | 8 912 896 | 40 000 | 160 000 | 200 | 11 | 10 |
| 5.2 | 8 912 896 | 60 000 | 240 000 | 200 | 11 | 10 |
| 6 | 35 651 584 | 60 000 | 240 000 | 600 | 22 | 20 |
| 6.1 | 35 651 584 | 120 000 | 480 000 | 600 | 22 | 20 |
| 6.2 | 35 651 584 | 240 000 | 800 000 | 600 | 22 | 20 |

FIG. 52(b)

Tiers and level limits for the Main and Main 10 profiles

| Level | Max luma sample rate MaxLumaSR (samples/sec) | Max bit rate MaxBR (1000 bits/s) | | Min Compression Ratio MinCR |
|---|---|---|---|---|
| | | Main tier | High tier | |
| 1 | 552 960 | 128 | - | 2 |
| 2 | 3 686 400 | 1 500 | - | 2 |
| 2.1 | 7 372 800 | 3 000 | - | 2 |
| 3 | 16 588 800 | 6 000 | - | 2 |
| 3.1 | 33 177 600 | 10 000 | - | 2 |
| 4 | 66 846 720 | 12 000 | 30 000 | 4 |
| 4.1 | 133 693 440 | 20 000 | 50 000 | 4 |
| 5 | 267 386 880 | 25 000 | 100 000 | 6 |
| 5.1 | 534 773 760 | 40 000 | 160 000 | 8 |
| 5.2 | 1 069 547 520 | 60 000 | 240 000 | 8 |
| 6 | 1 069 547 520 | 60 000 | 240 000 | 8 |
| 6.1 | 2 139 095 040 | 120 000 | 480 000 | 8 |
| 6.2 | 4 278 190 080 | 240 000 | 800 000 | 6 |

FIG. 53(a)

```
PARAMETER CONSTRAINTS RELATED TO Main Profile (EXAMPLE)

• 4:2:0, 8 bit
• SPS:  MAXIMUM 16 SETS
• PPS:  MAXIMUM 64 SETS
• CTB SIZE: 16x16 TO 64x64
• ONLY ONE OF Tile AND WPP IS AVAILABLE (PARALLELIZATION TOOL)
• entropy_slice_enabled_flag=0
• WIDTH OF Tile IS MINIMUM 256, HEIGHT IS MINIMUM 64
• MAXIMUM NUMBER OF BITS OF 1 CTB: 768 * bitDepth * (NUMBER OF PIXELS OF CTB ÷ 256)
```

FIG. 53(b)

```
ADDITIONAL LEVEL CONSTRAINTS RELATED TO Main Profile (EXAMPLE)

• UPPER LIMIT OF NUMBER OF SLICES: CONFORMS TO LEVEL CONSTRAINTS
• VCL HRD PARAMETER
   • BitRate[ SchedSelIdx ] <= cpbBrVclFactor * MaxBR
   • CpbSize[ SchedSelIdx ] <= cpbBrVclFactor * MaxCPB

• NAL HRD PARAMETER
   • BitRate[ SchedSelIdx ] <= cpbBrVclFactor * MaxBR
   • CpbSize[ SchedSelIdx ] <= cpbBrVclFactor * MaxCPB

• UPPER LIMIT OF NUMBER OF bytes OF NAL unit
   • IN CASE OF AU = 0
      1.5 * ( Max( PicSizeInSamplesY, fR * MaxLumaSR ) +
             MaxLumaSR * ( t_r( 0 ) - t_{r,n}( 0 ) )) ÷ MinCR

• IN CASE OF AU > 0
      1.5 * MaxLumaSR * ( tr( n ) - tr( n - 1 ) ) ÷ MinCR

• RESTRICTION ON CTB SIZE: 32x32 or 64x64 IN LEVEL 5 OR HIGHER
• NUMBER OF REFERENCE PICTURE BUFFERS: 8 OR LESS
• RESTRICTION ON NUMBER OF TILES: CONFORMS TO LEVEL CONSTRAINTS
```

FIG. 54

Profile, tier, and level syntax

| profile_tier_level( profilePresentFlag,<br>     maxNumSubLayersMinus1 ) { | Descriptor | |
|---|---|---|
| if( profilePresentFlag ) { | | |
|  general_profile_space | u(2) | ⎫ |
|  general_tier_flag | u(1) | ⎪ |
|  general_profile_idc | u(5) | ⎪ |
|  for( i = 0; i < 32; i++ ) | | ⎪ |
|   general_profile_compatibility_flag[ i ] | u(1) | ⎬ SYNPTL01 |
|  general_progressive_source_flag | u(1) | ⎪ |
|  general_interlaced_source_flag | u(1) | ⎪ |
|  general_non_packed_constraint_flag | u(1) | ⎪ |
|  general_frame_only_constraint_flag | u(1) | ⎪ |
|  general_reserved_zero_44bits | u(44) | ⎭ |
| } | | |
| general_level_idc | u(8) | } SYNPTL02 |
| for( i = 0; i < MaxNumSubLayersMinus1; i++ ) { | | ⎫ |
|  sub_layer_profile_present_flag[ i ] | u(1) | ⎬ SYNPTL03 |
|  sub_layer_level_present_flag[ i ] | u(1) | ⎪ |
| } | | ⎭ |
| if( maxNumSubLayersMinus1 > 0 ) | | ⎫ |
|  for( i = maxNumSubLayersMinus1; i < 8; i++ ) | | ⎬ SYNPTL04 |
|   reserved_zero_2bits[ i ] | u(2) | ⎭ |
| for( i = 0; i < maxNumSubLayersMinus1; i++ ) { | | |
|  if( sub_layer_profile_present_flag[ i ] ) { | | ⎫ |
|   sub_layer_profile_space[ i ] | u(2) | ⎪ |
|   sub_layer_tier_flag[ i ] | u(1) | ⎪ |
|   sub_layer_profile_idc[ i ] | u(5) | ⎪ |
|   for( j = 0; j < 32; j++ ) | | ⎪ |
|    sub_layer_profile_compatibility_flag[ i ][ j ] | u(1) | ⎬ SYNPTL05 |
|   sub_layer_progressive_source_flag[ i ] | u(1) | ⎪ |
|   sub_layer_interlaced_source_flag[ i ] | u(1) | ⎪ |
|   sub_layer_non_packed_constraint_flag[ i ] | u(1) | ⎪ |
|   sub_layer_frame_only_constraint_flag[ i ] | u(1) | ⎪ |
|   sub_layer_reserved_zero_44bits[ i ] | u(44) | ⎭ |
|  } | | |
|  if( sub_layer_level_present_flag[ i ] ) | | ⎫ |
|   sub_layer_level_idc[ i ] | u(8) | ⎬ SYNPTL06 |
| } | | |
| } | | |

FIG. 55

Video parameter set RBSP syntax

| video_parameter_set_rbsp () { | Descriptor | |
|---|---|---|
| vps_video_parameter_set_id | u(4) | ⎫ |
| vps_reserved_three_2bits | u(2) | |
| vps_max_layers_minus1 | u(6) | ⎬ SYNVPS01 |
| vps_max_sub_layers_minus1 | u(3) | |
| vps_temporal_id_nesting_flag | u(1) | |
| vps_extension_offset //vps_reserved_0xffff_16bits | u(16) | ⎭ |
| profile_tier_level( 1, vps_max_sub_layers_minus1 ) | | } SYNVPS02 |
| ...OMITTED... | | |
| vps_max_layer_id | u(6) | ⎫ |
| vps_num_layer_sets_minus1 | ue(v) | |
| for( i = 1; i <= vps_num_layer_sets_minus1; i++ ) | | ⎬ SYNVPS03 |
|   for( j = 0; j <= vps_max_layer_id; j++ ) | | |
|     layer_id_included_flag[ i ][ j ] | | ⎭ |
| ...OMITTED... | | |
| vps_extension_flag | u(1) | } SYNVPS04 |
| if( vps_extension_flag ) { | | |
|   while( !byte_aligned( ) ) | | ⎬ SYNVPS05 |
|     vps_extension_alignment_bit_equal_to_one | u(1) | |
|   vps_extension( ) | | } SYNVPS06 |
|   vps_extension2_flag | u(1) | ⎫ |
|   if( vps_extension2_flag ) | | |
|     while( more_rbsp_data( ) ) | | ⎬ SYNVPS07 |
|       vps_extension_data_flag | | |
| } | | ⎭ |
| rbsp_trailing_bits( ) | | } SYNVPS08 |
| } | | |

FIG. 56

Video parameter set extension syntax

| vps_extension( ) { | Descriptor | |
|---|---|---|
| avc_base_layer_flag | u(1) | ⎫ SYNVPS0A |
| vps_vui_offset | u(16) | ⎭ |
| ...OMITTED... | | |
| for( i = 1; i <= vps_max_layers_minus1; i++) | | ⎫ |
| for( j = 0; j < i; j++ ) | | ⎬ SYNVPS0B |
| direct_dependency_flag[ i ][ j ] | u(1) | ⎭ |
| ...OMITTED... | | |
| vps_number_layer_sets_minus1 | u(10) | ⎬ SYNVPS0C |
| vps_num_profile_tier_level_minus1 | u(6) | ⎬ SYNVPS0D |
| for( i = 1; i <= vps_num_profile_tier_level_minus1; i ++ ) { | | |
| vps_profile_present_flag[ i ] | u(1) | ⎬ SYNVPS0E |
| if( !vps_profile_present_flag[ i ] ) | | |
| profile_ref_minus1[ i ] | u (v) | ⎬ SYNVPS0F |
| profile_tier_level( vps_profile_present_flag[ i ], vps_max_sub_layers_minus1 ) | | ⎬ SYNVPS0G |
| } | | |
| numOutputLayerSets = vps_number_layer_sets_minus1 + 1 | | |
| ...OMITTED... | | |
| for( i = 1; i < numOutputLayerSets; i++ ) { | | ⎫ |
| if( i > vps_number_layer_sets_minus1 ) { | | |
| output_layer_set_idx_minus1[ i ] | u(v) | |
| lsIdx = output_layer_set_idx_minus1[ i ] + 1 | | |
| for( j = 0 ; j < NumLayersInIdList[ lsIdx ] − 1; j++) | | ⎬ SYNVPS0H |
| output_layer_flag[ i ][ j ] | u(1) | |
| } | | |
| profile_level_tier_idx[ i ] | u(v) | |
| } | | ⎭ |
| ··· OMITTED ··· | | |
| direct_dep_type_len_minus2 | ue(v) | ⎬ SYNVPS0I |
| for( i = 1; i <= vps_max_layers_minus1; i++ ) | | ⎫ |
| for( j = 0; j < i; j++ ) | | ⎬ SYNVPS0J |
| if( direct_dependency_flag[ i ][ j ] ) | | |
| direct_dependency_type[ i ][ j ] | u(v) | ⎭ |
| ··· OMITTED ··· | | ⎬ SYNVPS0K |
| } | | |

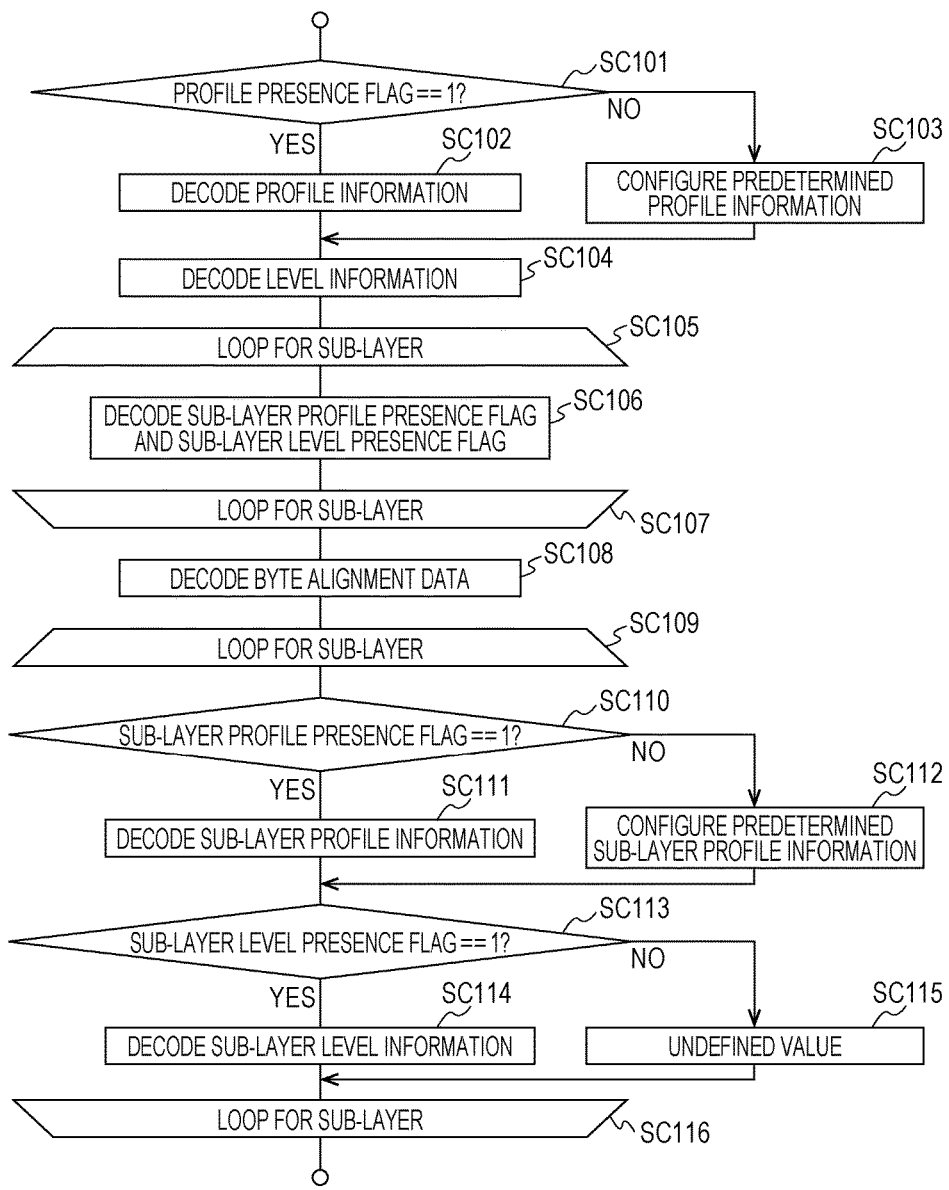

FIG. 62(a)

```
PROFILE INFORMATION CONFIGURING METHOD
FOR EACH SUB-LAYER IN CASE OF PROFILE PRESENCE FLAG = 1 for(i=MaxNumSubLayers-1; i>=0; i--) {
  if( sub_layer_profile_present_flag[i]==0 ) {
    if( i == MaxNumSubLayers-1 ) {
        The i-th sub-layer profile information is set to
        be equal to the general profile information of
        the current profile_tier_level();
    } else {// i<MaxNumSubLayers-1
        The i-th sub-layer profile information is set to
        be equal to the (i+1)-th sub-layer profile
        information of the current profile_tier_level();
    }
    // "PROFILE INFORMATION OF SUB-LAYER i"
    // = "PROFILE INFORMATION OF SUB-LAYER (i+1)"
  }
}
```

FIG. 62(b)

```
PROFILE INFORMATION CONFIGURING METHOD
FOR EACH SUB-LAYER IN CASE OF PROFILE PRESENCE FLAG = 0 for(i=MaxNumSubLayers-1; i>=0; i--) {
  if( sub_layer_profile_present_flag[i]==0 ) {
      The i-th sub-layer profile information is
      set to be equal to the i-th sub-layer profile
      information of the (ProfileRefIdx)-th
      profile_tier_level();
      // "PROFILE INFORMATION OF SUB-LAYER i"
      // = "PROFILE INFORMATION OF SUB-LAYER i OF PTL INFORMATION
      //    SPECIFIED BY ProfileRefIdx"
  }
}
```

FIG. 63(a)

```
LEVEL INFORMATION CONFIGURING METHOD
FOR EACH SUB-LAYER IN CASE OF SUB-LAYER LEVEL PRESENCE FLAG = 0 for(i=MaxNumSubLayers-1; i>=0; i--) {
   if( sub_layer_level_present_flag[i]==0 ) {
      if( i == MaxNumSubLayers-1 ) {
          The i-th sub-layer level information is set to
          be equal to the general level information of
          the current profile_tier_level():
      } else {// i<MaxNumSubLayers-1
          The i-th sub-layer level information is set to
          be equal to the (i+1)-th sub-layer level
          information of the current profile_tier_level();
      }
   //  "LEVEL INFORMATION OF SUB-LAYER i"
   //  = "LEVEL INFORMATION OF SUB-LAYER (i+1)"
   }
}
```

FIG. 63(b)

```
ANOTHER REPRESENTATION OF LEVEL INFORMATION CONFIGURING METHOD
FOR EACH SUB-LAYER IN CASE OF SUB-LAYER LEVEL PRESENCE FLAG = 0 for(i=MaxNumSubLayers-1; i>=0; i--) {
   if( sub_layer_level_present_flag[i]==0 ) {
      sub_layer_level_idc[i] = (i==MaxNumSubLayers-1) ?
         general_level_idc : sub_layer_level_idc[i+1];
   }
}
```

FIG. 64(a)

```
LEVEL INFORMATION CONFIGURING METHOD
FOR EACH SUB-LAYER IN CASE OF LEVEL PRESENCE FLAG=1 for (i=MaxNumSubLayers-1; i>=0; i--) {
  if( sub_layer_level_present_flag[i]==0 ) {
      sub_layer_level_idc[i] = (i==MaxNumSubLayers-1) ?
        general_level_idc : sub_layer_level_idc[i+1];
      // "LEVEL INFORMATION OF SUB-LAYER i"
      // = "LEVEL INFORMATION OF SUB-LAYER (i+1)"
  }
}
```

FIG. 64(b)

```
LEVEL INFORMATION CONFIGURING METHOD
FOR EACH SUB-LAYER IN CASE OF LEVEL PRESENCE FLAG=0 for (i=MaxNumSubLayers-1; i>=0; i--) {
  if( sub_layer_profile_present_flag[i]==0 ) {
      The i-th sub-layer level information is
      set to be equal to the i-th sub-layer level
      information of the (ProfileRefIdx)-th
      profile_tier_level();
      // "LEVEL INFORMATION OF SUB-LAYER i"
      // = "LEVEL INFORMATION OF SUB-LAYER i OF PTL INFORMATION
      //    SPECIFIED BY ProfileRefIdx"
  }
}
```

FIG. 64(c)

```
ANOTHER REPRESENTATION OF LEVEL INFORMATION CONFIGURING METHOD (b)
FOR EACH SUB-LAYER IN CASE OF LEVEL PRESENCE FLAG=0 for (i=MaxNumSubLayers-1; i>=0; i--) {
  if( sub_layer_profile_present_flag[i]==0 ) {
      sub_layer_level_idc[i] =
        sub_layer_level_idc[i] of the (ProfileRefIdx)-th
        profile_tier_level();
      // "LEVEL INFORMATION OF SUB-LAYER i"
      // = "LEVEL INFORMATION OF SUB-LAYER i OF PTL INFORMATION
      //    SPECIFIED BY ProfileRefIdx"
  }
}
```

FIG. 65

Video parameter set extension syntax

| vps_extension( ) { | Descriptor | |
|---|---|---|
| avc_base_layer_flag | u(1) | }SYNVPS0A |
| splitting_flag | u(1) | }SYNVPS0B |
| reserved_zero_6bits | u(6) | }SYNVPS0C |
| vps_vui_offset | u(16) | }SYNVPS0D |
| vps_ptl_info_offset<br>// IN THIS EXAMPLE, BYTE OFFSET TO vps_number_layer_sets_minus1 | u(16) | }SYNVPS0E |
| ~~splitting_flag~~ | ~~u(1)~~ | |
| for(i=0, NumScalabilityTypes=0; i<16; i++) | | |
|   scalability_mask_flag[ i ] | u(1) | }SYNVPS0F |
|   NumScalabityTypes += scalability_mask_flag[ i ] | | |
| } | | |
| ...OMITTED... | | |
| while( !byte_aligned( ) ){ | | |
|   vps_alignment_bit_equal_to_one | u(1) | }SYNVPS0G |
| } | | |
| vps_number_layer_sets_minus1 | u(10) | }SYNVPS0H |
| vps_num_profile_tier_level_minus1 | u(6) | }SYNVPS0I |
| for( i = 1; i <= vps_num_profile_tier_level_minus1; i ++ ) { | | |
|   vps_profile_present_flag[i] | u(1) | }SYNVPS0J |
| } | | |
| for( i=(8-((vps_num_profile_tier_level_minus1+1) % 8) % 8) ; i>0; i--) | | |
|   reserved_zero_1bits[ i ] | u(1) | }SYNVPS0K |
| for( i = 1; i <= vps_num_profile_tier_level_minus1; i ++ ) { | | |
|   ~~vps_profile_present_flag[ i ]~~ | ~~u(1)~~ | |
|   if( vps_profile_present_flag[ i ]) | | |
|     profile_ref_minus1 | ~~U(6)~~ u(8) | }SYNVPS0L |
|   profile_tier_level( vps_profile_present_flag[ i ], vps_max_sub_layers_minus1 ) | | }SYNVPS0M |
| } | | |
| ...OMITTED... | | |
| } | | |

Byte-aligned braces mark: SYNVPS0A–SYNVPS0F block and SYNVPS0H–SYNVPS0M block.

FOLLOWING SYNTAX IS BYTE ALIGNMENT DATA INSERTED TO ADJUST BYTE ALIGNMENT
· vps_alignment_bit_equal_to_one (SYNVPS0G)
· reserved_zero_1bits[i] (SYNVPS0J)

FIG. 68

Video parameter set extension syntax

| vps_extension( ) { | Descriptor | |
|---|---|---|
| avc_base_layer_flag | u(1) | }SYNVPS0A |
| splitting_flag | u(1) | }SYNVPS0B |
| reserved_zero_6bits | u(6) | }SYNVPS0C |
| vps_vui_offset | u(16) | }SYNVPS0D |
| vps_ptl_info_offset<br>// IN THIS EXAMPLE, BYTE OFFSET TO vps_number_layer_sets_minus1 | u(16) | }SYNVPS0E |
| ~~splitting_flag~~ | ~~u(1)~~ | |
| for(i=0, NumScalabilityTypes=0; i<16; i++) | | |
| scalability_mask_flag[ i ] | u(1) | }SYNVPS0F |
| NumScalabityTypes += scalability_mask_flag[ i ] | | |
| } | | |
| ...OMITTED... | | |
| while( !byte_aligned( ) ){ | | |
| vps_alignment_bit_equal_to_one | u(1) | }SYNVPS0G |
| } | | |
| vps_number_layer_sets_minus1 | u(10) | }SYNVPS0H |
| vps_num_profile_tier_level_minus1 | u(6) | }SYNVPS0I |
| for( i = 1; i <= vps_num_profile_tier_level_minus1; i ++ ) { | | |
| vps_profile_present_flag[i] | u(1) | }SYNVPS0J |
| } | | |
| for( i=(8-((vps_num_profile_tier_level_minus1+1) % 8) % 8) ; i>0; i--) | | }SYNVPS0K |
| reserved_zero_1bits[ i ] | u(1) | |
| for( i = 1; i <= vps_num_profile_tier_level_minus1; i ++ ) { | | |
| ~~vps_profile_present_flag[ i ]~~ | ~~u(1)~~ | |
| ~~if( vps_profile_present_flag[ i ])~~ | | |
| ~~profile_ref_minus1~~ | ~~U(6)~~ | }SYNVPS0L |
| profile_tier_level( vps_profile_present_flag[ i ], vps_max_sub_layers_minus1 ) | | }SYNVPS0M |
| } | | |
| ...OMITTED... | | |
| } | | |

Byte-aligned brackets encompass rows SYNVPS0A–SYNVPS0F (upper) and SYNVPS0H–SYNVPS0M (lower).

FOLLOWING SYNTAX IS BYTE ALIGNMENT DATA INSERTED TO ADJUST BYTE ALIGNMENT
· vps_alignment_bit_equal_to_one (SYNVPS0G)
· reserved_zero_1bits[i] (SYNVPS0J)

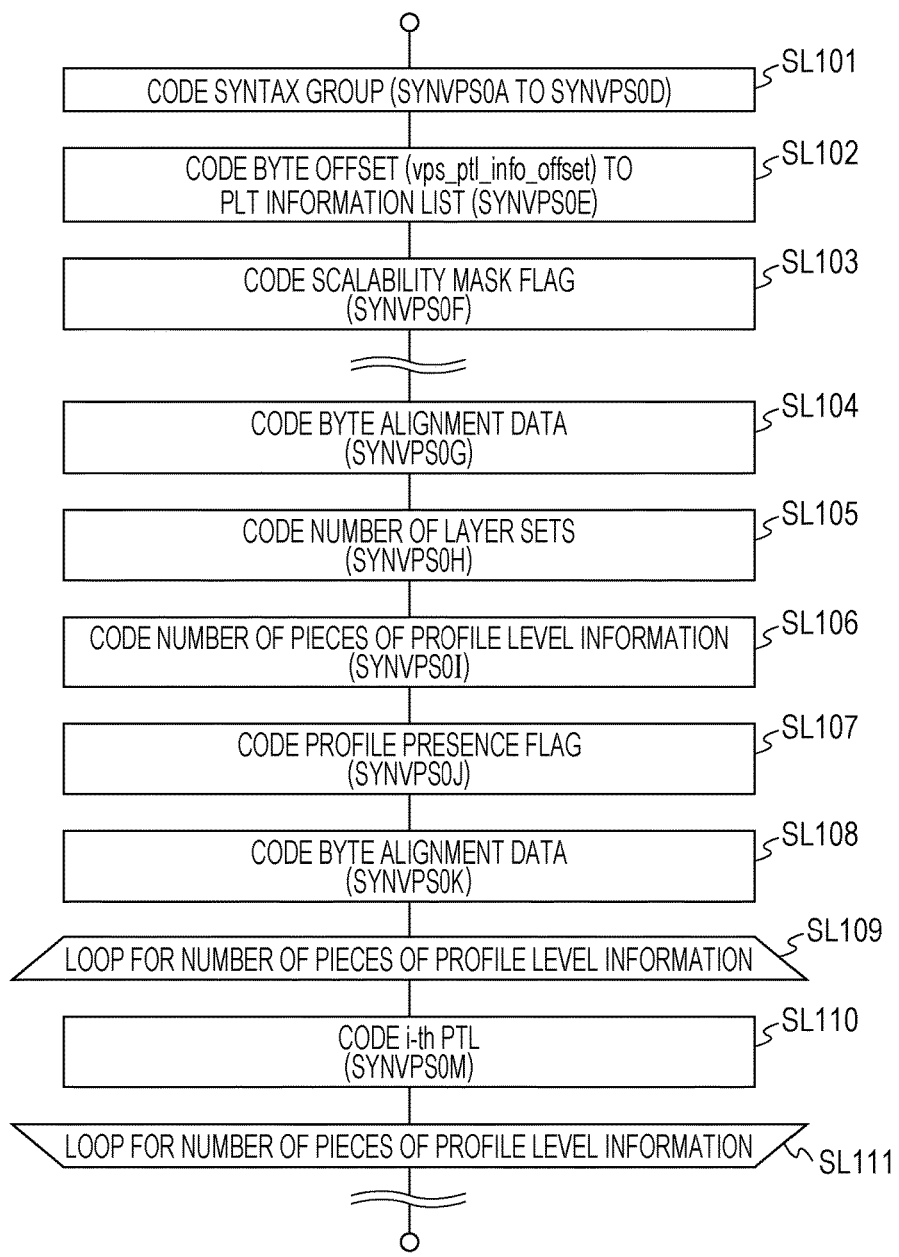

US 10,237,564 B1

IMAGE DECODING DEVICE, IMAGE DECODING METHOD, IMAGE CODING DEVICE, AND IMAGE CODING METHOD

TECHNICAL FIELD

The present invention relates to an image decoding device as well as an image decoding method decoding hierarchically coded data retaining a hierarchically coded image and to an image coding device as well as an image decoding method coding an image hierarchically to generate hierarchically coded data.

BACKGROUND ART

Images or moving images are one type of information transmitted in a communication system or recorded on a storage device. In the related art, there is known an image coding technology for transmitting and storing images (hereinafter, referred to as including moving images as well).

As a moving image coding scheme, there are known H.264/MPEG-4 advanced video coding (AVC) and high-efficiency video coding (HEVC) that is a follow-up codec of AVC (NPL 1).

In these moving image coding schemes, generally, a predicted image is generated on the basis of a locally decoded image obtained by coding/decoding an input image, and a prediction residual (may be called "difference image" or "residual difference image") obtained by subtracting the predicted image from the input image (source image) is coded. As a method for generating the predicted image, inter-frame prediction (inter-prediction) and intra-frame prediction (intra-prediction) are exemplified.

HEVC employs a technology of realizing temporal scalability assuming that a content is reproduced at a temporally reduced frame rate such as when a content of 60 fps is reproduced at 30 fps. Specifically, HEVC imposes constraints such that a temporal identifier (TemporalID; called a sub-layer identifier as well) is assigned to each picture and that a picture of a higher temporal identifier does not reference a picture of a lower temporal identifier. Accordingly, when only pictures of a specific temporal identifier are thinned out for reproduction, it is not necessary to decode pictures to which a higher temporal identifier is attached.

Recently, there has been suggested a scalable coding technology or a hierarchical coding technology coding images hierarchically according to a necessary data rate. As a representative scalable coding scheme (hierarchical coding scheme), there are known scalable HEVC (SHVC) and multiview HEVC (MV-HEVC).

SHVC supports spatial scalability, temporal scalability, and SNR scalability. For example, in the case of spatial scalability, an image downsampled from a source image to a desired resolution is coded as a lower layer. Next, inter-layer prediction is performed in a higher layer to remove redundancy between layers (NPL 2).

MV-HEVC supports view scalability. For example, in a case of coding three viewpoint images of a viewpoint image 0 (layer 0), a viewpoint image 1 (layer 1), and a viewpoint image 2 (layer 2), redundancy between the layers can be removed by performing inter-layer prediction to predict higher layers of the viewpoint image 1 and the viewpoint image 2 from a lower layer (layer 0) (NPL 3).

The inter-layer prediction utilized in scalable coding schemes such as SHVC and MV-HEVC includes inter-layer image prediction and inter-layer motion prediction. In the inter-layer image prediction, texture information (image) of a decoded picture of a lower layer (or a layer different from a target layer) is utilized to generate a predicted image of the target layer. In the inter-layer motion prediction, motion information of a decoded picture of a lower layer (or a layer different from a target layer) is utilized to derive a predicted value of the motion information of the target layer. That is, inter-layer prediction is performed by utilizing the decoded picture of the lower layer (or a layer different from the target layer) as a reference picture for the target layer.

In NPL 1, a profile and a level are defined so as to define processing performance necessary for an image decoding device (decoder) to decode coded data (or hierarchically coded data) of an image.

A profile defines processing performance that a decoder complying with a standard has to exhibit, assuming a specific application, and is defined by a combination or a set of coding tools (underlying technologies). Defining a profile has the advantage of enabling reduction of complexity of a decoder/encoder because individual applications may only implement an appropriate profile, not the entire standard.

A level defines the upper limit of the processing performance of a decoder as well as the range of the size of circuitry and defines constraints on parameters such as the maximum number of pixels processed per time, the maximum resolution of an image, the maximum bit rate, the maximum size of a reference image buffer, and the minimum compression ratio. That is, a level defines the processing performance of a decoder as well as the complexity of a bitstream. A level also defines the extent to which a tool defined by each profile is to be supported. Thus, a higher level is required to support a lower level.

In NPL 1, for example, various parameters restricted by a level are exemplified by, as illustrated in FIG. 52($a$), the maximum luminance picture size (Max luma picture size), the maximum bit rate (Max bit rate), the maximum CPB size (Max CPB size), the maximum number of slice segments per picture (Max slice segments per picture), the maximum number of tile rows per picture (Max number of tile rows), and the maximum number of tile columns per picture (Max number of tile columns). In addition, various parameters restricted by a level and applied to a specific profile are exemplified by, as illustrated in FIG. 52($b$), the maximum luminance sample rate (Max luma sample rate), the maximum bit rate (Max bit rate), and the minimum compression ratio (Min compression ratio). As a sub-concept of a level, "tier" is employed to represent whether the maximum bit rate of a bitstream (coded data) corresponding to each level and the maximum CPB size for storing the bitstream are defined in a Main tier (for consumer applications) or are defined in a High tier (for professional applications).

In NPL 1, for example, a main profile is defined as a profile. A main profile defines constraints on a coding tool such as those illustrated in FIG. 53($a$). A main profile also defines additional level constraints illustrated in FIG. 53($b$) in addition to the constraints defined by a level illustrated in FIGS. 52($a$) and 52($b$).

In NPL 1, a profile that a bitstream complies with is specified by a profile identifier general_profile_idc (in a syntax group SYNPTL01 of FIG. 54) in profile/level information (hereinafter, referred to as PTL information as well) profile_tier_level( ) illustrated in FIG. 54. For example, when a bitstream complies with a main profile, the value of general_profile_idc is set to one.

In addition, general_profile_compatibility_flag[i] (in the syntax group SYNPTL01 of FIG. 54) indicates whether a current bitstream can be decoded by a decoder complying with a profile other than the profile specified by the profile identifier general_profile_idc. For example, when the profile is compatible with the main profile, general_profile_compatibility_flag[1] is set to one.

In addition, a level identifier general_level_idc (in SYNPTL02 of FIG. 54) in the PTL information profile_tier_level( ) specifies one of the levels of FIGS. 52(a) and 52(b) that the complexity of a bitstream, or a level indicating the performance of a decoder required to decode a bitstream, complies with. For example, the value of the level identifier general_level_idc indicating "61" corresponds to the level 6.1 of FIGS. 52(a) and 52(b), and the value of the level identifier general_level_idc indicating "10" corresponds to the level 1 of FIGS. 52(a) and 52(b). That is, the tens' place (first digit) and the ones' place (second digit) of the value indicated by the level identifier general_level_idc respectively correspond to the integer value and the fraction value of a level in FIGS. 52(a) and 52(b).

In addition, a tier flag general_tier_flag (in the syntax group SYNPTL01 of FIG. 54) indicates whether a tier in the level specified by the level identifier general_level_idc is the Main tier or the High tier. The value of the tier flag general_tier_flag being zero indicates the Main tier, and the value being one indicates the High tier.

In the PTL information profile_tier_level( ) illustrated in FIG. 54, profile information (hereinafter, referred to as sub-layer profile information; a syntax group SYNPTL 05 in FIG. 54) per layer related to temporal scalability (hereinafter, referred to as a sub-layer or a temporal sub-layer as well) and level information (hereinafter, referred to as sub-layer level information; a syntax SYNPTL06 in FIG. 54) can be explicitly specified if each of a sub-layer profile presence flag sub_layer_profile_present_flag[i] (in a syntax group SYNPTL03 of FIG. 54) and a sub-layer level presence flag sub_layer_level_present_flag[i] (in the syntax group SYNPTL03 of FIG. 54) is set to one.

In NPL 1, the PTL information profile_tier_level( ) is signaled in both parameter sets of a video parameter set (VPS) and a sequence parameter set (SPS) illustrated in FIG. 10(a).

In scalable coding such as SHVC (NPL 2) or MV-HEVC (NPL 3), the PTL information applied to each layer set included in hierarchically coded data (bitstream) is signaled in the bitstream. Specifically, the PTL information profile_tier_level( ) related to a layer set 0 (base layer) is signaled in SYNVPS02 of a video parameter set in FIG. 55, and a PTL information list configured of the value of the total number of pieces of PTL information included in the bitstream—1 "vps_num_profile_tier_level_minus1" (SYNVPS0D in FIG. 56) and the vps_num_profile_tier_level_minus1 numbers of pieces of PTL information (SYNVPS0G in FIG. 56) is signaled in video parameter set extension data (FIG. 56). Next, a PTL information specifying index "profile_tier_level_idx[i]" (in a syntax group SYNVPS0H of FIG. 56) specifying the PTL information applied to each layer set (layer set i) is signaled. By so doing, the coding amount of the PTL information can be reduced in comparison with a case where the PTL information is signaled per layer set. In addition, if the PTL information occurring before an i-th iteration and including the same profile information as the i-th PTL information included in the PTL information list exists in the PTL information list, the value of a VPS profile presence flag "vps_profile_present_flag[i]" (SYNVPS0E in FIG. 56) is signaled as zero. Furthermore, an index (reference PTL information specifying index) "profile_ref_minus1[i]" (SYNVPS0F in FIG. 56) indicating the position of the corresponding PTL information on the PTL information list is signaled, and the profile information of the i-th PTL information inherits the profile information of the "profile_ref_minus1[i]+1"-th PTL information. By so doing, the redundancy of duplicate signaling of the profile information can be reduced (FIGS. 57, 62(a), and 62(b)).

In other words, the method of the related art for signaling the syntax structure related to the profile/level information profile_tier_level( ) for a layer set is summarized as follows. That is, the list of the syntax structure related to the profile/level information profile_tier_level( ) is signaled, and the PTL information specified by the i-th PTL information specifying index profile_level_tier_idx[i] is selected as the profile/level information applied to the i-th layer set from the PTL information list.

Details of signaling the profile/level information profile_tier_level( ) in the list are as follows.

The i-th VPS profile presence flag vps_profile_present_flag[i] is signaled in each profile/level information profile_tier_level( ). When the flag is set to "0", the i-th reference PTL information specifying index profile_ref_minus1[i] is signaled as well, and general profile information of the i-th profile/level information profile_tier_level( ) is estimated from the general profile information of the (profile_ref_minus1[i]+1)-th profile/level information profile_tier_level( ).

In signaling of the profile and level of each profile/level information profile_tier_level( ), each of the profile and level of the i-th sub-layer may be omitted by the sub-layer profile presence flag sub_layer_profile_present_flag and the i-th sub-layer level presence flag sub_layer_level_present_flag[i].

FIG. 59 is a diagram illustrating a schematic configuration of a PTL decoder of the related art, and FIG. 61 is a diagram illustrating a summary of a decoding operation of the PTL decoder of the related art illustrated in FIG. 59. FIG. 60 is a diagram illustrating a schematic configuration of a PTL coder of the related art.

CITATION LIST

Non Patent Literature

NPL 1: "Recommendation H.265 (04/13)", ITU-T (published on Jun. 7, 2013)

NPL 2: JCTVC-N1008_v3 "SHVC Draft 3", Joint Collaborative Team on Video Coding (JCT-VC) of ITU-T SG16 WP3 and ISO/IEC JTC 1/SC 29/WG 11 14th Meeting: Vienna, AT, Jul. 25-Aug. 2, 2013 (published on Aug. 20, 2013)

NPL 3: JCT3V-E1008_v5 "MV-HEVC Draft Text 5", Joint Collaborative Team on 3D Video Coding Extension Development of ITU-T SG16 WP3 and ISO/IEC JTC 1/SC 29/WG 11 5th Meeting: Vienna, AT, Jul. 27 to Aug. 2, 2013 (published on Aug. 7, 2013)

SUMMARY OF INVENTION

Technical Problem

Problems, however, arise in the technology of the related art related to signaling of the PTL information profile_tier_level( ) in the video parameter set extension data as follows.

(1) In NPL 2 and NPL 3, a constraint is set such that "the range of the value of "profile_ref_minus1[i]" is less than i". Thus, when the VPS profile presence flag "vsp_profile_p- resent_flag[1]" of the first PTL information on the PTL information list is zero, a problem arises in that the zeroth (foremost) PTL information on the PTL information list cannot be specified as a destination of reference by the reference PTL information specifying index "profile_ref_minus1[l]+1". Another problem arises in that if specifying the zeroth PTL information as a destination of reference is not allowed, the coding amounts of the VPS profile presence flag "vps_profile_present_flag[1]" and the reference PTL information specifying index "profile_ref_minus1[1]" are redundantly large in the first PTL information on the PTL information list.

(2) In an encoder, most part of the i-th PTL information can have a high probability of referencing the immediately previous PTL information by rearranging in advance the signaled PTL information on the PTL information list in order of similarity before coding. However, in the technology of the related art, the reference PTL information index "profile_ref_minus1" is always coded at a fixed length of six bits, and this poses a problem in that the coding amount thereof is redundantly large.

(3) In a case of referencing the profile information of the i-th PTL information through the (profile_ref_minus1[i]+1)-th PTL information, when the profile information of a sub-layer is not signaled in the reference destination ((profile_ref_minus1[i]+1)-th) PTL information, this poses a problem in that the profile information of the corresponding sub-layer is not defined in the reference source (i-th) PTL information. Similarly, when the level information of a sub-layer is not signaled in the i-th PTL information, this poses a problem in that the level information of the corresponding sub-layer is not defined in the layer set referencing the i-th PTL information (refer to SC115 in FIG. 61).

For example, it is assumed that a decoder is about to decode a bitstream of a target layer set extracted from hierarchically coded data (bitstream) by a sub-bitstream extracting process. At this time, when the level that the decoder complies with is less than the level (general_level_idc) of the highest sub-layer (or the highest temporal layer) of a target layer set, the decoder does not exhibit processing performance necessary for decoding the bitstream including the target layer set. Thus, it is possible that an unintended frame drop may occur in the reproduction of moving images. Meanwhile, if the level information is appropriately imparted to each sub-layer, the decoder references the level information of each sub-layer in the PTL information of the target layer set and extracts the bitstream of the sub-layer (layer and sub-layer) satisfying the profile and level that the decoder complies with from the bitstream of the target layer set (sub-bitstream extraction) to decode the extracted bitstream, thereby being capable of preventing an unintended frame drop.

The present invention is devised in view of the above problem, and an object thereof is to realize an image decoding device as well as an image coding device capable of improving syntax and data structure related to PTL information necessary for determining whether a decoder is capable of decoding coded data (or hierarchically coded data) in which an image is coded, to reduce the processing and coding amount related to decoding/coding of profile information and level information.

Solution to Problem

In order to resolve the above problem, according to an aspect of the present invention, there is provided an image decoding device that decodes hierarchically coded data, the device including a profile presence flag decoder that decodes a profile presence flag indicating the presence of profile information in PTL information on a PTL information list, and a PTL information decoder that decodes the PTL information, in which the PTL information decoder in the case where the profile presence flag is one, decodes the profile information of the PTL information from coded data, and in the case where the profile information presence flag is zero, estimates the profile information in the PTL information to be the same as the profile information of first previously decoded PTL information.

According to another aspect of the present invention, there is provided an image decoding method for decoding hierarchically coded data, the method including a profile presence flag decoding step of decoding a profile presence flag indicating the presence of profile information in PTL information on a PTL information list, and a PTL information decoding step of decoding the PTL information, in which the PTL information decoding step in the case where the profile presence flag is one, decodes the profile information of the PTL information from coded data, and in the case where the profile information presence flag is zero, estimates the profile information in the PTL information to be the same as the profile information of first previously decoded PTL information.

According to still another aspect of the present invention, there is provided an image coding device that hierarchically codes image data to generate hierarchically coded data, the device including a PTL information coder that codes PTL information indicating a profile of the hierarchically coded data, in which the PTL information coder codes the value of a profile presence flag as one in the case of coding profile information into the PTL information, and codes the value of the profile presence flag as zero in the case of estimating the profile information in the PTL information to be the same as the profile information of first previously coded PTL information.

According to still another aspect of the present invention, there is provided an image coding method for hierarchically coding image data to generate hierarchically coded data, the method including a PTL information coding step of coding PTL information indicating a profile of the hierarchically coded data, in which the PTL information coding step codes the value of a profile presence flag as one in the case of coding profile information into the PTL information, and codes the value of the profile presence flag as zero in the case of estimating the profile information in the PTL information to be the same as the profile information of first previously coded PTL information.

Advantageous Effects of Invention

According to an aspect of the present invention, the effect that the profile and tier information of the first profile/level information can be estimated from the zeroth profile/level information is accomplished.

According to an aspect of the present invention, the effect that the number of bits can be reduced is accomplished because an i-th reference PTL information specifying index is coded.

According to an aspect of the present invention, the effect that the number of bits can be reduced is accomplished because the profile and tier information of i-th profile/level information can be estimated from (i−1)-th profile/level information.

BRIEF DESCRIPTION OF DRAWINGS

FIG. 1(a) illustrates a hierarchical moving image coding device side, and FIG. 1(b) illustrates a hierarchical moving image decoding device side.

FIGS. 5(a) and 5(b) is are diagrams illustrating a configuration of coded data of an NAL unit.

FIG. 6 is a diagram illustrating values of an NAL unit type and a relationship between types of NAL units.

FIG. 7 is an example of a syntax table of a video parameter set VPS.

FIG. 8 is an example of a syntax table of an extension video parameter set VPS.

FIG. 9 is a diagram illustrating a data structure of PTL information.

FIG. 10(a) is a diagram illustrating a sequence layer defining a sequence SEQ, FIG. 10(b) is a diagram illustrating a picture layer defining a picture PICT, FIG. 10(c) is a diagram illustrating a slice layer defining a slice S, FIG. 10(d) is a diagram illustrating a slice data layer defining slice data, FIG. 10(e) is a diagram illustrating a coding tree layer defining a coding tree unit included in the slice data, and FIG. 10(f) is a diagram illustrating a coding unit layer defining a coding unit (CU) included in the coding tree.

FIGS. 19(a) and 19(b) are diagrams illustrating relative indexes represented by Golomb codes.

FIG. 20 is a block diagram illustrating details of a PTL information decoder.

FIG. 22 is a modification example of the syntax table of the extension video parameter set VPS (VPS extension data).

FIG. 23 is a modification example of the syntax table of the extension video parameter set VPS (VPS extension data).

FIG. 27 is a block diagram illustrating a modification example of details of the PTL information decoder.

FIG. 28 is a modification example of the syntax table of the video parameter set VPS.

FIG. 29 is a modification example of the syntax table of the extension video parameter set VPS (VPS extension data).

FIG. 32 is a diagram illustrating a modification example of the data structure of PTL information.

FIG. 35(a) is a diagram in which pictures constituting a moving image are lined up in order of display, FIG. 35(b) is a diagram illustrating an example of RPS information applied to a target picture, FIG. 35(c) is a diagram illustrating a current RPS derived when the RPS information illustrated in FIG. 35(b) is applied in a case where the POC of the target picture is zero, and FIGS. 35(d) and 35(e) are diagrams illustrating examples of a reference picture list generated from the reference pictures included in the current RPS.

FIGS. 36(a)-36(c) are diagrams illustrating an example of correcting a reference picture list: FIG. 36(a) is a diagram illustrating a L0 reference list before modification, FIG. 36(b) is a diagram illustrating RPL modification information, and FIG. 36(c) is a diagram illustrating the L0 reference list after modification.

FIG. 39 is a diagram illustrating a part of an SPS syntax table utilized in decoding an SPS in the header decoder and a reference picture information decoder of the image decoding device.

FIG. 40 is a diagram illustrating a syntax table of a short-term reference picture set utilized in decoding an SPS as well as in decoding a slice header in the header decoder and the reference picture information decoder of the image decoding device.

FIG. 41 is a diagram illustrating a part of a slice header syntax table utilized in decoding a slice header in the header decoder and the reference picture information decoder of the image decoding device.

FIG. 42 is a diagram illustrating a part of the slice header syntax table utilized in decoding a slice header in the header decoder and the reference picture information decoder of the image decoding device.

FIG. 43 is a diagram illustrating a syntax table of reference list rearrangement information utilized in decoding a slice header in the header decoder and the reference picture information decoder of the image decoding device.

FIG. 50(*a*) illustrates the transmission apparatus on which the hierarchical moving image coding device is mounted, and FIG. 50(*b*) illustrates the reception apparatus on which the hierarchical moving image decoding device is mounted.

FIG. 51(*a*) illustrates the recording apparatus on which the hierarchical moving image coding device is mounted, and FIG. 51(*b*) illustrates the reproduction apparatus on which the hierarchical moving image decoding device is mounted.

FIGS. 52(*a*) and 52(*b*) is are diagrams illustrating a limit value of each parameter related to level constraints in the technology of the related art.

FIGS. 53(*a*) and 53(*b*) are diagrams of the technology of the related art: FIG. 53(*a*) is an example of parameter constraints related to the Main profile, and FIG. 53(*b*) is an example of additional level constraints related to the Main profile.

FIG. 54 is a diagram illustrating the data structure of the PTL information in the technology of the related art.

FIG. 55 is a diagram illustrating the syntax table of the video parameter set VPS in the technology of the related art.

FIG. 56 is a diagram illustrating the syntax table of the extension video parameter set VPS in the technology of the related art.

FIG. 61 is a flowchart illustrating the flow of processes in the PTL information decoder in the technology of the related art.

FIGS. 62(*a*) and 62(*b*) are pseudocode illustrating an example of a configuration method for profile information of a sub-layer according to the present embodiment: FIG. 62(*a*) illustrates the configuration method in a case where a profile presence flag (profilePresentFlag) is one, and FIG. 62(*b*) illustrates the configuration method in a case where the profile presence flag is zero.

FIGS. 63(*a*) and 63(*b*) are pseudocode illustrating an example of a configuration method for level information of a sub-layer according to the present embodiment: FIG. 63(*a*) illustrates the configuration method in a case where a sub-layer level presence flag (sub_layer_level_flag[i]) is zero, and FIG. 63(*b*) is pseudocode illustrating another representation of FIG. 63(*a*).

FIGS. 64(*a*)-64(*c*) are pseudocode illustrating an example of a configuration method for profile information of a sub-layer according to the present embodiment: FIG. 64(*a*) illustrates the configuration method in a case where a level presence flag (levelPresentFlag) is one, and FIGS. 64(*b*) and 64(*c*) illustrate the configuration method in a case where the level presence flag is zero.

FIG. 65 is an example of the modification example of the syntax table of the extension video parameter set VPS (VPS extension data).

FIG. 68 is an example of the modification example of the syntax table of the extension video parameter set VPS (VPS extension data).

FIG. 70 is a flowchart illustrating a modification example of the VPS extension data coding process.

DESCRIPTION OF EMBODIMENTS

A hierarchical moving image decoding device 1 and a hierarchical moving image coding device 2 according to one embodiment of the present invention will be described as follows on the basis of FIG. 1(*a*) to FIG. 27.

SUMMARY

The hierarchical moving image decoding device (written as an image decoding device as well) 1 according to the present embodiment decodes coded data that is hierarchically coded by the hierarchical moving image coding device (written as an image coding device as well) 2. Hierarchical coding is a coding scheme that hierarchically codes a moving image to high-quality one from low-quality one. Hierarchical coding is standardized in, for example, SVC and SHVC. The quality of a moving image referred hereto widely means elements that affect the subjective and objective look of a moving image. The quality of a moving image includes, for example, "resolution", "frame rate", "image quality", and "pixel reproduction accuracy". Thus, while different quality of moving images referred hereafter indicates that "resolution" or the like is different for illustrative purposes, the invention is not limited to this. For example, in the case of moving images that are quantized in different quantization steps (that is, in the case of moving images that are coded by different coding noises), it is said that the quality of the moving images is different from each other.

From the viewpoint of types of information hierarchically coded, a hierarchical coding technology may be classified into (1) spatial scalability, (2) temporal scalability, (3) signal-to-noise ratio (SNR) scalability, and (4) view scalability. The spatial scalability is a technology of hierarchical coding with respect to the resolution or size of an image. The temporal scalability is a technology of hierarchical coding with respect to the frame rate (number of frames per time). The SNR scalability is a technology of hierarchical coding with respect to coding noise. The view scalability is a technology of hierarchical coding with respect to viewpoint positions associated in each image.

Prior to detailed descriptions of the hierarchical moving image coding device 2 and the hierarchical moving image decoding device 1 according to the present embodiment, first, (1) the layer structure of hierarchically coded data generated by the hierarchical moving image coding device 2 and decoded by the hierarchical moving image decoding device 1 will be described, and (2) a specific example of a data structure capable of use in each layer will be described next.

[Layer Structure of Hierarchically Coded Data]

Figure 1A:
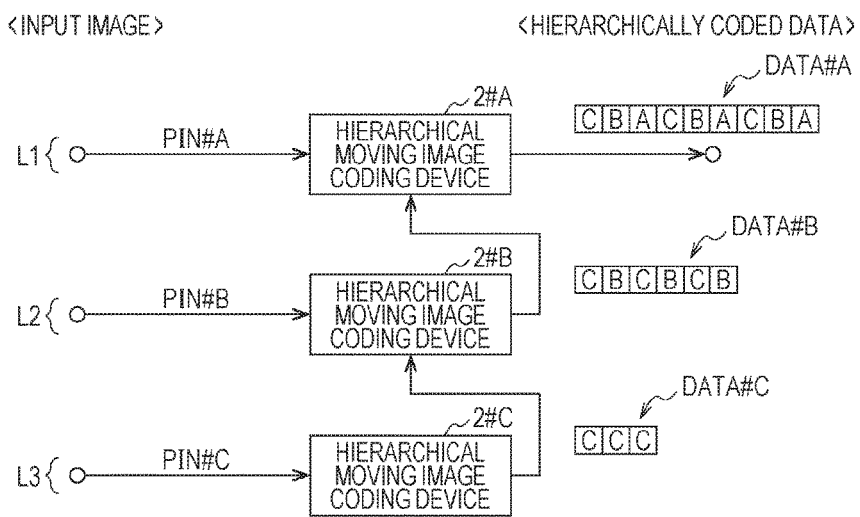
FIGS. 1(a) and 1(b) are diagrams illustrating a layer structure of hierarchically coded data according to one embodiment of the present invention.
Figure 1B:
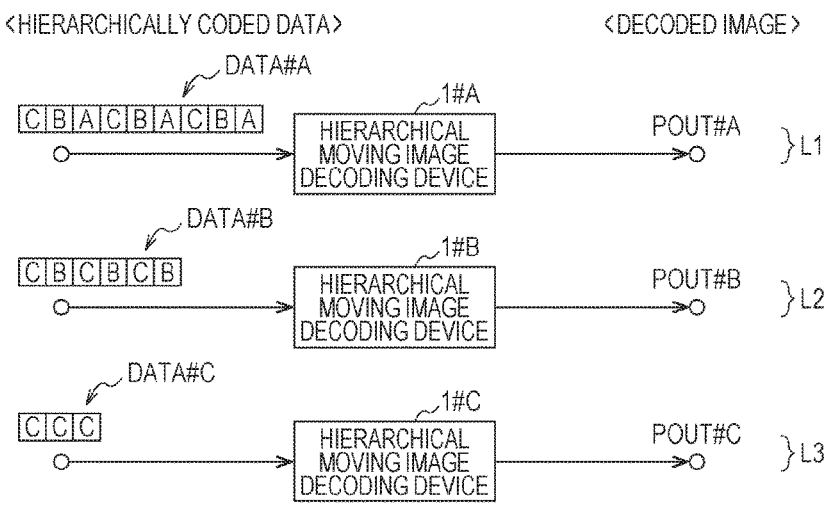

Coding and decoding of hierarchically coded data will be described as follows by employing FIGS. 1(a) and 1(b). FIGS. 1(a) and 1(b) are diagrams schematically representing a case where a moving image is hierarchically coded/decoded in three layers of a lower layer L3, an intermediate layer L2, and a higher layer L1. That is, in the examples illustrated in FIGS. 1(a) and 1(b), the higher layer L1 is the uppermost layer of the three layers, and the lower layer L3 is the lowermost layer thereof.

Hereinafter, a decoded image corresponding to specific quality that may be decoded from hierarchically coded data will be referred to as a decoded image in a specific layer (or a decoded image corresponding to a specific layer) (for example, a decoded image POUT#A in the higher layer L1).

FIG. 1(a) illustrates hierarchical moving image coding devices 2#A to 2#C that respectively code input images PIN#A to PIN#C hierarchically to generate coded data DATA#A to DATA#C. FIG. 1(b) illustrates hierarchical moving image decoding devices 1#A to 1#C that respectively decode the hierarchically coded data DATA#A to DATA#C to generate decoded images POUT#A to POUT#C.

First, the coding device side will be described by employing FIG. 1(a). The input images PIN#A, PIN#B, and PIN#C that are input on the coding device side are originated from the same image but have different quality (resolution, frame rate, image quality, or the like). The quality of the input images PIN#A, PIN#B, and PIN#C decreases in this order.

The hierarchical moving image coding device 2#C in the lower layer L3 codes the input image PIN#C in the lower layer L3 to generate the coded data DATA#C in the lower layer L3. The coded data DATA#C includes base information (illustrated by "C" in FIGS. 1(a) and 1(b)) necessary for decoding to obtain the decoded image POUT#C in the lower layer L3. Since the lower layer L3 is the lowermost layer, the coded data DATA#C in the lower layer L3 is referred to as base coded data as well.

The hierarchical moving image coding device 2#B in the intermediate layer L2 codes the input image PIN#B in the intermediate layer L2 while referencing the coded data DATA#C in the lower layer to generate the coded data DATA#B in the intermediate layer L2. The coded data DATA#B in the intermediate layer L2 includes additional information (illustrated by "B" in FIGS. 1(a) and 1(b)) necessary for decoding to obtain the decoded image POUT#B in the intermediate layer as well as the base information "C" included in the coded data DATA#C.

The hierarchical moving image coding device 2#A in the higher layer L1 codes the input image PIN#A in the higher layer L1 while referencing the coded data DATA#B in the intermediate layer L2 to generate the coded data DATA#A in the higher layer L1. The coded data DATA#A in the higher layer L1 includes additional information (illustrated by "A" in FIGS. 1(a) and 1(b)) necessary for decoding to obtain the decoded image POUT#A in the higher layer as well as the base information "C" necessary for decoding to obtain the decoded image POUT#C in the lower layer L3 and the additional information "B" necessary for decoding to obtain the decoded image POUT#B in the intermediate layer L2.

As such, the coded data DATA#A in the higher layer L1 includes information related to plural decoded images of different quality.

Next, the decoding device side will be described with reference to FIG. 1(b). On the decoding device side, the decoding devices 1#A, 1#B, and 1#C respectively in the higher layer L1, the intermediate layer L2, and the lower layer L3 decode the coded data DATA#A, DATA#B, and DATA#C to output the decoded images POUT#A, POUT#B, and POUT#C.

A moving image can be reproduced in specific quality by extracting a part of information of higher hierarchically coded data and decoding the extracted information in a lower specific decoding device.

For example, the hierarchical decoding device 1#B in the intermediate layer L2 may extract information necessary for decoding to obtain the decoded image POUT#B (that is, "B" and "C" included in the hierarchically coded data DATA#A) from the hierarchically coded data DATA#A in the higher layer L1 and may decode the extracted information to obtain the decoded image POUT#B. In other words, on the decoding device side, decoding can be performed on the basis of information included in the hierarchically coded data DATA#A in the higher layer L1 to obtain the decoded images POUT#A, POUT#B, and POUT#C.

The invention is not limited to the above three-layer hierarchically coded data. The hierarchically coded data may be hierarchically coded in two layers or may be hierarchically coded in more than three layers.

The hierarchically coded data may be configured by coding a part of or the entire coded data related to a decoded image in a specific layer independently of other layers so that information in other layers may not be referenced at the time of decoding in the specific layer. For example, while "C" and "B" are referenced during decoding to obtain the decoded image POUT#B in the above examples described by employing FIGS. 1(a) and 1(b), the invention is not limited to this. The hierarchically coded data may be configured so that decoding can employ only "B" to obtain the decoded image POUT#B. It is also possible to configure, for example, a hierarchical moving image decoding device that employs hierarchically coded data configured of only "B" as well as the decoded image POUT#C as an input of decoding to obtain the decoded image POUT#B.

In the case of realizing the SNR scalability, the same source image can be employed as the input images PIN#A, PIN#B, and PIN#C to generate hierarchically coded data such that the decoded images POUT#A, POUT#B, and POUT#C have different image quality. In that case, a hierarchical moving image coding device in a lower layer quantizes a prediction residual employing a larger quantization range than a hierarchical moving image coding device in a higher layer to generate hierarchically coded data.

The present specification defines terms as follows for convenience of description. The following terms are employed in the representation of technical matters below, unless otherwise specified.

Higher layer: a layer positioned higher than one layer is referred to as a higher layer. For example, higher layers above the lower layer L3 in FIGS. 1(a) and 1(b) are the intermediate layer L2 and the higher layer L1. A decoded image in a higher layer means a decoded image of higher quality (for example, higher resolution, higher frame rate, higher image quality, or the like).

Lower layer: a layer positioned lower than one layer is referred to as a lower layer. For example, lower layers below the higher layer L1 in FIGS. 1(a) and 1(b) are the intermediate layer L2 and the lower layer L3. A decoded image in a lower layer means a decoded image of lower quality.

Target layer: a layer that is a target of decoding or coding.

Reference layer: a specific lower layer referenced in decoding to obtain a decoded image corresponding to a target layer is referred to as a reference layer.

In the examples illustrated in FIGS. 1(a) and 1(b), reference layers for the higher layer L1 are the intermediate layer L2 and the lower layer L3. However, the invention is not limited to this. The hierarchically coded data can be configured such that not all the lower layers are referenced during decoding in the specific lower layer. For example, the hierarchically coded data may be configured such that a reference layer for the higher layer L1 is one of the intermediate layer L2 and the lower layer L3.

Base layer: a layer positioned lowermost is referred to as a base layer. A decoded image in a base layer is a decoded image of lowest quality that may be obtained from decoding of the coded data and is referred to as a base decoded image. In other words, a base decoded image is a decoded image corresponding to the lowermost layer. Partial coded data of the hierarchically coded data necessary for decoding the base decoded image is referred to as base coded data. For example, the base information "C" included in the hierarchically coded data DATA#A in the higher layer L1 is the base coded data.

Enhancement layer: a higher layer above the base layer is referred to as an enhancement layer.

Layer identifier: a layer identifier (referred to as a layer ID as well) is employed to identify a layer and is in one-on-one correspondence with a layer. Hierarchically coded data includes a hierarchy identifier that is employed to select partial coded data necessary for decoding to obtain a decoded image in a specific layer. A subset of the hierarchically coded data associated with a layer identifier corresponding to a specific layer is referred to as a layer representation as well.

Generally, decoding for obtaining a decoded image in a specific layer employs the layer representation of the layer and/or a layer representation corresponding to a lower layer below the layer. That is, decoding for obtaining a decoded image in a target layer employs the layer representation of the target layer and/or the layer representation of one or more lower layers below the target layer.

Inter-layer prediction: inter-layer prediction predicts a syntax element value of a target layer, coding parameters employed for decoding in the target layer, and the like on the basis of a syntax element value included in the layer representation of a layer (reference layer) different from the layer representation of the target layer, a value derived from the syntax element value, and a decoded image. Inter-layer prediction that predicts information related to motion prediction from the reference layer information is referred to as inter-layer motion information prediction as well. Inter-layer prediction that performs prediction from a decoded image in a lower layer is referred to as inter-layer image prediction (or inter-layer texture prediction) as well. Layers employed in the inter-layer prediction are, for example, lower layers below a target layer. Prediction performed in a target layer without employing a reference layer is referred to as intra-layer prediction as well.

Temporal identifier: a temporal identifier (referred to as a temporal ID, a sub-layer ID, or a sub-layer identifier as well) is an identifier employed for identifying a layer (hereinafter, a sub-layer) related to the temporal scalability. A temporal identifier is employed to identify a sub-layer and is in one-on-one correspondence with a sub-layer. Coded data includes a temporal identifier that is employed to select partial coded data necessary for decoding to obtain a decoded image in a specific sub-layer.

Sub-layer: a sub-layer is a layer related to the temporal scalability and specified by a temporal identifier. The term sub-layer (referred to as a temporal layer as well) will be referred hereafter so as to be distinguished from other scalability such as the spatial scalability and the SNR scalability.

Hereinafter, the temporal scalability is assumed to be realized by a sub-layer included in either the coded data in a base layer or the hierarchically coded data necessary for decoding in one layer.

Figure 2:
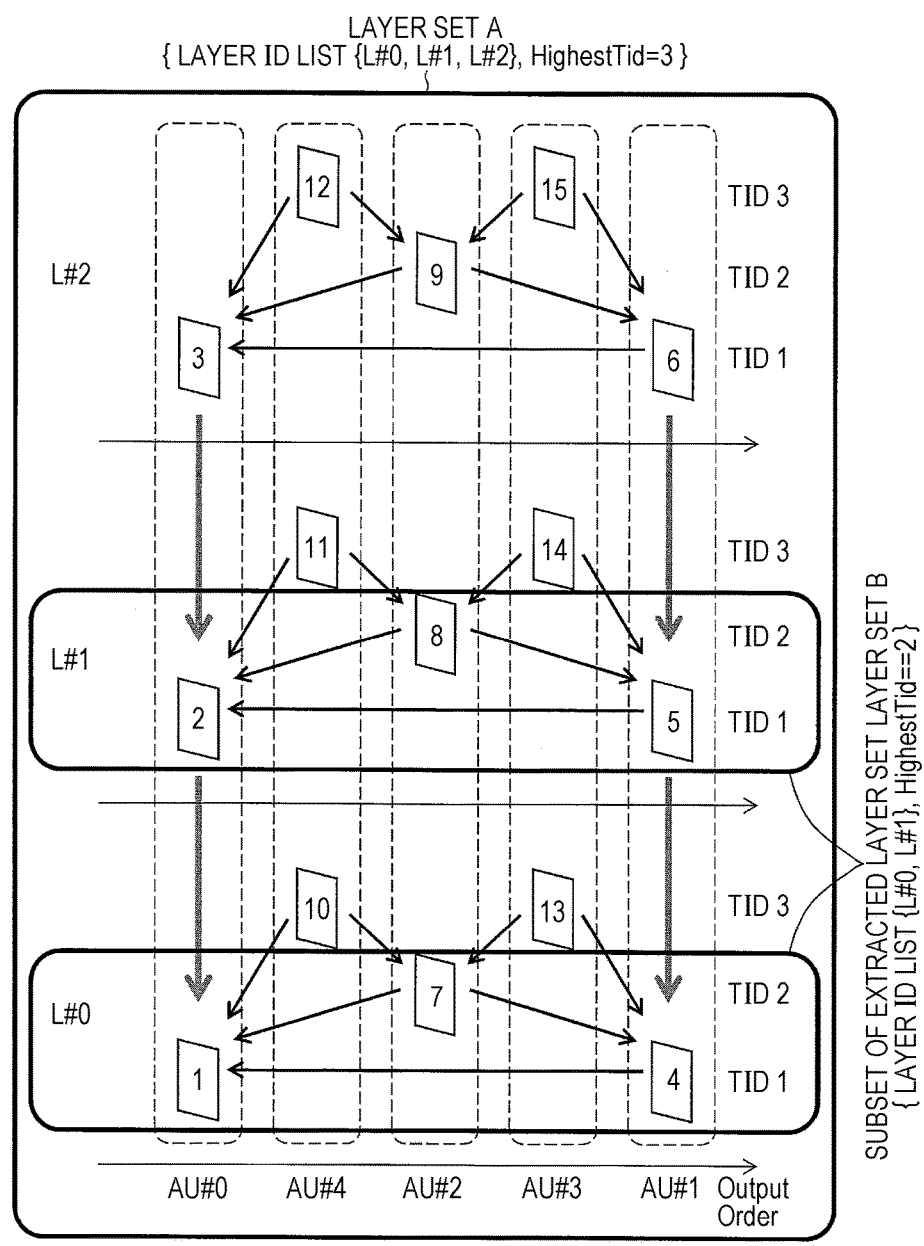
FIG. 2 is a diagram illustrating structures of layers and sub-layers (temporal layers) constituting a layer set.
Figure 3:
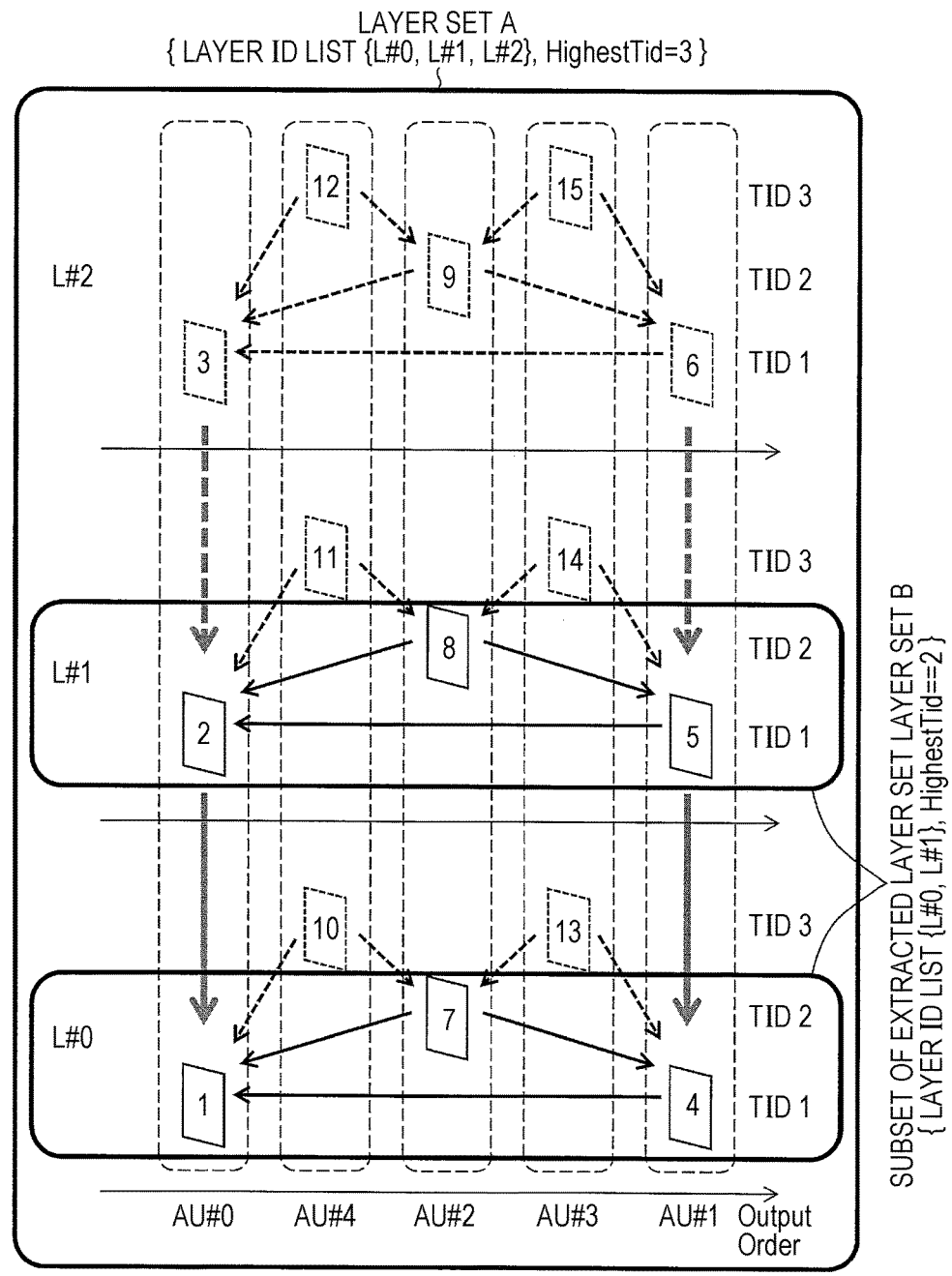
FIG. 3 is a diagram illustrating layers and sub-layers (temporal layers) constituting a subset of a layer set extracted from the layer set illustrated in FIG. 2 by a sub-bitstream extracting process.

Next, with reference to FIGS. 2 and 3, a description will be provided of an example in which hierarchically coded data including a layer set B (called a target set as well) as a subset of a layer set A is extracted from hierarchically coded data including the layer set A by a bitstream extracting process (referred to as sub-bitstream extraction as well).

The bitstream extracting process is a process that removes (discards) an NAL unit not included in a set (called a target set) defined by a target highest temporal identifier (heighest TemporalID or heighestTid) as well as a layer ID list representing layers included in a target layer set from a bitstream (hierarchically coded data or coded data) to extract a bitstream (referred to as a sub-bitstream as well) configured of NAL units included in the target set.

FIG. 2 represents the layer set A including three layers (L#0, L#1, and L#2), each of which is configured of three sub-layers (TID 1, TID 2, and TID 3). Hereinafter, layers and sub-layers constituting a layer set will be represented as {layer ID list {L#0, . . . , L#N}, highest temporal ID (HighestTid=K)}. For example, the layer set A of FIG. 2 is represented as {layer ID list {L#0, L#1, L#2}, highest temporal ID=3}. The reference sign L#N indicates a layer N. Each box in FIG. 2 represents a picture, and the numbers inside the boxes represent an example of decoding order. Hereinafter, a picture of the number N will be written as P#N (also applies in FIG. 3).

An arrow between each picture represents the direction of dependency between the pictures (reference relationship). Arrows in the same layer indicate reference pictures utilized in the inter-prediction. Arrows between layers represent reference pictures (referred to as reference layer pictures as well) utilized in the inter-layer prediction.

The reference sign AU in FIG. 2 represents an access unit, and the reference sign #N represents the access unit number. Given that an AU at a starting point (for example, at the start of random access) is AU#0, the AU#N represents the (N−1)-th access unit and represents the order of AUs included in a bitstream. That is, in the example of FIG. 2, access units are stored in the bitstream in order of AU#0, AU#1, AU#2, AU#3, AU#4, . . . . An access unit represents a set of NAL units aggregated according to a specific classification rule.

The AU#0 of FIG. 2 can be regarded as a set of VLC NALs including the coded data of the pictures P#1, P#1, and P#3. Details of an access unit will be described below.

In the example of FIG. 2, since the target set (layer set B) has a layer ID list of {L#0, L#1} and a highest temporal ID of two, the layers not included in the target set (layer set B) and the sub-layers having a highest temporal ID of greater than two are discarded from the bitstream including the layer set A by the bitstream extraction. That is, the layer L#2 not included in the layer ID list and the NAL unit including the sub-layer (TID 3) are discarded, and finally, the bitstream including the layer set B is extracted as illustrated in FIG. 3. In FIG. 3, dotted boxes represent discarded pictures, and dotted arrows indicate the direction of dependency between the discarded pictures and the reference pictures. Since the NAL units constituting the pictures of the layer L#3 and the sub-layer TID 3 are discarded, the dependency relationships thereof are previously disconnected.

In SHVC and MV-HEVC, the concepts of a layer and a sub-layer are introduced so as to realize the SNR scalability, the spatial scalability, the temporal scalability, and the like. As previously described in FIG. 2 and FIG. 3, in the case of realizing the temporal scalability by changing the frame rate, first, the coded data of the picture (highest temporal ID (TID 3)) that is not referenced by other pictures is discarded by the bitstream extracting process.

In the case of FIGS. 2 and 3, the coded data of the pictures (10, 13, 11, 14, 12, and 15) is discarded to generate coded data having a frame rate reduced in half.

In the case of realizing the SNR scalability, the spatial scalability, and the view scalability, discarding the coded data in a layer not included in the target set by the bitstream extraction can change the granularity of each scalability. Discarding the coded data (3, 6, 9, 12, and 15 in FIGS. 2 and 3) generates coded data having a coarse granularity of scalability. By repeating this process, the granularity of layers and sub-layers can be adjusted stepwise.

The above terms are intended for convenience of description only. The above technical matters may be represented by another terms.

[Data Structure of Hierarchically Coded Data]

Hereinafter, a case of employing HEVC and the extended scheme thereof as a coding scheme for generating coded data in each layer will be described as an example. However, the invention is not limited to this. The coded data in each layer may be generated by a coding scheme such as MPEG-2 or H.264/AVC.

In addition, a lower layer and a higher layer may be coded by different coding schemes. In addition, the coded data in each layer may be supplied to the hierarchical moving image decoding device 1 through different transmission paths or may be supplied to the hierarchical moving image decoding device 1 through the same transmission path.

For example, when an ultra-high-definition video (moving image or 4K video data) is hierarchically coded in the base layer as well as in one enhancement layer and is transmitted, the base layer may downscale the 4K video data and code the interlaced video data employing MPEG-2 or H.264/AVC to transmit the video data to a television broadcast network, and the enhancement layer may code the 4K video (progressive) employing HEVC and transmit the video to the Internet.

<Structure of Coded Data #1 (Referred to as Hierarchically Coded Data DATA as Well)>

Prior to detailed descriptions of the image coding device 2 and the image decoding device 1 according to the present embodiment, the data structure of coded data #1 generated by the image coding device 2 and decoded by the image decoding device 1 will be described.

(NAL Unit Layer)

Figure 4:
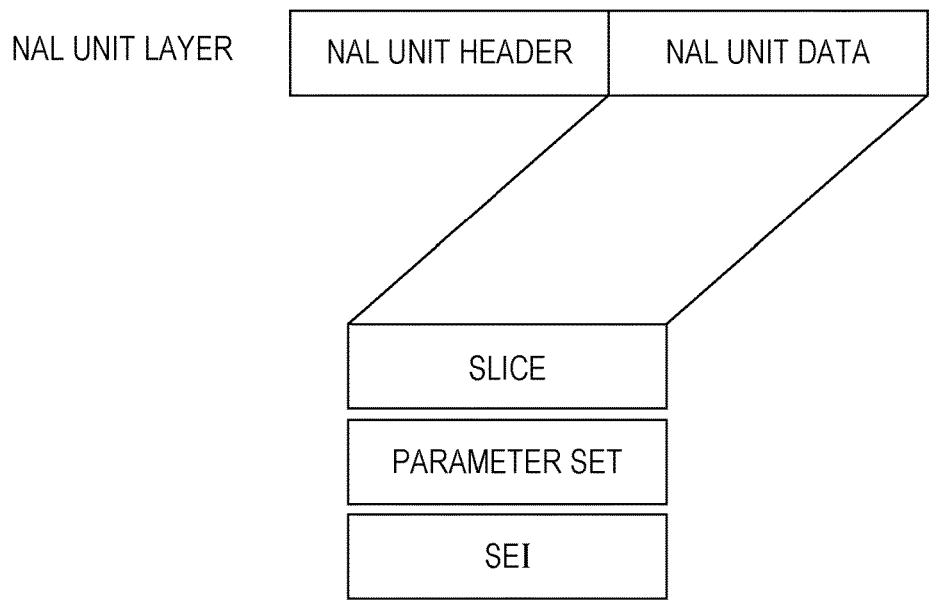
FIG. 4 is a diagram illustrating an example of a data structure constituting an NAL unit layer.

FIG. 4 is a diagram illustrating the layer structure of data in the coded data #1. The coded data #1 is coded in units called network abstraction layer (NAL) units.

An NAL is a layer disposed to abstract communication between a video coding layer (VCL) where a moving image coding process is performed and a lower system transmitting and storing coded data.

A VCL is a layer where an image coding process is performed. Coding is performed in the VCL. Meanwhile, the lower system referred hereto corresponds to the file formats of H.264/AVC and HEVC as well as the MPEG-2 system. In the example described below, the lower system corresponds to a decoding process performed in the target layer and the reference layer. In the NAL, the bitstream generated in the VCL is divided in units called NAL units and is transmitted to the destination lower system.

FIG. 5($a$) illustrates a syntax table of the network abstraction layer (NAL) unit. The NAL unit includes the coded data coded in the VCL and a header (NAL unit header: nal_unit_header( )) employed to appropriately send the coded data to the destination lower system. The NAL unit header is represented by, for example, the syntax illustrated in FIG. 5($b$). Written in the NAL unit header are "nal_unit_type" representing the type of the coded data stored in the NAL unit, "nuh_temporal_id_plus1" representing the identifier (temporal identifier) of a sub-layer where the stored coded data belongs, and "nuh_layer_id" (or nuh_reserved_zero_6bits) representing the identifier (layer identifier) of a layer where the stored coded data belongs.

The NAL unit data includes a parameter set, SEI, a slice, and the like described below.

FIG. 6 is a diagram illustrating values of an NAL unit type and a relationship between types of NAL units. As illustrated in FIG. 6, the NAL unit having a NAL unit type value between 0 and 15 illustrated in SYNA101 is a non-random access picture (RAP) slice. The NAL unit having a NAL unit type value between 16 and 21 illustrated in SYNA102 is a random access picture (RAP) slice. An RAP picture is broadly classified into a BLA picture, an IDR picture, and a CRA picture, and the BLA picture is further classified into BLA_W_LP, BLA_W_DLP, and BLA_N_LP. The IDR picture is further classified into IDR_W_DLP and IDR_N_LP. Other pictures besides the RAP picture are an LP picture, a TSA picture, an STSA picture, and a TRAIL picture described below.

(Access Unit)

A set of NAL units aggregated according to a specific classification rule is called an access unit. When the number of layers is one, the access unit is a set of NAL units constituting one picture. When the number of layers is greater than one, the access unit is a set of NAL units constituting pictures of a plurality of layers at the same time. In order to indicate the boundaries of the access unit, the coded data may include an NAL unit called an access unit delimiter. The access unit delimiter is included between a set of NAL units constituting one access unit and a set of NAL units constituting another access unit in the coded data.

(Video Parameter Set)

FIG. 7 is a diagram illustrating a configuration of the coded data of the video parameter set (VPS) according to one embodiment of the present invention. The meaning of a part of syntax elements will be described as follows. The VPS is a parameter set employed to define parameters common to a plurality of layers. The parameter set is employed when a picture is referenced by coded data that is the compressed data of the picture employing an ID (video_parameter_set_id).

video_parameter_set_id is an identifier employed to identify each VPS.

vide_reserved_three_2bits is syntax for future standard extension.

vps_max_layers_minus1 is syntax employed to calculate the upper limit value MaxNumLayers of the number of layers related to other scalability excluding the temporal scalability with respect to the hierarchically coded data including at least the base layer. The upper limit value MaxNumLayers of the number of layers is represented by MaxNumLayers=vps_max_num_sub_layers_minus1+1. The vps_max_num_sub_layers_minus1 is zero when the hierarchically coded data is configured of only the base layer.

vps_max_sub_layer_minus1 is syntax employed to calculate the upper limit value MaxNumSubLayers of the number of layers (sub-layers) related to the temporal scalability of the hierarchically coded data including at least the base layer. The upper limit value MaxNumSubLayers of the number of sub-layers is represented by MaxNumSubLayers=vps_max_sub_layers_minus1+1.

vps_temporal_id_nesting_flag is a flag representing whether to set an additional constraint on the inter-prediction performed on a picture referencing the VPS.

vps_extension_offset represents a byte offset value from the lead position of the NAL unit including the VPS until the syntax avc_base_flag in VPS extension data vps_extension( ).

profile_tier_level(X, Y) is syntax representing profile information and level information related to the hierarchically coded data (hereinafter, referred to as PTL information as well). The parameter X is the value of a profile information presence flag ProfilePresentFlag, and the parameter Y is the value of the upper limit value of the number of sub-layers−1, that is, MaxNumSubLayersMinus1. The parameter Y may be the value of MaxNumSubLayers instead of the value MaxNumSubLayersMinus1 of the upper limit value of the number of sub-layers−1. In that case, MaxNumSubLayersMinus1 in the PTL information profile_tier_level( ) is interpreted as "MaxNumSubLayers−1". Hereinafter, description will employ the upper limit value MaxNumSubLayers of the number of sub-layers instead of the value MaxNumSubLayersMinus1 of the upper limit value of the number of sub-layers−1. The profile/level information profile_tier_level( ) will be described below. The maximum profile/level information necessary for a decoder to decode the layer set 0 (base layer) is configured in the profile/level information defined herein. Instead of the maximum profile/level information necessary for decoding the layer set 0 (base layer), the maximum profile/level information necessary for decoding all the layers (includes the base layer, the enhancement layer, and the sub-layers adjunct to each layer) including the layer set 0 may be configured. The profile/level information profile_tier_level( ) included in the VPS is decoded in a PTL information decoder 1021 described below.

vps_max_layer_id is syntax representing the maximum value of the layer ID of all the NAL units (nuh_layer_id) in a CVS.

vps_num_layers_sets_minus1 is syntax representing "total number of layer sets, each representing a set of one or more layers, −1" included in the bitstream. The number of layer sets MaxNumLayersSets is vps_num_layers_sets_minus1+1.

layer_id_included_flag[i] [j] is a flag representing whether a layer of a layer ID of j is included as a layer constituting a layer set j (layer ID list).

vps_extension_flag is a flag indicating whether the VPS further includes the vps extension data vps_extension( ).

When the expression "a flag indicating whether XX is true" is written in the present specification, the number one is employed to indicate that XX is true, and the number zero is employed to indicate that XX is false. In addition, the number one is regarded as true and the number zero as false in a logical complement, a logical product, and the like (the same applies hereafter). However, in the actual device and method, other values can also be employed as the values of true and false.

FIG. 56 is a diagram illustrating a configuration of the coded data of the VPS according to the technology of the related art. The meaning of a part of syntax elements will be described as follows.

avc_base_layer_flag is a flag indicating whether the base layer is an H.264 coded bitstream.

vps_vui_offset represents a byte offset value from the lead position of the NAL unit including the VPS until the lead syntax (bit_rate_rate_flag (not illustrated in FIG. 56)) in VPS VUI data vps_vui( ) included in the VPS extension data vps_extension( ).

scalability_mask (not illustrated in FIG. 56) is a value indicating a scalability type. Each bit of the scalability mask corresponds to each scalability type. The first bit, the second bit, the third bit, and the fourth bit of the scalability mask respectively correspond to the spatial scalability, image quality scalability, depth scalability, and view scalability. When each bit is one, this means that the corresponding scalability type is valid. It is also possible that a plurality of bits is one. For example, when the scalability_mask is 12, the third bit and the fourth bit are one, and thus the depth scalability and the view scalability are valid. That is, this means 3D scalability including a plurality of views and depths.

dimension_id_len_minus1 (not illustrated in FIG. 56) indicates num_dimensions that is the number of dimension IDs dimention_id included in each scalability type: num_dimensions=dimension_id_len_minus1[1]+1. For example, the num_dimensions is decoded as two when the scalability type is depth or as the number of views when the scalability type is view.

dimention_id (not illustrated in FIG. 56) is information indicating a picture type of each scalability type.

direct_dependency_flag[i] [j] (referred to as a layer dependency flag) is a flag indicating whether the layer j is a direct reference layer (dependent layer) of the target layer i. The value of the flag being one indicates that the layer j is a dependent layer, and the value of the flag being zero indicates that the layer j is not a direct reference layer. That is, the target layer i references another layer j if the layer dependency flag is one, and the target layer i does not reference the layer j if the layer dependency flag is zero.

vps_number_layers_sets_minus1 (SYNVPS0C in FIG. 56) is syntax representing the total number of layer sets, each representing a set of one or more layers, included in the bitstream and has the same value as the vps_num_layers_sets_minus1.

vps_num_profile_teir_level_minus1 (SYNVPS0D in FIG. 56) is syntax representing "total number of pieces of PTL information included in the VPS−1". The number of pieces of PTL information in the VPS NumPTL is "vps_num_profile_tier_level_minus1+1". Hereinafter, a PTL information group configured of one or more pieces of PTL information existing in the VPS will be called a PTL information list.

vps_profile_present_flag[i] (VPS profile presence flag (SYNVPS0E in FIG. 56)) is a flag indicating the presence of the profile information of the i-th PTL information on the PTL information list. The VPS profile presence flag being one indicates that a syntax group indicating the profile information exists in the target PTL information profile_tier_level( ). The VPS profile presence flag being zero indicates that a syntax group indicating the profile information does not exist.

profile_ref_minus1[i] (reference PTL information specifying index (SYNVPS0F in FIG. 56)) is syntax indicating that the profile information of the i-th PTL information on the PTL information list is the same as the profile information of the (profile_ref_minus1[i]+1)-th PTL information on the PTL information list when the value of the VPS profile presence flag is zero. The technology of the related art has the constraint that "the value of the reference PTL information specifying index "profile_ref_minus1[i]+1" has to be less than the index i that indicates the position of the target PTL information in the PTL information list".

profile_teir_level(X, Y) (SYNVPS0G in FIG. 56) is the i-th PTL information in the PTL information list. Each PTL information is referenced in each layer set by the PTL information specifying index "profile_tier_level_idx[i]" described below that specifies the PTL information applied to each layer set (layer set i). The PTL information referenced by the PTL information specifying index "profile_tier_level_idx[i]" is set to the maximum profile/level information necessary for decoding the layers constituting the layer set i as well as the sub-layers adjunct to each layer. The profile/level information profile_tier_level( ) included in the VPS is decoded in a PTL information decoder X1021 described below.

profile_level_tier_idx[i] (PTL information specifying index) is syntax representing an index specifying the PTL information to be applied to the layer set i on the PTL information list.

direct_dependency_len_minus2 (SYNVPS0I in FIG. 56) is syntax representing the total number of layer dependency types.

direct_dependency_type[i] [j] (layer dependency type) indicates a reference relationship between the target layer i and the layer j. Specifically, when the layer dependency flag direct_dependency_flag[i] [j] is one, the layer dependency flag direct_dependency_type[i] [j] indicates the layer dependency type of the reference layer j with respect to the target layer i. The layer dependency type can specify either only sample prediction or only motion prediction or can specify both thereof. The relationship between the value of the direct_dependency_type[i] [j] and the value of the layer dependency type is illustrated below.

direct_dependency_type[i] [j]=0 . . . sample prediction and motion prediction direct_dependency_type[i] [j]=1 . . . motion prediction only direct_dependency_type[i] [j]=2 . . . sample prediction only FIGS. 10(a)-10(f) are diagrams illustrating the layer structure of data in the coded data #1. The coded data #1, for example, includes a sequence and a plurality of pictures constituting the sequence. FIGS. 10(a) to 10(f) are diagrams respectively illustrating a sequence layer predefining a sequence SEQ, a picture layer defining a picture PICT, a slice layer defining a slice S, a slice data layer defining slice data, a coding tree layer defining a coding tree unit included in the slice data, and a coding unit layer defining a coding unit (CU) included in the coding tree.

(Sequence Layer)

Figure 10A:
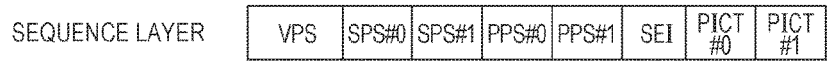
FIGS. 10(a)-10(f) are diagram illustrating a configuration of hierarchically coded data according to one embodiment of the present invention.

In the sequence layer, a set of data that the image decoding device 1 references to decode the processing target sequence SEQ (hereinafter, referred to as a target sequence as well) is defined. As illustrated in FIG. 10(a), the sequence SEQ includes the video parameter set, a sequence parameter set SPS, a picture parameter set PPS, the picture PICT, and supplemental enhancement information SEI. The value illustrated after # indicates the layer ID. While FIGS. 10(a)-10(f) illustrates an example in which there are #0 and #1, that is, there are the coded data of the layer ID zero and the coded data of the layer ID one, the type and the number of layers are not limited to this example.

The video parameter set VPS defines a set of coding parameters common to a plurality of moving images, each moving image being configured of a plurality of layers, and a set of coding parameters related to the plurality of layers included in the moving image as well as the individual layers.

The sequence parameter set SPS defines a set of coding parameters that the image decoding device 1 references to decode the target sequence. For example, the width and height of a picture are defined.

The picture parameter set PPS defines a set of coding parameters that the image decoding device 1 references to decode each picture in the target sequence. For example, a reference value of the quantization range employed in decoding of a picture (pic_init_qp_minus26), a flag indicating whether to apply the motion prediction (weighted_pred_flag), and a scaling list (quantization matrix) are included. The PPS may exist in plural quantities. In that case, one of the plurality of PPSs is selected from each picture in the target sequence.

(Picture Layer)

Figure 10B:
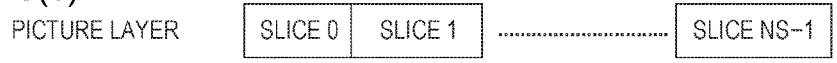

The picture layer defines a set of data that the image decoding device 1 references to decode the processing target picture PICT (hereinafter, referred to as a target picture as well). As illustrated in FIG. 10(b), the picture PICT includes slices S0 to SNS-1 (NS is the total number of slices included in the picture PICT).

Hereinafter, the suffixes 0 to NS-1 of the reference signs of the slices S0 to SNS-1 may not be written when the distinction between each of the slices S0 to SNS-1 is not necessary. This also applies to other data appended with suffixes included in the coded data #1 described below.

(Slice Layer)

Figure 10C:
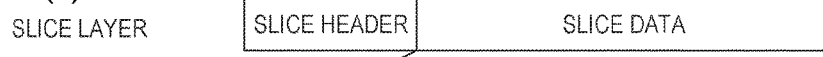

The slice layer defines a set of data that the image decoding device 1 references to decode the processing target slice S (referred to as a target slice as well). As illustrated in FIG. 10(c), the slice S includes a slice header SH and slice data SDATA.

The slice header SH includes a coding parameter group that the image decoding device 1 references to determine the method for decoding the target slice. Slice type specifying information (slice_type) that specifies a slice type is an example of a coding parameter included in the slice header SH.

Slice types specifiable by the slice type specifying information are exemplified by (1) an I slice employing only the intra-prediction in coding, (2) a P slice employing either uni-directional prediction or the intra-prediction in coding, (3) a B slice employing one of the uni-directional prediction, bi-directional prediction, and intra-prediction in coding, and the like.

The slice header SH may include a reference (pic_parameter_set_id) to the picture parameter set PPS included in the sequence layer.

(Slice Data Layer)

Figure 10D:
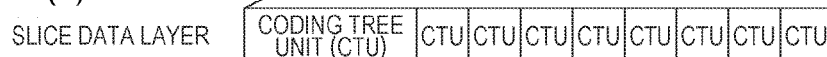

The slice data layer defines a set of data that the image decoding device 1 references to decode the processing target slice data SDATA. As illustrated in FIG. 10(d), the slice data SDATA includes coded tree units (CTU). A CTU is a fixed-size (for example, 64×64) block constituting a slice and is called a largest cording unit (LCU) as well.

(Coding Tree Layer)

Figure 10E:
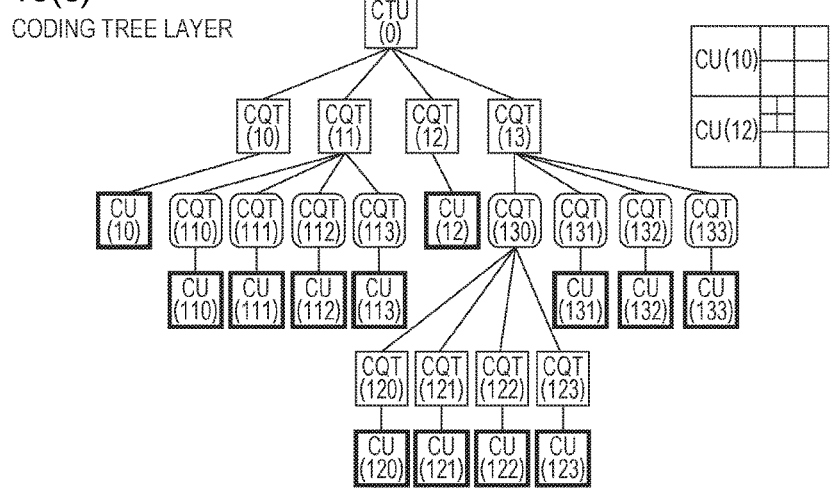

The coding tree layer, as illustrated in FIG. 10(e), defines a set of data that the image decoding device 1 references to decode a processing target coding tree block. The coding tree unit is divided by recursive quadtree subdivision. Nodes of a tree structure obtained by the recursive quadtree subdivision are referred to as a coding tree. An intermediate node of the quadtree is a coded quad tree (CQT), and the CTU is defined as including the uppermost CQTs. The CQT includes a split flag (split_flag) When the split_flag is one, the CQT is divided into four CQTs (includes four CQTs). When the split_flag is zero, the CQT includes a coded unit (CU) that is a terminal node. The coding unit CU is a terminal node of the coding tree layer and is not divided anymore in this layer. The coding unit CU is the base unit of a coding process.

When the size of the coding tree unit CTU is 64×64 pixels, the size of the coding unit is one of 64×64 pixels, 32×32 pixels, 16×16 pixels, and 8×8 pixels.

(Coding Unit Layer)

Figure 10F:
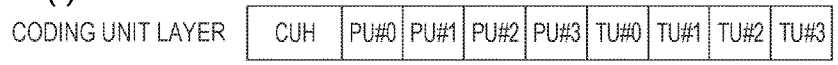

The coding unit layer, as illustrated in FIG. 10(f), defines a set of data that the image decoding device 1 references to decode the processing target coding unit. Specifically, the coding unit is configured of a CU header CUH, a prediction tree, a transform tree, and a CU header CUF. The CU header CUH defines whether the coding unit is a unit employing the intra-prediction or a unit employing the inter-prediction. The coding unit is the root of the prediction tree (PT) as well as the transform tree (TT). The CU header CUF is included either between the prediction tree and the transform tree or after the transform tree.

In the prediction tree, the coding unit is divided into one or a plurality of prediction blocks, and the position and size of each prediction block are defined. In other words, the prediction block is one or a plurality of non-overlapping areas constituting the coding unit. The prediction tree includes one or a plurality of prediction blocks obtained by the above partitioning.

A prediction process is performed per prediction block. Hereinafter, the prediction block that is the unit of prediction will be referred to as a prediction unit (PU) as well.

Types of partitioning in the prediction tree broadly include two cases of the intra-prediction and the inter-prediction. The intra-prediction is the prediction performed in the same picture, and the inter-prediction refers to a prediction process performed between different pictures (for example, between display times or between layer images).

In the case of the intra-prediction, the method for partitioning includes 2N×2N (the same size as the coding unit) and N×N.

In the case of the inter-prediction, the method for partitioning is coded by part_mode of the coded data and includes 2N×2N (the same size as the coding unit), 2N×N, 2N×nU, 2N×nD, N×2N, nL×2N, nR×2N, and N×N. The 2N×nU indicates that the 2N×2N coding unit is divided into two areas of 2N×0.5N and 2N×1.5N from the top of the coding unit. The 2N×nD indicates that the 2N×2N coding unit is divided into two areas of 2N×1.5N and 2N×0.5N from the top of the coding unit. The nL×2N indicates that the 2N×2N coding unit is divided into two areas of 0.5N×2N and 1.5N×2N from the left of the coding unit. The nR×2N indicates that the 2N×2N coding unit is divided into two areas of 1.5N×2N and 0.5N×1.5N from the left of the coding unit. The number of partitions is one, two, or four. Thus, one to four PUs are included in the CU. These PUs will be represented in order as PU0, PU1, PU2, and PU3.

In the transform tree, the coding unit is divided into one or a plurality of transform blocks, and the position and size of each transform block are defined. In other words, the transform block is one or a plurality of non-overlapping areas constituting the coding unit. The transform tree includes one or a plurality of transform blocks obtained by the above partitioning.

Partitioning of the coding unit in the transform tree includes allocating an area of the same size as the coding unit as the transform block and recursive quadtree subdivision as in the above partitioning of the tree blocks.

A transform process is performed per transform block. Hereinafter, the transform block that is the unit of transform will be referred to as a transform unit (TU) as well.

(Prediction Parameter)

A predicted image of the prediction unit is derived by prediction parameters adjunct to the prediction unit. The prediction parameters are either the prediction parameters of the intra-prediction or the prediction parameters of the inter-prediction. Hereinafter, the prediction parameters of the inter-prediction (inter-prediction parameters) will be described. The inter-prediction parameters are configured of prediction list utilization flags predFlagL0 and predFlagL1, reference picture indexes refIdxL0 and refIdxL1, and vectors mvL0 and mvL1. The prediction list utilization flags predFlagL0 and predFlagL1 are flags respectively indicating whether reference picture lists called an L0 reference list and an L1 reference list are employed. When the value of the flag is one, the corresponding reference picture list is employed. When two of the reference picture lists are employed, that is, in the case of predFlagL0=1 and predFlagL1=1, this corresponds to bi-prediction. When one reference picture list is employed, that is, in the case of either (predFlagL0, predFlagL1)=(1, 0) or (predFlagL0, predFlagL1)=(0, 1), this corresponds to uni-prediction. Information about the prediction list utilization flag can be represented by an inter-prediction identifier inter_pred_idc described below. Generally, the prediction list utilization flag is employed in a predicted image generator and a prediction parameter memory described below, and the inter-prediction identifier inter_pred_idc is employed when information indicating which reference picture list is employed is decoded from the coded data.

Syntax elements for deriving the inter-prediction parameters included in the coded data are, for example, a partitioning mode part_mode, a merge flag merge_flag, a merge index merge_idx, the inter-prediction identifier inter_pred_idc, a reference picture index refIdxLX, a prediction vector index mvp_LX_idx, and a difference vector mvdLX.

(Example of Reference Picture List)

Figure 11:
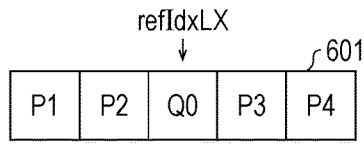
FIG. 11 is a schematic diagram illustrating an example of a reference picture list.

Next, an example of the reference picture list will be described. The reference picture list is an array configured of reference pictures stored in a decoded picture buffer 12. FIG. 11 is a schematic diagram illustrating an example of the reference picture list. In a reference picture list 601, each of the five oblongs arranged linearly in the left-right direction indicates a reference picture. The reference signs P1, P2, Q0, P3, and P4 illustrated in order from the left end to the right end are reference signs indicating each reference picture. The letter P in P1 and the like indicates a viewpoint P, and the letter Q in Q0 indicates a layer Q different from a layer P. The suffixes of P and Q indicate a picture order count POC. The downward arrow under refIdxLX indicates that the reference picture index refIdxLX is an index referencing the reference picture Q0 in the decoded picture buffer 12.

(Example of Reference Picture)

Figure 12:
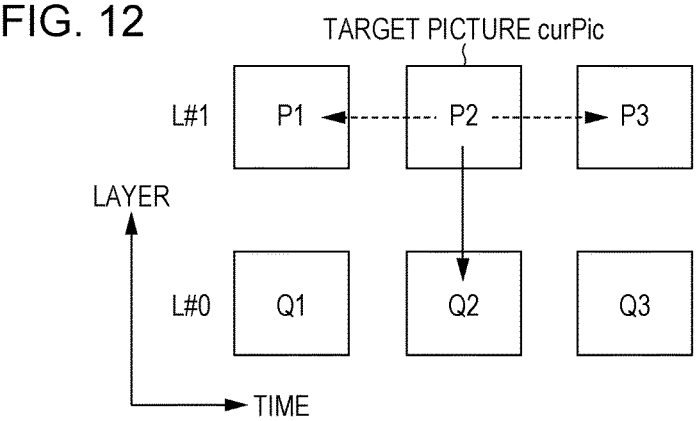
FIG. 12 is a schematic diagram illustrating examples of a reference picture.

Next, examples of the reference picture employed in deriving a vector will be described. FIG. 12 is a schematic diagram illustrating examples of the reference picture. In FIG. 12, the horizontal axis indicates a display time, and the vertical axis indicates the number of layers. Each of the oblongs of vertically two rows and horizontally three columns (total six) illustrated indicates a picture. Of the six oblongs, the oblong in the second column of the lower row from the left illustrates a decoding target picture (target picture), and each of the remaining five oblongs illustrates a reference picture. A reference picture Q2 indicated by a downward arrow from the target picture is a picture in a different layer at the same display time as the target picture. The reference picture Q2 is employed in the inter-layer prediction employing the target picture curPic(P2) as a reference. A reference picture P1 indicated by a leftward arrow from the target picture is a picture in the past in the same layer as the target picture. A reference picture P3 indicated by a rightward arrow from the target picture is a picture in the future in the same layer as the target picture. Either the reference picture P1 or P3 is employed in the motion prediction employing the target picture as a reference.

(Inter-Prediction Identifier and Prediction List Utilization Flag)

The relationship between the inter-prediction identifier and the prediction list utilization flags predFlagL0 and predFlagL1 is that both are exchangeable as follows. Thus, either the prediction list utilization flag or the inter-prediction identifier may be employed as the inter-prediction parameters. In addition, hereinafter, a determination employing the prediction list utilization flag may be substituted by a determination employing the inter-prediction identifier. Conversely, a determination employing the inter-prediction identifier may be substituted by a determination employing the prediction list utilization flag.

inter-prediction identifier=(predFlagL1<<1)+predFlagL0
predFlagL0=inter-prediction identifier & 1
predFlagL1=inter-prediction identifier>>1 where >> is a right shift, and << is a left shift.

(Merge Prediction and AMVP Prediction)

A method for decoding (coding) the prediction parameters includes a merge prediction (merge) mode and an adaptive motion vector prediction (AMVP) mode. The merge flag merge_flag is a flag employed to identify these modes. Either in the merge prediction mode or in the AMVP mode, the prediction parameters of a previously processed block are employed to derive the prediction parameters of the target PU. The merge prediction mode is a mode that employs the previously derived prediction parameters without including the prediction list utilization flag predFlagLX (inter-prediction identifier inter_pred_idc), the reference picture index refIdxLX, and the vector mvLX in the coded data. The AMVP mode is a mode that includes the inter-prediction identifier inter_pred_idc, the reference picture index refIdxLX, and the vector mvLX in the coded data. The vector mvLX is coded as the prediction vector index mvp_LX_idx indicating a prediction vector and as the difference vector (mvdLX).

The inter-prediction identifier inter_pred_idc is data indicating the type and the number of reference pictures and has a value of Pred_L0, Pred_L1, or Pred_Bi. The Pred_L0 and Pred_L1 respectively indicate that the reference pictures stored in the reference picture lists called the L0 reference list and the L1 reference list are employed and both indicate that one reference picture is employed (uni-prediction). Prediction employing the L0 reference list and prediction employing the L1 reference list are respectively called L0 prediction and L1 prediction. The Pred_Bi indicates that two reference pictures are employed (bi-prediction) and indicates that two of the reference pictures stored in the L0 reference list and the L1 reference list are employed. The prediction vector index mvp_LX_idx is an index indicating the prediction vector. The reference picture index refIdxLX is an index indicating the reference picture stored in the reference picture list. The reference sign LX is a manner of representation employed when the L0 prediction and the L1 prediction are not distinguished. Substituting LX with L0 or L1 distinguishes parameters of the L0 reference list and parameters of the L1 reference list. For example, the refIdxL0 represents the reference picture index employed in the L0 prediction. The refIdxL1 represents the reference picture index employed in the L1 prediction. The refIdx (refIdxLX) is a representation employed when the distinction between the refIdxL0 and the refIdxL1 is not necessary.

The merge index merge_idx is an index indicating which prediction parameter of prediction parameter candidates (merge candidates) derived from the previously processed block is employed as the prediction parameter of the decoding target block.

(Motion Vector and Disparity Vector)

The vector mvLX includes a motion vector and a disparity vector (parallax vector). The motion vector is a vector that indicates a positional shift between the position of a block of a picture at a display time in one layer and the position of the corresponding block of a picture at a different display time (for example, an adjacent discrete time) in the same layer. The disparity vector is a vector that indicates a positional shift between the position of a block of a picture at a display time in one layer and the position of the corresponding block of a picture at the same display time in a different layer. The pictures in different layers are, for example, pictures of the same resolution and different quality, pictures of different viewpoints, or pictures of different resolutions. Particularly, the disparity vector corresponding to the pictures of different viewpoints is called a parallax vector. In the description below, the motion vector and the disparity vector will be simply called the vector mvLX when the distinction therebetween is not necessary. The prediction vector and the difference vector related to the vector mvLX are respectively called a prediction vector mvpLX and the difference vector mvdLX. A determination of whether the vector mvLX and the difference vector mvdLX are the motion vectors or the disparity vectors is performed by employing the reference picture index refIdxLX adjunct to the vectors.

(Configuration of Image Decoding Device)

Figure 13:
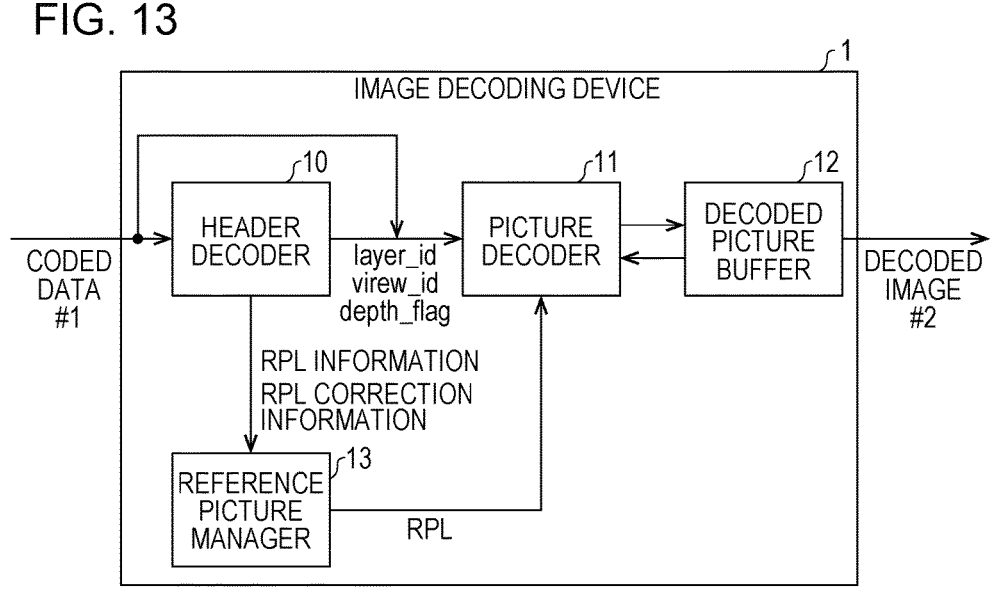
FIG. 13 is a functional block diagram illustrating a schematic configuration of an image decoding device according to one embodiment of the present invention.
Figure 44:
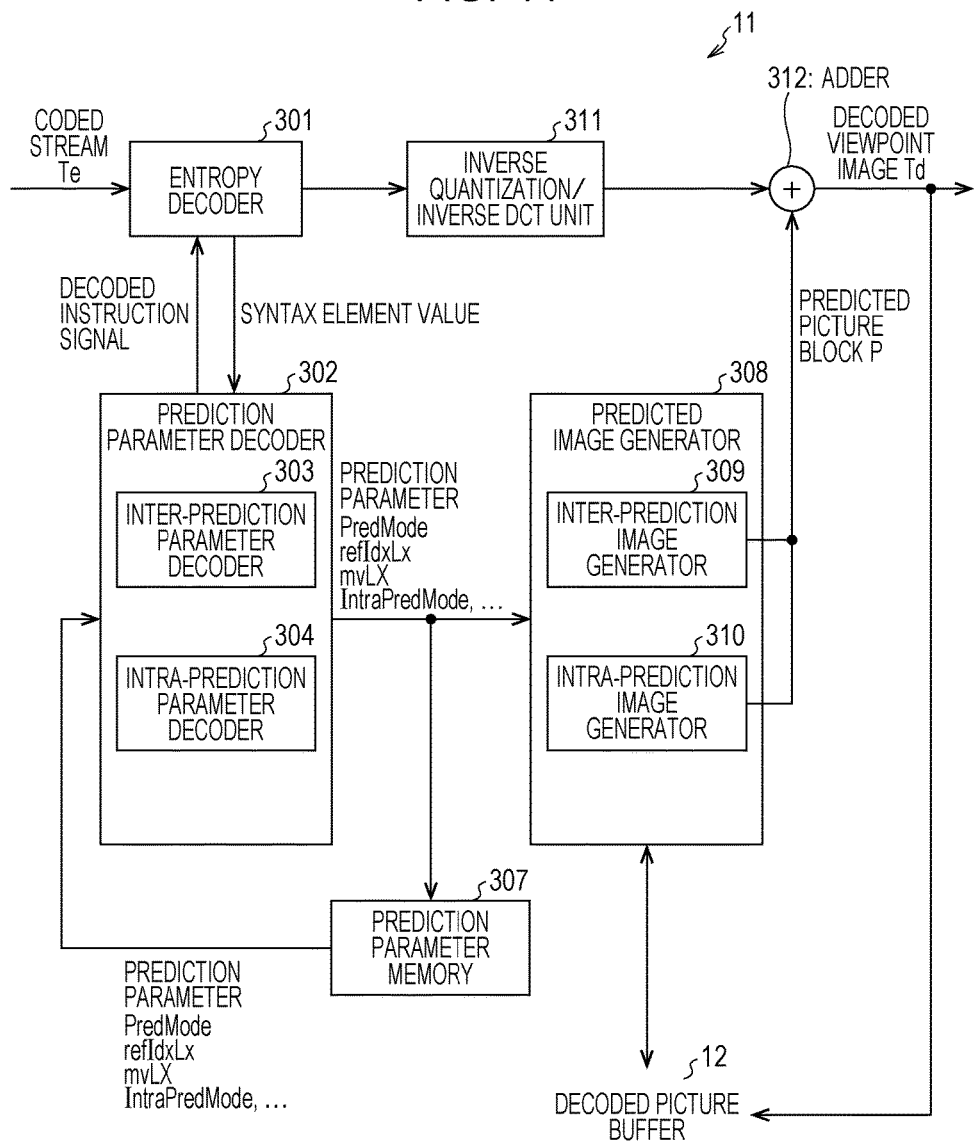
FIG. 44 is a schematic diagram illustrating a configuration of an image decoding device according to the present embodiment.

A configuration of the image decoding device 1 according to the present embodiment will be described. FIG. 44 is a diagram illustrating a schematic configuration of an image decoding device, and FIG. 13 is a diagram illustrating a configuration of the image decoding device 1 according to the present embodiment. The image decoding device 1 is configured to include a header decoder 10, a picture decoder 11, the decoded picture buffer 12, and a reference picture manager 13. The image decoding device 1 is capable of performing a random access decoding process, described below, that initiates decoding from a picture of an image including a plurality of layers at a specific time.

[Header Decoder 10]

The header decoder 10 decodes information utilized in decoding in units of NAL units, sequence units, picture units, or slice units from the coded data #1 supplied by the image coding device 2. The decoded information is output to the picture decoder 11 and the reference picture manager 13.

The header decoder 10 decodes information utilized in decoding in units of sequences by passing the VPS, SPS, and PPS included in the coded data #1 on the basis of the predefined syntax definitions thereof. For example, information related to the number of layers is decoded from the VPS. Information associated with the image size of the decoded image is decoded from the VPS when representation information exists in the VPS, or the information associated with the image size of the decoded image is decoded from the SPS when the representation information exists in the SPS.

The header decoder 10 decodes information utilized in decoding in units of slices by passing the slice header included in the coded data #1 on the basis of the predefined syntax definition thereof. For example, the slice type is decoded from the slice header.

Figure 14:
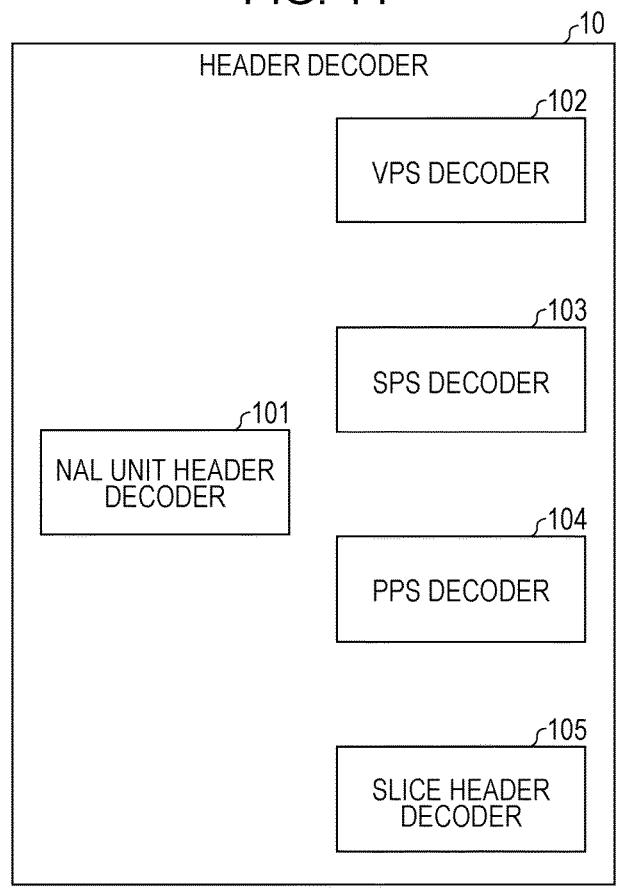
FIG. 14 is a diagram illustrating a schematic configuration of a header decoder of the image decoding device.

The header decoder 10 illustrated in FIG. 14 includes an NAL unit header decoder 101, a VPS decoder 102, an SPS decoder 103, a PPS decoder 104, a slice header decoder 105, a parameter memory (not illustrated), and the like.

Figure 15:
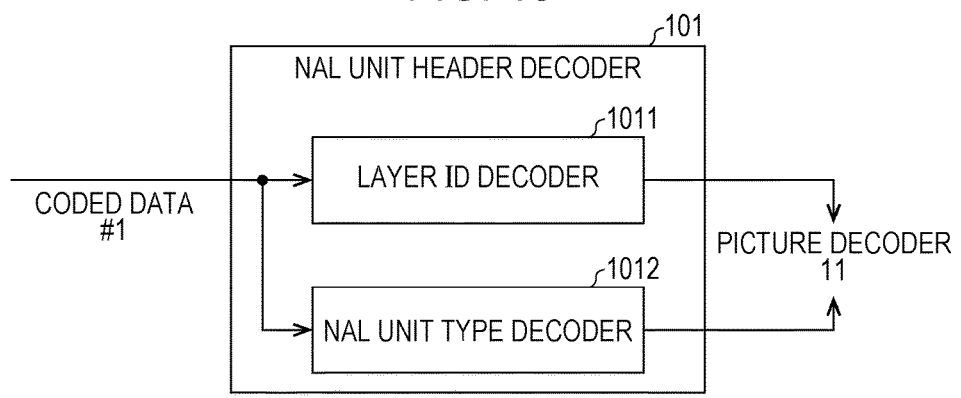
FIG. 15 is a functional block diagram illustrating a schematic configuration of an NAL unit header decoder of the image decoding device.

FIG. 15 is a functional block diagram illustrating a schematic configuration of the NAL unit header decoder 101. As illustrated in FIG. 15, the NAL unit header decoder 101 is configured to include a layer ID decoder 1011 and an NAL unit type decoder 1012.

The layer ID decoder 1011 decodes the layer ID from the coded data. The NAL unit type decoder 1012 decodes the NAL unit type from the coded data. The layer ID is, for example, 6-bit information from 0 to 63. When the layer ID is zero, this indicates the base layer. The NAL unit type is, for example, 6-bit information from 0 to 63 and indicates the type of data included in the NAL unit. As described below, types of data, for example, parameter sets such as the VPS, SPS, and PPS; RPS pictures such as the IDR picture, the CRA picture, and the LBA picture; non-RPS pictures such as the LP picture; and the SEI are identified from the NAL unit type.

The VPS decoder 102 decodes information utilized in units of layers by passing the VPS included in the coded data #1 on the basis of the defined syntax definition thereof. Details of the VPS decoder 102 will be described below.

The SPS decoder 103 decodes information utilized in units of sequences by passing the SPS included in the coded data #1 on the basis of the defined syntax definition thereof.

The PPS decoder 104 decodes information utilized in units of pictures by passing the PPS included in the coded data #1 on the basis of the defined syntax definition thereof.

The slice header decoder 105 decodes information utilized in decoding in units of slices by passing the slice header included in the coded data #1 on the basis of the defined syntax definition thereof.

Hereinafter, the VPS decoder 102 according to a first embodiment of the present invention will be described with reference to FIG. 16 to FIG. 22.

[VPS Decoder 102]

Figure 16:
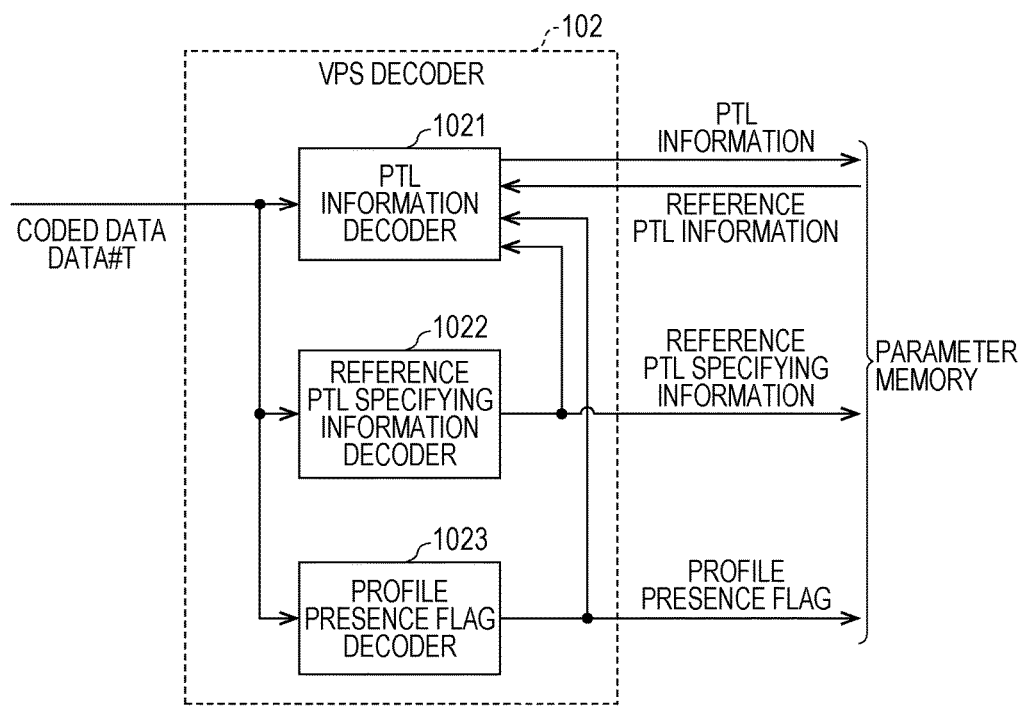
FIG. 16 is a functional block diagram illustrating a schematic configuration of a VPS decoder of the header decoder.

FIG. 16 is a functional block diagram illustrating a schematic configuration of the VPS decoder 102. As illustrated in FIG. 16, the VPS decoder 102 is configured to further include the profile level information decoder (PTL information decoder) 1021, a reference PTL specifying information decoder 1022, and a profile presence flag decoder 1023.

<Details of VPS Decoding Process>

Figure 17:
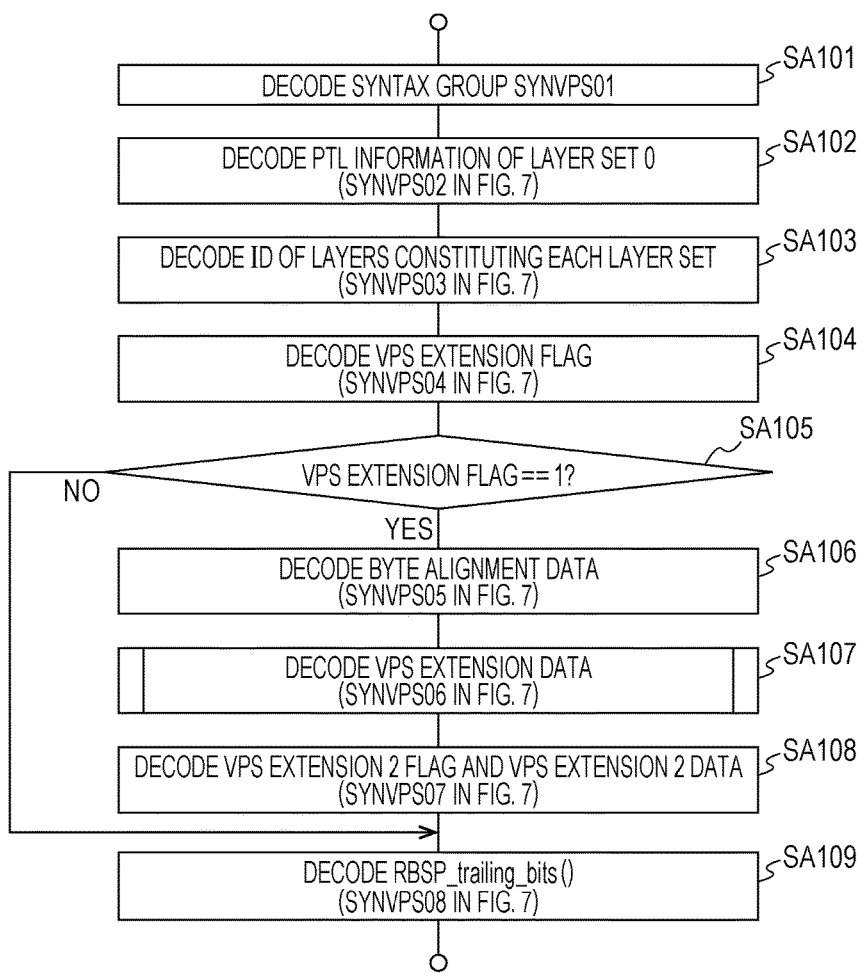
FIG. 17 is a flowchart illustrating operation of the VPS decoder.

Hereinafter, operation of the VPS decoder 102 will be described with reference to FIG. 17.

(Step SA101) The VPS decoder 102 decodes a syntax group SYNVPS01 of FIG. 7.

(Step SA102) The PTL information decoder 1021 included in the VPS decoder 102 decodes the PTL information of the layer set 0 illustrated in SYNVPS02 of FIG. 7. The decoded PTL information is supplied to and stored on the parameter memory.

(Step SA103) The VPS decoder 102 decodes the layer IDs of the layers constituting each layer set from a syntax group SYNVPS03 of FIG. 7.

(Step SA104) The VPS decoder 102 decodes the VPS extension flag vps_extension_flag of FIG. 7 (SYNVPS04 of FIG. 7).

(Step SA105) When the VPS extension flag is one (YES in Step SA105), it is determined that the VPS extension data is in the VPS, and the process proceeds to Step SA106. When the VPS extension flag is zero (NO in Step SA105), it is determined that the VPS extension data is not in the VPS, and the process proceeds to Step SA109.

(Step SA106) Byte alignment data (vps_extension_alignment_bit_equal_to_one) inserted from the bit next to the VPS extension flag immediately before avc_base_flag included in the VPS extension data (a syntax group SYNVPS05 of FIG. 7) is decoded.

(Step SA107) The VPS extension data vps_extension( ) is decoded. Details of a VPS extension data decoding process will be described below.

(Step SA108) The VPS decoder 102 decodes a VPS extension 2 flag vps_extension2_flag illustrated in SYNVPS07 of FIG. 7. If the VPS extension 2 flag is one, VPS extension 2 data is decoded.

(Step SA109) The VPS decoder 102 decodes RBSP_trailing_bits( ) illustrated in SYNVPS08 of FIG. 7. The RBSP_trailing_bits( ) is byte alignment data. The byte alignment data is called stuffing data as well.

<Details of VPS Extension Data Decoding Process>

Figure 18:
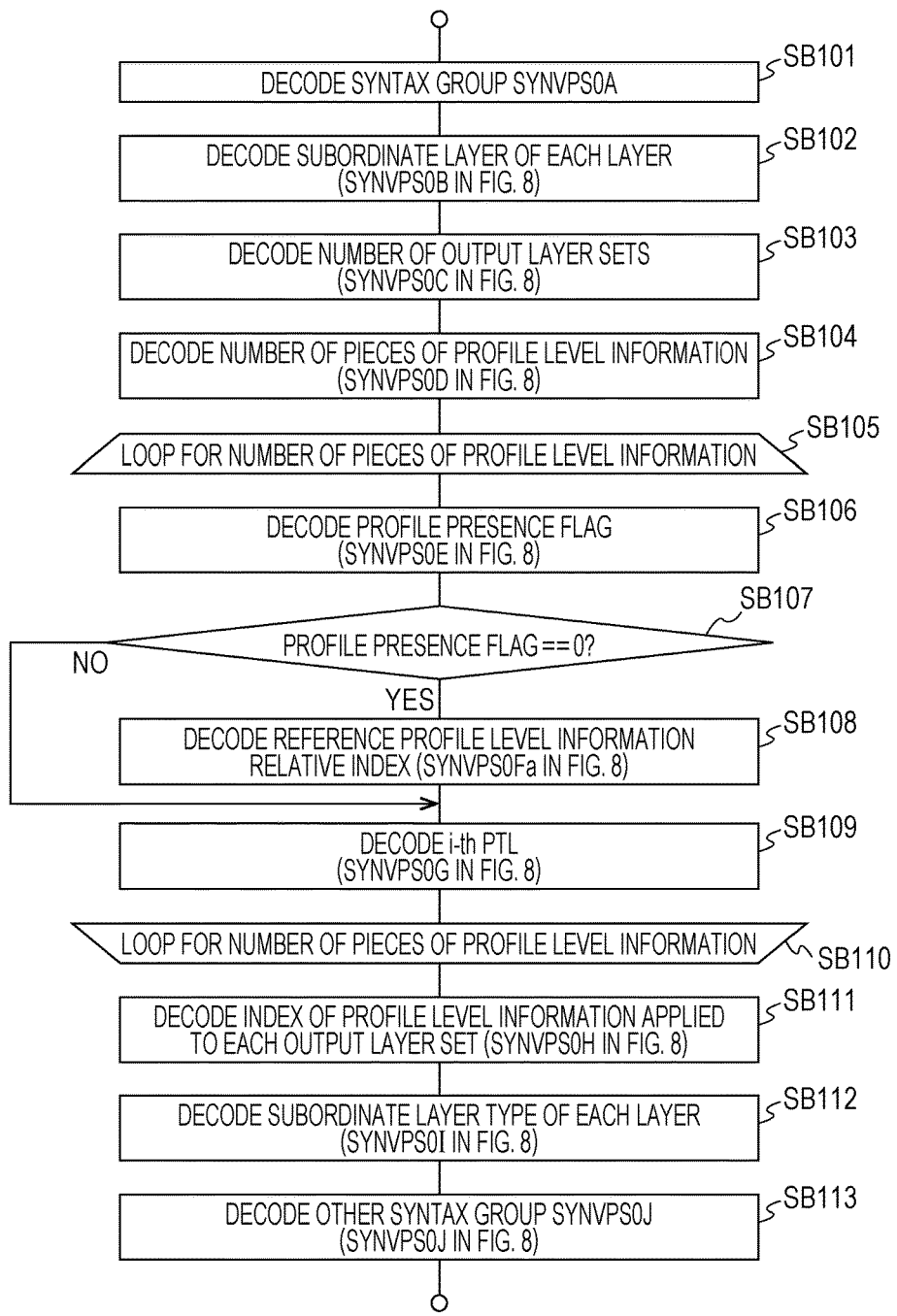
FIG. 18 is a flowchart illustrating a VPS extension data decoding process.

The VPS extension data decoding process will be described with reference to FIG. 18.

(Step SB101) The VPS decoder 102 decodes a syntax group SYNVPS0A of FIG. 8.

(Step SB102) The VPS decoder 102 decodes the dependency flag related to the dependent layer (referred to as the direct reference layer or a subordinate layer as well) referenced by each layer from a syntax group SYNVPS0B of FIG. 8.

(Step SB103) The VPS decoder 102 decodes the number of layer sets (syntax SYNVPS0C of FIG. 8).

(Step SB104) The VPS decoder 102 decodes the total number of pieces of PTL information included in the VPS (SYNVPS0D of FIG. 8).

(Step SB105) Step SB105 is the starting point of a loop of a decoding process for the PTL information included in the VPS.

(Step SB106) The profile presence flag decoder 1023 included in the VPS decoder 102 decodes the profile presence flag (syntax SYNVPS0E of FIG. 8) indicating the presence of a syntax group indicating the profile information in the i-th PTL information profile_tier_level( ).

(Step SB107) When the profile presence flag is zero, it is determined that there is no syntax group indicating the profile information in the i-th PTL information, and the process proceeds to Step SB108. When the profile presence flag is one, it is determined that there is a syntax group indicating the profile information in the i-th PTL information, and the process proceeds to Step SB109.

(Step SB108) When the profile presence flag is zero, the reference PTL specifying information decoder 1022 included in the VPS decoder 102 decodes the reference PTL information specifying index (referred to as a reference profile level information relative index or reference PTL specifying information as well) "profile_ref_delta_index_minus1[i]" (SYNVPS0Fa of FIG. 8) that indicates the PTL information from which the profile information of the i-th PTL information is referenced on the PTL information list. The reference PTL information specifying index "profile_ref_delta_index_minus1[i]" represents a relative index between the i-th PTL information and the reference destination PTL information. That is, the i-th PTL information references the j-th PTL information specified by j=(i–profile_ref_delta_minus1[i]+1) for profile information. On the encoder side, the PTL information on the PTL information list is rearranged in advance in order of similarity. Thus, the i-th PTL information can have a high probability of referencing the immediately previous PTL information. Therefore, the reference PTL specifying index "profile_ref_delta_index_minus1[i]" can reduce the bit length necessary for representing the reference PTL specifying index in comparison with the related art by, for example, representing the relative index by Golomb codes as illustrated in FIGS. 19(a) and 19(b). FIG. 19(a) represents a correspondence table of a Golomb code and a syntax value, and FIG. 19(b) represents a correspondence between a Golomb code configured of "prefix" and "suffix" and a value that can be represented by the bit length of each Golomb code.

In other words, the profile/level information decoder regards the semantics of the i-th reference PTL information specifying index in the profile/level information that the i-th reference PTL information specifying index specifies a relative position between the i-th profile/level information and the referenced profile/level information.

For example, when the value of the reference PTL specifying index "profile_ref_delta_minus1[i]" is zero, that is, when the first previous (i–1)-th PTL information before the i-th PTL information is referenced, the bit length necessary for representing the reference PTL specifying index is one bit by employing the Golomb codes illustrated in FIGS. 19(a) and 19(b). Accordingly, the coding amount can be reduced in comparison with the technology of the related art in which the reference PTL information specifying index is represented at a fixed length. In addition, since the lead PTL information (zeroth) on the PTL information list can be referenced, it is possible to resolve the defect that the reference PTL information specifying index does not function when the first PTL information is the target. The same effect may be accomplished by decoding the reference PTL specifying index "profile_ref_delta_minus1[i]" with k-th order exponential Golomb codes (EGk (K>=0)) instead of the Golomb codes. The Golomb codes illustrated in FIGS. 19(a) and 19(b) are called zeroth order exponential Golomb codes as well.

When referencing the lead PTL information (zeroth) on the PTL information list is not allowed, an agreement may be set in advance between the decoder and the encoder, setting the profile presence flag certainly to one when the first PTL information is the target as well as stating explicitly that the profile information of the first PTL information has to be included in the coded data (referred to as a bitstream constraint as well). Accordingly, the defect that the reference PTL information specifying index does not function when the first PTL information is the target can be resolved in the same manner.

(Step SB109) The PTL information decoder 1021 included in the VPS decoder 102 decodes the profile and level information of the i-th PTL information with the input of the profile presence flag, the reference PTL specifying index, and the number of sub-layers. Details of the PTL information decoder 1021 will be described below.

(Step SB110) Step SB110 is the end point of the loop of the decoding process for the PTL information included in the VPS.

(Step SB111) The VPS decoder 102 decodes the PTL information specifying index (profile_level_tier_idx[i] in a syntax group SYNVPS0H of FIG. 8) specifying the PTL information to be applied to each output layer set.

(Step SB112) The VPS decoder 102 decodes a subordinate layer type of each layer from a syntax group SYNVPS0I of FIG. 8. The "direct_dep_type_len_minus2" in the syntax group SYNVPS0I of FIG. 8 represents the bit length (direct_dep_type_len_minus2+2) of the subordinate layer type (direct_dependency_type[i] [j]), and the subordinate layer type (direct_dependency_tipe[i] [j]) in the syntax SYNVPS0I of FIG. 8 represents a type of dependency between each layer and the subordinate layer.

(Step SB111) The VPS decoder 102 decodes the other syntax group SYNVPS0J of FIG. 8.

<Details of PTL Information Decoder 1011>

Next, details of the PTL information decoder 1021 according to the first embodiment will be described by employing FIG. 20 and FIG. 21.

FIG. 20 is a functional block diagram illustrating a configuration of the PTL information decoder 1021. As illustrated in FIG. 20, the PTL information (profile/level information) decoder 1021 includes a profile information decoder 1021a, a level information decoder 1021b, a sub-layer profile presence flag decoder 1021c, a sub-layer level presence flag decoder 1021d, a byte alignment data decoder 1021e, and a reference profile level selector 1021f.

[Profile Information Decoder 1021a]

The profile information decoder 1021a decodes and outputs the profile information of the decoding target PTL information (profile information of the highest sub-layer or called general profile information as well) from coded data DATA#T on the basis of the profile presence flag profilePresentFlag. Specifically, when the profile presence flag profilePresentFlag is one, the profile information of the decoding target PTL information is decoded from the coded data DATA#T. When the profile presence flag profilePresentFlag is zero, it is determined that the profile information of the decoding target PTL information is the same as the profile information of the PTL information specified by the reference PTL specifying information. The previously decoded PTL information specified by the reference PTL specifying information is read from the parameter memory (not illustrated), and the profile information thereof is output as the profile information of the decoding target PTL information. The profile information is certainly signaled on the coding side in the zeroth PTL information positioned at the lead of the VPS and in the SPS at the base layer.

The profile information decoder 1021*a* decodes and outputs the sub-layer profile information of each sub-layer in the decoding target PTL information excluding the highest sub-layer from the coded data DATA#T on the basis of the profile presence flag profilePresentFlag, the number of sub-layers MaxNumSubLayers, the reference PTL specifying information, and the sub-layer profile presence flag sub_layer_profile_present_flag[i] of each sub-layer supplied from the sub-layer profile presence flag decoder 1021*c*.

(Sub-Layer Profile Decoding when Profile Presence Flag is One)

When the profile presence flag of the decoding target PTL information is one, the profile information decoder 1021*a* decodes the sub-layer profile by the following operation. When the sub-layer profile presence flag of a sub-layer i (temporalId=i+1) in the decoding target PTL information is one, it is determined that the profile information of the sub-layer i exists in the coded data DATA#T, and the sub-layer profile information of the sub-layer i is decoded from the coded data DATA#T. In other cases, the sub-layer profile information of the sub-layer i is set to predetermined profile information. When the sub-layer i is the highest sub-layer (i=MaxNumSubLayers−1), the general profile is configured as the profile information of the sub-layer i. In other cases, the profile information of a sub-layer (i+1) of the decoding target PTL information is configured as the profile information of the sub-layer i. A configuration rule for the sub-layer profile information is represented by pseudocode as follows (refer to FIG. 62(*a*) (FIG_INFER_RULE)).

```
for(i=MaxNumSubLayers-1; i>=0; i--) {
  if(sub_layer_profile_present_flag[i]==0) {
    if(i==MaxNumSubLayers-1) {
      The i-th sub-layer profile information is set to be
        equal to the general level information of the
        current profile_tier_level( );
    } else{// i<MaxNumSubLayers-1
      The i-th sub-layer profile information is set to be
        equal to the (i+1)-th sub-layer profile information
        of the current profile_tier_level( );
    }
  }
}
```

(Sub-Layer Profile Decoding when Profile Presence Flag is Zero)

When the profile presence flag of the decoding target PTL information is zero, the profile information decoder 1021*a* decodes the sub-layer profile by the following operation. When the sub-layer profile presence flag of the sub-layer i (temporalId=i+1) is one, it is determined that the profile information of the sub-layer i exists in the coded data DATA#T, and the sub-layer profile information of the sub-layer i is decoded from the coded data DATA#T. In other cases, in the sub-layer profile information of the sub-layer i, the profile information of the corresponding sub-layer of the previously decoded PTL information specified by the reference PTL specifying information is configured as the profile information of the sub-layer i. A configuration rule for the sub-layer profile information is represented by pseudocode as follows (refer to FIG. 62(*b*) (FIG_INFER_RULE)). The ProfileRefIdx is the reference PTL specifying information and is ProfileRefIdx=(profile_ref_delta_minus1+1) in the present embodiment. That is, the ProfileRefIdx-th PTL information on the PTL information list is referenced.

```
for(i=MaxNumSubLayers-1; i>=0; i--) {
  if(sub_layer_profile_present_flag[i]==0) {
    i-th sub_layer_profile information is set to be equal to
      i-th sub_layer_profile information of the (ProfileRefIdx)-th profile_tier_level( );
  }
}
```

An agreement is set in advance between the image decoding device side and the image coding device side such that coding/decoding is performed to set the value of the sub-layer presence flag to zero as well when the profile presence flag is zero.

[Level Information Decoder 1021*b*]

The level information decoder 1021*b* decodes and outputs the level information of the decoding target PTL information (level information of the highest sub-layer or called general level information as well) from the coded data DATA#T. In addition, the level information decoder 1021*b* decodes and outputs the sub-layer level information of each sub-layer of the decoding target PTL information excluding the highest sub-layer from the coded data DATA#T on the basis of the number of sub-layers MaxNumSubLayers and the sub-layer level presence flag sub_layer_level_present_flag[i] of each sub-layer supplied from the sub-layer level presence flag decoder 1021*d*.

Specifically, when the sub-layer level presence flag sub_layer_level_present_flag[i] of the sub-layer i (temporalId=i+1) is one, it is determined that the level information of the sub-layer i exists in the coded data #T, and the sub-layer level information of the sub-layer i is decoded and output from the coded data DATA#T. In other cases (when the sub-layer level presence flag sub_layer_level_present_flag[i] is zero), the sub-layer level information of the sub-layer i is set to predetermined level information. For example, the level information of the sub-layer (i+1) of the decoding target PTL information is configured as the level information of the sub-layer i. That is, the sub-layer i (temporalId=highestTid−1, that is, temporalId=MaxNumSubLayers−2) that is lower by one than the highest sub-layer (temporalId=highestTid) is set to the level information (general level information) of the highest sub-layer, and other sub-layers i are set to the sub-layer level information of the sub-layer (i+1) that is higher by one than the sub-layer i. A configuration rule for the sub-layer level information is represented by pseudocode as follows (refer to FIG. 63(*a*) (FIG_INFER_RULE)).

```
for(i=MaxNumSubLayers-1; i>=0; i--) {
  if(sub_layer_profile_present_flag[i]==0) {
    i-th sub_layer_profile information is set to be equal to
      (i+1)-th sub_layer_profile information;
  }
}
```

The rule can be represented by the pseudocode of FIG. 63(*b*) as well.

```
for(i=MaxNumSubLayers-1; i>=0; i--) {
  if(sub_layer_level_present_flag[i]==0) {
    sub_layer_level_idc[i]=(i==MaxNumSubLayers-1) ?
      general_level_idc: sub_layer_level_idc[i+1];
```

}
}
[Sub-Layer Profile Presence Flag Decoder 1021*c*]

The sub-layer profile presence flag decoder 1021*c* decodes the sub-layer profile presence flag of each sub-layer of the decoding target PTL information from the coded data DATA#T on the basis of the number of sub-layers Max-NumSubLayers and outputs the decoded sub-layer profile presence flag to the profile information decoder 1021*a* and to the outside.

[Sub-Layer Level Presence Flag Decoder 1021*d*]

The sub-layer level presence flag decoder 1021*d* decodes the sub-layer level presence flag of each sub-layer of the decoding target PTL information from the coded data DATA#T on the basis of the number of sub-layers Max-NumSubLayers and outputs the decoded sub-layer level presence flag to the level information decoder 1021*b* and to the outside.

[Byte Alignment Data Decoder 1021*e*]

The byte alignment data decoder 1021*e* reads (decodes) the byte alignment data (reserved_zero_2bits[i]) of the number of bits defined on the basis of the number of sub-layers (MaxNumSbuLayersMinus1 or MaxNumSubLayers−1) (syntax SYNPTL04 of FIG. 9) by two bits from the coded data.

The number of bits to be read (decoded) as the byte alignment data is "(8−MaxNumSubLayersMinus1)*2 bits" as is apparent from the syntax SYNVPSPTL04 of FIG. 9.

[Reference Profile Level Selector 1021*f*]

The reference profile level selector 1021*f* reads the previously decoded PTL information specified by the reference PTL specifying information from the parameter memory (not illustrated).

(Flow of Profile/Level Information Profile_Tier_Level( ) Decoding Process)

Figure 21:
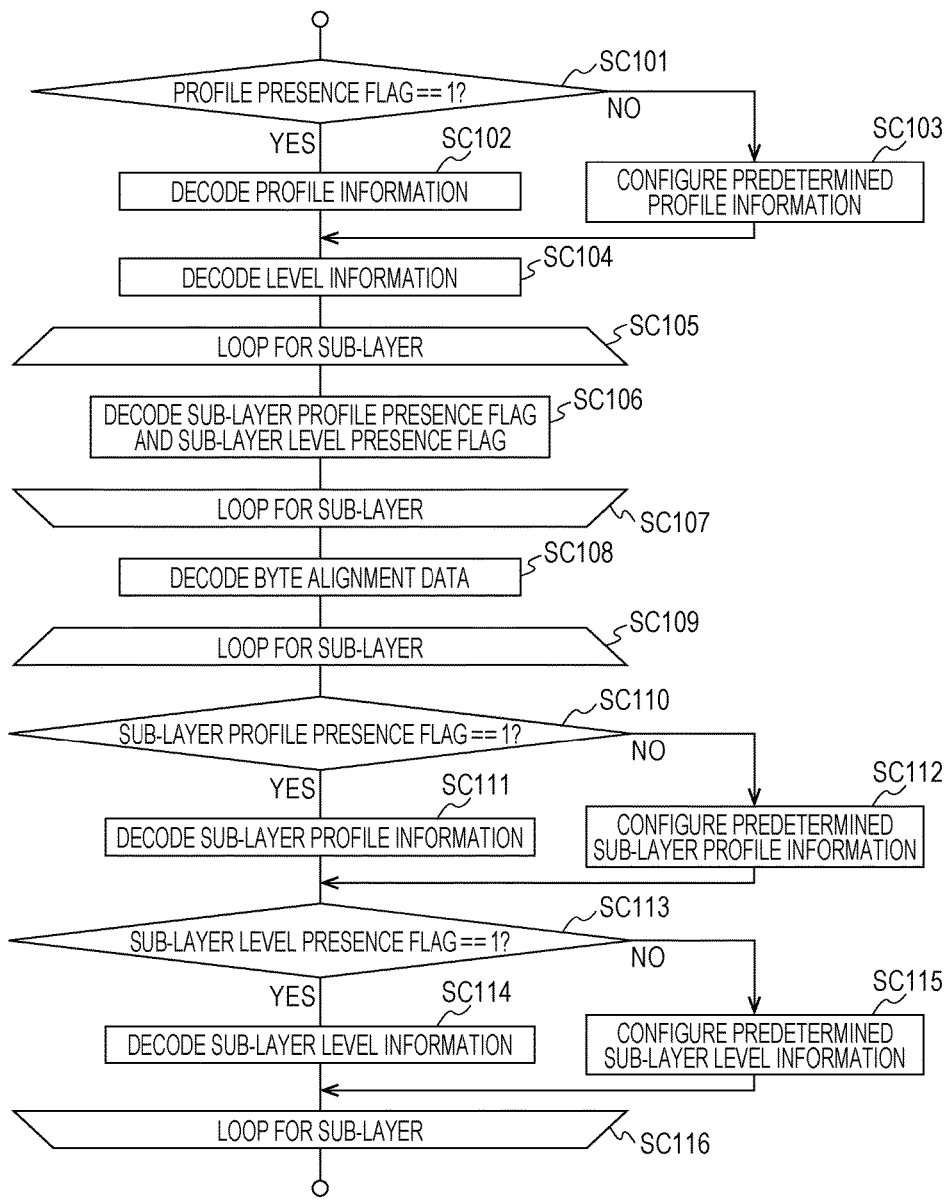
FIG. 21 is a flowchart illustrating the flow of processes in the PTL information decoder.

FIG. 21 is a flowchart illustrating a PTL information profile_tier_level( ) decoding process. Hereinafter, operation of the profile/level information decoder 1021 will be described.

(Step SC101) The profile information decoder 1021*a* determines whether the profile presence flag profilePresentFlag is one. The process proceeds to Step SC102 when the profile presence flag profilePresentFlag is one (YES in Step SC101) or proceeds to Step SC103 in other cases (NO in Step SC101).

(Step SC102) The profile information decoder 1021*a* decodes, for example, a syntax group SYNPTL01 of FIG. 9
profile space general_profile_space
tier flag general_tier_flag
profile identifier general_profile_idc
profile compatibility flag general_profile_compatibility_flag[i]
. . . omitted . . .
profile reserved syntax general_reserved_zero_44bits and the like from the coded data DATA#T and outputs the decoded syntax group as the profile information of the decoding target PTL information.

(Step SC103) The profile information decoder 1021*a* determines that the profile information of the decoding target PTL information is the same as the profile information of the previously decoded PTL information specified by the reference PTL specifying information, reads the previously decoded PTL information specified by the reference PTL specifying information from the parameter memory (not illustrated), and configures and outputs the profile information as the profile information of the decoding target PTL information.

(Step SC104) The level information decoder 1021 decodes the following syntax
level identifier general_level_idc from the coded data DATA#T and outputs the decoded syntax as the level information of the decoding target PTL information.

(Step SC105) Step SC105 is the starting point of a loop related to decoding of the sub-layer profile presence flags and the sub-layer level presence flags of the sub-layers. The variable i is initialized to zero before the start of the loop. The process inside the loop is performed when the variable i is less than the number of sub-layers−1 "MaxNumSubLayers−1", and the variable i is incremented by one each time the process inside the loop is performed once. That is, the sub-layer profile presence flags and the sub-layer level presence flags of the sub-layers excluding the highest sub-layer are decoded in Step SC105 to Step SC107.

(Step SC106) The sub-layer profile presence flag decoder 1021*c* decodes and outputs the sub-layer profile presence flag sub_layer_profile_present_flag[i] related to the sub-layer specified by the variable i from the coded data DATA#T.

The sub-layer level presence flag decoder 1021*d* decodes and outputs the sub-layer level presence flag sub_layer_level_present_flag[i] related to the sub-layer specified by the variable i from the coded data DATA#T.

(Step SC107) Step SC107 is the end point of the loop related to decoding of the sub-layer profile presence flags and the sub-layer level presence flags of the sub-layers.

(Step SC108) The byte alignment data decoder 1021*e* reads (decodes) the byte alignment data (reserved_zero_2bits[i]) of the number of bits defined on the basis of the number of sub-layers (MaxNumSbuLayersMinus1 or MaxNumSubLayers−1) (syntax SYNPTL04 of FIG. 9) by two bits from the coded data.

Specifically, in Step SC105 to Step SC107, the coding amount of each of the sub-layer profile presence flag and the sub-layer level presence flag decoded per sub-layer is one bit, total two bits, and the number of sub-layers is Max-NumSubLayers. Thus, the total sum of the coding amount decoded in Step SC105 to Step SC107 is 2*(MaxNumSub-Layer−1). Therefore, the number of bits to be read (decoded) as the byte alignment data is "(8−MaxNumSubLayersMinus1)*2 bits".

(Step SC109) Step SC109 is the starting point of a loop related to decoding of the sub-layer profile information and the sub-layer level information of the sub-layers. The variable i is initialized to zero before the start of the loop. The process inside the loop is performed when the variable i is less than the number of sub-layers−1 "MaxNumSubLayers−1", and the variable i is incremented by one each time the process inside the loop is performed once.

(Step SC110) The profile information decoder 1021*a* determines whether the sub-layer profile presence flag "sub_layer_profile_present_flag[i] specified by the variable i is one. The process proceeds to Step SC111 when the sub-layer profile presence flag is one (YES in Step SC110) or proceeds to Step SC112 in other cases (NO in Step SC110).

(Step SC111) The profile information decoder 1021*a* decodes and outputs, for example, a syntax group SYNPTL05 of FIG. 9
sub-layer profile space sub_layer_profile_space[i]
sub-layer tier flag sub_layer_tier_flag[i]
sub-layer profile identifier sub_layer_profile_idc[i]
sub-layer profile compatibility flag sub_layer_profile_compatibility_flag[i] [j]
. . . omitted . . .

sub-layer profile reserved syntax sub_layer_reserved_zero_44bits[i] from the coded data DATA#T as the sub-layer profile information of the sub-layer specified by the variable i.

(Step SC112) The profile information decoder 1021a sets the sub-layer profile information of the sub-layer i to predetermined profile information. For example, as illustrated in FIG. 62(a), when the profile presence flag profilePresentFlag is one, the profile information of the sub-layer (i+1) of the decoding target PTL information is configured and output as the profile information of the sub-layer i. As illustrated in FIG. 62(b), when the profile presence flag profilePresentFlag is zero, the profile information of the corresponding sub-layer of the previously decoded PTL information specified by the reference PTL specifying information is configured and output as the profile information of the sub-layer i.

(Step SC113) The level information decoder 1021b determines whether the sub-layer level presence flag sub_layer_level_present_flag[i] of the sub-layer specified by the variable i is one. The process proceeds to Step SCA114 when the sub-layer level presence flag is one (YES in Step SC113) or proceeds to Step SC115 in other cases (NO in Step SC113).

(Step SC114) The level information decoder 1021b decodes and outputs
sub-layer level identifier sub_layer_level_idc[i] from the coded data DATA#T as the sub-layer level information of the sub-layer specified by the variable i.

(Step SC115) The level information decoder 1021b sets the sub-layer level information of the sub-layer i to predetermined level information. For example, as illustrated in FIGS. 63(a) and 64(b), the level information of the sub-layer (i+1) of the decoding target PTL information is configured and output as the level information of the sub-layer i.

(Step SC116) Step SC116 is the end point of the loop related to decoding of the sub-layer profile information and the sub-layer level information of the sub-layers.

While the operation of the profile/level information decoder 1011 according to the first embodiment is described thus far, the invention is not limited to the above Steps. The above Steps may be changed to the extent possible.

The leading four bits (each syntax has one bit) of the extension syntax "general_reserved_zero_44bits" in the PTL information may be allocated for range extension syntax as follows, and the remaining 40 bits of the extension syntax may be changed to "general_reserved_40btis".
general_max_12 bit_constraint_flag
general_max_10 bit_constraint_flag
general_max_422chroma_constraint_flag
general_max_420chroma_constraint_flag Similarly, the leading four bits (each syntax has one bit) of the extension syntax sub_layer_reserved_zero_44bits[i] of each sub-layer having a temporal ID=i+1 (i=0 . . . maxNumSubLayersMinus1) may be allocated for range extension syntax as follows, and the remaining 40 bits of the extension syntax may be changed to "sub_layer_reserved_zero_40bits[i]".
sub_max_12 bit_constraint_flag[i]
sub_max_10 bit_constraint_flag[i]
sub_max_422chroma_constraint_flag[i]
sub_max_420chroma_constraint_flag[i]
(Modification Example of First Embodiment)

A modification example of the VPS decoder 102 will be described with reference to FIG. 22. Operation of the VPS decoder 102, since being the same as that of the first embodiment, will not be described excluding the reference PTL information specifying index (syntax SYNVPS0Fb of FIG. 22).

While the reference PTL information specifying index which is the relative index between the position of the target PTL information on the PTL information list and the reference destination PTL information (profile_ref_delta_index_minus1[i]) is decoded by Golomb codes in the first embodiment, the invention is not limited to this. For example, instead of the relative index, the profile information of the "profile_ref[i]"-th PTL information on the PTL information list may be referenced. At this time, the reference PTL information specifying index "profile_ref[i]" is variable-length decoded at a bit length V defined on the basis of the index i indicating the position of the target PTL information on the list. The bit length V is defined by ceil(log 2(i)). Accordingly, the coding amount can be reduced in comparison with the technology of the related art in which the reference PTL information specifying index is represented at a fixed length. In addition, since the lead PLT information (zeroth) on the PTL information list can be referenced, it is possible to resolve the defect that the reference PTL information specifying index does not function when the first PTL information is the target.

In other words, in the profile/level information decoded by the profile/level information decoder, the reference PTL information specifying index is changed to the reference profile so that the profile and tier information of the first profile/level information can be estimated on the basis of the zeroth profile/level information.

When referencing the lead PTL information (zeroth) on the PTL information list is not allowed, an agreement may be set in advance between the decoder and the encoder, setting the profile presence flag certainly to one when the first PTL information is the target as well as stating explicitly that the profile information of the first PTL information has to be included in the coded data (referred to as a bitstream constraint as well). Accordingly, the defect that the reference PTL information specifying index does not function when the first PTL information is the target can be resolved in the same manner.

<<Modification Example 2 of VPS Decoder 102>>

Next, a modification example 2 of the VPS decoder 102 will be described by employing FIG. 23 to FIG. 27.

Figure 24:
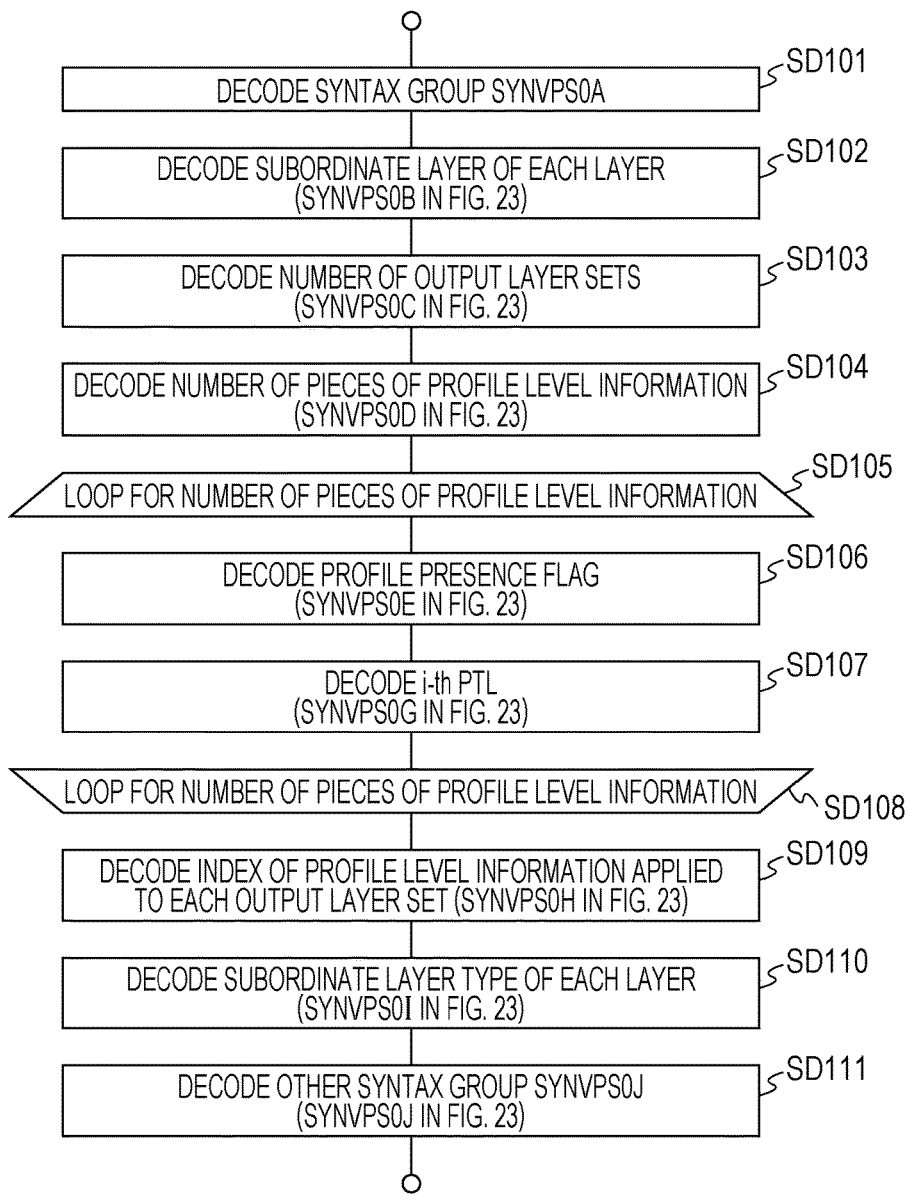
FIG. 24 is a flowchart illustrating a VPS extension data decoding process.
Figure 25:
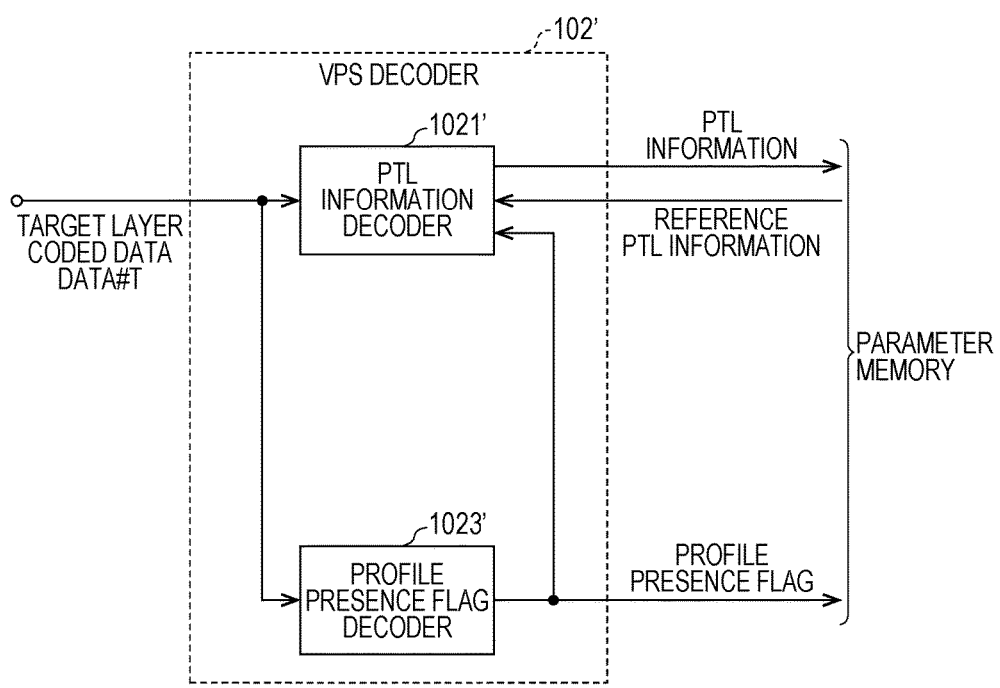
FIG. 25 is a functional block diagram illustrating a modification example of the schematic configuration of the VPS decoder.
Figure 26:
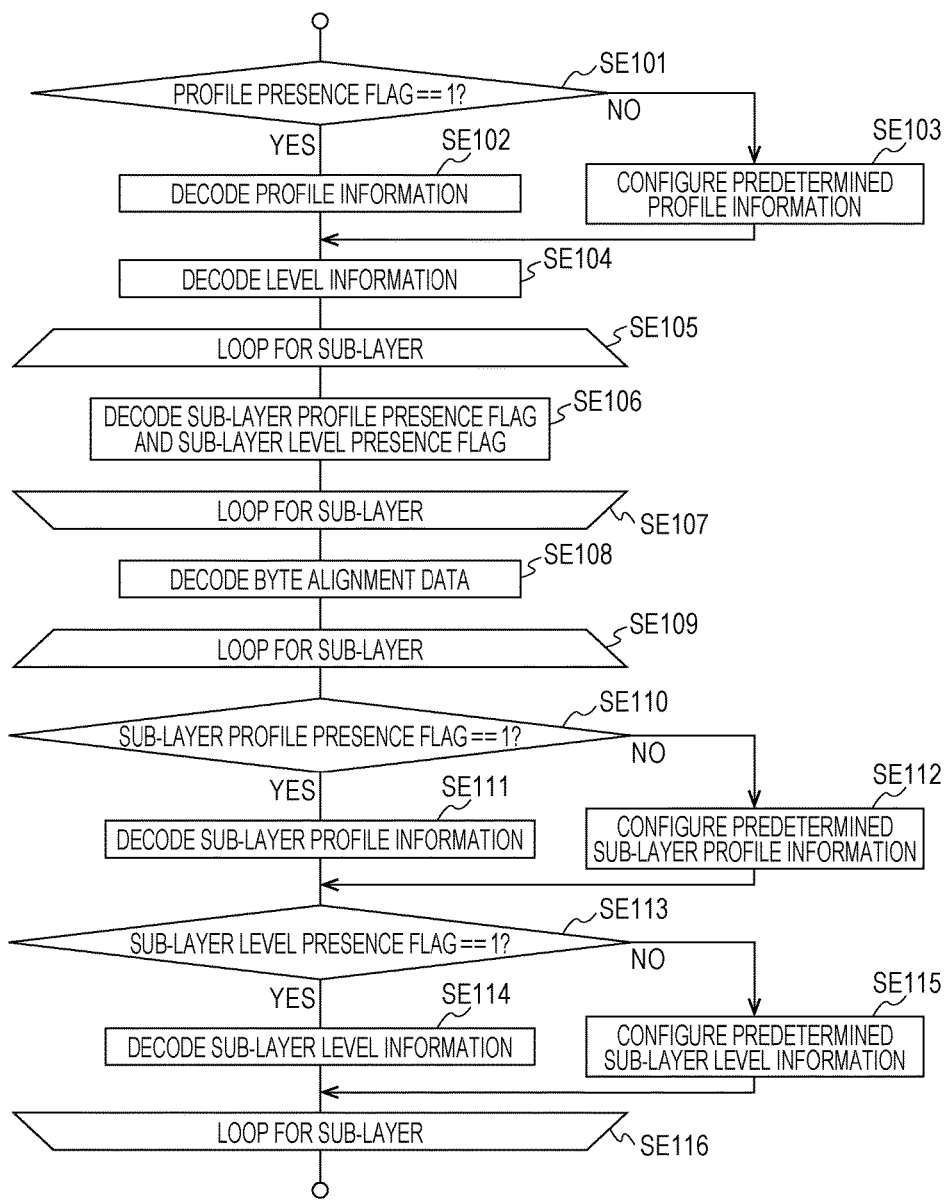
FIG. 26 is a flowchart illustrating a modification example of the flow of processes in the PTL information decoder.

FIG. 23 is a modification example of the syntax table of the extension video parameter set VPS. FIG. 24 is a flowchart illustrating a VPS extension data decoding process. FIG. 25 is a functional block diagram illustrating a modification example of the schematic configuration of the VPS decoder. FIG. 26 is a flowchart illustrating a modification example of the flow of processes in the PTL information decoder. FIG. 27 is a block diagram illustrating a modification example of details of the PTL information decoder.

First, a syntax table of the extension video parameter set VPS according to the modification example 2 will be described by employing FIG. 23. The difference between the syntax table of the extension video parameter set VPS illustrated in FIG. 23 and that illustrated in FIG. 8 is that the reference PTL information specifying index (profile_ref_delta_index_minus1[i]) illustrated in the syntax SYNVPS0Fa of FIG. 8 is deleted in FIG. 23 and that the profile presence flag (vps_profile_present_flag[i]) illustrated in syntax SYNVPS0E of FIG. 23 functions as the reference PTL specifying information specifying index as well. That is, when the value of the profile presence flag (vps_profile_present_flag[i]) is one, the profile information of the i-th PTL information is decoded from the coded data. Meanwhile, when the value of the profile presence flag is zero, the profile information of the previously decoded (i−1)-th PTL information, which is decoded immediately before the i-th PTL information, is configured (estimated) in the profile information of the i-th PTL information.

Next, differences between a configuration of a VPS decoding 102' according to the modification example 2 and that of the VPS decoder 102 will be described. The VPS decoder 102' illustrated in FIG. 25 does not include the reference PTL information decoder 1022 that the VPS decoder 102 includes, and the function of a PTL information decoder 1021' is partially different from that of the PTL information decoder 1021.

More specifically, the function of a profile information decoder 1021a' and of a reference profile level information selector 1021f' included in the PTL information decoder 1021' illustrated in FIG. 27 is partially different. Other constituents (a level information decoder 1021b', a sub-layer presence flag decoder 1021c', a sub-layer level information decoder 1021d', and a byte alignment data decoder 1021e') included in the PTL information decoder 1021' are the same as the constituents of the same reference sign included in the PTL information decoder 1021 and thus will not be described. Hereinafter, only different part of the function of the profile information decoder 1021a' and of the reference profile level information selector 1021f' will be described.

[Profile Information Decoder 1021a']

The profile information decoder 1021a' decodes and outputs the profile information of the decoding target PTL information (profile information of the highest sub-layer or called general profile information as well) from the coded data DATA#T on the basis of the profile presence flag profilePresentFlag. Specifically, when the profile presence flag profilePresentFlag is one, the profile information of the decoding target PTL information is decoded from the coded data DATA#T. When the profile presence flag profilePresentFlag is zero, it is determined that the profile information of the decoding target PTL information is the same as the profile information of the previously decoded PTL information that is first previously decoded before the decoding target PTL information ((i−1)-th PTL information). The previously decoded (i−1)-th PTL information is read from the parameter memory (not illustrated), and the profile information thereof is output as the profile information of the decoding target PTL information.

The profile information decoder 1021a' decodes and outputs the sub-layer profile information of each sub-layer in the decoding target PTL information excluding the highest sub-layer from the coded data DATA#T on the basis of the profile presence flag profilePresentFlag, the number of sub-layers MaxNumSubLayers, and the sub-layer profile presence flag sub_layer_profile_present_flag[i] of each sub-layer supplied from the sub-layer profile presence flag decoder 1021c. When the profile presence flag is one, the profile information decoding process in each sub-layer is the same as that of the profile information decoder 1021a and thus will not be described. When the profile presence flag is zero, the profile information processing in each sub-layer is the same as that of the profile information decoder 1021a if the derivation of the reference PTL specifying information ProfileRefIdx in the pseudocode illustrated in FIG. 62(b) is substituted as follows. That is, given that an index idx indicates the position of the decoding target PTL information on the PTL information list, the reference PTL specifying information is derived as ProfileRefIdx=(idx−1). Therefore, the previously decoded ProfileRefIdx (=idx−1)-th PTL information, that is, the first previously decoded PTL information on the PTL information list is referenced.

(Flow of Profile/Level Information Profile_Tier_Level( ) Decoding Process)

Hereinafter, operation of the profile/level information decoder 1021' according to the modification example 2 will be described by employing FIG. 26. The profile information/level information decoding process will be described with only Steps SC103 and SC112 of FIG. 21 of which the operation is changed. The other common Steps will not be described. That is, in the description below, Steps SC103 and SC112 of FIG. 21 are respectively changed to Steps SE103 and SE112.

(Step SE103) The profile information decoder 1021a' determines that the profile information of the decoding target PTL information is the same as the profile information of the PTL information that is first previously decoded before the decoding target PTL information on the PTL information list ((i−1)-th PTL information), reads the previously decoded PTL information from the parameter memory (not illustrated), and configures and outputs the profile information thereof as the profile information of the decoding target PTL information.

(Step SE112) The profile information decoder 1021a' sets the sub-layer profile information of the sub-layer i to pre-determined profile information. For example, as illustrated in FIG. 62(a), when the profile presence flag profilePresentFlag is one, the profile information of the sub-layer (i+1) of the decoding target PTL information is configured and output as the profile information of the sub-layer i. As illustrated in FIG. 62(b), when the profile presence flag profilePresentFlag is zero, the profile information of the corresponding sub-layer of the previously decoded PTL information specified by ProfileRefIdx is configured and output as the profile information of the sub-layer i. Given that the index idx indicates the position of the decoding target PTL information on the PTL information list, the ProfileRefIdx is ProfileRefIdx=(idx−1). That is, the first previously decoded PTL information is referenced.

While the operation of the profile/level information decoder 1021' according to the modification example 2 is described thus far, the invention is not limited to the above Steps. The above Steps may be changed to the extent possible.

As described thus far, in the syntax table of the extension video parameter set VPS according to the modification example 2, the reference PTL information specifying index (profile_ref_delta_index_minus1[i]) illustrated in the syntax SYNVPS0Fa of FIG. 23 is deleted, and the profile presence flag (vps_profile_present_flag[i]) illustrated in the syntax SYNVPS0E of FIG. 23 functions as the reference PTL specifying information specifying index as well. That is, when the value of the profile presence flag (vps_profile_present_flag[i]) is one, the profile information of the i-th PTL information is decoded from the coded data. Meanwhile, when the value of the profile presence flag is zero, the profile information of the previously decoded (i−1)-th PTL information, which is decoded immediately before the i-th PTL information, is configured (estimated) in the profile information of the i-th PTL information. On the encoder side, the PTL information on the PTL information list is rearranged in advance in order of similarity. Thus, the i-th PTL information can have a high probability of referencing the immediately previous PTL information. That is, the vps_profile_present_flag[i] when being zero can be interpreted as estimating the reference PTL specifying index to be "profile_ref_delta_index_minus1[i]=0" without decoding the reference PTL specifying index "profile_ref_delta_index_minus1[i]". Accordingly, the coding amount related to the relative index can be further reduced.

<<Modification Example 3 of VPS Decoder 102>>

Figure 30:
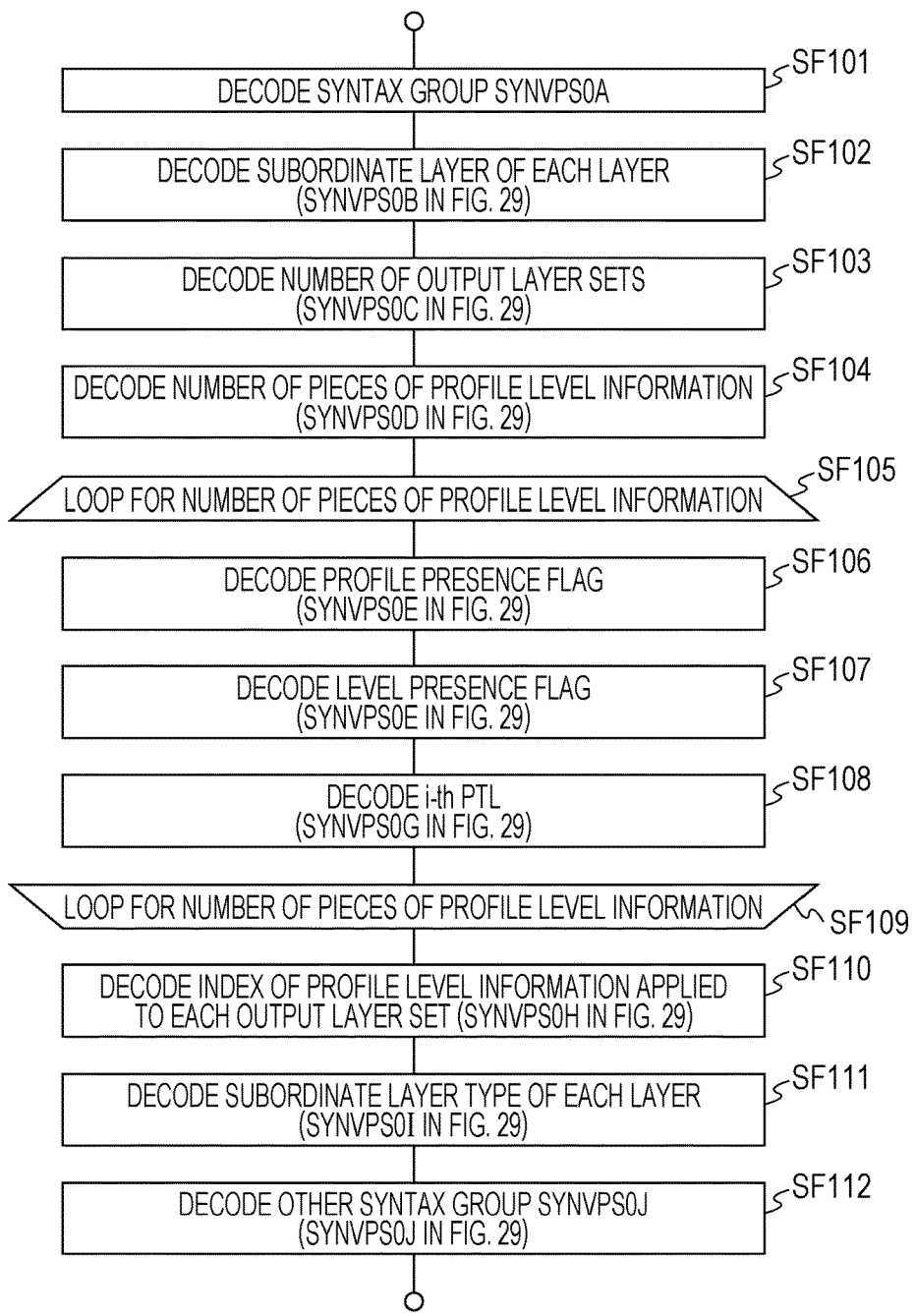
FIG. 30 is a flowchart illustrating a modification example of the VPS extension data decoding process.
Figure 31:
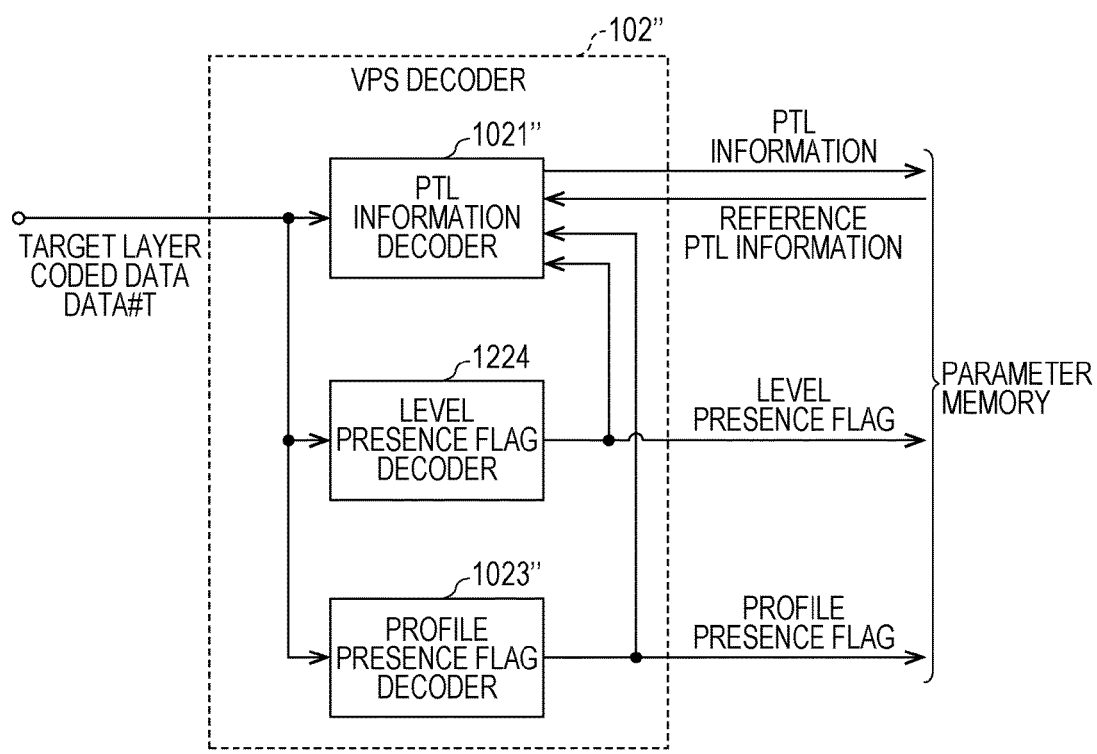
FIG. 31 is a functional block diagram illustrating a modification example of the schematic configuration of the VPS decoder.
Figure 33:
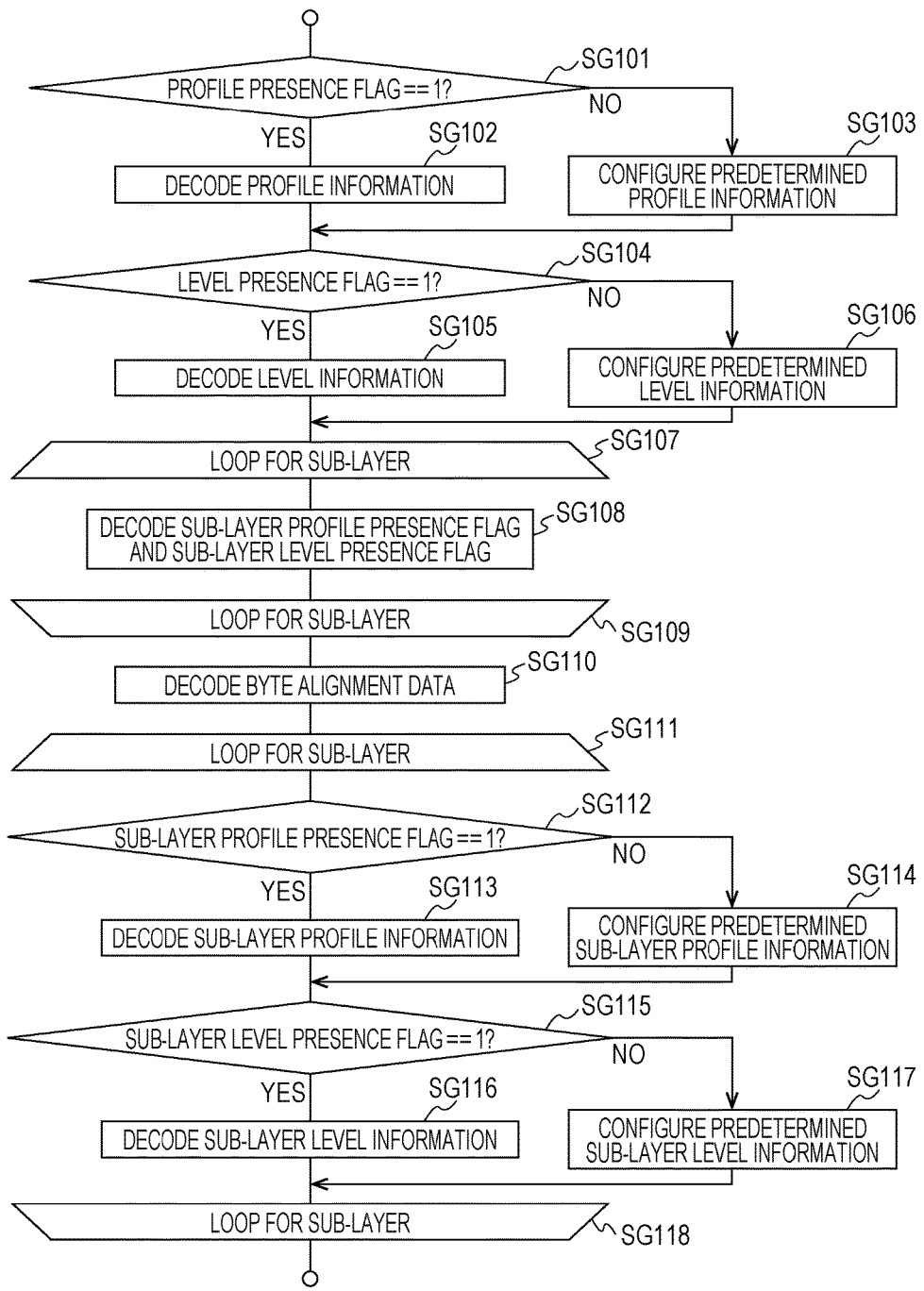
FIG. 33 is a flowchart illustrating a modification example of the flow of processes in the PTL information decoder.
Figure 34:
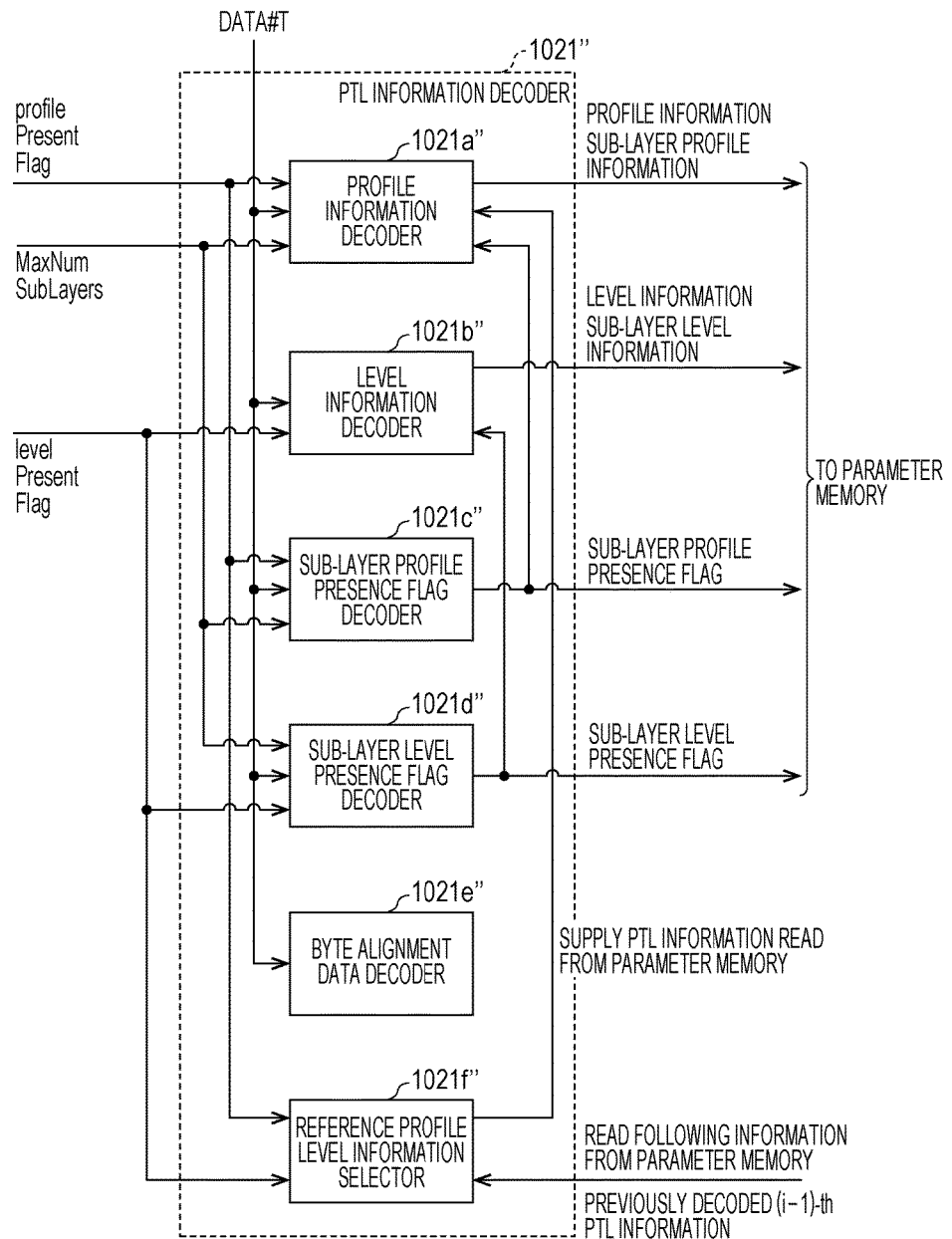
FIG. 34 is a block diagram illustrating a modification example of details of the PTL information decoder.

Next, a modification example 3 of the VPS decoder 102 will be described by employing FIG. 28 to FIG. 34. FIG. 28 is a modification example of the syntax table of the video parameter set VPS. FIG. 29 is a modification example of the syntax table of the extension video parameter set VPS. FIG. 30 is a flowchart illustrating a modification example of the VPS extension data decoding process. FIG. 31 is a functional block diagram illustrating a modification example of the schematic configuration of the VPS decoder. FIG. 32 is a diagram illustrating a modification example of the data structure of the PTL information. FIG. 33 is a flowchart illustrating a modification example of the flow of processes in the PTL information decoder. FIG. 34 is a block diagram illustrating a modification example of details of the PTL information decoder.

In the technology of the related art, the profile presence flag enables controlling whether to decode the profile information or not. However, in the case of utilizing a plurality of layers, there may be a common level between the layers. Thus, the level information may be signaled redundantly. Therefore, in order to reduce redundancy in signaling the level information, the data structure of the profile/level information profile_tier_level( ) further has a level presence flag levelPresentFlag indicating the presence of the level information as an input in addition to the profile presence flag profilePresentFlag as illustrated in FIG. 32. By this modification, first, the PTL information positioned at the lead of the video parameter set VPS is coded with the input of profilePresentFlag=1 and levelPresentFlag=1 as illustrated in FIG. 28. This modification does not change the syntax tables of the existing PTL information positioned at the lead of the VPS in HEVC and the PTL information of the SPS notified in the base layer. That is, the existing HEVC decoder being incapable of decoding the PTL information of the VPS and SPS does not occur.

First, a syntax table of the extension video parameter set VPS according to the modification example 3 will be described by employing FIG. 29. The difference between the syntax table of the extension video parameter set VPS of the related art illustrated in FIG. 56 and that illustrated in FIG. 29 is that the reference PTL information specifying index (profile_ref_minus1[i]) illustrated in the syntax SYNVPS0F of FIG. 56 is deleted in FIG. 29 and that the profile presence flag (vps_profile_present_flag[i]) illustrated in syntax SYNVPS0E of FIG. 29 and the newly added level presence flag (vps_level_present_flag[i]) illustrated in SYNVPS0Fa of FIG. 29 function as the reference PTL specifying information specifying index as well. That is, when the value of the profile presence flag (vps_profile_present_flag[i]) is one, the profile information of the i-th PTL information is decoded from the coded data. Meanwhile, when the value of the profile presence flag is zero, the profile information of the previously decoded (i−1)-th PTL information, which is decoded immediately before the i-th PTL information, is configured (estimated) in the profile information of the i-th PTL information. Similarly, when the value of the level presence flag (vps_level_present_flag[i]) is one, the level information of the i-th PTL information is decoded from the coded data. Meanwhile, when the value of the level presence flag is zero, the level information of the previously decoded (i−1)-th PTL information, which is decoded immediately before the i-th PTL information, is configured (estimated) in the level information of the i-th PTL information.

Next, differences between a configuration of a VPS decoding 102" according to the modification example 3 and that of the VPS decoder 102 will be described. The VPS decoder 102" illustrated in FIG. 31 newly includes a level presence flag decoder 1224 while not including the reference PTL information decoder 1022 that the VPS decoder 102 includes, and the function of a PTL information decoder 1021" is partially different from that of the PTL information decoder 1021. The level presence flag 1224 decodes the level presence flag (vps_level_present_flag[i]) of the i-th PTL information.

Hereinafter, a configuration of the profile/level information decoder 1021" in the modification example 3 will be described by employing FIG. 34. As illustrated in FIG. 34, the profile/level information decoder 1021" includes a profile information decoder 1021a", a level information decoder 1021b", a sub-layer profile level presence flag decoder 1021f", and a byte alignment data decoder 1021e". The sub-layer presence flag decoder 1021c", the sub-layer level information decoder 1021d", and the byte alignment data decoder 1021e" are the same as the corresponding constituents of the first embodiment and thus will not be described. In addition, the profile information decoder 1021a" is the same as the profile information decoder 1021a' included in the PTL information decoder 1021' according to the modification example 2 and thus will not be described.

Hereinafter, only different part of the function of the level information decoder 1021b" and of the reference profile level information selector 1021f" will be described.

[Level Information Decoder 1021b"]

The level information decoder 1021b" decodes and outputs the level information of the decoding target PTL information (level information of the highest sub-layer or called general level information as well) from the coded data DATA#T on the basis of the level presence flag levelPresentFlag. Specifically, when the level presence flag levelPresentFlag is one, the level information of the decoding target PTL information is decoded from the coded data DATA#T. When the level presence flag levelPresentFlag is zero, it is determined that the level information of the decoding target PTL information is the same as the level information of the previously decoded PTL information that is first previously decoded before the decoding target PTL information ((i−1)-th PTL information). The previously decoded (i−1)-th PTL information is read from the parameter memory (not illustrated), and the level information thereof is output as the level information of the decoding target PTL information.

In addition, the level information decoder 1021b" decodes and outputs the sub-layer level information of each sub-layer of the decoding target PTL information excluding the highest sub-layer from the coded data DATA#T on the basis of the level presence flag levelPresentFlag, the number of sub-layers MaxNumSubLayers, and the sub-layer level presence flag sub_layer_level_present_flag[i] of each sub-layer supplied from the sub-layer level presence flag decoder 1021d".

(Sub-Layer Level Decoding when Level Presence Flag is One)

When the level presence flag of the decoding target PTL information is one, operation of the level information decoder 1021b" is the same as the operation of the level information decoder 1021b included in the PTL information decoder 1021 according to the first embodiment and thus will not be described in detail. Simply describing, when the sub-layer level presence flag of the sub-layer i (temporalId=i+1) is one, it is determined that the level information of the sub-layer i exists in the coded data DATA#T, and the sub-layer level information of the sub-layer i is decoded from the coded data DATA#T. In other cases, the sub-layer level information of the sub-layer i is set to predetermined level information. For example, the level information of the sub-layer (i+1) of the decoding target PTL information is configured as the level information of the sub-layer i (refer to FIGS. 63(a) and 63 (b)).

(Sub-Layer Level Decoding when Level Presence Flag is Zero)

When the level presence flag of the decoding target PTL information is zero, the level information decoder 1021b" decodes the sub-layer level by the following operation. When the sub-layer level presence flag of the sub-layer i (temporalId=i+1) is one, it is determined that the level information of the sub-layer i exists in the coded data DATA#T, and the sub-layer level information of the sub-layer i is decoded from the coded data DATA#T. In other cases, the sub-layer level information of the sub-layer i is set to predetermined level information. Specifically, it is determined that the level information of the sub-layer i of the decoding target PTL information is the same as the level information of the corresponding sub-layer of the previously decoded PTL information that is first previously decoded before the decoding target PTL information ((idx−1)-th PTL information). The previously decoded (idx−1)-th PTL information is read from the parameter memory (not illustrated), and the level information thereof is output as the sub-layer level information of the decoding target PTL information. The idx is an index indicating the position of the decoding target PTL information on the PTL information list. A configuration rule for the sub-layer level information is represented by pseudocode as follows (refer to FIG. 64(b)). The ProfileRefIdx is the reference PTL specifying information and is ProfileRefIdx=(idx−1) in the modification example 3. That is, the ProfileRefIdx-th PTL information on the PTL information list is referenced.

for(i=MaxNumSubLayers−1; i>=0; i−−) {
    if(sub_layer_level_present_flag[i]==0) {
       i-th sub_layer_level information is set to be equal to
          i-th sub layer_level information of the (ProfileRefIdx)-th profile_tier_level( );
       }
    }

The above pseudocode can also be represented as in FIG. 64(c).

(Flow of Profile/Level Information Profile_Tier_Level( ) Decoding Process)

Hereinafter, operation of the profile/level information decoder 1021" according to the modification example 3 will be described by employing FIG. 33. The profile information/level information decoding process will be described with only Steps SG104, SG105, SG106, SG115, SG116, and SG117 of FIG. 33 of which the operation is different from those of FIG. 21. The other common Steps will not be described.

(Step SG104) The level information decoder 1021b" determines whether the level presence flag levelPresentFlag is one. The process proceeds to Step SG105 when the level presence flag levelPresentFlag is one (YES in Step SG104) or proceeds to Step SG106 in other cases (NO in Step SG104).

(Step SG105) The level information decoder 1021b' decodes the following syntax
    level identifier general_level_idc from the coded data DATA#T and outputs the decoded syntax as the level information of the decoding target PTL information.

(Step SG106) The level information decoder 1021b" determines that the level information of the decoding target PTL information is the same as the level information of the previously decoded PTL information preceding the decoding target PTL information by one on the PTL information list ((i−1)-th PTL information), reads the previously decoded PTL information from the parameter memory (not illustrated), and outputs the level information thereof as the level information of the decoding target PTL information.

(Step SG115) The level information decoder 1021b" determines whether the sub-layer level presence flag sub_layer_level_present_flag[i] of the sub-layer specified by the variable i is one. The process proceeds to Step SG116 when the sub-layer level presence flag is one (YES in Step SG115) or proceeds to Step SG117 in other cases (NO in Step SG115).

(Step SG116) The level information decoder 1021b' decodes and outputs
    sub-layer level identifier sub_layer_level_idc[i] from the coded data DATA#T as the sub-layer level information of the sub-layer specified by the variable i.

(Step SC117) The level information decoder 1021b" sets the sub-layer level information of the sub-layer i to predetermined level information. For example, as illustrated in FIG. 64(a), when the level presence flag levelPresentFlag is one, the level information of the sub-layer (i+1) of the decoding target PTL information is configured and output as the level information of the sub-layer i. As illustrated in FIG. 64(b), when the level presence flag levelPresentFlag is zero, the level information of the corresponding sub-layer of the previously decoded PTL information specified by ProfileRefIdx is configured and output as the level information of the sub-layer i. Given that the index idx indicates the position of the decoding target PTL information on the PTL information list, the ProfileRefIdx is ProfileRefIdx=(idx−1). That is, the first previously decoded PTL information is referenced.

While the operation of the profile/level information decoder 1021" according to the modification example 3 is described thus far, the invention is not limited to the above Steps. The above Steps may be changed to the extent possible.

As described thus far, in the syntax table of the extension video parameter set VPS according to the modification example 3, the reference PTL information specifying index (profile_ref_delta_idx_minus1[i]) illustrated in the syntax SYNVPS0F of FIG. 23 is deleted, and the profile presence flag (vps_profile_present_flag[i]) illustrated in the syntax SYNVPS0E of FIG. 29 and the level presence flag (vps_level_present_flag[i]) function as the reference PTL specifying information specifying index as well. That is, when the value of the profile presence flag (vps_profile_present_flag[i]) is one, the profile information of the i-th PTL information is decoded from the coded data. Meanwhile, when the value of the profile presence flag is zero, the profile information of the previously decoded (i−1)-th PTL information, which is decoded immediately before the i-th PTL information, is configured (estimated) in the profile information of the i-th PTL information. In addition, when the value of the level presence flag (vps_level_present_flag[i]) is one, the level information of the i-th PTL information is decoded from the coded data. Meanwhile, when the value of the level presence flag is zero, the level information of the previously decoded (i−1)-th PTL information, which is decoded immediately before the i-th PTL information, is configured (estimated) in the level information of the i-th PTL information. On the encoder side, the PTL information on the PTL information list is rearranged in advance in order of similarity. Thus, the i-th PTL information can have a high probability of referencing the immediately previous PTL information. That is, either the vps_profile_present_flag[i] when being zero or the vps_level_present_flag[i] when being zero can be interpreted as estimating the reference PTL specifying index to be "profile_ref_delta_index_minus1[i]==0" without decoding the reference PTL specifying index "profile_ref_delta_index_minus1[i]". Accordingly, the coding amount related to the relative index can be further reduced. Furthermore, the modification example 3 accomplishes the effect of reducing the redundancy of the profile information and level information of the decoding target PTL information as in the first embodiment.

As described thus far, the profile/level information decoder derives the level information of the i-th profile/level information from the level information of other profile/level information when the VPS level presence flag is equal to "0".

<<Modification Example 3a of VPS Decoder 102>>

The configuration of the modification 3 may be changed as follows. That is, the profile presence flag profilePresentFlag and the level presence flag levelPresentFlag are substituted by a profile level presence flag ProfileLevelPresentFlag that represents the presence of the profile information and of the level information.

Hereinafter, a configuration of the profile/level information decoder 1021" in a modification example 3a will be described by employing FIG. 34 instead. The PTL information decoder 1021" according to the modification example 3a has the same configuration and operation as the PTL information decoder 1021" of the modification example 3 excluding the input values of the profile presence flag profilePresentFlag and the level presence flag levelPresentFlag. While there is wiring for the profile presence flag profilePresentFlag and the level presence flag levelPresentFlag in FIG. 34, the profilePresentFlag and the levelPresentFlag of FIG. 34 are input as zero in the modification example 3a when the profile level presence flag profileLevelPresentFlag is zero. When the profile level presence flag profileLevelPresentFlag is one, the profilePresentFlag and the levelPresentFlag of FIG. 34 are input as one. This modification does not change the syntax tables of the existing PTL information positioned at the lead of the VPS in HEVC and the PTL information of the SPS notified in the base layer. That is, the existing HEVC decoder being incapable of decoding the PTL information of the VPS and SPS does not occur.

The modification 3a described thus far accomplishes the same effect as the modification 3. Furthermore, in comparison with the modification example 3, the coding amount related to an additional flag (the level presence flag in the modification 3) can be reduced by integrating the profile presence flag and the level presence flag into one profile level presence flag indicating the presence of the profile information and the level information.

As described thus far, the profile/level information decoder derives the level information of the i-th profile/level information from the level information of other profile/level information when the VPS profile level presence flag is equal to "0".

<<Modification Example 4 of VPS Decoder 102>>

Figure 66:
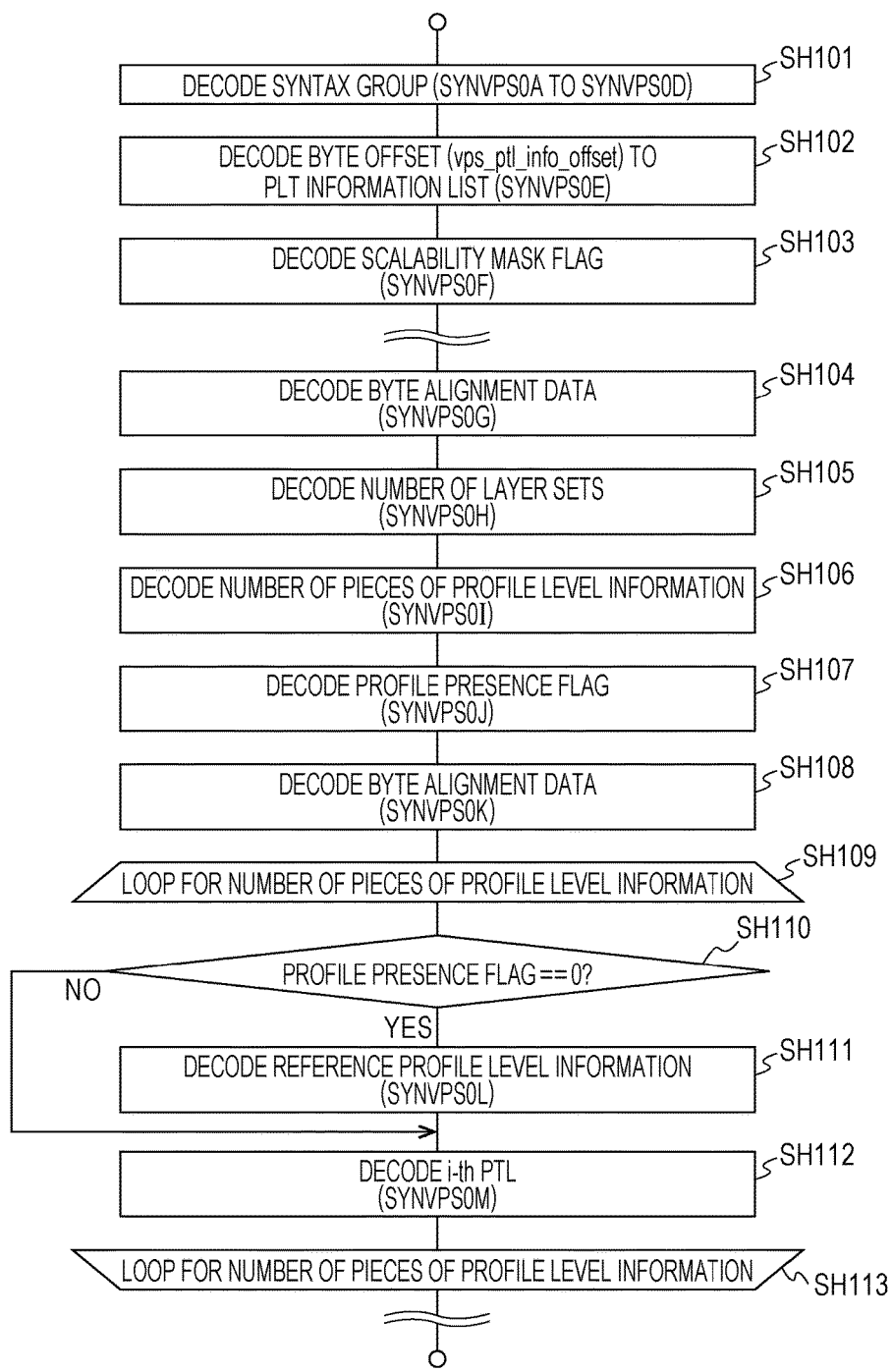
FIG. 66 is a flowchart illustrating a modification example of the VPS extension data decoding process.

Next, a modification example 4 of the VPS decoder 102 will be described by employing FIG. 65 and FIG. 66.

First, a syntax table of the extension video parameter set VPS (VPS extension data vps_extension( )) according to the modification example 4 will be described by employing FIG. 65. Differences between the syntax table of the extension video parameter set illustrated in FIG. 56 (technology of the related art) and that of FIG. 65 are described in (1) and (2) as follows.

(1) (a) A change in the arrangement of syntax splitting_flag (SYNVPS0B of FIG. 65) (arranged next to avc_base_layer_flag in the example of FIG. 65) and extension bits (byte alignment data) reserved_zero_6bits (SYNVPS0C of FIG. 65) for adjusting byte alignment and (b) syntax vps_ptl_info_offset (SYNVPS0E of FIG. 65) indicating a byte offset from the lead of the VPS NAL unit to the syntax related to the PTL information in the VPS extension data of the VPS NAL unit are added so that the syntax from the flag avc_base_layer_flag (SYNVPS0A of FIG. 65) indicating whether the base layer at the lead of the VPS extension data vps_extension( ) is a bitstream coded by H.264 to the scalability mask scalability_mask_flag[i] (SYNVPS0F of FIG. 65) indicating the scalability of each layer is byte-aligned.

First, the byte offset information vps_ptl_info_offset illustrated in FIG. 65 is desirably 16 bits so as to maintain byte alignment. While the byte offset information vps_ptl_info_offset is a byte offset from the lead of the VPS NAL unit until the syntax related to the PTL information in the VPS extension data of the VPS NAL unit, specifically, the byte offset information vps_ptl_info_offset may be a byte offset from the lead of the VPS NAL unit until the syntax vps_number_layer_sets_minus1 (number of layer sets) illustrated in SYNVPS0H of FIG. 65. In this case, byte alignment data vps_alignment_bit_equal_to_one (SYNVPS0G in FIG. 65) is inserted immediately before the number of layer sets vps_number_layer so as to adjust the byte alignment. In addition, not being limited to this, the byte offset information vps_ptl_info_offset may be a byte offset from the lead of the VPS NAL unit until the syntax VPS_num_profile_tier_level_minus1 (number of pieces of PTL information) illustrated in SYNVPS0I of FIG. 65. In this case, as in the SYNVPS0G of FIG. 65, the byte alignment data vps_alignment_bit_equal_to_one is inserted immediately before the number of pieces of PTL information vps_num_profile_tier_level_minus1 so as to adjust the byte alignment.

While the value of the extension bits reserved_zero_6bits is zero of six bits, the value may be one as well. In addition, any of the extension bits reserved_zero_6bits may be utilized to represent other syntax. For example, each of the leading N bits (1<=N<=6) of the reserved_zero_6bits may be substituted by any one of the syntax illustrated below, a flag indicating the presence of a certain state, and the like.

flag max_tid_ref_present_flag (not illustrated) indicating the presence of the upper limit of a sub-layer available in the inter-layer prediction of each layer flag all_ref_layers_active_flag (not illustrated) indicating whether the number of active direct reference layers utilized in the inter-layer prediction and the like at the time of decoding a coded picture is the same as the number of reference layers that may be referenced in the inter-layer prediction and the like through decoding of the entire sequence (indicating that all of the direct reference layers are referenced at the time of decoding a coded picture)

flag more_output_layer_sets_than_default_flag (not illustrated) indicating that the number of output layer sets is greater than a default value (vps_number_layer_sets_minus1+1)

representation information presence flag rep_format_idx_present_flag (not illustrated)

flag max_one_active_ref_layer_flag (not illustrated) indicating that the number of reference layers referenced at the time of decoding a coded picture is one at most flag cross_layer_irap_alinged_flag (not illustrated) indicating that a picture that can be randomly accessed between layers is aligned flag single_layer_for_non_irap_flag (not illustrated) indicating whether all of the VLC NAL units in one AU have the same layer identifier or a picture having a layer identifier greater than the value of the other layer identifier, while two layer identifiers are included in the VCL NAL unit in one AU, is a random access picture VUI presence flag vps_vui_present_flag (not illustrated)

In addition, the bit length of the extension bits reserved_zero_6bits is not limited to six bits and may be extended to the number of bits at which byte alignment can be adjusted. For example, the extension bits reserved_zero_6bits may be 14 bits by adding eight bits to the six bits, and the leading N bits ($1<=N<=14$) thereof may be substituted by the above flags or other syntax.

The above flags are scattered in the technology of the related art. Thus, a problem arises in that the presence of syntax or the presence of a state related to the flags cannot be obtained unless decoding is performed as far as the location where the flags exist. However, as in the modification example 4, arranging the flag indicating the presence of certain syntax or state at the lead of the VPS extension data results in the effect that the presence of the relevant syntax and state can be obtained early by the decoder reading (decoding) the leading few bytes of the VPS extension data. In addition, by performing byte alignment, the number of memory accesses related to reading/writing can be reduced at the time of decoding/coding each syntax. That is, the effect of reducing the amount of processing required to perform decoding/coding is accomplished.

In addition, by adding the syntax vps_ptl_info_offset indicating a byte offset for relevant syntax to the PTL information, the decoder can early access the syntax related to the PTL information that exists at the byte offset indicated by the vps_ptl_info_offset by reading the leading few bits (or bytes) of the VPS extension data. Accessing the PTL information on the PTL information list early has an advantage. Although the scalability_mask_flag indicating the scalability type of each layer exists near the lead of the VPS extension data, it is not possible to obtain whether each layer set is decodable by the decoder from that syntax. Thus, by accessing early and decoding the PTL information on the basis of the byte offset vps_ptl_info_offset, the decoder can early obtain whether a decodable layer set exists in the bitstream. In addition, the decoder can specify a decodable layer set by decoding the PTL specifying index (profile_level_tier_idx[i]) (the syntax group SYNVPS0H of FIG. 56) specifying the PTL information applied to each (output) layer set arranged immediately after the PTL information list. Furthermore, the decoder selects a target set (output layer set) on the basis of the PTL information, the correspondence information between the output layer set and the PTL information (PTL information specifying index), the layer ID list of each layer set (a syntax group SYNVPS03 of FIG. 55), and the like and performs the bitstream extracting process. Thus, it is possible to generate only the bitstream decodable by the decoder.

(2) In the stage of establishing HEVC standards in NPL 1, the PTL information profile_tier_level( ) (FIG. 54) in the VPS and SPS is designed such that the profile information (SYNPTL01 of FIG. 54), the level information (SYNPTL02 of FIG. 54), the sub-layer profile presence flag and the sub-layer level presence flag (SYNPTL03 of FIG. 54), the profile information of each sub-layer (SYNPTL05 of FIG. 54), and the level information (SYNPTL06 of FIG. 54) are byte-aligned. For example, there is byte alignment data illustrated in SYNPTL04 of FIG. 54 for adjusting byte alignment. In addition, the sub-layer profile presence flag and the sub-layer level presence flag are designed to be signaled as being interleaved with the profile information and the level information of each sub-layer so that the profile information and the level information of a specific sub-layer can be easily accessed by byte calculation on the basis of the number of sub-layers, the sub-layer profile presence flag, and the sub-layer level presence flag.

However, in the technology of the related art (NPL 2 and NPL 3), byte alignment is not maintained in the PTL information of the VPS extension data because the syntax (for example, vps_profile_present_flag[i] or profile_ref_minus1[i] of FIG. 56) immediately before the PTL information is not aligned. Thus, the above advantage considered in the stage of establishing standards of the PTL information described above is impaired.

In order to resolve the above problem, syntax is arranged, bit lengths are changed, and byte alignment data vps_alingment_bit_equalt_to_one (SYNVPS0G of FIG. 65), the number of pieces of PTL information, and byte alignment data reserved_zero_1bits[i] (SYNVPS0K of FIG. 65) defined on the basis of the profile presence flag are newly added such that the syntax related to the PTL information (syntax of the number of output layer sets vps_number_layer_sets_minus1 (SYNVPS0H of FIG. 65), the number of pieces of PTL information vps_num_profile_tier_level_minus1 (SYNVPS0I of FIG. 65), the VPS profile presence flag vps_present_flag[i](SYNVPS0J of FIG. 65), the reference PTL specifying information profile_ref_minus1[i] (SYNVPS0L of FIG. 65), and the PTL information profile_tier_level( ) (SYNVPS0M of FIG. 65)) is byte-aligned.

Specifically, first, the byte alignment data vps_alingment_bit_equalt_to_one (SYNVPS0G of FIG. 65) illustrated in SYNVPS0G of FIG. 65 is inserted to be arranged in the coded data at a position where the leading syntax of the syntax related to the PTL information (the number of layer sets vps_number_layer_sets_minus1 in the example of FIG. 65) is byte-aligned (arranged at the leading position of a byte boundary). A function byte_aligned( ) is a process of determining whether the current position (in units of bits) in the coded data is on the byte boundary. The determination is "true" when the current position in the coded data is on the byte boundary or is "false" in other cases. That is, the byte alignment data (vps_alingment_bit_equalt_to_one) is inserted by one bit until the determination is "true".

Next, the profile presence flag of each PTL information and the PTL information are interleaved (separated) to insert the byte alignment data reserved_zero_bits[i] between the profile presence flag and the PTL information so as to adjust byte alignment. In the case of FIG. 65, the syntax of the number of layer sets vps_number_layer_sets_minus1 (SYNVPS0H of FIG. 65) and the number of pieces of PTL information vps_num_profile_tier_level_minus1 (SYNVPS0G of FIG. 65) is byte-aligned. Thus, the bit amount V of the byte alignment data reserved_zero_bits[i] inserted is defined by the number of pieces of PTL information, for example, $V=\{8-\{\{(\text{vps\_num\_profile\_tier\_level\_minus1}+1) \% 8\} \% 8\}\}$. A loop expression for inserting the byte alignment data is not limited to "for(i=

"(((vps_num_profile_tier_level_minus1+1) % 8) % 8); i>0; i−−)" illustrated in SYNVPS0G of FIG. 65 and may be changed to the extent possible. For example, "for(i=0; i<(((vps_num_profile_tier_level_minus1+1) % 8) % 8); i++)" may be employed.

While the byte alignment data vps_alingment_bit_equal_to_one (=one bit) is inserted immediately before the number of layer sets in the case of FIG. 65, the byte alignment data may be inserted immediately before the number of pieces of PTL information vps_num_profile_tier_level_minus1. In this case, the bit amount V of the byte alignment data inserted between the profile presence flag and the PTL information is defined by a bit length V1 (=six bits) of the number of pieces of PTL information as well as the number of pieces of PTL information, for example, V={8−{{(vps_num_profile_tier_level_minus1+1+V1) % 8} % 8}}.

In this case, the loop expression for inserting the byte alignment data may be, for example, "for(i=(((vps_num_profile_tier_level_minus1+1+V1) % 8) % 8); i>0; i−−)". In addition, the loop expression is not limited to this and may be changed to the extent possible. For example, "for(i=0; i<(((vps_num_profile_tier_level_minus1+1+V1) % 8) % 8); i++)" may be employed. Alternatively, "while (!byte_aligned( ))" may be employed instead of the above loop expression.

The reference PTL specifying information profile_ref_minus1[i] is changed from six bits to eight bits so as to maintain byte alignment on the PTL information list (SYNVPS0L of FIG. 65). Alternatively, instead of extending the bit length of the reference PTL specifying information profile_ref_minus1[i], two-bit extension bits reserved_zero_2bits may be added thereto so as to adjust byte alignment.

The PTL information on the PTL information list is byte-aligned by performing the above changes. Thus, the number of memory accesses related to reading/writing can be reduced at the time of decoding/coding each syntax. That is, the effect of reducing the amount of processing required to perform decoding/coding is accomplished. In addition, as in NPL 1, the profile information and the level information of a specific sub-layer of each PTL information can be easily accessed by byte calculation on the basis of the number of sub-layers, the sub-layer profile presence flag, and the sub-layer level presence flag.

(Configuration of VPS Decoder 102''')

A configuration of a VPS decoder 102''' according to the modification example 4 will be described with reference to FIG. 16. The VPS decoder 102''' further includes a byte alignment data decoder 1024 (not illustrated) in addition to the same constituents as the PTL information decoder 1021, the reference PTL specifying information decoder 1022, and the profile presence flag decoder 1023 included in the VPS decoder 102 of the first embodiment. Hereinafter, only the byte alignment data decoder 1024 will be described.

The byte alignment data decoder 1024 included in the VPS decoder 102''' decodes data and byte alignment data inserted in the VPS extension data vps_extension( ) to adjust byte alignment. Such data are vps_alignment_bit_equal_to_one (SYNVPS0G of FIG. 65) and reserved_zero_1bits[i] (SYNVPS0K of FIG. 65).

<Details of VPS Extension Data Decoding Process (Modification Example 4)>

A VPS extension data decoding process of the VPS decoder 102''' will be described by employing FIG. 66.

(Step SH101) The VPS decoder 102''' decodes a syntax group SYNVPS0A of FIG. 65.

(Step SH102) The VPS decoder 102''' decodes byte offset information (vps_ptl_info_offset) to the PTL information list illustrated in SYNVPS0E of FIG. 65.

(Step SH103) The VPS decoder 102''' decodes the scalability mask flag illustrated in SYNVPS0F of FIG. 65.

. . . omitted . . .

(Step SH104) The byte alignment data decoder 1024 included in the VPS decoder 102''' decodes (reads) the byte alignment data (vps_alignment_bit_equal to one) by one bit on the basis of a predetermined determination expression illustrated in SYNVPS0G of FIG. 65.

(Step SH105) The VPS decoder 102''' decodes the number of layer sets illustrated in SYNVPS0H of FIG. 65.

(Step SH106) The VPS decoder 102''' decodes the number of pieces of PTL information illustrated in SYNVPS0I of FIG. 65.

(Step SH107) The profile presence flag decoder 1023 included in the VPS decoder 102''' decodes the profile presence flag illustrated in SYNVPS0J of FIG. 65 in quantities of "the number of pieces of PTL information−1".

(Step SH108) The byte alignment data decoder 1024 included in the VPS decoder 102''' decodes the byte alignment data (reserved_zero_bit[i]) illustrated in SYNVPS0K of FIG. 65. The number of bits of the decoded byte alignment data is V={8−{{(vps_num_profile_tier_level_minus1+1) % 8} % 8}}.

(Step SH109) Step SH109 is the starting point of a loop of a decoding process for the PTL information included in the VPS.

(Step SH110) When the profile presence flag is zero, it is determined that there is no syntax group indicating the profile information in the i-th PTL information, and the process proceeds to Step SH112. When the profile presence flag is one, it is determined that there is a syntax group indicating the profile information in the i-th PTL information, and the process proceeds to Step SA111.

(Step SH111) When the profile presence flag is zero, the reference PTL specifying information decoder 1022 included in the VPS decoder 102'''' decodes the reference PTL information specifying index "profile_ref_minus1[i]" (SYNVPS0L of FIG. 65) that indicates the PTL information from which the profile information of the i-th PTL information is referenced on the PTL information list. The reference PTL information specifying index "profile_ref_minus1[i]" represents the position of the reference destination PTL information. That is, the i-th PTL information references the j-th PTL information specified by j=(profile_ref_minus1[i]+1) for profile information.

(Step SH112) The PTL information decoder 1021 included in the VPS decoder 102''' decodes the profile and level information of the i-th PTL information with the input of the profile presence flag, the reference PTL specifying index, and the number of sub-layers. Details of the PTL information decoder 1021 will not be described since being described previously.

(Step SH113) Step SH113 is the end point of the loop of the decoding process for the PTL information included in the VPS.

(Step SH114) The VPS decoder 102''' decodes the other syntax.

While the operation of the VPS decoder 102''' according to the modification example 4 is described thus far, the invention is not limited to the above Steps. The above Steps may be changed to the extent possible.

<<Modification Example 4a of VPS Decoder 102>>

Figure 69:
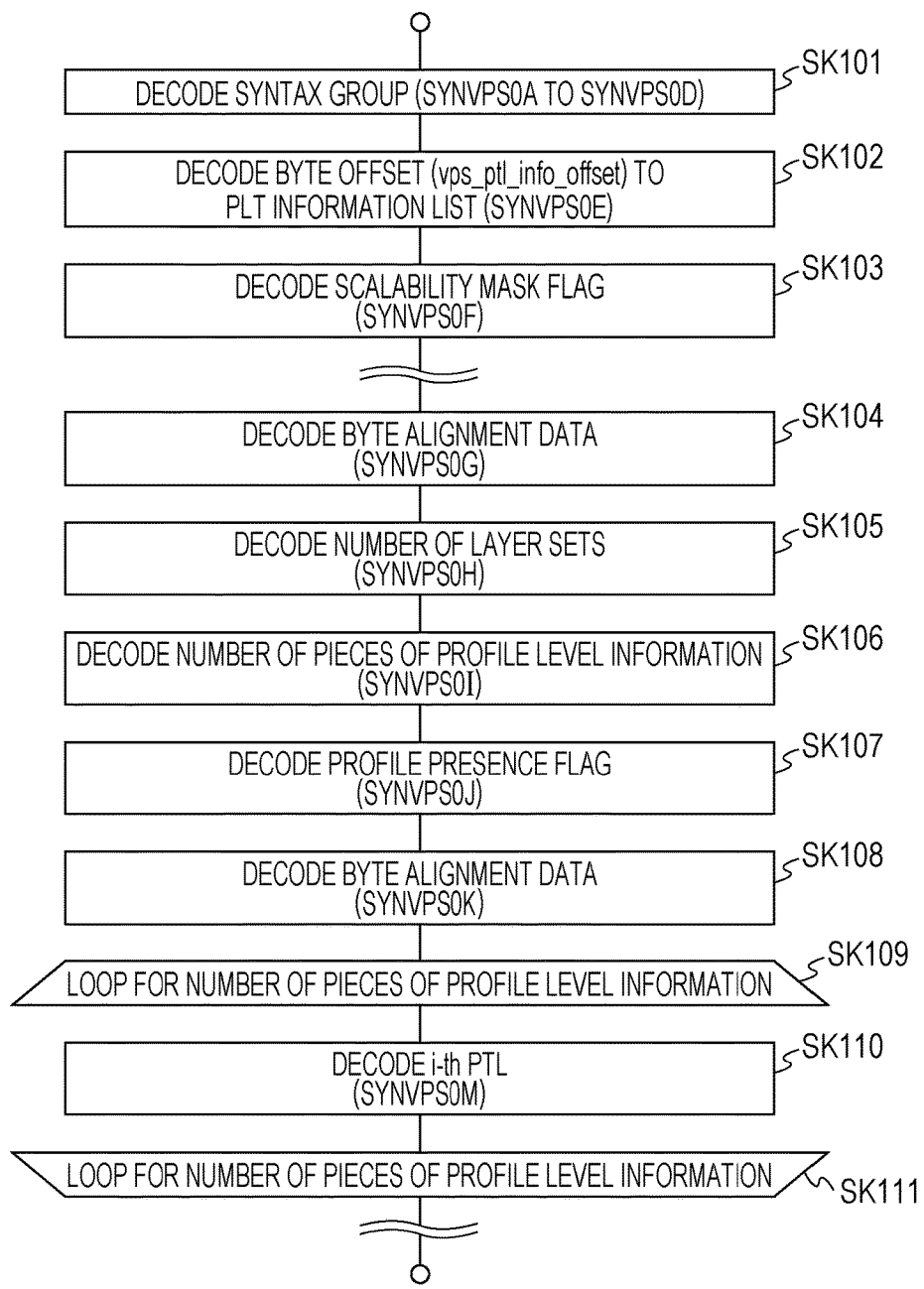
FIG. 69 is a flowchart illustrating a modification example of the VPS extension data decoding process.

Next, a modification example 4a of the VPS decoder 102 will be described by employing FIG. 68 and FIG. 69.

First, a syntax table of the extension video parameter set VPS (VPS extension data vps_extension( )) according to the modification example 4a will be described by employing FIG. 68. The difference between the syntax table of the VPS extension data illustrated in FIG. 65 according to the modification example 4 and that illustrated in FIG. 68 is that the reference PTL information specifying index (profile_ref_minus1[i]) illustrated in the syntax SYNVPS0L of FIG. 65 is deleted in FIG. 68 and that the profile presence flag (vps_profile_present_flag[i]) illustrated in the syntax SYNVPS0J of FIG. 68 functions as the reference PTL specifying information specifying index as well. That is, when the value of the profile presence flag (vps_profile_present_flag[i]) is one, the profile information of the i-th PTL information is decoded from the coded data. Meanwhile, when the value of the profile presence flag is zero, the profile information of the previously decoded (i–1)-th PTL information, which is decoded immediately before the i-th PTL information, is configured (estimated) in the profile information of the i-th PTL information. On the encoder side, the PTL information on the PTL information list is rearranged in advance in order of similarity. Thus, the i-th PTL information can have a high probability of referencing the immediately previous PTL information. That is, the vps_profile_present_flag[i] when being zero can be interpreted as estimating the reference PTL specifying index to be "profile_ref_minus1[i]==0" without decoding the reference PTL specifying index "profile_ref_minus1[i]". Accordingly, the coding amount related to the reference PTL specifying index can be further reduced. Other changes made on the VPS extension data of the technology of the related art are the same as those of the modification example 4 and accomplish the same effect.

(Configuration of VPS Decoder 102′″a)

A configuration of a VPS decoder 102′″a according to the modification example 4a will be described with reference to FIG. 25. The VPS decoder 102′″a further includes the byte alignment data decoder 1024 (not illustrated) in addition to the same constituents as the PTL information decoder 1021′ and the profile presence flag decoder 1023′ included in the VPS decoder 102′ of the modification example 2. The same constituents, the PTL information decoder 1021′ and the profile presence flag decoder 1023′, will not be described. In addition, the byte alignment data decoder 1024 is the same as the byte alignment data decoder 1024 included in the VPS decoder 102′″ of the modification example 4 and thus will not be described.

<Details of VPS Extension Data Decoding Process (Modification Example 4a)>

A VPS extension data decoding process of the VPS decoder 102′″a will be described by employing FIG. 69. The VPS extension data decoding process of the VPS decoder 102′″a has the same operation as the modification example 4 except that Step SH110 (a branching determination based on the value of the profile presence flag and a transition based on the branching) and Step SH111 (decoding of the reference PTL information specifying index profile_ref_minus1[i]) are omitted in FIG. 66 and thus will not be described.

While the operation of the VPS decoder 102′″a according to the modification example 4 is described thus far, the invention is not limited to the above Steps. The above Steps may be changed to the extent possible.

While vps_ptl_info_offset indicating the byte offset from the lead of the VPS NAL unit until the syntax related to the PTL information in the VPS extension data of the VPS NAL unit is added to the VPS extension data of the modification example 4 and of the modification example 4a, the invention is not limited to this. For example, instead of adding the byte offset, the syntax related to the PTL information may be arranged immediately after the scalability mask flag. Even by so doing, the PTL information and the relevant syntax can be accessed early, and the same effect as the modification example 4 and the modification example 4a is accomplished. The same can apply to the coding side.

While the profile presence flag and the PTL information are signaled as being interleaved in the modification example 4a, the invention is not limited to this. For example, the level information presence flag introduced in the modification example 3 may be signaled as being interleaved with the PTL information, as in the modification example 4a. That is, it is also possible that the profile information and the level information are first signaled in quantities of the number of pieces of PTL information–1, then the byte alignment data is inserted, and then each PTL information is signaled. In this case, the same effect as the modification example 4a and the modification example 3 is accomplished. This change can also apply to the coding side.

[Reference Picture Information Decoder]

A reference picture information decoder is a constituent of the header decoder 10 and decodes information related to the reference picture from the coded data #1.

The information related to the reference picture includes reference picture set information (hereinafter, RPS information) and reference picture list modification information (hereinafter, RPL modification information).

A reference picture set (RPS) represents a set of pictures, in a target picture or in a picture subsequent to the target picture in the decoding order, having the possibility of being utilized as a reference picture. The RPS information is information decoded from the SPS or the slice header and is information employed in deriving the reference picture set configured at the time of decoding each picture.

A reference picture list (RPL) is a list of reference picture candidates to be referenced at the time of motion compensated prediction. The reference picture list may exist in quantities of two or more. The present embodiment employs the L0 reference picture list (L0 reference list) and the L1 reference picture list (L1 reference list). The RPL modification information is information decoded from the SPS or the slice header and indicates the order of reference pictures in the reference picture list.

The motion compensated prediction utilizes a reference picture that is recorded at the position of a reference image index (refIdx) on a reference image list. For example, when the value of refIdx is zero, the reference picture at the position of zero on the reference image list, that is, the reference picture at the lead of the reference image list is employed in the motion compensated prediction.

An RPS information and RPL modification information decoding process performed by the reference picture information decoder will be described in more detail below as this process is important in the present embodiment.

Figure 35A:
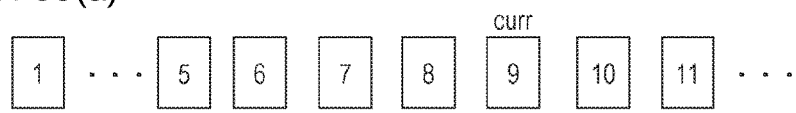
FIGS. 35(a)-35(e) are diagrams illustrating a reference picture set as well as examples of a reference picture list.

Examples of the reference picture set and the reference picture list will be described with reference to FIGS. 35(a)-35(e). FIG. 35(a) illustrates pictures constituting a moving image linearly in order of display. The numbers in the drawing represent POCs corresponding to each picture. The POC is assigned in ascending order to each picture in order of output as described below in the description of the decoded picture buffer. The picture having a POC of nine and illustrated with "curr" is the current decoding target picture.

Figure 35B:
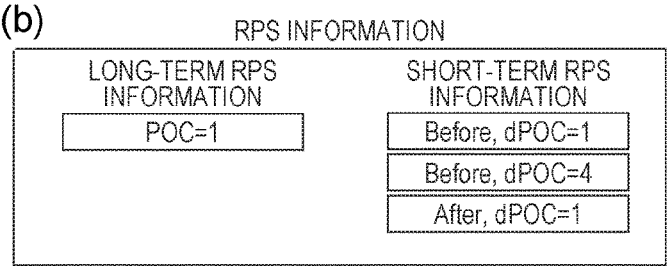

FIG. 35(b) illustrates an example of the RPS information applied to the target picture. The reference picture set (current RPS) in the target picture is derived on the basis of the RPS information. The RPS information includes long-term RPS information and short-term RPS information. The long-term RPS information directly indicates the POC of the picture included in the current RPS. In the example illustrated in FIG. 35(b), the long-term RPS information indicates that the picture of POC=1 is included in the current RPS. The pictures included in the current RPS are recorded in the short-term RPS information as a difference with respect to the POC of the target picture. The short-term RPS information illustrated as "Before, dPOC=1" in the drawing indicates that the picture of the POC smaller by one than the POC of the target picture is included in the current RPS. Similarly, "Before, dPOC=4" in the drawing indicates the picture of the POC smaller by four, and "After, dPOC=1" indicates that the picture of the POC greater by one is included in the current RPS. The term "Before" indicates a picture before the target picture, that is, a picture that is earlier than the target picture in order of display. The term "After" indicates a picture after the target picture, that is, a picture that is later than the target picture in order of display.

Figure 35C:
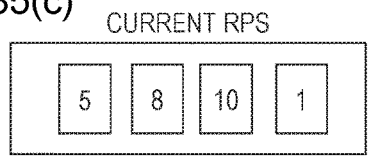

FIG. 35(c) illustrates an example of the current RPS derived when the RPS information illustrated in FIG. 35(b) is applied in a case where the POC of the target picture is zero. The picture of POC=1 indicated by the long-term RPS information is included in the current RPS. In addition, the picture of the POC, indicated by the short-term RPS information, smaller by one than that of the target picture (POC=9), that is, the picture of POC=8 is included in the current RPS. Similarly, the pictures of POC=5 and of POC=10 indicated by the short-term RPS information are included in the current RPS.

Figure 35D:
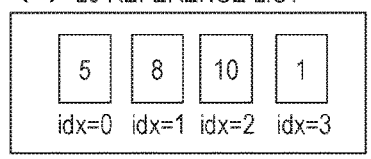
Figure 35E:
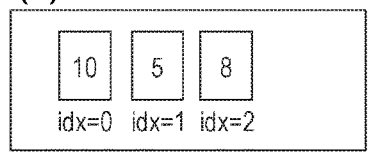

FIGS. 35(d) and 35(e) illustrate examples of the reference picture list generated from the reference pictures included in the current RPS. Each element of the reference picture list is assigned an index (reference picture index) (written as idx in the drawings). FIG. 35(d) illustrates an example of the L0 reference list. The reference pictures having POCs of 5, 8, 10, and 1 and included in the current RPS are included in this order in the L0 reference list. FIG. 35(e) illustrates an example of the L1 reference list. The reference pictures having POCs of 10, 5, and 8 and included in the current RPS are included in this order in the L1 reference list. As illustrated in the example of the L1 reference list, the reference picture list does not necessarily include all of the reference pictures (referenceable pictures) included in the current RPS. However, the number of elements of the reference picture list is at most the number of reference pictures included in the current RPS. In other words, the length of the reference picture list is less than or equal to the number of pictures referenceable in the current picture.

Next, an example of reference picture list modification will be described with reference to FIGS. 36(a)-36(c). FIGS. 36(a)-36(c) illustrates a post-modification reference picture list (FIG. 36(c)) obtained when the RPL modification information (FIG. 36(b)) is applied to a specific reference picture list (FIG. 36(a)). The pre-modification L0 reference list illustrated in FIG. 36(a) is the same as the L0 reference list described in FIG. 35(d). The RPL modification information illustrated in FIG. 36(b) has reference picture index values as elements thereof and stores the values of 0, 2, 1, and 3 in order from the lead thereof. The RPL modification information indicates that the reference pictures indicated by the reference picture indexes of 0, 2, 1, and 3 included in the pre-modification reference list are configured in this order as the reference pictures of the post-modification L0 reference list. FIG. 36(c) illustrates the post-modification L0 reference list. The pictures having POCs of 5, 10, 8, and 1 are included in this order in the post-modification L0 reference list.

(Moving Image Decoding Processing Procedure)

The procedure in which the image decoding device 1 generates a decoded image #2 from the input coded data #1 is as follows.

(S11) The header decoder 10 decodes the VPS and SPS from the coded data #1.

(S12) The header decoder 10 decodes the PPS from the coded data #1.

(S13) The pictures indicated by the coded data #1 are sequentially configured as a target picture. The processes of S14 to S17 are performed on each target picture.

(S14) The header decoder 10 decodes the slice header of each slice included in the target picture from the coded data #1. The reference picture information decoder included in the header decoder 10 decodes the RPS information from the slice header and outputs the decoded RPS information to a reference picture set configuring unit 131 included in the reference picture manager 13. In addition, the reference picture information decoder decodes the RPL modification information from the slice header and outputs the decoded RPL modification information to a reference picture list deriving unit 132.

(S15) The reference picture set configuring unit 131 generates the reference picture set RPS applied to the target picture on the basis of the RPS information as well as a combination of the POC of a locally decoded image recorded in the decoded picture buffer 12 and the positional information thereof on the memory and outputs the generated reference picture set RPS to the reference picture list deriving unit 132.

(S16) The reference picture list deriving unit 132 generates the reference picture list RPL on the basis of the reference picture set RPS as well as the RPL modification information and outputs the generated reference picture list RPL to the picture decoder 11. (S17) The picture decoder 11 creates a locally decoded image of the target picture from the coded data #1 on the basis of the slice data of each slice included in the target picture as well as the reference picture list RPL and records the locally decoded image in association with the POC of the target picture in the decoded picture buffer. The locally decoded image recorded in the decoded picture buffer is output to the outside as the decoded image #2 at an appropriate timing determined on the basis of the POC.

[Decoded Picture Buffer 12]

The locally decoded image of each picture decoded by the picture decoder is recorded in the decoded picture buffer 12 in association with the layer ID and the POC (picture order count; picture order information) of the picture. The decoded picture buffer 12 determines the POC of the output target at a predetermined output timing. Then, the locally decoded image corresponding to the POC is output to the outside as one of the pictures constituting the decoded image #2.

Figure 37:
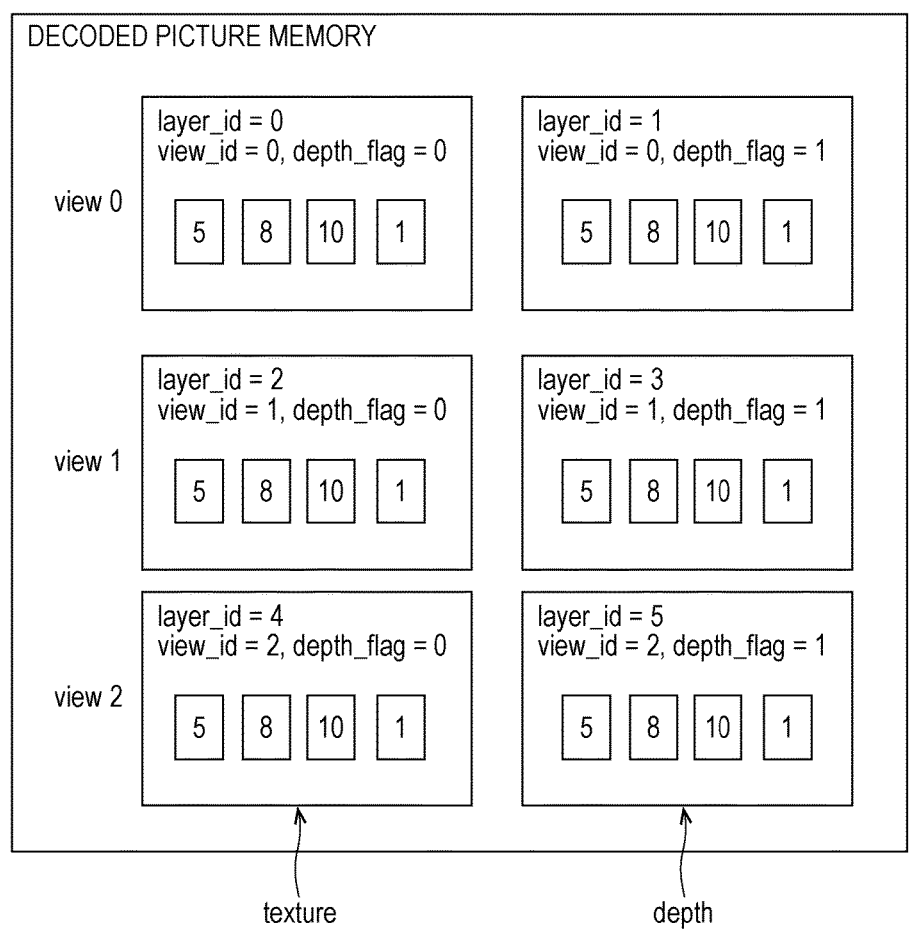
FIG. 37 is a schematic diagram illustrating a configuration of a picture structure.

FIG. 37 is a schematic diagram illustrating a configuration of a decoded picture memory. Boxes in which numbers are written indicate locally decoded images in the drawing. The number indicates the POC. As illustrated in FIG. 37, the locally decoded images in a plurality of layers are recorded in association with the layer ID, the POC, and the locally decoded image. Furthermore, a view ID view_id and a depth flag depth_flag corresponding to the layer ID are also recorded in association with the locally decoded image.

[Reference Picture Manager 13]

Figure 38:
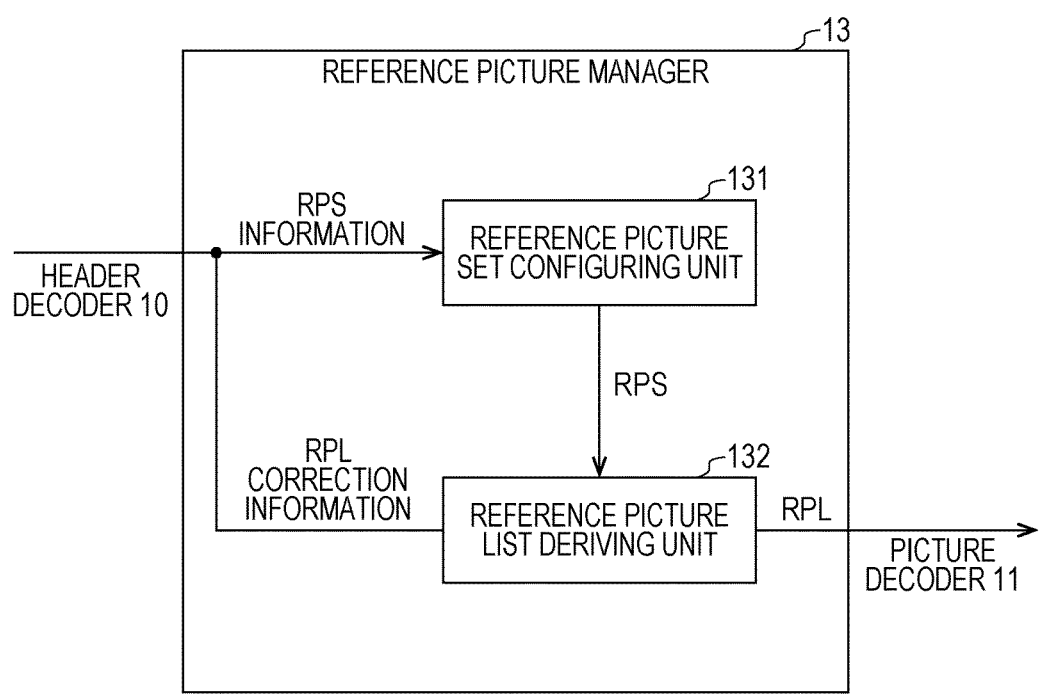
FIG. 38 is a functional block diagram illustrating a schematic configuration of a reference picture manager.

FIG. 38 is a schematic diagram illustrating a configuration of the reference picture manager 13 according to the present embodiment. The reference picture manager 13 is configured to include the reference picture set configuring unit 131 and the reference picture list deriving unit 132.

The reference picture set configuring unit 131 builds the reference picture set RPS on the basis of the RPS information decoded by a reference picture information decoder 218 as well as the information about the locally decoded image, the layer ID, and the POC recorded in the decoded picture buffer 12 and outputs the reference picture set RPS to the reference picture list deriving unit 132. Details of the reference picture set configuring unit 131 will be described below.

The reference picture list deriving unit 132 generates the reference picture list RPL on the basis of the RPL modification information decoded by the reference picture information decoder 218 as well as the reference picture set RPS input from the reference picture set configuring unit 131 and outputs the reference picture list RPL to the picture decoder 11. Details of the reference picture list deriving unit 132 will be described below.

(Details of Reference Picture Information Decoding Process)

The RPS information and RPL modification information decoding process in the process of S14 of the above decoding procedure will be described in detail.

(RPS Information Decoding Process)

The RPS information is information decoded from either the SPS or the slice header to build the reference picture set. Included in the RPS information are as follows.

1. SPS short-term RPS information: short-term reference picture set information included in the SPS 2. SPS long-term RP information: long-term reference picture information included in the SPS 3. SH short-term RPS information: short-term reference picture set information included in the slice header 4. SH long-term RP information: long-term reference picture information included in the slice header (1. SPS Short-Term RPS Information)

The SPS short-term RPS information includes a plurality of pieces of short-term reference picture set information that may be utilized by each picture referencing the SPS. A short-term reference picture set is a set of pictures that may be a reference picture (short-term reference picture) specified by a position relative to the target picture (for example, a POC difference with respect to the target picture).

Decoding of the SPS short-term RPS information will be described with reference to FIG. 39. FIG. 39 illustrates a part of an SPS syntax table utilized at the time of decoding the SPS in the header decoder 10 and in the reference picture information decoder. The part (A) of FIG. 39 corresponds to the SPS short-term RPS information. The SPS short-term RPS information includes the number of short-term reference picture sets included in the SPS (num_short_term_ref_pic_sets) and information about each short-term reference picture set (short_term_ref_pic_set(i)).

The short-term reference picture set information will be described with reference to FIG. 40. FIG. 40 illustrates a syntax table of the short-term reference picture set utilized at the time of decoding the SPS and decoding the slice header in the header decoder 10 and in the reference picture information decoder.

The short-term reference picture set information includes the number of short-term reference pictures that are earlier than the target picture in order of display (num_negative_pics) and the number of short-term reference pictures that are later than the target picture in order of display (num_positive_pics). Hereinafter, the short-term reference picture that is earlier than the target picture in order of display will be called a forward short-term reference picture, and the short-term reference picture that is later than the target picture in order of display will be called a backward short-term reference picture.

The short-term reference picture set information includes the absolute value of the POC difference of each forward short-term reference picture with respect to the target picture (delta_poc_s0_minus1[i]) and the presence of the possibility of being utilized as the reference picture of the target picture (used_by_curr_pic_s0_flag[i]). In addition, included are the absolute value of the POC difference of each backward short-term reference picture with respect to the target picture (delta_poc_s1_minus1[i]) and the presence of the possibility of being utilized as the reference picture of the target picture (used_by_curr_pic_s1_flag[i]).

(2. SPS Long-Term RP Information)

The SPS long-term RP information includes a plurality of pieces of long-term reference picture information that may be utilized by each picture referencing the SPS. A long-term reference picture is a picture specified by an absolute position (for example, POC) in the sequence.

Decoding of the SPS long-term RP information will be described with reference to FIG. 39 again. The part (B) of FIG. 39 corresponds to the SPS long-term RP information. The SPS long-term RP information includes information indicating the presence of the long-term reference picture transmitted in the SPS (long_term_ref_pics_present_flag), the number of long-term reference pictures included in the SPS (num_long_term_ref_pics_sps), and information about each long-term reference picture. The long-term reference picture information includes the POC of the reference picture (lt_ref_pic_poc_lsb_sps[i]) and the presence of the possibility of being utilized as the reference picture of the target picture (used_by_curr_pic_lt_sps_flag[i]).

The POC of the reference picture may be the value of the POC associated with the reference picture, or the least significant bit (LSB) of the POC, that is, the value of the remainder after division of the POC by the predefined square of two may be employed.

(3. SH Short-Term RPS Information)

The SH short-term RPS information includes information about a single short-term reference picture set that may be utilized by a picture referencing the slice header.

Decoding of the SPS short-term RPS information will be described with reference to FIG. 41. FIG. 41 illustrates a part of a slice header syntax table utilized at the time of decoding the slice header in the header decoder 10 and in the reference picture information decoder. The part (A) of FIG. 41 corresponds to the SH short-term RPS information. The SH short-term RPS information includes a flag (short_term_ref_pic_set_sps_flag) indicating whether to select the short-term reference picture set from the previously decoded short-term reference picture sets in the SPS or to include the short-term reference picture set explicitly in the slice header. In the case of selecting the short-term reference picture set from the previously decoded ones in the SPS, an identifier (short_term_ref_pic_set_idx) selecting one of the previously decoded short-term reference picture sets is included in the SH short-term RPS information. In the case of explicitly including the short-term reference picture set in the slice header, information corresponding to the above syntax table (short_term_ref_pic_set(idx)) is included in the SPS short-term RPS information.

(4. SH Long-Term RP Information)

The SH long-term RP information includes information about the long-term reference picture that may be utilized by a picture referencing the slice header.

Decoding of the SH long-term RP information will be described with reference to FIG. 41 again. The part (B) of FIG. 41 corresponds to the SH long-term RP information. The SH long-term RP information is included in the slice header only when the long-term reference picture is available in the target picture (long_term_ref_pic_present_flag). When one or more long-term reference pictures are previously decoded in the SPS (num_long_term_ref_pics_sps>0), the number of pictures, of the previously decoded long-term reference pictures in the SPS, that may be referenced by the target picture (num_long_term_sps) is included in the SH long-term RP information. In addition, the number of long-term reference pictures (num_long_term_pics) explicitly transmitted by the slice header is included in the SH long-term RP information. In addition, information (lt_idx_sps[i]) about selecting the long-term reference picture in quantities of num_long_term_sps from the long-term reference pictures previously transmitted by the SPS is included in the SH long-term RP information. Furthermore, as information about the long-term reference picture included explicitly in the slice header, the POC of the reference picture (poc_lsb_lt[i]) and the presence of the possibility of being utilized as the reference picture of the target picture (used_by_curr_pic_lt_flag[i]) are included in the SH long-term RP information in quantities of num_long_term_pics.

(RPL Modification Information Decoding Process)

The RPL modification information is information decoded from either the SPS or the slice header to build the reference picture list RPL. The RPL modification information includes SPS list modification information and SH list modification information.

(SPS List Modification Information)

The SPS list modification information is information included in the SPS and is information related to reference picture list modification constraints. The SPS list modification information will be described with reference to FIG. 39 again. The part (C) of FIG. 39 corresponds to the SPS list modification information. The SPS list modification information includes a flag (restricted_ref_pic_lists_flag) indicating whether the reference picture list is common to the previous slice included in a picture and a flag (lists_modification_present_flag) indicating whether there is information related to list rearrangement in the slice header.

(SH List Modification Information)

The SH list modification information is information included in the slice header and includes update information about the length of the reference picture list applied to the target picture (reference list length) and reference picture list rearrangement information (reference list rearrangement information). The SH list modification information will be described with reference to FIG. 42. FIG. 42 illustrates a part of a slice header syntax table utilized at the time of decoding the slice header in the header decoder 10 and in the reference picture information decoder. The part (C) of FIG. 42 corresponds to the SH list modification information.

A flag (num_ref_idx_active_oveoverride_flag) indicating whether the list length is updated is included as reference list length update information. In addition, information (num_ref_idx_l0_active_minus1) representing the reference list length after the L0 reference list is changed and information (num_ref_idx_l1 active_minus1) representing the reference list length after the L1 reference list is changed are included.

Information included in the slice header as the reference list rearrangement information will be described with reference to FIG. 43. FIG. 43 illustrates a syntax table of the reference list rearrangement information utilized at the time of decoding the slice header in the header decoder 10 and in the reference picture information decoder.

The reference list rearrangement information includes an L0 reference list rearrangement flag (ref_pic_list_modification_flag_10). When the value of the flag is one (when the L0 reference list is rearranged) and NumPocTotalCurr is greater than two, an L0 reference list rearrangement order (list_entry_10[i]) is included in the reference list rearrangement information. The NumPocTotalCurr is a variable representing the number of reference pictures available in the current picture. Therefore, the L0 reference list rearrangement order is included in the slice header only when the L0 reference list is rearranged and the number of reference pictures available in the current picture is greater than two.

Similarly, when the reference picture is the B slice, that is, when the L1 reference list is available in the target picture, an L1 reference list rearrangement flag (ref_pic_list_modification_flag_11) is included in the reference list rearrangement information. When the value of the flag is one and NumPocTotalCurr is greater than two, an L1 reference list rearrangement order (list_entry_11[i]) is included in the reference list rearrangement information. In other words, the L1 reference list rearrangement order is included in the slice header only when the L1 reference list is rearranged and the number of reference pictures available in the current picture is greater than two.

(Details of Reference Picture Set Deriving Process)

The process of S15 in the above moving image decoding procedure, that is, a reference picture set deriving process performed by the reference picture set configuring unit will be described in detail.

As described above, the reference picture set configuring unit 131 generates the reference picture set RPS employed in decoding of the target picture on the basis of the RPS information and the information recorded in the decoded picture buffer 12.

The reference picture set RPS is a set of pictures (referenceable pictures) available as the reference image in the target picture or in the picture subsequent to the target picture in the decoding order at the time of decoding. The reference picture set is divided into the following two subsets according to referenceable picture types.

current picture referenceable list ListCurr: a list of referenceable pictures, of the pictures in the decoded picture buffer, in the target picture subsequent picture referenceable list ListFoll: a list of pictures in the decoded picture buffer that is not referenced in the target picture but is referenceable in the picture subsequent to the target picture in the decoding order The number of pictures included in the current picture referenceable list is called the number of current picture referenceable pictures NumCurrList. The NumPocTotalCurr described with reference to FIG. 43 is the same as NumCurrList.

The current picture referenceable list is further configured of three partial lists.

current picture long-term referenceable list ListLtCurr:
current picture referenceable pictures specified by the SPS long-term RPS information or the SH long-term RPS information current picture short-term forward referenceable list ListStCurrBefore: current picture referenceable pictures that are specified by the SPS short-term RPS information or the SH short-term RPS information and are earlier than the target picture in order of display current picture short-term backward referenceable list ListStCurrAfter: current picture referenceable pictures that are specified by the SPS short-term RPS information or the SH short-term RPS information and are earlier than the target picture in order of display The subsequent picture referenceable list is further configured of two partial lists.

subsequent picture long-term referenceable list ListLtFoll: subsequent picture referenceable pictures specified by the SPS long-term RP information or the SH long-term RP information subsequent picture short-term referenceable list ListStFoll: current picture referenceable pictures specified by the SPS short-term RPS information or the SH short-term RPS information The reference picture set configuring unit 131, when the NAL unit type is other than IDR, generates the reference picture set RPS, that is, the current picture short-term forward referenceable list ListStCurrBefore, the current picture short-term backward referenceable list ListStCurrAfter, the current picture long-term referenceable list ListLtCurr, the subsequent picture short-term referenceable list ListStFoll, and the subsequent picture long-term referenceable list ListLtFoll in the following procedure. In addition, the variable NumPocTotalCurr representing the number of current picture referenceable pictures is derived. Each referenceable list is assumed to be configured as empty before initiation of the processes below. The reference picture set configuring unit 131 derives the reference picture set RPS as empty when the NAL unit type is IDR.

(S201) A single short-term reference picture set employed in decoding of the target picture is specified on the basis of the SPS short-term RPS information and the SH short-term RPS information. Specifically, when the value of short_term_ref_pic_set_sps included in the SH short-term RPS information is zero, the short term RPS explicitly transmitted by the slice header included in the SH short-term RPS information is selected. In other cases (the value of short_term_ref_pic_set_sps is one), the short term RPS that short_term_ref_pic_set_idx included in the SH short-term RPS information indicates is selected from a plurality of short term RPSs included in the SPS short-term RPS information.

(S202) The value of the POC of each reference picture included in the selected short-term RPS is derived, and the position of the locally decoded image recorded in association with the corresponding POC value in the decoded picture buffer 12 is detected to derive the position where the reference picture is recorded in the decoded picture buffer.

The POC value of the reference picture is derived by subtracting the value of "delta_poc_s0_minus1[i]+1" from the POC value of the target picture when the reference picture is a forward short-term reference picture. Meanwhile, the POC value of the reference picture is derived by adding the value of "delta_poc_s1_minus1[i]+1" to the POC value of the target picture when the reference picture is a backward short-term reference picture.

(S203) The forward reference pictures included in the short-term RPS are checked in order of transmission. When the associated value of used_by_curr_pic_s0_flag[i] is one, the corresponding forward reference picture is added to the current picture short-term forward referenceable list ListStCurrBefore. In other cases (the value of used_by_curr_pic_s0_flag[i] is zero), the corresponding forward reference picture is added to the subsequent picture short-term referenceable list ListStFoll.

(S204) The backward reference pictures included in the short-term RPS are checked in order of transmission. When the associated value of used_by_curr_pic_s1_flag[i] is one, the corresponding backward reference picture is added to the current picture short-term backward referenceable list ListStCurrAfter. In other cases (the value of used_by_curr_pic_s1_flag[i] is zero), the corresponding forward reference picture is added to the subsequent picture short-term referenceable list ListStFoll.

(S205) The long-term reference picture set employed in decoding of the target picture is specified on the basis of the SPS long-term RP information and the SH long-term RP information. Specifically, the reference picture is selected in quantities of num_long_term_sps from the reference pictures included in the SPS long-term RP information and having the same layer ID as the target picture and is added to the long-term reference picture set in order. The selected reference picture is a reference picture indicated by lt_idx_sps[i]. Next, the reference picture included in the SH long-term RP information is added in quantities of num_long_term_pics to the long-term reference picture set in order. When the layer ID of the target picture is other than zero, the picture having a different layer ID from the target picture, particularly, the reference picture of the same POC as the POC of the target picture is further added to the long-term reference picture set from the reference pictures having the same layer ID as the dependent layer ref_layer_id of the target picture.

(S206) The value of the POC of each reference picture included in the long-term reference picture set is derived, and the position of the locally decoded image recorded in association with the corresponding POC value in the decoded picture buffer 12 from the reference pictures having the same layer ID as the target picture is detected to derive the position where the reference picture is recorded in the decoded picture buffer. In addition, in the case of the reference picture having a different layer ID from the target picture, the position of the locally decoded image recorded in association with the layer ID specified by the dependent layer ref_layer_id as well as the POC of the target picture is detected and derived as the position where the reference picture is recorded in the decoded picture buffer.

In the case of the reference picture having the same layer ID as the target picture, the POC of the long-term reference picture is directly derived from the value of either poc_lst_lt[i] or lt_ref_pic_poc_lsb_sps[i] that is decoded in association with the reference picture. In the case of the reference picture having a different layer ID from the target picture, the POC of the target picture is configured.

(S207) The reference pictures included in the long-term reference picture set are checked in order. When the associated value of either used_by_curr_pic_lt_flag[i] or used_by_curr_pic_lt_sps_flag[i] is one, the corresponding long-term reference picture is added to the current picture long-term referenceable list ListLtCurr. In other cases (the value of either used_by_curr_pic_lt_flag[i] or used_by_curr_pic_lt_sps_flag[i] is zero), the corresponding long-term reference picture is added to the subsequent picture long-term referenceable list ListLtFoll.

(S208) The value of the variable NumPocTotalCurr is configured as the sum of the number of reference pictures referenceable from the current picture. That is, the value of the variable NumPocTotalCurr is configured as the sum of the number of elements of each of the three lists, the current picture short-term forward referenceable list ListStCurrBefore, the current picture short-term forward referenceable list ListStCurrAfter, and the current picture long-term referenceable list ListLtCurr.

(Details of Reference Picture List Building Process)

The process of S16 in the above decoding procedure, that is, a reference picture list building process will be described in detail. As described previously, the reference picture list deriving unit 132 generates the reference picture list RPL on the basis of the reference picture set RPS and the RPL modification information.

The reference picture list is configured of two lists of the L0 reference list and the L1 reference list. First, the procedure of building the L0 reference list will be described. The L0 reference list is built in the procedure illustrated in the following S301 to S307.

(S301) A tentative L0 reference list is generated and is initialized to an empty list.

(S302) The reference pictures included in the current picture short-term forward referenceable list are added to the tentative L0 reference list in order.

(S303) The reference pictures included in the current picture short-term backward referenceable list are added to the tentative L0 reference list in order.

(S304) The reference pictures included in the current picture long-term referenceable list are added to the tentative L0 reference list in order.

(S305) When the reference picture list is modified (when the value of lists_modification_present_flag included in the RPL modification information is one), the following processes of S306a to S306b are performed. In other cases (when the value of lists_modification_present_flag is zero), the process of S307 is performed.

(S306a) When the modification of the L0 reference picture is valid (when the value of ref_pic_list_modification_flag_l0 included in the RPL modification information is one) and the number of current picture referenceable pictures NumCurrList is equal to two, S306b is performed. In other cases, S306c is performed.

(S306b) The value of the list rearrangement order list_entry_l0[i] included in the RPL modification information is configured by the following expressions. Then, S306c is performed.

list_entry_l0[0]=1
list_entry_l0[1]=0

(S306c) The elements of the tentative L0 reference list are rearranged on the basis of the value of the reference list rearrangement order list_entry_l0[i] and are configured as the L0 reference list. The element RefPicList0[rIdx] of the L0 reference list corresponding to a reference picture index rIdx is derived by the following expression. The RefListTemp0[i] represents the i-th element of the tentative L0 reference list.

RefPicList0[rIdx]=RefPicListTemp0[list_entry_l0[rIdx]]

According to this expression, the value recorded at the position indicated by the reference picture index rIdx in the reference list rearrangement order list_entry_l0[i] is referenced, and the reference picture recorded at the position of the value in the tentative L0 reference list is stored as the reference picture at the position of rIdx on the L0 reference list.

(S307) The tentative L0 reference list is configured as the L0 reference list.

Next, the L1 reference list will be built. The L1 reference list can be built in the same procedure as the L0 reference list. In the above procedure of building the L0 reference list (S301 to S307), the terms L0 reference picture, L0 reference list, tentative L0 reference list, and list_entry_l0 may be respectively substituted by the terms L1 reference picture, L1 reference list, tentative L1 reference list, and list_entry_l1.

Figure 45:
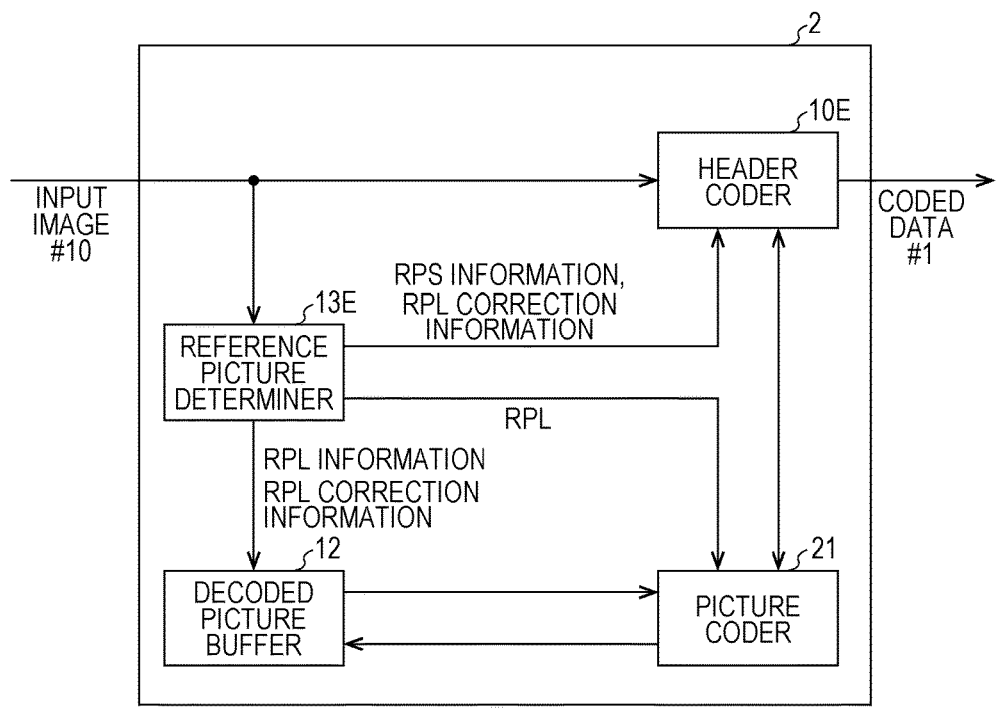
FIG. 45 is a schematic diagram illustrating a configuration of an image coding device according to the present embodiment.

While the example of FIG. 43 in which the RPL modification information is omitted when the number of current picture referenceable pictures is two is written above, the invention is not limited to this. The RPL modification information may be omitted when the number of current picture referenceable pictures is one. Specifically, the reference list rearrangement information is parsed on the basis of the syntax table illustrated in FIG. 45 during the SH list modification information decoding process in the reference picture information decoder. FIG. 45 illustrates the syntax table of the reference list rearrangement information utilized at the time of decoding the slice header.

[Picture Decoder 11]

The picture decoder 11 generates the locally decoded image of each picture and records the locally decoded image in the decoded picture buffer 12 on the basis of the coded data #1, header information input from the header decoder 10, the reference picture recorded in the decoded picture buffer 12, and the reference picture list input from the reference picture list deriving unit 132.

FIG. 44 is a schematic diagram illustrating a configuration of the picture decoder 11 according to the present embodiment. The picture decoder 11 is configured to include an entropy decoder 301, a prediction parameter decoder 302, a prediction parameter memory (prediction parameter storage) 307, a predicted image generator 308, an inverse quantization/inverse DCT unit 311, and an adder 312.

The prediction parameter decoder 302 is configured to include an inter-prediction parameter decoder 303 and an intra-prediction parameter decoder 304. The predicted image generator 308 is configured to include an inter-prediction image generator 309 and an intra-prediction image generator 310.

The entropy decoder 301 entropy-decodes the coded data #1 input from the outside to separate and decode individual codes (syntax elements). Separated codes are prediction information for generating the predicted image and residual information for generating the difference image.

The entropy decoder 301 outputs a part of the separated codes to the prediction parameter decoder 302. The part of the separated codes are, for example, a prediction mode PredMode, the partitioning mode part_mode, the merge flag merge_flag, the merge index merge_idx, an inter-prediction flag inter_pred_idx, the reference picture index refIdxLX, the prediction vector index mvp_LX_idx, and the difference vector mvdLX. Control on which code is decoded is performed on the basis of an instruction from the prediction parameter decoder 302. The entropy decoder 301 outputs a quantization coefficient to the inverse quantization/inverse DCT unit 311. The quantization coefficient is a coefficient obtained by performing discrete cosine transform (DCT) and quantizing a residual signal during the coding process.

The inter-prediction parameter decoder 303 references the prediction parameters stored on the prediction parameter memory 307 and decodes the inter-prediction parameters on the basis of the codes input from the entropy decoder 301.

The inter-prediction parameter decoder 303 outputs the decoded inter-prediction parameters to the predicted image generator 308 and also stores the decoded inter-prediction parameters on the prediction parameter memory 307. Details of the inter-prediction parameter decoder 303 will be described below.

The intra-prediction parameter decoder 304 references the prediction parameters stored on the prediction parameter memory 307 and generates intra-prediction parameters on the basis of the codes input from the entropy decoder 301. The intra-prediction parameters are information necessary when the predicted image of a decoding target block is generated by employing the intra-prediction and include, for example, an intra-prediction mode IntraPredMode.

The intra-prediction parameter decoder 304 outputs the intra-prediction parameters to the predicted image generator 308 and also stores the intra-prediction parameters on the prediction parameter memory 307.

The prediction parameter memory 307 stores the prediction parameters at a predetermined position per decoding target picture and per decoding target block. Specifically, the prediction parameter memory 307 stores the inter-prediction parameters decoded by the inter-prediction parameter decoder 303, the intra-prediction parameters decoded by the intra-prediction parameter decoder 304, and the prediction mode predMode separated by the entropy decoder 301. The intra-prediction parameters stored are, for example, the prediction list utilization flag predFlagLX (inter-prediction flag inter_pred_idx), the reference picture index refIdxLX, and the vector mvLX.

The prediction mode predMode input from the entropy decoder 301 and the prediction parameters from the prediction parameter decoder 302 are input into the predicted image generator 308. The predicted image generator 308 reads the reference picture from the decoded picture buffer 12. The predicted image generator 308 generates a predicted picture block P (predicted image) by employing the input prediction parameters as well as the read reference picture in the prediction mode indicated by the prediction mode predMode.

When the prediction mode predMode indicates an inter-prediction mode, the inter-prediction image generator 309 performs the inter-prediction to generate the predicted picture block P by employing the inter-prediction parameters input from the inter-prediction parameter decoder 303 as well as the read reference picture. The predicted picture block P corresponds to the PU. The PU, as described above, corresponds to a part of the picture configured of a plurality of pixels that are units for performing the prediction process, that is, to the decoding target block on which the prediction process is performed once.

The inter-prediction image generator 309 reads a reference picture block, from the decoded picture buffer 12, at the position indicated by the vector mvLX with the decoding target block as a reference from the reference picture indicated by the reference picture index refIdxLX on the reference picture list of which the prediction list utilization flag predFlagLX is one (either the L0 reference list or the L1 reference list). The inter-prediction image generator 309 performs prediction on the read reference picture block and generates the predicted picture block P. The inter-prediction image generator 309 outputs the generated predicted picture block P to the adder 312.

When the prediction mode predMode indicates an intra-prediction mode, the intra-prediction image generator 310 performs the intra-prediction by employing the intra-prediction parameters input from the intra-prediction parameter decoder 304 as well as the read reference picture. Specifically, the intra-prediction image generator 310 reads a reference picture block, of the previously decoded blocks, within a predetermined range from the decoding target block in the decoding target picture from the decoded picture buffer 12. The predetermined range is, when the decoding target block sequentially moves in the so-called raster scan order, for example, one of adjacent blocks of left, upper left, upper, and upper right blocks and is different depending on the intra-prediction mode. The raster scan order is the order of movement sequentially from the left end to the right end of each row from the top end to the bottom end of each picture.

The intra-prediction image generator 310 generates the predicted picture block by employing the read reference picture block and the input prediction parameters.

The intra-prediction image generator 310 outputs the generated predicted picture block P to the adder 312.

The inverse quantization/inverse DCT unit 311 obtains a DCT coefficient by inverse-quantizing the quantization coefficient input from the entropy decoder 301. The inverse quantization/inverse DCT unit 311 performs inverse discrete cosine transform (inverse DCT) on the obtained DCT coefficient to compute a decoded residual signal. The inverse quantization/inverse DCT unit 311 outputs the computed decoded residual signal to the adder 312.

The adder 312 adds the predicted picture block P input from the inter-prediction image generator 309 as well as from the intra-prediction image generator 310 and the signal value of the decoded residual signal input from the inverse quantization/inverse DCT unit 311 per pixel to generate a reference picture block. The adder 312 stores the generated reference picture block in a reference picture buffer and outputs a decoded layer image Td into which the generated reference picture block is integrated per picture to the outside.

[Image Coding Device]

Hereinafter, the image coding device 2 according to the present embodiment will be described with reference to FIG. 45.

(Summary of Image Coding Device)

The image coding device 2, if described schematically, is a device that generates and outputs the coded data #1 by coding an input image #10.

(Configuration of Image Coding Device)

A configuration example of the image coding device 2 according to the present embodiment will be described. FIG. 45 is a schematic diagram illustrating a configuration of the image coding device 2 according to the present embodiment. The image coding device 2 is configured to include a header coder 10E, a picture coder 21, the decoded picture buffer 12, and a reference picture determiner 13E. The image coding device 2 is capable of performing a random access decoding process, described below, that initiates decoding from a picture of an image including a plurality of layers at a specific time.

[Header Coder 10E]

The header coder 10E generates information utilized in decoding in units of NAL units, sequences, pictures, or slices, such as the NAL unit header, SPS, PPS, and slice header, on the basis of the input image #10 and codes and outputs the information.

The header coder 10E codes information utilized in decoding in units of sequences by passing the VPS, SPS, and PPS included in the coded data #1 on the basis of the predefined syntax definitions thereof. For example, information related to the number of layers is coded into the VPS, and information related to the image size of the decoded image is coded into the SPS. Information related to the image size of the decoded image of a plurality of layers (representation information) is coded into the VPS, and information related to the image size of the decoded image in a certain target layer (representation information) is coded into the SPS.

The header coder 10E codes information utilized in decoding in units of slices by passing the slice header included in the coded data #1 on the basis of the predefined syntax definition thereof. For example, the slice type is coded from the slice header.

The header coder 10E is configured to further include an NAL unit header coder 101E, a VPS coder 102E (222), an SPS coder 103E, a PPS coder 104, a slice header coder 105E, and the like (not illustrated).

The NAL unit header coder 101E is configured to include a layer ID coder 1011E and an NAL unit type coder 1012E (not illustrated).

The layer ID coder 1011E imparts and codes the layer ID and the temporal ID, which are for identifying each layer and sub-layers adjunct to the layers, to the coded data (slice header and slice data) of the image signal of each layer image T input from the outside and to the coded data of the parameter sets (VPS, SPS, PPS, and SEI) referenced for decoding the slice data.

The NAL unit type coder 1012E imparts and codes the NAL unit type representing the type (identity) of the coded data to each coded data. The NAL unit type will not be described as is previously described above.

The VPS coder 102E (222) corresponds to the inverse of the process of the VPS decoder 102 and codes information utilized in units of layers on the basis of a plurality of layer images T and the defined VPS syntax. Details of the VPS coder 102E (222) will be described below.

The SPS coder 103E corresponds to the inverse of the process of the SPS decoder 103 and codes information utilized in units of sequences on the basis of the layer image T and the defined SPS syntax definition.

The PPS coder 104E corresponds to the inverse of the process of the PPS decoder 104 and codes information utilized in units of pictures on the basis of each picture of the layer image T and the defined PPS syntax definition.

The slice header coder 105E corresponds to the inverse of the process of the slice header decoder 105, performs coding per slice constituting the picture of the layer image T on the basis of the defined slice header syntax definition, and codes information utilized in decoding in units of slices.

The VPS and the SPS include the profile/level information profile_tier_level( ) related to the profile and level necessary for coding/decoding each layer set. The header coder 10E performs the following process on the profile/level information. The header coder 10E supplies the number of layer sets and the total number of pieces of PTL information applied to each layer set, both of which are either supplied from the outside or configured in advance. Next, on the basis of the profile information and the level information (profile/level/tier), either supplied from the outside or configured in advance, of each layer set (includes each sub-layer belonging to the layers as well) configured of the layer set 0 (for example, the base layer), the base layer, and the enhancement layer, the values of the profile presence flag applied to each layer set, the profile presence flag of the sub-layers (sub-layer presence flag), and the level presence flag of the sub-layers (sub-layer level presence flag) are configured, and the configured profile presence flag and the profile presence flag/level presence flag of each sub-layer are supplied to a header information coder. If the profile presence flag of certain PTL information is zero, the reference PLT specifying information indicating the position that the PTL information references on the PTL information list is supplied.

(Correspondence with Image Decoding Device)

The image coding device 2 includes configurations corresponding to each configuration of the image decoding device 1. The word corresponding means a relationship in which the image coding device 2 and the image decoding device 1 perform the same process or the inverse of the process of each other.

For example, the reference picture information decoding process of the reference picture information decoder included in the image decoding device 1 is the same as a reference picture information coding process of a reference picture information coder included in the image coding device 2. More specifically, the reference picture information decoder generates the RPS information and the RPL modification information as the syntax values decoded from the SPS and the slice header. On the contrary, the reference picture information coder codes the input RPS information and the RPL modification information as the syntax values of the SPS and the slice header.

For example, a process of decoding syntax values from bit arrays in the image decoding device 1 corresponds to the inverse of a process of coding bit arrays from syntax values in the image coding device 2.

(Process Flow)

The procedure in which the image coding device 2 generates the output coded data #1 from the input image #10 is as follows.

(S21) The following processes of S22 to S29 are performed on each picture (target picture) constituting the input image #10.

(S22) A reference picture set determiner determines the reference picture set RPS on the basis of the target picture in the input image #10 as well as the locally decoded image recorded in the decoded picture buffer 12 and outputs the reference picture set RPS to a reference picture list determiner. In addition, the reference picture set determiner derives the RPS information necessary for generating the reference picture set RPS and outputs the RPS information to the reference picture information coder.

(S23) The reference picture list determiner derives the reference picture list RPL on the basis of the target picture in the input image #10 as well as the input reference picture set RPS and outputs the reference picture list RPL to the picture coder 21 and the picture decoder 11. In addition, the reference picture list determiner derives the RPL modification information necessary for generating the reference picture list RPL and outputs the RPL modification information to the reference picture information coder.

(S24) The reference picture information coder generates the RPS information and the RPL modification information to be included in the SPS or in the slice header on the basis of the reference picture set RPS and the reference picture list RPL.

(S25) The header coder 10E generates and outputs the SPS applied to the target picture on the basis of the input image #10 as well as the RPS information and the RPL modification information generated by the reference picture determiner 13E.

(S26) The header coder 10E generates and outputs the PPS applied to the target picture on the basis of the input image #10.

(S27) The header coder 10E codes the slice header of each slice constituting the target picture on the basis of the input image #10 as well as the RPS information and the RPL modification information generated by the reference picture determiner 13E and outputs the coded slice header to the outside as a part of the coded data #1 and to the picture decoder 11.

(S28) The picture coder 21 generates the slice data of each slice constituting the target picture on the basis of the input image #10 and outputs the slice data to the outside as a part of the coded data #1.

(S29) The picture coder 21 generates the locally decoded image of the target picture and records the locally decoded image in association with the layer ID and POC of the target picture in the decoded picture buffer.

(Configuration of Picture Coder 21)

Figure 46:
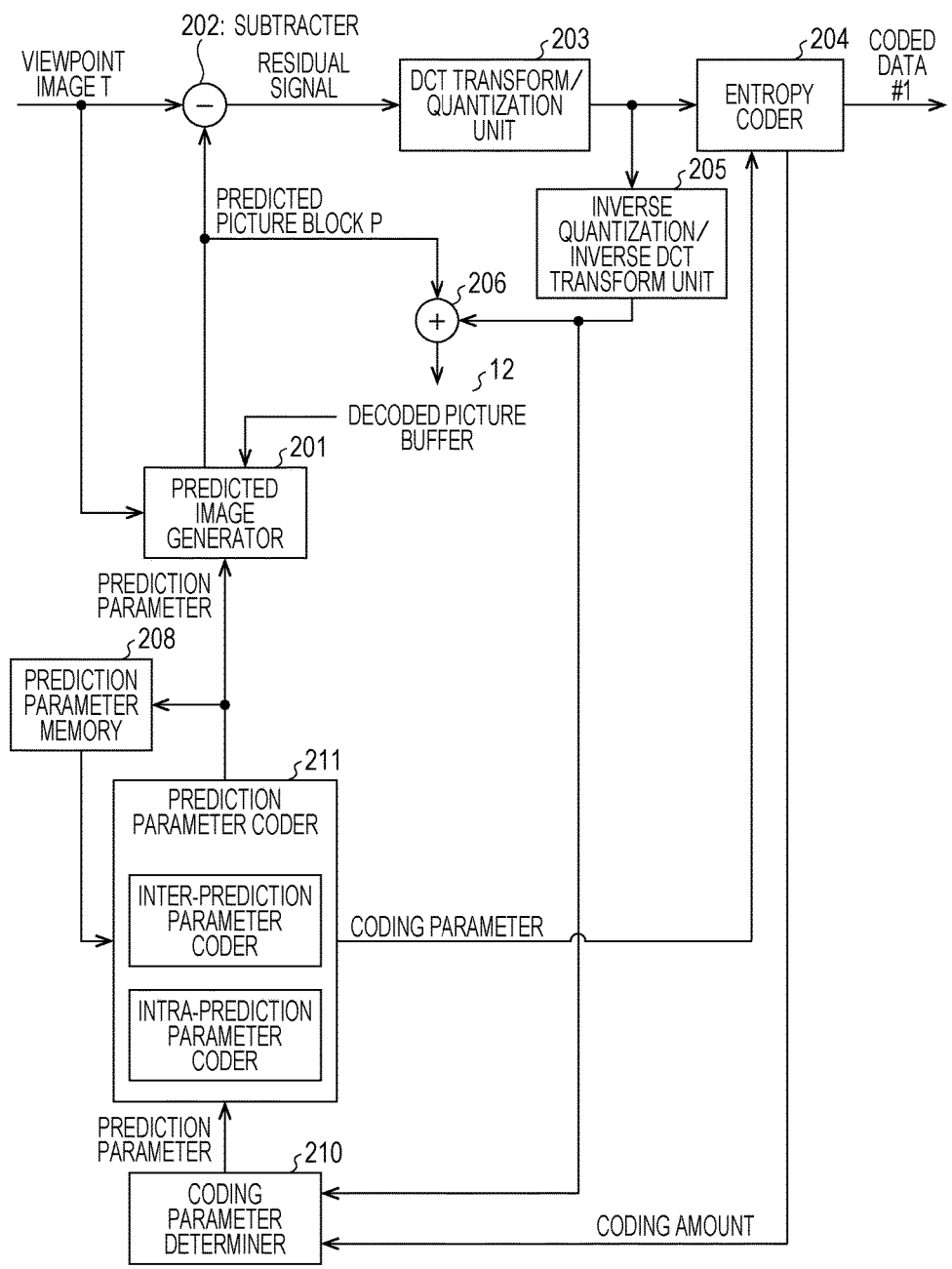
FIG. 46 is a block diagram illustrating a configuration of a picture coder.

Next, a configuration of the picture coder 21 according to the present embodiment will be described. FIG. 46 is a block diagram illustrating a configuration of the picture coder 21 according to the present embodiment. The picture coder 21 is configured to include a predicted image generator 201, a subtracter 202, a DCT/quantization unit 203, an entropy coder 204, an inverse quantization/inverse DCT unit 205, an adder 206, a prediction parameter memory 208, a coding parameter determiner 210, and a prediction parameter coder 211. The prediction parameter coder 211 is configured to include an inter-prediction parameter coder 212 and an intra-prediction parameter coder 213.

The predicted image generator 201 generates the predicted picture block P per block, which is a region divided from a picture, of each picture in each layer of the layer image T input from the outside. The predicted image generator 201 reads the reference picture block from the decoded picture buffer 12 on the basis of the prediction parameters input from the prediction parameter coder 211. The prediction parameters input from the prediction parameter coder 211 are, for example, the motion vector and the disparity vector. The predicted image generator 201 reads the reference picture block of a predicted block at the position indicated by the motion vector or the disparity vector starting from a coding target block. The predicted image generator 201 employs one of a plurality of prediction schemes for the read reference picture block to generate the predicted picture block P. The predicted image generator 201 outputs the generated predicted picture block P to the subtracter 202. The predicted image generator 201 operates in the same manner as the predicted image generator 308 described previously. Thus, details of generating the predicted picture block P will not be described.

The predicted image generator 201, in order to select a prediction scheme, for example, selects the prediction scheme that minimizes an error value based on the signal value per pixel of the block included in the layer image as well as the signal value per pixel corresponding to the predicted picture block P. A method for selecting a prediction scheme is not limited to this.

When the coding target picture is a base layer picture, the plurality of prediction schemes includes the intra-prediction, motion prediction, and merge prediction. The motion prediction is prediction, one type of the inter-prediction, performed between display times. The merge prediction is prediction that employs the same reference picture block and prediction parameters as those of the previously coded block that resides within a predetermined range from the coding target block. When the coding target picture is a non-base view picture, the plurality of prediction schemes includes the intra-prediction, motion prediction, merge prediction, and disparity prediction. The disparity prediction (parallax prediction) is prediction, one type of the inter-prediction, performed between different layer images (different viewpoint images). Furthermore, there are motion prediction, merge prediction, and disparity prediction.

The predicted image generator 201, when selecting the intra-prediction, outputs the prediction mode predMode indicating the intra-prediction mode employed at the time of generating the predicted picture block P to the prediction parameter coder 211.

The predicted image generator 201, when selecting the motion prediction, stores the motion vector mvLX employed at the time of generating the predicted picture block P on the prediction parameter memory 208 and also outputs the motion vector mvLX to the inter-prediction parameter coder 212. The motion vector mvLX indicates a vector from the position of the coding target block until the position of the reference picture block at the time of generating the predicted picture block P. Information indicating the motion vector mvLX may include information indicating the reference picture (for example, the reference picture index refIdxLX and the picture order count POC) and may represent the prediction parameters. In addition, the predicted image generator 201 outputs the prediction mode predMode indicating the inter-prediction mode to the prediction parameter coder 211.

The predicted image generator 201, when selecting the disparity prediction (inter-layer image prediction), stores the disparity vector employed at the time of generating the predicted picture block P on the prediction parameter memory 208 and also outputs the disparity vector to the inter-prediction parameter coder 212. A disparity vector dvLX indicates a vector from the position of the coding target block until the position of the reference picture block at the time of generating the predicted picture block P. Information indicating the disparity vector dvLX may include information indicating the reference picture (for example, the reference picture index refIdxLX and the layer ID (or the view ID view_id)) and may represent the prediction parameters. In addition, the predicted image generator 201 outputs the prediction mode predMode indicating the inter-prediction mode to the prediction parameter coder 211.

The predicted image generator 201, when selecting the merge prediction, outputs the merge index merge_idx indicating the selected reference picture block to the inter-prediction parameter coder 212. In addition, the predicted image generator 201 outputs the prediction mode predMode indicating the merge prediction mode to the prediction parameter coder 211.

The subtracter 202 subtracts the signal value of the predicted picture block P input from the predicted image generator 201 from the signal value of the block corresponding to the layer image T input from the outside per pixel and generates a residual signal. The subtracter 202 outputs the generated residual signal to the DCT/quantization unit 203 and the coding parameter determiner 210.

The DCT/quantization unit 203 performs DCT on the residual signal input from the subtracter 202 and computes the DCT coefficient. The DCT/quantization unit 203 quantizes the computed DCT coefficient and obtains the quantization coefficient. The DCT/quantization unit 203 outputs the obtained quantization coefficient to the entropy coder 204 and the inverse quantization/inverse DCT unit 205.

The quantization coefficient from the DCT/quantization unit 203 and the coding parameters from the coding parameter determiner 210 are input into the entropy coder 204. The input coding parameters include codes such as the reference picture index refIdxLX, the vector index mvp_LX_idx, the difference vector mvdLX, the prediction mode predMode, and the merge index merge_idx.

The entropy coder 204 entropy-codes the input quantization coefficient and coding parameters to generate the coded data #1 and outputs the generated coded data #1 to the outside.

The inverse quantization/inverse DCT unit 205 inverse-quantizes the quantization coefficient input from the DCT/quantization unit 203 to obtain the DCT coefficient. The inverse quantization/inverse DCT unit 205 performs inverse DCT on the obtained DCT coefficient and computes the coded residual signal. The inverse quantization/inverse DCT unit 205 outputs the computed coded residual signal to the adder 206.

The adder 206 adds the signal value of the predicted picture block P input from the predicted image generator 201 and the signal value of the coded residual signal input from the inverse quantization/inverse DCT unit 205 per pixel to generate the reference picture block. The adder 206 stores the generated reference picture block in the decoded picture buffer 12.

The prediction parameter memory 208 stores the prediction parameters generated by the prediction parameter coder 211 at a predetermined position per coding target picture and per coding target block.

The coding parameter determiner 210 selects one of a plurality of coding parameter sets. The coding parameters are the prediction parameters or coding target parameters generated in relation to the prediction parameters. The predicted image generator 201 employs each coding parameter set to generate the predicted picture block P.

The coding parameter determiner 210 computes a cost value that indicates the magnitude of the amount of information and a coding error of each of the plurality of sets. The cost value is, for example, the sum of the coding amount and the value obtained by multiplying a squared error by a coefficient λ. The coding amount is the amount of information of the coded data #1 obtained by entropy-coding a quantization error and the coding parameters. The squared error is the total sum of the square of the residual value of the residual signal computed in the subtracter 202 between pixels. The coefficient λ is a preset real number greater than zero. The coding parameter determiner 210 selects the coding parameter set minimizing the computed cost value. Accordingly, the entropy coder 204 outputs the selected coding parameter set to the outside as the coded data #1 and does not output the non-selected coding parameter sets.

The prediction parameter coder 211 derives the prediction parameters employed at the time of generating the predicted picture on the basis of the parameters input from the predicted image generator 201 and codes the derived prediction parameters to generate the coding parameter sets. The prediction parameter coder 211 outputs the generated coding parameter sets to the entropy coder 204.

The prediction parameter coder 211 stores the prediction parameters corresponding to those selected by the coding parameter determiner 210 from the generated coding parameter sets on the prediction parameter memory 208.

The prediction parameter coder 211 operates the inter-prediction parameter coder 212 when the prediction mode predMode input from the predicted image generator 201 indicates the inter-prediction mode. The prediction parameter coder 211 operates the intra-prediction parameter coder 213 when the prediction mode predMode indicates the intra-prediction mode.

The inter-prediction parameter coder 212 derives the inter-prediction parameters on the basis of the prediction parameters input from the coding parameter determiner 210. The inter-prediction parameter coder 212, as a configuration deriving the inter-prediction parameters, includes the same configuration as the configuration of the inter-prediction parameter decoder 303 deriving the inter-prediction parameters.

The intra-prediction parameter coder 213 determines the intra-prediction mode IntraPredMode indicated by the prediction mode predMode input from the coding parameter determiner 210 as an inter-prediction parameter set.

Hereinafter, the VPS coder 102E according to the first embodiment of the present invention will be described with reference to FIGS. 7 to 9, 17, 20 to 24, 26, 29, 33, and 47 to 49.

[VPS Coder 222 (102E)]

Figure 47:
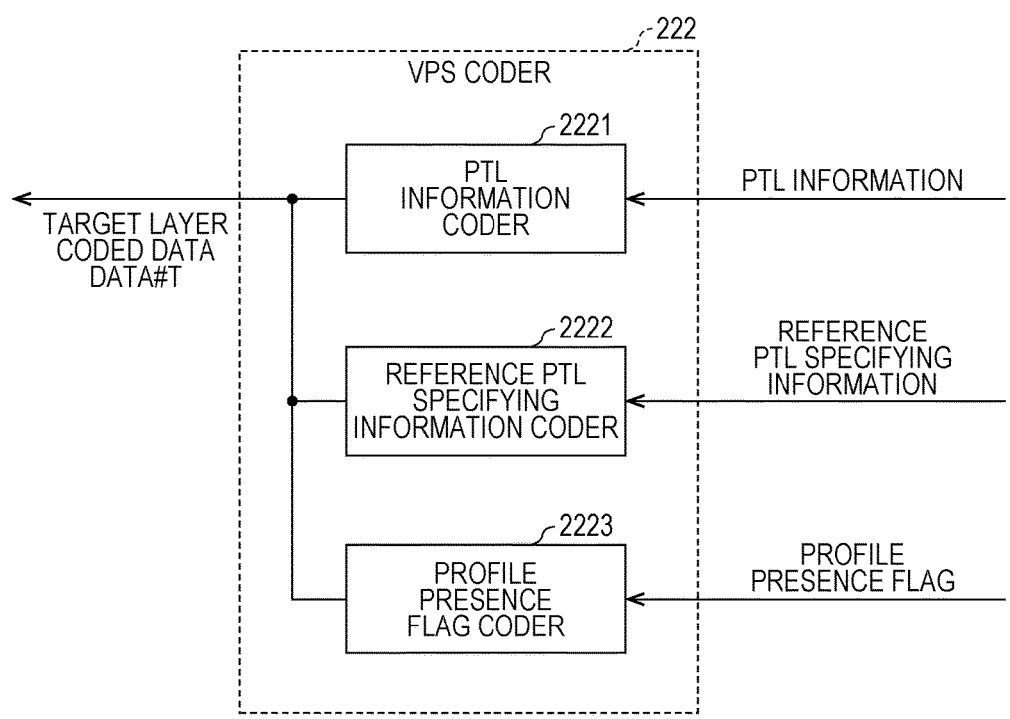
FIG. 47 is a functional block diagram illustrating a schematic configuration of a VPS coder.
Figure 48:
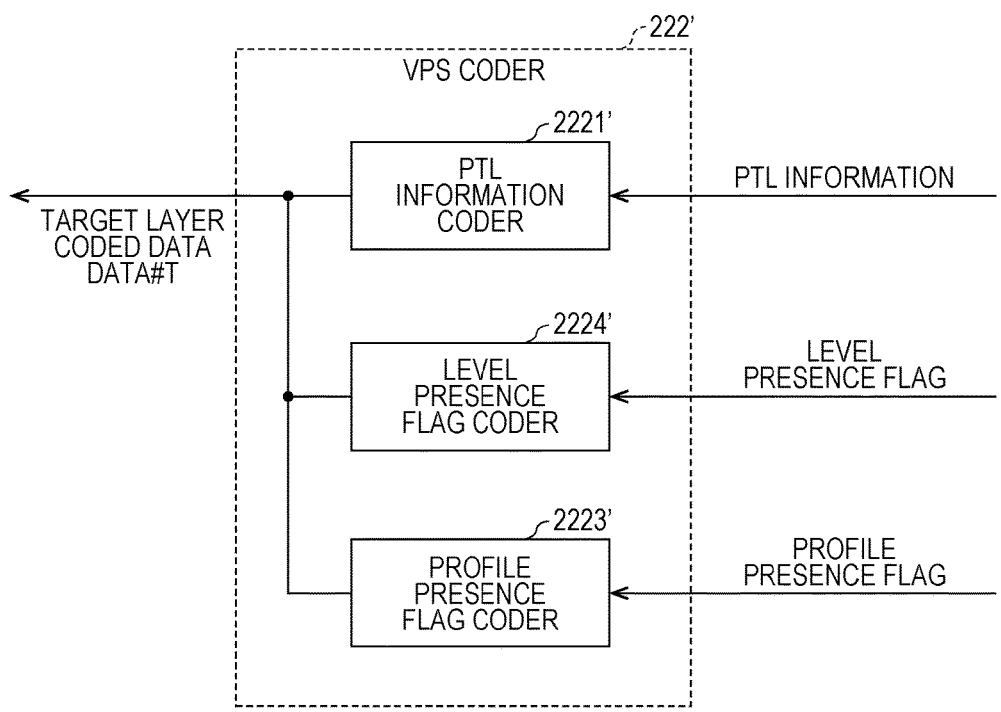
FIG. 48 is a functional block diagram illustrating a modification example of the schematic configuration of the VPS coder.

FIG. 47 is a functional block diagram illustrating a schematic configuration of the VPS coder 222. As illustrated in FIG. 47, the VPS coder 222 is configured to include a profile level information coder (PTL information coder) 2221, a reference PTL specifying information coder 2222, and a profile presence flag coder 2223.

<Details of VPS Coding Process>

Hereinafter, operation of the VPS coder 222 will be described with reference to FIG. 17. FIG. 17 will be interpreted by substituting the word "decode" with "code". The VPS coder 222 is the inverse of the process of the VSP decoder 102.

(Step SA101) The VPS coder 222 codes the syntax group SYNVPS01 of FIG. 7.

(Step SA102) The PTL information coder 2221 included in the VPS coder 222 codes the PTL information of the layer set 0 illustrated in SYNVPS02 of FIG. 7.

(Step SA103) The VPS coder 222 codes the layer IDs of the layers constituting each layer set illustrated in the syntax group SYNVPS03 of FIG. 7.

(Step SA104) The VPS coder 222 codes the VPS extension flag vps_extension_flag of FIG. 7 (SYNVPS04 of FIG. 7).

(Step SA105) When the VPS extension flag is one (YES in Step SA105), it is determined that the VPS extension data is in the VPS, and the process proceeds to Step SA106. When the VPS extension flag is zero (NO in Step SA105), it is determined that the VPS extension data is not in the VPS, and the process proceeds to Step SA109.

(Step SA106) The byte alignment data (vps_extension_aligment_bit_equal_to_one) for adjusting byte alignment from the bit next to the VPS extension flag immediately before avc_base_flag included in the VPS extension data (the syntax group SYNVPS05 of FIG. 7) is coded.

(Step SA107) The VPS extension data vps_extension( ) is coded. Details of a VPS extension data coding process will be described below.

(Step SA108) The VPS coder 222 codes the VPS extension 2 flag vps_extension2_flag illustrated in SYNVPS07 of FIG. 7. If the VPS extension 2 flag is one, the VPS extension 2 data is coded.

(Step SA109) The VPS coder 222 codes RBSP_traling_bits( ) illustrated in SYNVPS08 of FIG. 7. The RBSP_trailing_bits( ) is byte alignment data. The byte alignment data is called stuffing data as well.

<Details of VPS Extension Data Coding Process>

The VPS extension data coding process will be described with reference to FIG. 18. FIG. 18 will be interpreted by substituting the word "decode" with "code".

(Step SB101) The VPS coder 222 codes the syntax group SYNVPS0A of FIG. 8.

(Step SB102) The VPS coder 222 codes the dependency flag, illustrated in the syntax group SYNVPS0B of FIG. 8, related to the dependent layer (referred to as the direct reference layer or a subordinate layer as well) referenced by each layer.

(Step SB103) The VPS coder 222 codes the number of layer sets (syntax SYNVPS0C of FIG. 8).

(Step SB104) The VPS coder 222 codes the total number of pieces of PTL information included in the VPS (SYNVPS0D of FIG. 8).

(Step SB105) Step SB105 is the starting point of a loop of a coding process for the PTL information included in the VPS.

(Step SB106) The profile presence flag coder 2223 included in the VPS coder 222 codes the profile presence flag (syntax SYNVPS0E of FIG. 8) indicating the presence of the syntax group indicating the profile information in the i-th PTL information profile_tier_level( ).

(Step SB107) When the profile presence flag is zero, it is determined that there is no syntax group indicating the profile information in the i-th PTL information, and the process proceeds to Step SB108. When the profile presence flag is one, it is determined that there is a syntax group indicating the profile information in the i-th PTL information, and the process proceeds to Step SB109.

(Step SB108) When the profile presence flag is zero, the reference PTL specifying information coder 2222 included in the VPS coder 222 codes the reference PTL information specifying index (referred to as the reference profile level information relative index as well) "profile_ref_delta_index_minus1[i]" (SYNVPS0Fa of FIG. 8) that indicates the PTL information from which the profile information of the i-th PTL information is referenced on the PTL information list. The reference PTL information specifying index "profile_ref_delta_index_minus1[i]" represents a relative index between the i-th PTL information and the reference destination PTL information. That is, the i-th PTL information references the j-th PTL information specified by j=(i−profile_ref_delta_minus1[i]+1) for profile information. On the encoder side, the PTL information on the PTL information list is rearranged in advance in order of similarity. Thus, the i-th PTL information can have a high probability of referencing the immediately previous PTL information. Therefore, the reference PTL specifying index "profile_ref_delta_index_minus1[i]" can reduce the bit length necessary for representing the reference PTL specifying index in comparison with the related art by, for example, representing the relative index by Golomb codes as illustrated in FIG. 20.

In other words, the profile/level information coder regards the semantics of the i-th reference PTL information specifying index in the profile/level information that the i-th reference PTL information specifying index specifies a relative position between the i-th profile/level information and the referenced profile/level information.

For example, when the value of the reference PTL specifying index "profile_ref_delta_minus1[i]" is zero, that is, when the (i−1)-th PTL information preceding the i-th PTL information by one is referenced, the bit length necessary for representing the reference PTL specifying index is one bit by employing the Golomb codes illustrated in FIG. 20. Accordingly, the coding amount can be reduced in comparison with the technology of the related art in which the reference PTL information specifying index is represented at a fixed length. In addition, since the lead PTL information (zeroth) on the PTL information list can be referenced, it is possible to resolve the defect that the reference PTL information specifying index does not function when the first PTL information is the target. The same effect may be accomplished by decoding the reference PTL specifying index "profile_ref_delta_minus1[i]" with k-th order exponential Golomb codes (EGk (K>=0)) instead of the Golomb codes. The Golomb codes illustrated in FIG. 20 are called zeroth order exponential Golomb codes as well.

When referencing the lead PTL information (zeroth) on the PTL information list is not allowed, an agreement may be set in advance between the decoder and the encoder, setting the profile presence flag certainly to one when the first PTL information is the target as well as stating explicitly that the profile information of the first PTL information has to be included in the coded data (referred to as a bitstream constraint as well). Accordingly, the defect that the reference PTL information specifying index does not function when the first PTL information is the target can be resolved in the same manner.

(Step SB109) The PTL information coder 2222 included in the VPS coder 222 codes the profile and level information of the i-th PTL information with the input of the profile presence flag, the reference PTL specifying information (reference PTL specifying index), the number of sub-layers, and the PTL information. Details of the PTL information coder 2221 will be described below.

(Step SB110) Step SB110 is the end point of the loop of the coding process for the PTL information included in the VPS.

(Step SB111) The VPS coder 222 codes the PTL information specifying index (profile_level_tier_idx[i] in the syntax group SYNVPS0H of FIG. 8) specifying the PTL information applied to each output layer set.

(Step SB112) The VPS coder 222 codes the subordinate layer type of each layer illustrated in the syntax group SYNVPS0I of FIG. 8.

(Step SB111) The VPS coder 222 codes the other syntax group SYNVPS0J of FIG. 8.

<Details of PTL Information Coder 2221>

Next, details of the PTL information coder 2221 according to the first embodiment will be described by employing FIG. 49 and FIG. 21. The PTL information coder 2221 is a coding device corresponding to the PTL information decoder 1021. FIG. 21 will be interpreted by substituting the word "decode" with "code".

Figure 49:
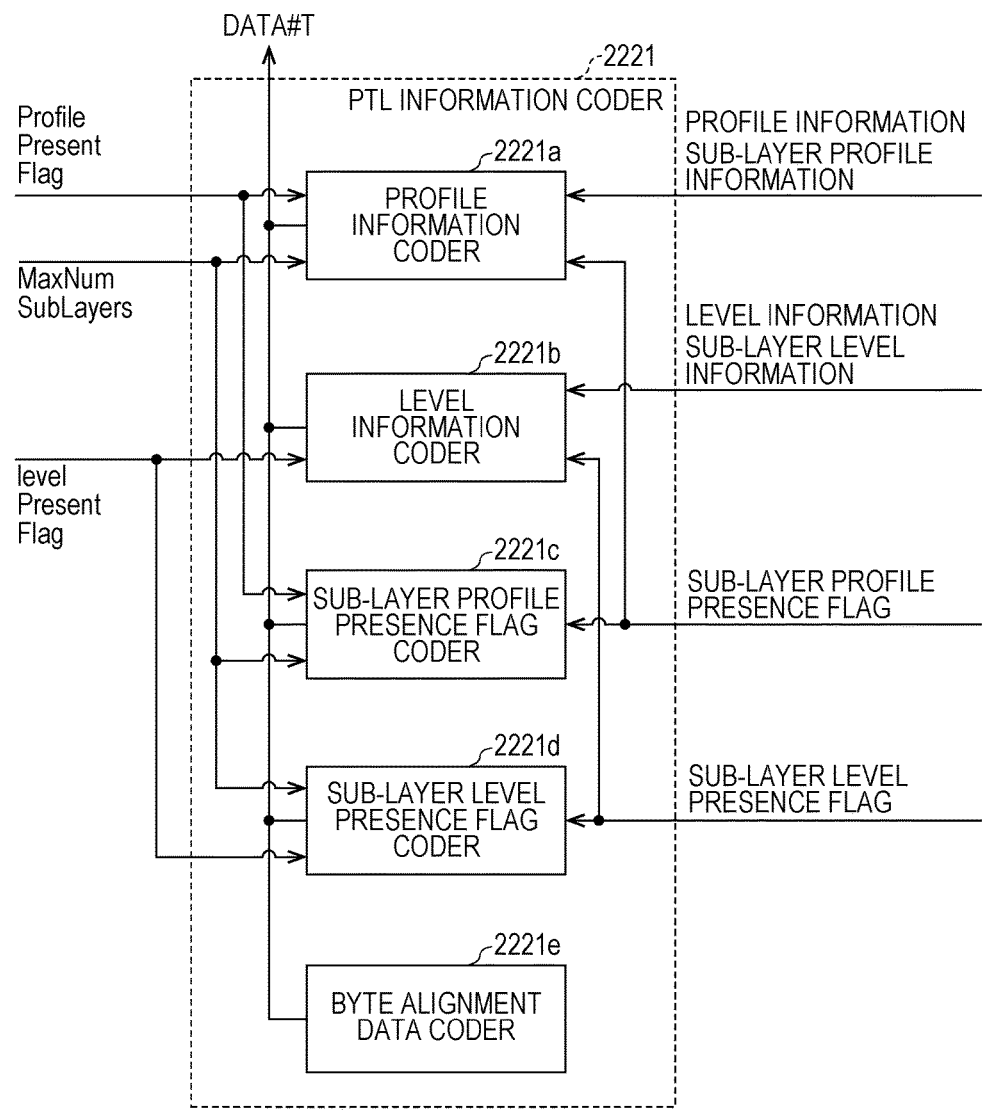
FIG. 49 is a block diagram illustrating details of a PTL information coder.

FIG. 49 is a functional block diagram illustrating a configuration of the PTL information coder 2221. As illustrated in FIG. 49, the PTL information coder 2221 includes a profile information coder 2221a, a level information coder 2221b, a sub-layer profile presence flag coder 2221c, a sub-layer level presence flag coder 2221d, and a byte alignment data coder 2221e. The present embodiment will be interpreted as not including the input line of levelPresentFlag in FIG. 49.

[Profile Information Coder 2221a]

The profile information coder 2221a codes the profile information of the coding target PTL information (profile information of the highest sub-layer or called the general profile information as well) supplied from the outside on the basis of the profile presence flag profilePresentFlag supplied from the outside and outputs the coded profile information as the coded data DATA#T. Specifically, when the profile presence flag profilePresentFlag is one, the profile information of the coding target PTL information is coded and is output as the coded data DATA#T. When the profile presence flag profilePresentFlag is zero, the coding process is not performed because there is no profile information to be coded in the coding target PTL information.

The profile information coder 2221*a* codes the sub-layer profile information of each sub-layer of the coding target PTL information excluding the highest sub-layer on the basis of the profile presence flag profilePresentFlag, the number of sub-layers MaxNumSubLayers, and the sub-layer profile presence flag sub_layer_profile_present_flag[i] of each sub-layer supplied from the outside and outputs the coded sub-layer profile information as the coded data DATA#T.

An agreement may be set in advance between the image decoding device 1 and the image coding device 2 for a configuration method (estimation method) for the profile information of each sub-layer when the profile presence flag is one or zero. For example, as described previously, when the profile presence flag is one, the profile information of each sub-layer is configured according to the pseudocode illustrated in FIG. 62(*a*). When the profile presence flag is zero, the profile information of each sub-layer is configured according to the pseudocode illustrated in FIG. 62(*b*). Accordingly, it is possible to resolve the problem that the sub-layer profile information is undefined in the case of profilePresentFlag=1 as well as sub_layer_profile_present_flag[i]=0.

[Level Information Coder 2221*b*]

The level information coder 2221*b* codes the level information of the coding target PTL information (level information of the highest sub-layer or called the general level information as well) supplied from the outside and outputs the coded level information as the coded data #T. In addition, the level information coder 2221*b* codes the sub-layer level information of each sub-layer of the coding target PTL information excluding the highest sub-layer on the basis of the number of sub-layers MaxNumSubLayers and the sub-layer level presence flag sub_layer_level_present_flag[i] of each sub-layer supplied from the outside and outputs the coded sub-layer level information as the coded data #T.

Specifically, when the sub-layer level presence flag sub_layer_level_present_flag[i] if the sub-layer i (temporalId=i+1) is one, the level information of the sub-layer i supplied from the outside is coded and is output as the coded data DATA#T. In other cases (when the sub-layer level presence flag sub_layer_level_present_flag[i] is zero), the coding process is not performed because there is no level information to be coded.

An agreement may be set in advance between the image decoding device 1 and the image coding device 2 for a configuration method (estimation method) for the level information of each sub-layer when the sub-layer level presence flag of the sub-layer i is zero. For example, as described previously, when the sub-layer level presence flag is zero, the level information of each sub-layer is configured according to the pseudocode illustrated in FIGS. 63(*a*) and 63(*b*). Accordingly, it is possible to resolve the problem that the sub-layer level information is undefined in the case of sub_layer_level_present_flag[i]=0.

[Sub-Layer Profile Presence Flag Coder 2221*c*]

The sub-layer profile presence flag coder 2221*c* codes the sub-layer profile presence flag of each sub-layer of the coding target PTL information on the basis of the number of sub-layers MaxNumSubLayers supplied from the outside and outputs the coded sub-layer profile presence flag as the coded data DATA#T.

[Sub-Layer Level Presence Flag Coder 2221*d*]

The sub-layer level presence flag coder 2221*d* codes the sub-layer level presence flag of each sub-layer of the coding target PTL information on the basis of the number of sub-layers MaxNumSubLayers supplied from the outside and outputs the coded sub-layer level presence flag as the coded data DATA#T.

[Byte Alignment Data Coder 2221*e*]

The byte alignment data coder 2221*e* codes the byte alignment data (reserved_zero_2bits[i]) of the number of bits defined on the basis of the number of sub-layers (MaxNumSbuLayersMinus1 or MaxNumSubLayers−1) (syntax SYNPTL04 of FIG. 9) by two bits and outputs the coded byte alignment data as the coded data DATA#T. The number of bits to be coded as the byte alignment data is "(8−MaxNumSubLayersMinus1)*2 bits" as is apparent from the syntax SYNVPSPTL04 of FIG. 9.

(Flow of Profile/Level Information Profile_Tier_Level( ) Coding Process)

A PTL information profile_tier_level( ) coding process will be described with reference to FIG. 21. FIG. 21 will be interpreted by substituting the word "decode" with "code". In addition, the processes in Steps SC103, SC112, and SC115 are not performed on the coding device side. That is, in the case of NO in the branching of Step SC101, the process proceeds to Step SC104. In addition, in the case of NO in the branching of Step SC110, the process proceeds to Step SC113. In addition, in the case of NO in the branching of Step SC113, the process proceeds to Step SC116.

(Step SC101) The profile information coder 2221*a* determines whether the profile presence flag profilePresentFlag is one. The process proceeds to Step SC102 when the profile presence flag profilePresentFlag is one (YES in Step SC101) or proceeds to Step SC104 in other cases (NO in Step SC101).

(Step SC102) The profile information coder 2221*a* codes, for example, the syntax group SYNPTL01 of FIG. 9 profile space general_profile_space tier flag general_tier_flag profile identifier general_profile_idc profile compatibility flag general_profile_compatibility_flag[i]

. . . omitted . . .

profile reserved syntax general_reserved_zero_44bits and the like as the profile information of the coding target PTL information.

(Step SC104) The level information coder 2221*b* codes the following syntax level identifier general_level_idc as the level information of the coding target PTL information.

(Step SC105) Step SC105 is the starting point of a loop related to coding of the sub-layer profile presence flags and the sub-layer level presence flags of the sub-layers. The variable i is initialized to zero before the start of the loop. The process inside the loop is performed when the variable i is less than the number of sub-layers−1 "MaxNumSubLayers−1", and the variable i is incremented by one each time the process inside the loop is performed once. That is, the sub-layer profile presence flags and the sub-layer level presence flags of the sub-layers excluding the highest sub-layer are coded in Step SC105 to Step SC107.

(Step SC106) The sub-layer profile presence flag coder 2221*c* codes the sub-layer profile presence flag sub_layer_profile_present_flag[i] related to the sub-layer specified by the variable i.

The sub-layer level presence flag coder 2221*d* codes the sub-layer level presence flag sub_layer_level_present_flag[i] related to the sub-layer specified by the variable i.

(Step SC107) Step SC107 is the end point of the loop related to coding of the sub-layer profile presence flags and the sub-layer level presence flags of the sub-layers.

(Step SC108) The byte alignment data coder 2221e inserts (codes) the byte alignment data (reserved_zero_2bits[i]) of the number of bits defined on the basis of the number of sub-layers (MaxNumSbuLayersMinus1 or MaxNumSubLayers−1) (syntax SYNPTL04 of FIG. 9) by two bits into the coded data DATA#T.

Specifically, in Step SC105 to Step SC107, the coding amount of each of the sub-layer profile presence flag and the sub-layer level presence flag coded per sub-layer is one bit, total two bits, and the number of sub-layers is MaxNumSubLayers. Thus, the total sum of the coding amount decoded in Step SC105 to Step SC107 is 2*(MaxNumSubLayer−1). Therefore, the number of bits to be coded as the byte alignment data is "(8−MaxNumSubLayersMinus1)*2 bits".

(Step SC109) Step SC109 is the starting point of a loop related to coding of the sub-layer profile information and the sub-layer level information of the sub-layers. The variable i is initialized to zero before the start of the loop. The process inside the loop is performed when the variable i is less than the number of sub-layers−1 "MaxNumSubLayers−1", and the variable i is incremented by one each time the process inside the loop is performed once.

(Step SC110) The profile information coder 2221a determines whether the sub-layer profile presence flag "sub_layer_profile_present_flag[i] specified by the variable i is one. The process proceeds to Step SC111 when the sub-layer profile presence flag is one (YES in Step SC110) or proceeds to Step SC113 in other cases (NO in Step SC110).

(Step SC111) The profile information coder 2221a codes, for example,
sub-layer profile space sub_layer_profile_space[i]
sub-layer tier flag sub_layer_tier_flag[i]
sub-layer profile identifier sub_layer_profile_idc[i]
sub-layer profile compatibility flag sub_layer_profile_compatibility_flag[i] [j]
. . . omitted . . .
sub-layer profile reserved syntax sub_layer_reserved_zero_44bits[i]
illustrated in the syntax group SYNPTL05 of FIG. 9 as the sub-layer profile information of the sub-layer specified by the variable i.

(Step SC113) The level information coder 2221b determines whether the sub-layer level presence flag sub_layer_level_present_flag[i] of the sub-layer specified by the variable i is one. The process proceeds to Step SC114 when the sub-layer level presence flag is one (YES in Step SC113) or proceeds to Step SC116 in other cases (NO in Step SC113).

(Step SC114) The level information coder 2221b codes and outputs
sub-layer level identifier sub_layer_level_idc[i] as the sub-layer level information of the sub-layer specified by the variable i.

(Step SC116) Step SC116 is the end point of the loop related to coding of the sub-layer profile information and the sub-layer level information of the sub-layers.

While the operation of the profile/level information coder 2221 according to the first embodiment is described thus far, the invention is not limited to the above Steps. The above Steps may be changed to the extent possible.

(Modification Example of First Embodiment)

A modification example of the VPS coder 202 will be described with reference to FIG. 22. Operation of the VPS code unit 202, since being the same as that of the first embodiment, will not be described excluding the reference PTL information specifying index (syntax SYNVPS0Fb of FIG. 22).

While the reference PTL information specifying index which is the relative index between the position of the target PTL information on the PTL information list and the reference destination PTL information (profile_ref_delta_index_minus1[i]) is coded by Golomb codes in the first embodiment, the invention is not limited to this. For example, instead of the relative index, the profile information of the "profile_ref[i]"-th PTL information on the PTL information list may be referenced. At this time, the reference PTL information specifying index "profile_ref[i]" is variable-length coded at the bit length V defined on the basis of the index i indicating the position of the target PTL information on the list. The bit length V is defined by ceil(log 2(i)). Accordingly, the coding amount can be reduced in comparison with the technology of the related art in which the reference PTL information specifying index is represented at a fixed length. In addition, since the lead PLT information (zeroth) on the PTL information list can be referenced, it is possible to resolve the defect that the reference PTL information specifying index does not function when the first PTL information is the target.

In other words, in the profile/level information coded by the profile/level information coder, the reference PTL information specifying index is changed to the reference profile so that the profile and tier information of the first profile/level information can be estimated on the basis of the zeroth profile/level information.

When referencing the lead PTL information (zeroth) on the PTL information list is not allowed, an agreement may be set in advance between the decoder and the encoder, setting the profile presence flag certainly to one when the first PTL information is the target as well as stating explicitly that the profile information of the first PTL information has to be included in the coded data (referred to as a bitstream constraint as well). Accordingly, the defect that the reference PTL information specifying index does not function when the first PTL information is the target can be resolved in the same manner.

<<Modification Example 2 of VPS Coder 202>>

Next, a modification example 2 of the VPS coder 202 will be described by employing FIG. 23, FIG. 24, FIG. 26, and FIG. 47.

FIG. 23 is a modification example of the syntax table of the extension video parameter set VPS. A VPS extension data coding process will be described with reference to FIG. 24. FIG. 24 will be interpreted by substituting the word "decode" with "code".

First, a syntax table of the extension video parameter set VPS according to the modification example 2 will be described by employing FIG. 23. The difference between the syntax table of the extension video parameter set VPS illustrated in FIG. 23 and that illustrated in FIG. 8 is that the reference PTL information specifying index (profile_ref_delta_index_minus1[i]) illustrated in the syntax SYNVPS0Fa of FIG. 8 is deleted in FIG. 23 and that the profile presence flag (vps_profile_present_flag[i]) illustrated in syntax SYNVPS0E of FIG. 23 functions as the reference PTL specifying information specifying index as well. That is, when the value of the profile presence flag (vps_profile_present_flag[i]) is one, the profile information of the i-th PTL information is coded. Meanwhile, when the value of the profile presence flag is zero, the profile information is not coded because the profile information of the i-th PTL information is the same as that of the previously coded (i−1)-th PTL information that is coded immediately before the i-th PTL information.

Next, differences between a configuration of a VPS coder 202' according to the modification example 2 and that of the VPS coding 202 will be described. The VPS coder 202' does not include the reference PTL specifying information coder 2222 included in the VPS coder 202. Another difference is that the input line of the profile presence flag is connected to the PTL information coder 2221 (not illustrated).

The PTL information coder 2221 according to the modification example 2 has the same constituents as the PTL information coder 2221 of the first embodiment and thus will not be described.

The flow of the PTL information coding process is the same as the flow of the PLT information coding process of the first embodiment and thus will not be described.

As described thus far, in the syntax table of the extension video parameter set VPS according to the modification example 2, the reference PTL information specifying index (profile_ref_delta_index_minus1[i]) illustrated in the syntax SYNVPS0Fa of FIG. 23 is deleted, and the profile presence flag (vps_profile_present_flag[i]) illustrated in the syntax SYNVPS0E of FIG. 23 functions as the reference PTL specifying information specifying index as well. That is, when the value of the profile presence flag (vps_profile_present_flag[i]) is one, the profile information of the i-th PTL information is coded. Meanwhile, when the value of the profile presence flag is zero, the profile information is not coded because the profile information of the i-th PTL information is the same as the profile information of the previously coded (i−1)-th PTL information that is coded immediately before the i-th PTL information. On the encoder side, the PTL information on the PTL information list is rearranged in advance in order of similarity. Thus, the i-th PTL information can have a high probability of referencing the immediately previous PTL information. That is, the vps_profile_present_flag[i] when being zero can be interpreted as estimating the reference PTL specifying index to be "profile_ref_delta_index_minus1[i]=0" without coding the reference PTL specifying index "profile_ref_delta_index_minus1[i]". Accordingly, the coding amount related to the relative index can be further reduced.

<<Modification Example 3 of VPS Coder 222>>

A modification example 3 of the VPS coder 222 is the inverse of the process corresponding to the modification example 3 of the VPS decoder 102.

Differences between a configuration of the VPS coder 222' according to the modification example 3 and that of the VPS coder 222 will be described. The VPS coder 222" illustrated in FIG. 48 does not include the reference PTL specifying information coding 2222 included in the VPS coder 222 but newly includes a level presence flag coder 2224' The level presence flag coder 2224' codes the level presence flag of the coding target PTL information input from the outside and outputs the coded level presence flag as the coded data.

Hereinafter, a configuration of the PTL information coder 2221 in the modification example 3 will be described by employing FIG. 49. The PTL information coder 2221 according to the modification 3 has the same constituents as the PTL information coder 2221 of the first embodiment excluding the point that the input line of the level presence flag is connected to the level information coder 2221b and to the sub-layer level presence flag coder 2221d and thus will not be described. Hereinafter, only differences between the function of the level information coder 2221b and that of the sub-layer level presence flag coder 2221d will be described.

[Level Information Coder 2221b]

The level information coder 2221b codes and outputs the level information of the coding target PTL information (level information of the highest sub-layer or called the general level information as well) on the basis of the level presence flag levelPresentFlag supplied from the outside. Specifically, when the level presence flag levelPresentFlag is one, the level information of the coding target PTL information is coded. When the level presence flag levelPresentFlag is zero, the level information is not coded because the level information of the coding target PTL information is the same as the level information of the previously coded PTL information ((i−1)-th PTL information) that is coded preceding the coding target PTL information by one.

In addition, the level information coder 2221b codes and outputs the sub-layer level information of each sub-layer of the coding target PTL information excluding the highest sub-layer on the basis of the level presence flag levelPresentFlag, the number of sub-layers MaxNumSubLayers, and the sub-layer level presence flag sub_layer_level_present_flag[i] of each sub-layer supplied from the outside.

(In Case where Level Presence Flag is One)

When the level presence flag is one, operation of the level information coder 2221b is the same as the operation of the level information coder 2221b included in the PTL information coder 2221 of the first embodiment and thus will not be described in detail. If described simply, when the sub-layer level presence flag of the sub-layer i (temporalId=i+1) is one, the level information of the sub-layer i is coded. In other cases, the level information of the sub-layer i is not coded. An agreement may be set in advance between the image decoding device 1 and the image coding device 2 for a configuration method for the level information when the sub-layer level presence flag of the sub-layer i is zero. For example, the level information of the sub-layer (i+1) of the coding target PTL information is configured as the level information of the sub-layer i (refer to FIGS. 63(a) and 63(b)). Accordingly, it is possible to resolve the problem that the sub-layer level information is undefined in the case of level_present_flag=0 as well as sub_layer_level_present_flag[i]=0.

(In Case where Level Presence Flag is Zero)

When the sub-layer level presence flag of the sub-layer i (temporalId=i+1) is one, the level information of the sub-layer i is coded. In other cases, the level information is not coded because the level information of the sub-layer i of the coding target PTL information is the same as the level information of the corresponding sub-layer of the previously coded PTL information ((idx−1)-th PTL information) that is coded preceding the coding target PTL information by one. The idx is an index indicating the position of the decoding target PTL information on the PTL information list. A configuration rule for the sub-layer level information is illustrated in FIG. 64(b).

(Flow of Profile/Level Information Profile_Tier_Level( ) Coding Process)

Hereinafter, operation of the PTL information coder 2221 according to the modification example 3 will be described by employing FIG. 33. FIG. 33 will be interpreted by substituting the word "decode" with "code". Only Steps SG104, SG105, SG106, SG115, SG116, and SG117 of FIG. 33 of which the operation is different from those of FIG. 21 will be described. The other common Steps will not be described. In addition, the processes of Steps SG103, SG106, SG114, and SG117 are not performed on the coding side. That is, in the case of NO in the branching of Step SG101, the process proceeds to Step SG104. In addition, in the case of NO in the branching of Step SG104, the process proceeds to Step SG107. In addition, in the case of NO in the branching of Step SG112, the process proceeds to Step SG115. In addition, in the case of NO in the branching of Step SG115, the process proceeds to Step SG118.

(Step SG104) The level information coder 2221b determines whether the level presence flag levelPresentFlag is one. The process proceeds to Step SG105 when the level presence flag levelPresentFlag is one (YES in Step SG104) or proceeds to Step SG107 in other cases (NO in Step SG104).

(Step SG105) The level information coder 2221b codes the following syntax
 level identifier general_level_idc as the level information of the coding target PTL information.

(Step SG115) The level information coder 2221b determines whether the sub-layer level presence flag sub_layer_level_present_flag[i] of the sub-layer specified by the variable i is one. The process proceeds to Step SG116 when the sub-layer level presence flag is one (YES in Step SG115) or proceeds to Step SG118 in other cases (NO in Step SG115).

(Step SG116) The level information coder 2221b codes sub-layer level identifier sub_layer_level_idc[i] as the sub-layer level information of the sub-layer specified by the variable i.

While the operation of the PTL information coder 2221 according to the modification example 3 is described thus far, the invention is not limited to the above Steps. The above Steps may be changed to the extent possible.

As described thus far, in the syntax table of the extension video parameter set VPS according to the modification example 3, the reference PTL information specifying index (profile_ref_delta_idx_minus1[i]) illustrated in the syntax SYNVPS0F of FIG. 23 is deleted, and the profile presence flag (vps_profile_present_flag[i]) illustrated in the syntax SYNVPS0E of FIG. 29 and the level presence flag (vps_level_present_flag[i]) function as the reference PTL specifying information specifying index as well. That is, when the value of the profile presence flag (vps_profile_present_flag[i]) is one, the profile information of the i-th PTL information is coded. Meanwhile, when the value of the profile presence flag is zero, the profile information is not coded because the profile information of the i-th PTL information is the same as the profile information of the previously coded (i−1)-th PTL information that is coded immediately before the i-th PTL information. In addition, when the value of the level presence flag (vps_level_present_flag[i]) is one, the level information of the i-th PTL information is coded. Meanwhile, when the value of the level presence flag is zero, the level information is not coded because the level information of the i-th PTL information is the same as the level information of the previously coded (i−1)-th PTL information that is coded immediately before the i-th PTL information. On the encoder side, the PTL information on the PTL information list is rearranged in advance in order of similarity. Thus, the i-th PTL information can have a high probability of referencing the immediately previous PTL information. That is, either the vps_profile_present_flag[i] when being zero or the vps_level_present_flag[i] when being zero can be interpreted as estimating the reference PTL specifying index to be "profile_ref_delta_index_minus1[i]=0" without coding the reference PTL specifying index "profile_ref_delta_index_minus1[i]". Accordingly, the coding amount related to the relative index can be further reduced. Furthermore, the modification example 3 accomplishes the effect of reducing the redundancy of the profile information and level information of the coding target PTL information as in the first embodiment.

<<Modification Example 3a of VPS Coder 222>>

A modification example 3a of the VPS coder 222 is the inverse of the process corresponding to the modification 3a of the VPS decoder 202. The configuration of the modification 3 may be changed as follows. That is, the profile presence flag profilePresentFlag and the level presence flag levelPresentFlag are substituted by a profile level presence flag ProfileLevelPresentFlag that represents the presence of the profile information and of the level information.

Hereinafter, a configuration of the PLT information coder 2221 in the modification example 3a will be described by employing FIG. 49 instead. The PTL information coder 2221 according to the modification example 3a has the same configuration and operation as the PTL information decoder 2221 of the modification example 3 excluding the input values of the profile presence flag profilePresentFlag and the level presence flag levelPresentFlag. While there is wiring for the profile presence flag profilePresentFlag and the level presence flag levelPresentFlag in FIG. 49, the profilePresentFlag and the levelPresentFlag of FIG. 49 are input as zero in the modification example 3a when the profile level presence flag profileLevelPresentFlag is zero. When the profile level presence flag profileLevelPresentFlag is one, the profilePresentFlag and the levelPresentFlag of FIG. 49 are input as one. This modification does not change the syntax tables of the existing PTL information positioned at the lead of the VPS in HEVC and the PTL information of the SPS notified in the base layer. That is, the existing HEVC decoder being incapable of decoding the PTL information of the VPS and SPS does not occur.

The modification 3a described thus far accomplishes the same effect as the modification 3. Furthermore, in comparison with the modification example 3, the coding amount related to an additional flag (the level presence flag in the modification 3) can be reduced by integrating the profile presence flag and the level presence flag into one profile level presence flag indicating the presence of the profile information and the level information.

<<Modification Example 4 of VPS Coder 222>>

Figure 67:
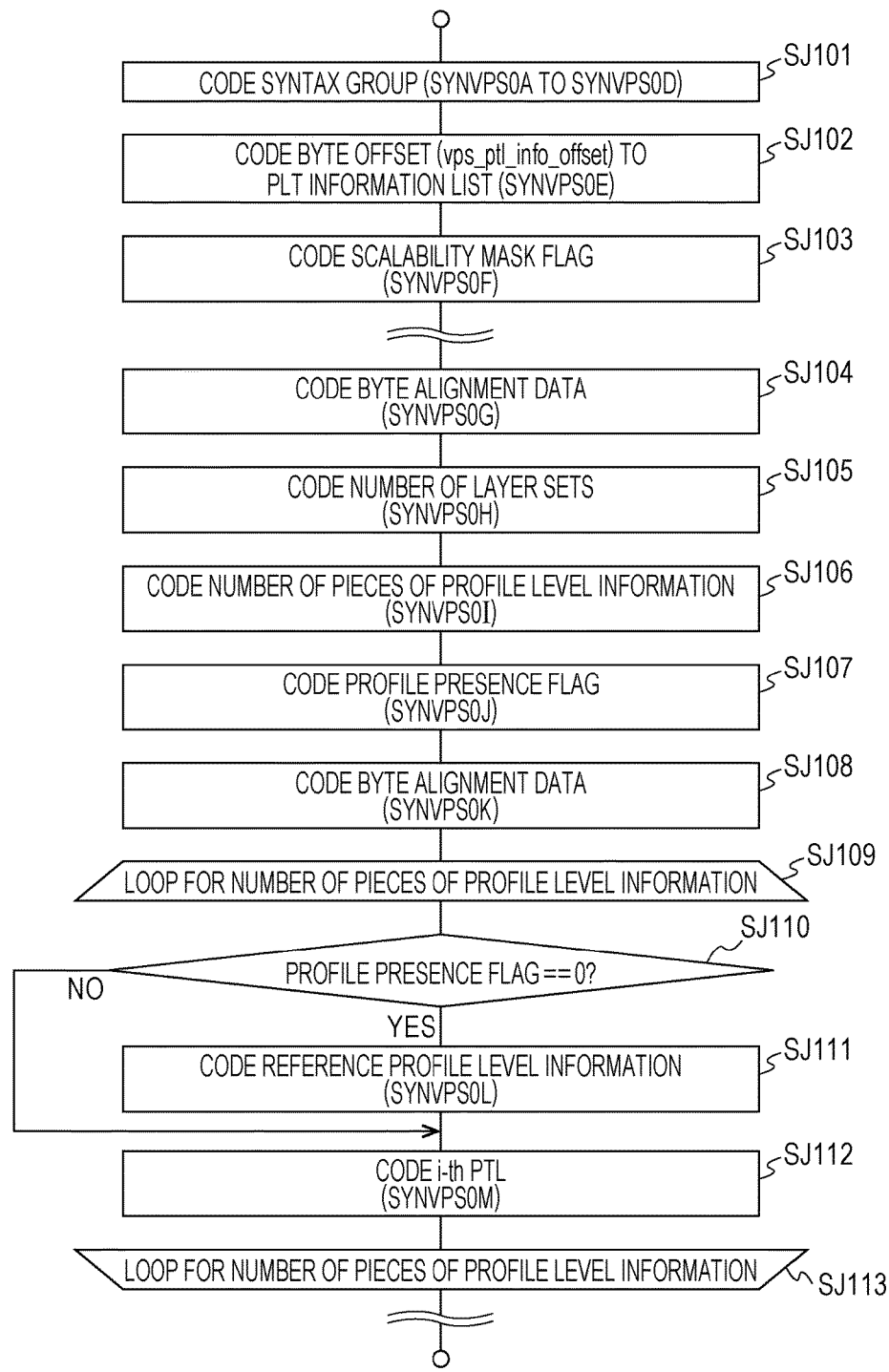
FIG. 67 is a flowchart illustrating a modification example of a VPS extension data coding process.

Next, a modification example 4 of the VPS coder 202 will be described by employing FIG. 65 and FIG. 67. The modification 4 of the VPS coder 202 is the inverse of the process corresponding to the modification example 4 of the VPS decoder 102. While the syntax table of the VPS extension data according to the modification example 4 is not described since being previously described in the modification example 4 of the VPS decoder 102, the same effect is accomplished.

(Configuration of VPS Coder 222''')

A configuration of a VPS coder 222''' according to the modification example 4 will be described with reference to FIG. 47. The VPS coder 222''' further includes a byte alignment data coder 2024 (not illustrated) in addition to the same constituents as the PTL information coder 2221, the reference PTL information coder 2222, and the profile presence flag coder 2223 included in the VPS coder 222 of the first embodiment. Hereinafter, only the byte alignment data coder 2224 will be described.

The byte alignment data coder 2224 included in the VPS coder 222''' codes data and byte alignment data inserted in the VPS extension data vps_extension( ) to adjust byte alignment. Such data are vps_alignment_bit_equal_to_one (SYNVPS0G of FIG. 65) and reserved_zero_1bits[i] (SYNVPS0K of FIG. 65).

<Details of VPS Extension Data Coding Process (Modification Example 4)>

A VPS extension data coding process of the VPS coder 222''' will be described by employing FIG. 67.

(Step SJ101) The VPS coder 222''' codes the syntax group SYNVPS0A of FIG. 65.

(Step SJ102) The VPS coder 222''' codes the byte offset information (vps_ptl_info_offset) to the PTL information list illustrated in SYNVPS0E of FIG. 65.

(Step SJ103) The VPS coder 222''' codes the scalability mask flag illustrated in SYNVPS0F of FIG. 65.

... omitted ...

(Step SJ104) The byte alignment data coder 2224 included in the VPS coder 222''' codes the byte alignment data (vps_alignment_bit_equal_to_one) by one bit on the basis of a predetermined determination expression illustrated in SYNVPS0G of FIG. 65.

(Step SJ105) The VPS coder 222''' codes the number of layer sets illustrated in SYNVPS0H of FIG. 65.

(Step SJ106) The VPS coder 222''' codes the number of pieces of PTL information illustrated in SYNVPS0I of FIG. 65.

(Step SJ107) The profile presence flag decoder 1023 included in the VPS coder 222''' codes the profile presence flag illustrated in SYNVPS0J of FIG. 65 in quantities of "the number of pieces of PTL information−1".

(Step SJ108) The byte alignment data coder 2224 included in the VPS coder 222''' codes the byte alignment data (reserved_zero_bit[i]) illustrated in SYNVPS0K of FIG. 65. The number of bits of the coded byte alignment data is V={8−{{(vps_num_profile_tier_level_minus1+1) % 8} % 8}}.

(Step SJ109) Step SJ109 is the starting point of a loop of a coding process for the PTL information included in the VPS.

(Step SJ110) When the profile presence flag is zero, it is determined that there is no syntax group indicating the profile information in the i-th PTL information, and the process proceeds to Step SJ112. When the profile presence flag is one, it is determined that there is a syntax group indicating the profile information in the i-th PTL information, and the process proceeds to Step SJ111.

(Step SJ111) When the profile presence flag is zero, the reference PTL specifying information coder 2222 included in the VPS coder 222''' codes the reference PTL information specifying index "profile_ref_minus1[i]" (SYNVPS0L of FIG. 65) that indicates the PTL information from which the profile information of the i-th PTL information is referenced on the PTL information list. The reference PTL information specifying index "profile_ref_minus1[i]" represents the position of the reference destination PTL information. That is, the i-th PTL information has the same profile information as the j-th PTL information specified by j=(profile_ref_minus1[i]+1).

(Step SJ112) The PTL information coder 2221 included in the VPS coder 222''' codes the profile and level information of the i-th PTL information with the input of the profile presence flag, the reference PTL specifying index, and the number of sub-layers. Details of the PTL information coder 2221 will not be described since being described previously.

(Step SJ113) Step SJ113 is the end point of the loop of the coding process for the PTL information included in the VPS.

(Step SJ114) The VPS coder 222''' codes the other syntax.

While the operation of the VPS coder 222''' according to the modification example 4 is described thus far, the invention is not limited to the above Steps. The above Steps may be changed to the extent possible.

<<Modification Example 4a of VPS Coder 222>>

Next, a modification example 4a of the VPS coder 222 will be described by employing FIG. 68 and FIG. 70. The modification example 4a of the VPS coder 202 is the inverse of the process corresponding to the modification example 4a of the VPS decoder 102. While the syntax table of the VPS extension data according to the modification example 4a is not described since being previously described in the modification example 4a of the VPS decoder 102, the same effect is accomplished.

(Configuration of VPS Coder 222'''a)

A configuration of a VPS coder 222'''a according to the modification example 4a will be described. The VPS coder 222'''a further includes the byte alignment data coder 2224 (not illustrated) in addition to the same constituents as the PTL information coder 2221' and the profile presence flag coder 2223' included in the VPS coder 222' of the modification example 2. The same constituents, the PTL information coder 2221' and the profile presence flag coder 2223', will not be described. In addition, the byte alignment data coder 2224 is the same as the byte alignment data coder 22224 included in the VPS coder 222''' of the modification example 4 and thus will not be described.

<Details of VPS Extension Data Coding Process (Modification Example 4a)>

A VPS extension data coding process of the VPS coder 222'''a will be described by employing FIG. 70. The VPS extension data coding process of the VPS coder 222'''a has the same operation as the modification example 4 except that Step SL110 (a branching determination based on the value of the profile presence flag and a transition based on the branching) and Step SL111 (coding of the reference PTL information specifying index profile_ref_minus1[i]) are omitted in FIG. 70 and thus will not be described.

While the operation of the VPS coder 222'''a according to the modification example 4a is described thus far, the invention is not limited to the above Steps. The above Steps may be changed to the extent possible.

In the profile/level information coded by the profile/level information coder, as described thus far, the reference PTL information specifying index may be changed to the reference profile so that the profile and tier information of the first profile/level information can be estimated on the basis of the zeroth profile/level information.

In the profile/level information coded by the profile/level information coder, the VPS profile presence flag may be included instead of the reference PTL information specifying index.

The profile/level information coder, when the level information of the i-th sub-layer is not presented, may perform coding such as estimating the level of the i-th sub-layer to be the same as the smaller of the level of the (i+1)-th sub-layer and the level of the level identifier.

Coding may be performed such that the VPS level presence flag is added to the profile/level information so that the profile/level information coder can derive the level information of the i-th profile/level information from the level information of the other profile/level information when the VPS level presence flag is equal to "0".

(Supplementary Matters)

The maximum profile information and level information necessary for decoding all of the layers constituting a layer set as well as the sub-layers adjunct to each layer are configured in the profile information and level information of the PTL information applied to the layer set. For the profile information and level information of the sub-layer as well, the maximum profile information and level information necessary for decoding the sub-layers, having a temporal ID less than or equal to a specific one, of all of the layers in the layer set are configured.

In each PTL information (assume PTL information A and PTL information B) applied to the layer set A {layer ID list {L#0, L#1, L#2}, HighestTid=3} and the layer set B {layer ID list {L#0, L#1}, HighestTid=2} which is a subset of the layer set A, the PTL information A of the higher layer set (layer set A) is configured to be backward-compatible with the profile information and level information of the PTL information B of the lower layer set (layer set B). That is, at least the following constraints are configured.

the value of the profile space of the lower layer set B≤the value of the profile space of the higher layer set A the value of the profile identifier of the lower layer set B≤the value of the profile identifier of the higher layer set A the value of the tier flag of the lower layer set B≤the value of the tier flag of the higher layer set A the value of the profile compatibility flag of the higher layer set A corresponding to the profile identifier of the lower layer set B is one (that is, the layer set B is forward-compatible with the layer set A). Given that, for example, the profile identifier of the layer set B is "LayerSetBProfileIdc" and the profile compatibility flag of the layer set A is "layerSetA's general_compatibility_flag[i]", "LayerSetA's general_compatibility_flag["LayerSetBProfileIdc" ]=1" is configured.

the value of the level identifier of the higher layer set A≥the value of the level identifier of the lower layer set B The same constraints are applied to the sub-layer profile information and the sub-layer level information as well. That is, "lower layer set B" may be replaced by and interpreted as ""sub-layer (temporalId=i) of the lower layer set B", and "higher layer set A" may be replaced by and interpreted as "sub-layer (temporalId=i) of the higher layer set A".

The advantage of posing the above constraints will be described below. The technology of the related art (NPL 1 to NPL 3) does not have constraints set between each PTL information (profile information, level information, sub-layer profile information, and sub-layer level information) applied to the layer set B which is a subset of the higher layer set A. Thus, a problem arises in that load on installing the image decoding device is high (the complexity of the image decoding device increases).

It is assumed that, for example, the profile of each layer L#N of the layer set A {{layer ID list {L#0, L#1, L#2}, HighestTid=3} in FIG. 2 is coded with the following three types of profile settings of profile of the layer L#2: "scalable main profile",
profile of the layer L#1: "scalable high profile", and
profile of the layer L#0: "main profile".

The "scalable high profile is a higher scalable profile supporting all of the coding tools of "scalable main profile" and "main profile". The "scalable main profile" is a higher scalable profile supporting all of the coding tools of "main profile". The "main profile" represents "main profile" of HEVC written in NPL 1. That is, the relationship between the profiles is "main profile"<"scalable main profile"<"scalable high profile".

In the above example, an image decoding device that supports the profile "scalable high profile" can decode all of the layers (L#0, L#1, and L#2) in the layer set A. That is, the layer set A can be completely decoded. However, an image decoding device that supports the profile "scalable main profile", if trying to decode a bitstream extracted from the sub-layers (layer set B) of the layer set A, cannot decode the lower layer (L#1), which is a dependent layer at the time of decoding the layer L#2, and the higher layer L#2 because the profile of the lower layer (L#1) is incompatible with the profile of the higher layer (L#2) and cannot decode even the base layer L#0 of the lower profile "main profile". That is, it is possible that coded data in which the profile of the lower layer and a profile incompatible with the profile of the higher layer are discontinuously configured is generated on the image coding device side. Therefore, when such coded data is decoded on the image decoding device side, the lower layer on which the decoding target layer is dependent cannot be decoded. As a consequence, a problem arises in that the granularity of the layer scalability and of the sub-layer scalability becomes coarse.

In order to flexibly realize scalability with such coded data on the image decoding device side, it is necessary for the image decoding device to be installed to support a plurality of profiles. This results in the problem of increasing the complexity of the image decoding device.

Similarly, for the level/tier as well, there are no constraints set between the level/tiers between layer sets, thereby posing the same problem as in the case of the absence of the above profile constraints. That is, on the image coding device side, it is possible that the coded data in which the level and the tier of the lower layer and a level and a tier incompatible with the level and the tier of the higher layer are discontinuously configured is generated, and the granularity of the layer scalability and of the sub-layer scalability becomes coarse, thereby posing the problem of impairing flexibility. In order to flexibly realize scalability with such coded data on the image decoding device side, it is necessary for the image decoding device to be installed to support a plurality of levels and tiers. This results in the problem of increasing the complexity of the image decoding device.

Therefore, in order to resolve the above problem, it is preferable to pose the following constraints between layer sets that are in an inclusion relation.

(1-1) the value of the profile space of the lower layer set B≤the value of the profile space of the higher layer set A (1-2) the value of the profile identifier of the lower layer set B≤the value of the profile identifier of the higher layer set A (1-3) the value of the tier flag of the lower layer set B≤the value of the tier flag of the higher layer set A (1-4) the value of the profile compatibility flag of the higher layer set A corresponding to the profile identifier of the lower layer set B is one (that is, the layer set B is forward-compatible with the layer set A). Given that, for example, the profile identifier of the layer set B is "LayerSetBProfileIdc" and the profile compatibility flag of the layer set A is "layerSetA's general_profile_compatibility_flag[i]", "LayerSetA's general_profile_compatibility_flag["LayerSetBProfileIdc" ]=1" is configured.

(1-5) the value of the level identifier of the higher layer set A≥the value of the level identifier of the lower layer set B It is preferable to pose the following constraints for each layer in the same layer set.

(2-1) the value of the profile space of the lower layer L#N≤the value of the profile space of the higher layer L#(N+1)

(2-2) the value of the profile identifier of the lower layer L#N≤the value of the profile identifier of the higher layer L#(N+1)

(2-3) the value of the tier flag of the lower layer L#N≤the value of the tier flag of the higher layer L#N (2-4) the value of the level identifier of the lower layer L#N≤the value of the level identifier of the higher layer L#N It is preferable to pose the following constraints for the sub-layers (a sub-layer N will be represented as SL#N) of the same layer (L#N).

(3-1) the value of the profile space of the lower sub-layer SL#N≤the value of the profile space of the higher sub-layer SL#(N+1)

(3-2) the value of the profile identifier of the lower sub-layer SL#N≤the value of the profile identifier of the higher sub-layer SL#(N+1)

(3-3) the value of the tier flag of the lower sub-layer SL#N≤the value of the tier flag of the higher sub-layer SL#(N+1)

(3-4) the value of the profile compatibility flag of the higher sub-layer SL#(N+1) corresponding to the profile identifier of the lower sub-layer SL#N is one (that is, the sub-layer SL#N is forward-compatible with the sub-layer SL#(N+1)). Given that, for example, the profile identifier of the sub-layer SL#N is "sub_layer_profile_idc[N]" and the profile compatibility flag of the sub-layer SL#(N+1) is "sub_layer_profile_compatibility_flag[N+1] [j]", "sub_layer_profile_compatibility_flag[N+1] [sub_layer_profile_idc[N]]=1" is configured.

(3-5) the value of the level identifier of the higher sub-layer SL#(N+1)≥the value of the level identifier of the lower sub-layer SL#N As described thus far, by posing the profile and level constraints in advance on the image decoding device side and on the image coding device side, the effect of preventing generation of the coded data in which the profile/level of the lower layer and a profile/level incompatible with the profile/level of the higher layer are discontinuously configured is accomplished. In addition, the effect of reducing the complexity of the image decoding device is accomplished because the number of profile/levels that the image decoding device is to be compatible with can be reduced to a necessary minimum.

The VPS decoder 102 and the VPS coder 222 (including the modification examples thereof as well) may explicitly decode/code syntax (profile/level constraint flag "profile_level_restrict_flag") representing whether to exert the above constraints related to the profile and the level between the layer sets that are in an inclusion relation immediately before each PTL information in the VPS extension data. In addition to the same effects as above, the effect that the image decoding device can easily and early determine the presence of the profile/level constraints in each layer in the VPS or in the SPS before decoding the PTL information in the VPS extension data is accomplished. Similarly, a flag indicating the presence of constraints may be provided for the profile and the level.

(Example of Application to Other Hierarchical Moving Image Coding/Decoding Systems)

The hierarchical moving image coding device 2 and the hierarchical moving image decoding device 1 described above can be utilized as mounted on various apparatuses performing transmission, reception, recording, and reproduction of a moving image. The moving image may be a natural moving image captured by a camera or the like or may be an artificial moving image (including a CG and a GUI) generated by a computer or the like.

Figure 50A:
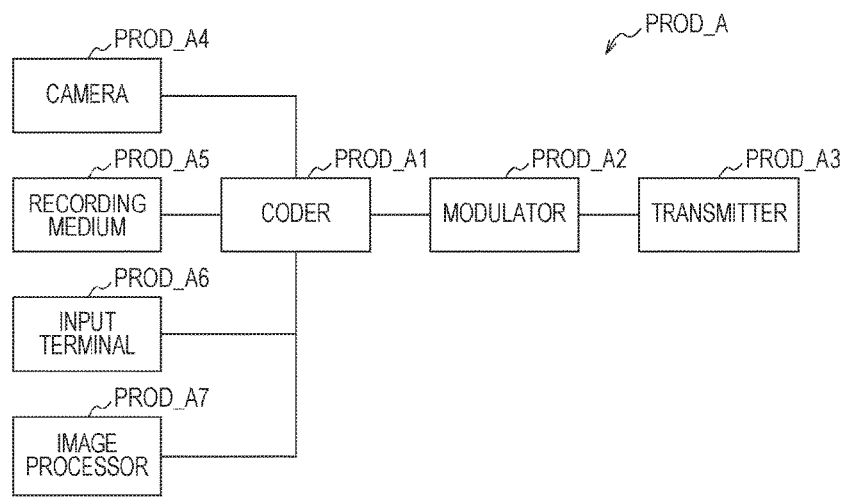
FIGS. 50(*a*) and 50(*b*) are diagrams illustrating configurations of a transmission apparatus on which the hierarchical moving image coding device is mounted and a reception apparatus on which the hierarchical moving image decoding device is mounted.
Figure 50B:
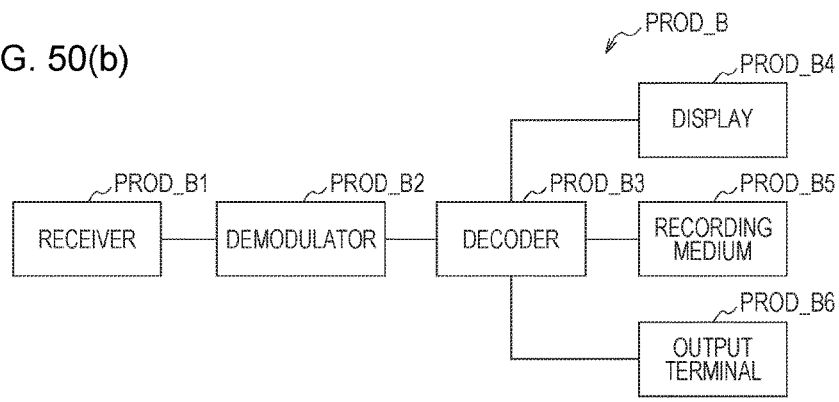

Utilization of the above hierarchical moving image coding device 2 and the hierarchical moving image decoding device 1 in transmission and reception of a moving image will be described on the basis of FIGS. 50(*a*) and 50(*b*). FIG. 50(*a*) is a block diagram illustrating a configuration of a transmission apparatus PROD_A on which the hierarchical moving image coding device 2 is mounted.

As illustrated in FIG. 50(*a*), the transmission apparatus PROD_A includes a coder PROD_A1 coding a moving image to obtain coded data, a modulator PROD_A2 modulating a carrier wave in the coded data obtained by the coder PROD_A1 to obtain a modulated signal, and a transmitter PROD_A3 transmitting the modulated signal obtained by the modulator PROD_A2. The hierarchical moving image coding device 2 described above is utilized as the coder PROD_A1.

The transmission apparatus PROD_A may further include, as a source of supply of a moving image to be input into the coder PROD_A1, a camera PROD_A4 capturing a moving image, a recording medium PROD_A5 on which a moving image is recorded, an input terminal PROD_A6 for inputting a moving image from the outside, and an image processor A7 generating or processing an image. While the transmission apparatus PROD_A illustrated in FIG. 50(*a*) is configured to include all of these constituents, a part of the constituents may be omitted.

The recording medium PROD_A5 may be a type on which an uncoded moving image is recorded or may be a type on which a moving image coded by a recording coding scheme different from a transmission coding scheme is recorded. In the case of the latter, a decoder (not illustrated) decoding the coded data read from the recording medium PROD_A5 according to the recording coding scheme may be interposed between the recording medium PROD_A5 and the coder PROD_A1.

FIG. 50(*b*) is a block diagram illustrating a configuration of a reception apparatus PROD_B on which the hierarchical moving image decoding device 1 is mounted. As illustrated in FIG. 50(*b*), the reception apparatus PROD_B includes a receiver PROD_B1 receiving a modulated signal, a demodulator PROD_B2 demodulating the modulated signal received by the receiver PROD_B1 to obtain coded data, and a decoder PROD_B3 decoding the coded data obtained by the demodulator PROD_B2 to obtain a moving image. The hierarchical moving image decoding device 1 described above is utilized as the decoder PROD_B3.

The reception apparatus PROD_B may further include, as a destination of supply of a moving image output by the decoder PROD_B3, a display PROD_B4 displaying a moving image, a recording medium PROD_B5 for recording a moving image, and an output terminal PROD_B6 for outputting a moving image to the outside. While the reception apparatus PROD_B illustrated in FIG. 50(*b*) is configured to include all of these constituents, a part of the constituents may be omitted.

The recording medium PROD_B5 may be a type for recording an uncoded moving image or may be coded by a recording coding scheme different from a transmission coding scheme. In the case of the latter, a coder (not illustrated) coding the moving image obtained from the decoder PROD_B3 according to the recording coding scheme may be interposed between the decoder PROD_B3 and the recording medium PROD_B5.

A transmission medium for transmitting the modulated signal may be a wireless medium or may be a wired medium. A transmission form of transmitting the modulated signal may be broadcasting (herein indicates a transmission form of which the transmission destination is not specified in advance) or may be communication (herein indicates a transmission form of which the transmission destination is specified in advance). That is, transmission of the modulated signal may be realized by any one of wireless broadcasting, wired broadcasting, wireless communication, and wired communication.

A broadcasting station (a broadcasting facility or the like)/reception station (a television receiver or the like) for terrestrial digital broadcasting, for example, is an example of the transmission apparatus PROD_A/reception apparatus PROD_B transmitting and receiving the modulated signal by wireless broadcasting. A broadcasting station (a broadcasting facility or the like)/reception station (a television receiver or the like) for cable television broadcasting is an example of the transmission apparatus PROD_A/reception apparatus PROD_B transmitting and receiving the modulated signal by wired broadcasting.

A server (a workstation or the like)/client (a television receiver, a personal computer, a smartphone, or the like) for a video on demand (VOD) service, a moving image sharing service, or the like employing the Internet is an example of the transmission apparatus PROD_A/reception apparatus PROD_B transmitting and receiving the modulated signal by communication (generally, either a wireless type or a wired type is employed as a transmission medium in a LAN, and a wired type is employed as a transmission medium in a WAN). Types of personal computers include a desktop PC, a laptop PC, and a tablet PC. Types of smartphones include a multifunctional mobile phone terminal as well.

The client of the moving image sharing service has the function of coding a moving image captured by a camera and uploading the coded moving image to the server in addition to the function of decoding and displaying coded data downloaded from the server. That is, the client of the moving image sharing service functions as both of the transmission apparatus PROD_A and the reception apparatus PROD_B.

Figure 51A:
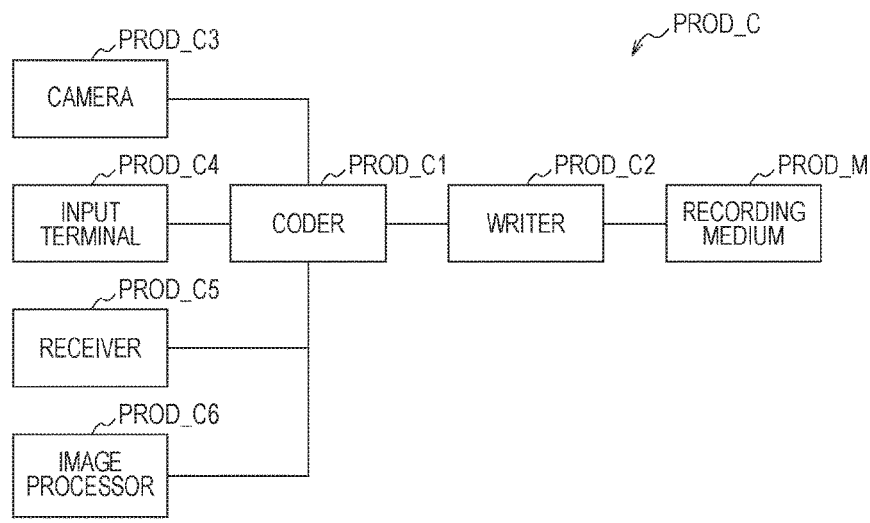
FIGS. 51(*a*) and 51(*b*) are diagrams illustrating configurations of a recording apparatus on which the hierarchical moving image coding device is mounted and a reproduction apparatus on which the hierarchical moving image decoding device is mounted.

Utilization of the above hierarchical moving image coding device 2 and the hierarchical moving image decoding device 1 in recording and reproduction of a moving image will be described on the basis of FIGS. 51(a) and 51(b). FIG. 51(a) is a block diagram illustrating a configuration of a recording apparatus PROD_C on which the above hierarchical moving image coding device 2 is mounted.

As illustrated in FIG. 51(a), the recording apparatus PROD_C includes a coder PROD_C1 coding a moving image to obtain coded data and a writer PROD_C2 writing the coded data obtained by the coder PROD_C1 into a recording medium PROD_M. The hierarchical moving image coding device 2 described above is utilized as the coder PROD_C1.

The recording medium PROD_M may be (1) a type incorporated into the recording apparatus PROD_C such as a hard disk drive (HDD) or a solid state drive (SSD), (2) a type coupled to the recording apparatus PROD_C such as an SD memory card or a Universal Serial Bus (USB) flash memory, or (3) a type loaded into a drive device (not illustrated) incorporated into the recording apparatus PROD_C such as a digital versatile disc (DVD) or a Blu-ray (registered trademark) disc (BD).

The recording apparatus PROD_C may further include, as a source of supply of a moving image to be input into the coder PROD_C1, a camera PROD_C3 capturing a moving image, an input terminal PROD_C4 for inputting a moving image from the outside, a receiver PROD_C5 for receiving a moving image, and an image processor C6 generating or processing an image. While the recording apparatus PROD_C illustrated in FIG. 51(a) is configured to include all of these constituents, a part of the constituents may be omitted.

The receiver PROD_C5 may receive an uncoded image or may receive coded data coded by a transmission coding scheme different from a recording coding scheme. In the case of the latter, a transmission decoder (not illustrated) decoding coded data coded by the transmission coding scheme may be interposed between the receiver PROD_C5 and the coder PROD_C1.

Examples of such a recording apparatus PROD_C include a DVD recorder, a BD recorder, and a hard disk drive (HDD) recorder (in this case, either the input terminal PROD_C4 or the receiver PROD_C5 serves as a main source of supply of a moving image). A camcorder (in this case, the camera PROD_C3 serves as a main source of supply of a moving image), a personal computer (in this case, either the receiver PROD_C5 or the image processor C6 serves as a main source of supply of a moving image), a smartphone (in this case, either the camera PROD_C3 or the receiver PROD_C5 is a main source of supply of a moving image), or the like is also an example of such a recording apparatus PROD_C.

Figure 51B:
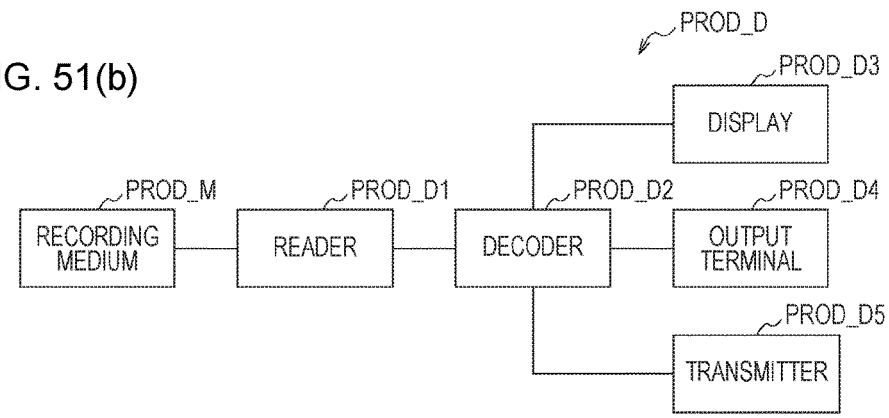
Figure 57:
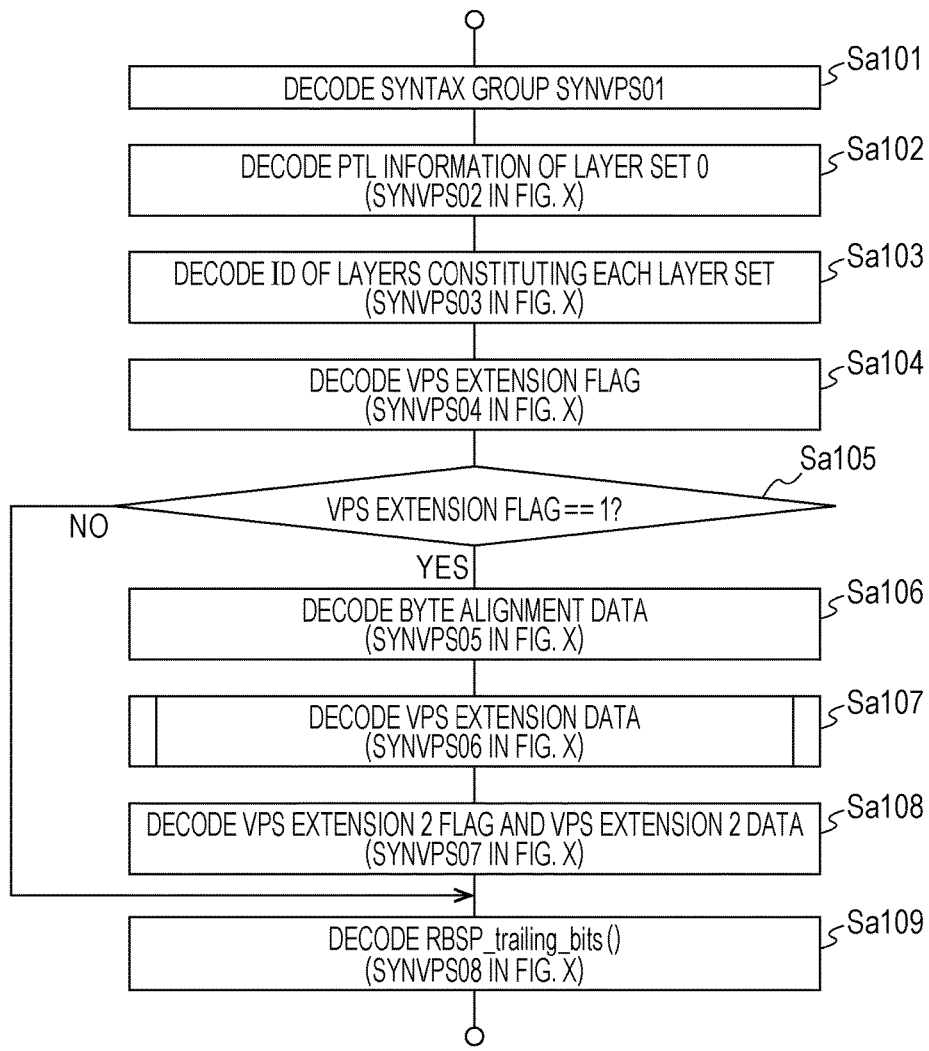
FIG. 57 is a flowchart illustrating the flow of a VPS data decoding process in the technology of the related art.
Figure 58:
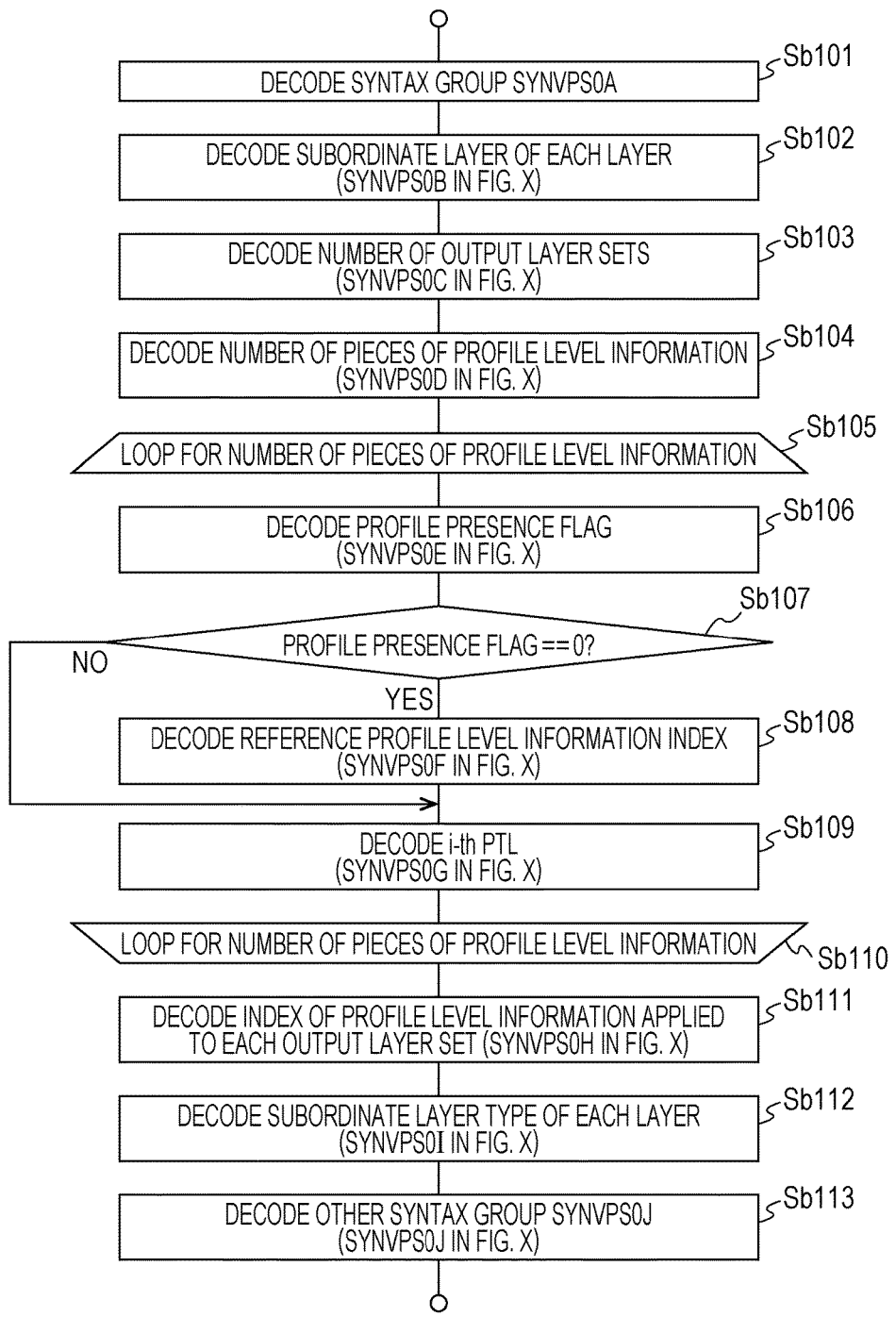
FIG. 58 is a flowchart illustrating the flow of the VPS extension data decoding process in the technology of the related art.
Figure 59:
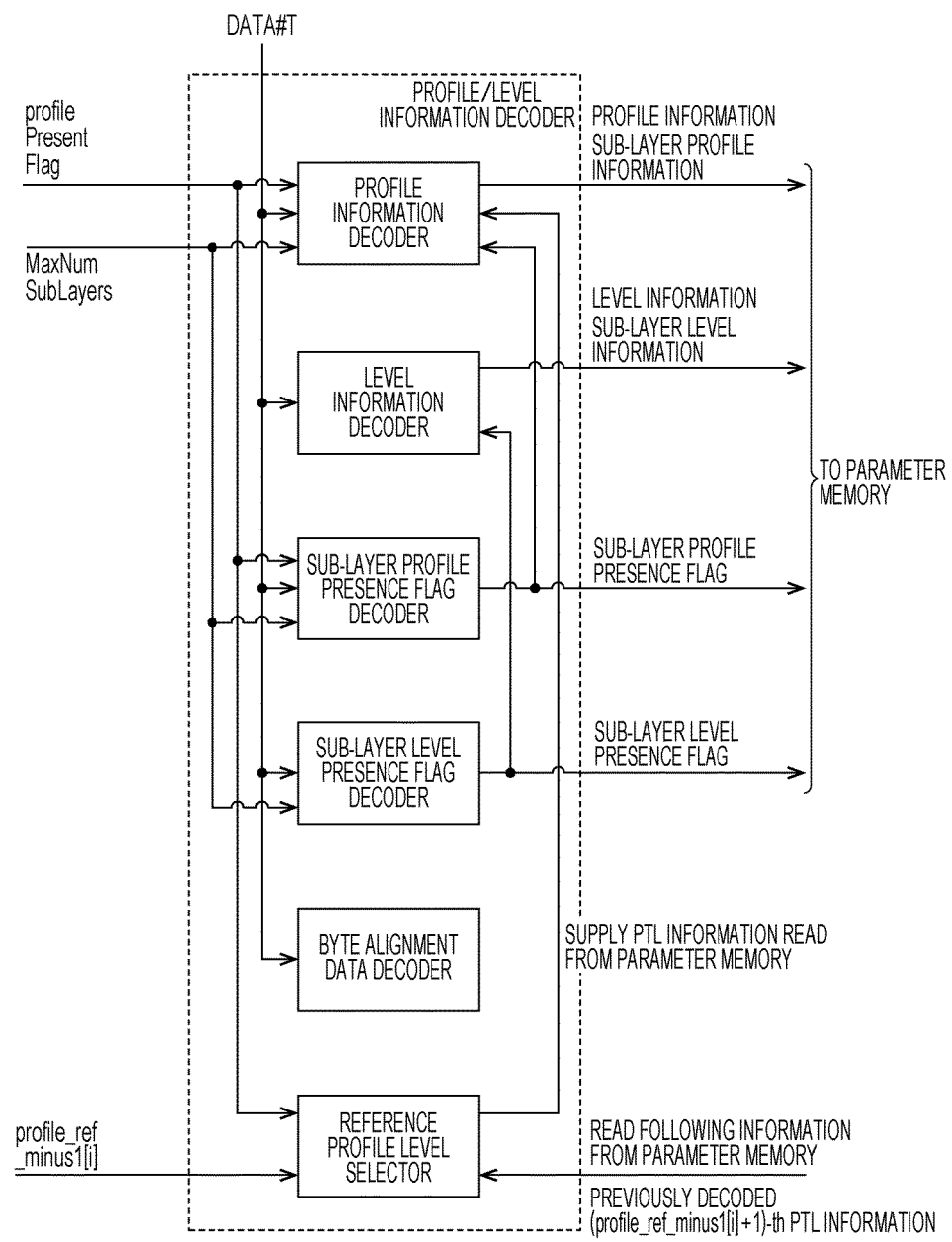
FIG. 59 is a block diagram illustrating a configuration of the PTL information decoder in the technology of the related art.
Figure 60:
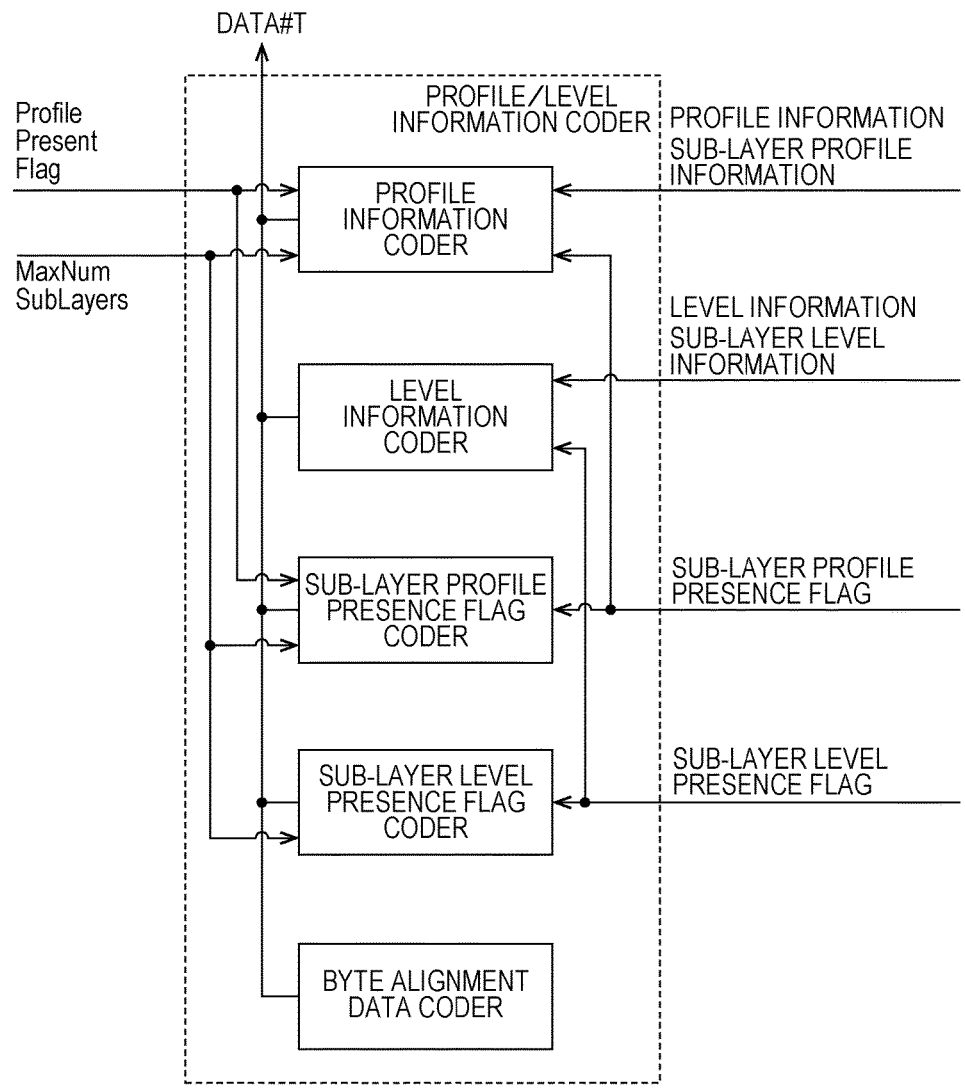
FIG. 60 is a block diagram illustrating a configuration of the PTL information coder in the technology of the related art.

FIG. 51(b) is a block illustrating a configuration of a reproduction apparatus PROD_D on which the hierarchical moving image decoding device 1 is mounted. As illustrated in FIG. 51(b), the reproduction apparatus PROD_D includes a reader PROD_D1 reading coded data written in the recording medium PROD_M and a decoder PROD_D2 decoding the coded data read by the reader PROD_D1 to obtain a moving image. The hierarchical moving image decoding device 1 described above is utilized as the decoder PROD_D2.

The recording medium PROD_M may be (1) a type incorporated into the reproduction apparatus PROD_D such as an HDD or an SSD, (2) a type coupled to the reproduction apparatus PROD_D such as an SD memory card or a USB flash memory, or (3) a type loaded into a drive device (not illustrated) incorporated into the reproduction apparatus PROD_D such as a DVD or a BD.

The reproduction apparatus PROD_D may further include, as a destination of supply of a moving image output by the decoder PROD_D2, a display PROD_D3 displaying a moving image, an output terminal PROD_D4 for outputting a moving image to the outside, and a transmitter PROD_D5 transmitting a moving image. While the reproduction apparatus PROD_D illustrated in FIG. 51(b) is configured to include all of these constituents, a part of the constituents may be omitted.

The transmitter PROD_D5 may transmit an uncoded image or may transmit coded data coded by a transmission coding scheme different from a recording coding scheme. In the case of the latter, a coder (not illustrated) coding a moving image by the transmission coding scheme may be interposed between the decoder PROD_D2 and the transmitter PROD_D5.

Examples of such a reproduction apparatus PROD_D include a DVD player, a BD player, and an HDD player (in this case, the output terminal PROD_D4 to which a television receiver or the like is coupled serves as a main destination of supply of a moving image). A television receiver (in this case, the display PROD_D3 is a main destination of supply of a moving image), digital signage (referred to as an electronic signboard, an electronic bulletin board, or the like as well; either the display PROD_D3 or the transmitter PROD_D5 serves as a main destination of supply of a moving image), a desktop PC (in this case, either the output terminal PROD_D4 or the transmitter PROD_D5 serves as a main destination of supply of a moving image), a laptop or tablet PC (in this case, either the display PROD_D3 or the transmitter PROD_D5 serves as a main destination of supply of a moving image), a smartphone (in this case, either the display PROD_D3 or the transmitter PROD_D5 serves as a main destination of supply of a moving image), or the like is also an example of such a reproduction apparatus PROD_D.

(Hardware Realization and Software Realization)

Finally, each block of the hierarchical moving image decoding device 1 and of the hierarchical moving image coding device 2 may be realized by hardware with logic circuits formed on an integrated circuit (IC chip) or may be realized by software employing a central processing unit (CPU).

In the case of the latter, each of the devices includes a CPU executing instructions of a control program realizing each function, a read-only memory (ROM) storing the program, a random access memory (RAM) loading the program, a storage device (recording medium) such as a memory storing the program and a variety of data, and the like. The object of the present invention can also be achieved by supplying a recording medium on which program codes (an executable format program, an intermediate code program, and a source program) of the control program for each of the devices, which is a piece of software realizing the above functions, are recorded in a manner readable by a computer to each of the devices and by reading and executing the program codes recorded on the recording medium with the computer (or a CPU or a microprocessing unit (MPU)).

As the recording medium, for example, there can be employed tapes such as a magnetic tape or a cassette tape; discs including magnetic discs such as a Floppy (registered trademark) disk or a hard disk as well as optical discs such as a compact disc read-only memory (CD-ROM), a magneto-optical (MO) disc, a mini disc (MD), a digital versatile disk (DVD), or a CD recordable (CD-R); cards such as an IC card (including a memory card) or an optical card; semiconductor memories such as a mask ROM, an erasable programmable read-only memory (EPROM), an Electrically Erasable and Programmable Read-Only Memory (EEPROM, registered trademark), or a flash ROM; logic circuits such as a programmable logic device (PLD) or a field programmable gate array (FPGA); or the like.

Each of the devices may be configured to be capable of being coupled to a communication network, and the program codes may be supplied through the communication network. The communication network is not particularly limited as long as the communication network can transmit the program codes. For example, the Internet, an intranet, an extranet, a local area network (LAN), an integrated services digital network (ISDN), a value-added network (VAN), a community antenna television (CATV) communication network, a virtual private network, a telephone line network, a mobile communication network, or a satellite communication network can be utilized. A transmission medium constituting the communication network is not limited to a specific configuration or type as long as the transmission medium is a medium that can transmit the program codes. For example, either wired types such as Institute of Electrical and Electronic Engineers (IEEE) 1394, USB, a power line carrier, a cable TV line, a telephone line, or an asymmetric digital subscriber line (ADSL) or wireless types such as infrared rays in infrared data association (IrDA) or in a remote controller, Bluetooth (registered trademark), IEEE 802.11 wireless protocol, high data rate (HDR), near field communication (NFC), Digital Living Network Alliance (DLNA, registered trademark), a mobile phone network, a satellite line, or a terrestrial digital network can be utilized. The present invention may be realized in the form of a computer data signal, embedded in a carrier wave, in which the program codes are implemented by electronic transmission.

[Conclusion]

According to a first aspect of the present invention, an image decoding device that decodes hierarchically coded data is configured to include a profile presence flag decoder that decodes a profile presence flag indicating the presence of profile information in PTL information on a PTL information list, and a PTL information decoder that decodes the PTL information, in which the PTL information decoder in the case where the profile presence flag is one, decodes the profile information of the PTL information from coded data, and in the case where the profile information presence flag is zero, estimates the profile information in the PTL information to be the same as the profile information of first previously decoded PTL information.

According to the above configuration, it is possible to determine whether the profile information of the PTL information is to be decoded or to be estimated from the profile information of the first previously decoded PTL information on the basis of the value of the profile presence flag.

According to a second aspect of the present invention, the image decoding device in the first aspect further includes a sub-layer profile presence flag decoder that decodes a sub-layer profile presence flag indicating the presence of each sub-layer profile information, in which the PTL information decoder, in the case where the sub-layer profile information presence flag of each sub-layer is one, decodes the sub-layer profile information of each sub-layer from coded data, and in the case where each sub-layer profile information presence flag is zero, estimates each sub-layer profile information included in each PTL information to be the same as each corresponding sub-layer profile information included in the first previously decoded PTL information.

According to the above configuration, a determination of whether the sub-layer profile information of each sub-layer is to be decoded or is to be estimated to be the same as each corresponding sub-layer profile information included in the first previously decoded PTL information is performed on the basis of the value of the sub-layer profile presence flag.

According to a third aspect of the present invention, the image decoding device in the first aspect further includes a sub-layer level information presence flag decoder that decodes a sub-layer level presence flag indicating the presence of each sub-layer level information, in which the PTL information decoder, in the case where the sub-layer level information presence flag of each sub-layer is one, decodes the sub-layer level information of each sub-layer from coded data, and in the case where the sub-layer level information presence flag is zero, estimates each sub-layer level information included in the PTL information to be the same as each corresponding sub-layer level information included in the first previously decoded PTL information.

According to the above configuration, it is possible to determine whether the sub-layer level information of each sub-layer is to be decoded or is to be estimated to be the same as each corresponding sub-layer level information included in the first previously decoded PTL information on the basis of the value of the sub-layer level presence flag.

According to a fourth aspect of the present invention, in the image decoding device in the first to third aspects, the profile information may include at least a profile space, a tier flag, a profile identifier, and a profile compatibility flag.

According to the above configuration, it is possible to obtain the profile information including at least the profile space, the tier flag, the profile identifier, and the profile compatibility flag either by decoding or by estimating.

According to a fifth aspect of the present invention, in the image decoding device in the second or fourth aspect, the sub-layer profile information may include at least a sub-layer profile space, a sub-layer tier flag, a sub-layer profile identifier, and a sub-layer profile compatibility flag.

According to the above configuration, it is possible to obtain the sub-layer profile information including at least the sub-layer profile space, the sub-layer tier flag, the sub-layer profile identifier, and the sub-layer profile compatibility flag either by decoding or by estimating.

According to a sixth aspect of the present invention, in the image decoding device in the second aspect, in the case where the profile presence flag related to the PTL information is zero, the value of the sub-layer profile presence flag related to each sub-layer included in the PTL information may be configured as zero.

According to the above configuration, in the case where the profile presence flag is zero, the value of the sub-layer profile presence flag related to each sub-layer included in the PTL information can be configured as zero.

According to a seventh aspect of the present invention, an image decoding method for decoding hierarchically coded data includes a profile presence flag decoding step of decoding a profile presence flag indicating the presence of profile information in PTL information on a PTL information list, and a PTL information decoding step of decoding the PTL information, in which the PTL information decoding step in the case where the profile presence flag is one, decodes the profile information of the PTL information from coded data, and in the case where the profile information presence flag is zero, estimates the profile information in the PTL information to be the same as the profile information of first previously decoded PTL information.

According to the above configuration, it is possible to determine whether the profile information of the PTL information is to be decoded or to be estimated from the profile information of the first previously decoded PTL information on the basis of the value of the profile presence flag.

According to an eighth aspect of the present invention, an image coding device that hierarchically codes image data to generate hierarchically coded data is configured to include a PTL information coder that codes PTL information indicating a profile of the hierarchically coded data, in which the PTL information coder codes the value of a profile presence flag as one in the case of coding profile information into the PTL information, and codes the value of the profile presence flag as zero in the case of estimating the profile information in the PTL information to be the same as the profile information of first previously coded PTL information.

According to the above configuration, it is possible to configure and code the value of the profile presence flag according to whether the profile information of the PTL information is to be coded or is to be coded as being estimated to be the same as the profile information of the first previously coded PTL information.

According to a ninth aspect of the present invention, an image coding method for hierarchically coding image data to generate hierarchically coded data includes a PTL information coding step of coding PTL information indicating a profile of the hierarchically coded data, in which the PTL information coding step codes the value of a profile presence flag as one in the case of coding profile information into the PTL information, and codes the value of the profile presence flag as zero in the case of estimating the profile information in the PTL information to be the same as the profile information of first previously coded PTL information.

According to the above configuration, it is possible to configure and code the value of the profile presence flag according to whether the profile information of the PTL information is to be coded or is to be coded as being estimated to be the same as the profile information of the first previously coded PTL information.

[Other Aspects of Present Invention]

According to another first aspect of the present invention, an image decoding device that decodes hierarchically coded data into which image information related to an image having different quality per layer is hierarchically coded to restore an image in a target layer which is a decoding target includes a profile/level information decoder that decodes profile/level information indicating a profile of the hierarchically coded data, in which the profile/level information decoder regards the semantics of an i-th reference PTL information specifying index in the profile/level information that the i-th reference PTL information specifying index specifies a relative position between i-th profile/level information and referenced profile/level information.

According to the above configuration, it is possible to estimate the profile and tier information of the first profile/level information from the zeroth profile/level information.

According to another second aspect of the present invention, an image decoding device that decodes hierarchically coded data into which image information related to an image having different quality per layer is hierarchically coded to restore an image in a target layer which is a decoding target includes a profile/level information decoder that decodes profile/level information indicating a profile of the hierarchically coded data, in which in the profile/level information decoded by the profile/level information decoder, a reference PTL information specifying index is changed to a reference profile so that the profile and tier information of the first profile/level information can be estimated on the basis of the zeroth profile/level information.

According to the above configuration, the number of bits can be reduced because an i-th reference PTL information specifying index is coded.

According to another third aspect of the present invention, an image decoding device that decodes hierarchically coded data into which image information related to an image having different quality per layer is hierarchically coded to restore an image in a target layer which is a decoding target includes a profile/level information decoder that decodes profile/level information indicating a profile of the hierarchically coded data, in which in the profile/level information decoded by the profile/level information decoder, a VPS profile presence flag may be included instead of a reference PTL information specifying index.

According to the above configuration, the number of bits can be reduced because the profile and tier information of the i-th profile/level information can be estimated from the (i−1)-th profile/level information.

According to another fourth aspect of the present invention, in the image decoding device in the other first or second aspect, the profile/level information decoder, in the case where the level information of an i-th sub-layer is not presented, may estimate the level thereof to be the same as the smaller of the level of an (i+1)-th sub-layer and the level of a level identifier.

According to the above configuration, it is possible to avoid the case where displaying of a sub-layer having a temporal ID of one is undefined because the manner of handling the level of the i-th sub-layer is apparent in the case where the level information of the i-th sub-layer does not exist in the profile/level information.

According to another fifth aspect of the present invention, in the image decoding device in the other first or second aspect, the profile/level information decoder, in the case where a sub-layer profile presence flag of an i-th sub-layer is one, may determine that the profile information of the sub-layer exists in coded data in a target layer and may decode sub-layer profile information of the sub-layer on the basis of the coded data.

According to the above configuration, the situation where the sub-layer profile information is undefined can be resolved even in the case where the profile presence flag is one and the sub-layer profile presence flag is zero.

According to another sixth aspect of the present invention, in the image decoding device in the other first or second aspect, the profile/level information decoder may decode the level information of the highest sub-layer on the basis of coded data in a target layer, may determine in the case where a sub-layer level presence flag of an i-th sub-layer is one in sub-layer level information of each sub-layer excluding the highest sub-layer that the level information of the sub-layer exists in the coded data in the target layer, may decode the sub-layer level information of the sub-layer on the basis of the coded data, and may set the sub-layer level information of the sub-layer to predetermined level information in the case where the sub-layer level presence flag of the i-th sub-layer is zero.

According to the above configuration, the situation where the sub-layer level information is undefined can be resolved even in the case where the sub-layer level presence flag is zero.

According to another seventh aspect of the present invention, in the image decoding device in the other first or second aspect, the profile/level information decoder, in the case where a level presence flag is one and a sub-layer level presence flag of an i-th sub-layer is one, may determine that the level information of the sub-layer exists in coded data in a target layer and decode sub-layer level information of the sub-layer on the basis of the coded data, in the case where the level presence flag is one and the sub-layer level presence flag of the i-th sub-layer is zero, may set the sub-layer level information of the sub-layer to predetermined level information, in the case where the level presence flag is zero and the sub-layer level presence flag of the i-th sub-layer is one, may determine that the level information of the sub-layer exists in the coded data in the target layer and decode the sub-layer level information of the sub-layer on the basis of the coded data, and in the case where the level presence flag is zero and the sub-layer level presence flag of the i-th sub-layer is zero, may set the sub-layer level information of the sub-layer to the level information of a sub-layer specified by the i-th reference PTL information specifying index.

According to the above configuration, the situation where the sub-layer level information is undefined can be resolved even in the case where the level presence flag is zero and the sub-layer level presence flag is zero.

According to another eighth aspect of the present invention, in the image decoding device in the other third aspect, a VPS level presence flag may be added to the profile/level information, and the profile/level information decoder may derive the level information of i-th profile/level information from the level information of the other profile/level information in the case where the VPS level presence flag is equal to "0".

According to the above configuration, it is possible to avoid the case where displaying of a sub-layer having a temporal ID of one is undefined because the manner of handling the level of the i-th sub-layer is apparent in the case where the level information of the i-th sub-layer does not exist in the profile/level information.

According to another ninth aspect of the present invention, an image coding device that generates hierarchically coded data into which image information related to an image having different quality per layer is hierarchically coded from image data includes a profile/level information coder that codes profile/level information indicating a profile of the hierarchically coded data, in which the profile/level information coder performs coding with the semantics of an i-th reference PTL information specifying index in the profile/level information as specifying a relative position between i-th profile/level information and referenced profile/level information.

According to the above configuration, it is possible to estimate the profile and tier information of the first profile/level information from the zeroth profile/level information.

According to another tenth aspect of the present invention, an image coding device that generates hierarchically coded data into which image information related to an image having different quality per layer is hierarchically coded from image data includes a profile/level information coder that codes profile/level information indicating a profile of the hierarchically coded data, in which in the profile/level information coded by the profile/level information coder, a reference PTL information specifying index is changed to a reference profile so that the profile and tier information of the first profile/level information can be estimated on the basis of the zeroth profile/level information.

According to the above configuration, the number of bits can be reduced because an i-th reference PTL information specifying index is coded.

According to another eleventh aspect of the present invention, an image coding and decoding device that generates hierarchically coded data into which image information related to an image having different quality per layer is coded from image data includes a profile/level information coder that codes profile/level information indicating a profile of the hierarchically coded data, in which in the profile/level information coded by the profile/level information coder, a VPS profile presence flag may be included instead of a reference PTL information specifying index.

According to the above configuration, the number of bits can be reduced because the profile and tier information of the i-th profile/level information can be estimated from the (i−1)-th profile/level information.

According to another twelfth aspect of the present invention, in the image coding device in the other ninth or tenth aspect, the profile/level information coder, in the case where the level information of an i-th sub-layer is not presented, may perform coding such as estimating the level thereof to be the same as the smaller of the level of an (i+1)-th sub-layer and the level of a level identifier.

According to the above configuration, it is possible to avoid the case where displaying of a sub-layer having a temporal ID of one is undefined because the manner of handling the level of the i-th sub-layer is apparent in the case where the level information of the i-th sub-layer does not exist in the profile/level information.

According to another thirteenth aspect of the present invention, in the image coding device in the other ninth or tenth aspect, the profile/level information coder, in the case where a sub-layer profile presence flag of an i-th sub-layer is one, may include the profile information of the sub-layer in coded data in a target layer.

According to the above configuration, the situation where the sub-layer profile information is undefined can be resolved even in the case where the profile presence flag is one and the sub-layer profile presence flag is zero.

According to another fourteenth aspect of the present invention, in the image coding device in the other ninth or tenth aspect, the profile/level information coder may include the level information of the highest sub-layer in coded data in a target layer, may include, in the case where a sub-layer level presence flag of an i-th sub-layer is one in sub-layer level information of each sub-layer excluding the highest sub-layer, the level information of the sub-layer in the coded data in the target layer and include the sub-layer level information of the sub-layer in the coded data, and may set the sub-layer level information of the sub-layer to predetermined level information in the case where the sub-layer level presence flag of the i-th sub-layer is zero.

According to the above configuration, the situation where the sub-layer level information is undefined can be resolved even in the case where the sub-layer level presence flag is zero.

According to another fifteenth aspect of the present invention, in the image coding device in the other ninth or tenth aspect, the profile/level information coder, in the case where a level presence flag is one and a sub-layer level presence flag of an i-th sub-layer is one, may include the level information of the sub-layer in coded data in a target layer and include sub-layer level information of the sub-layer in the coded data, in the case where the level presence flag is one and the sub-layer level presence flag of the i-th sub-layer is zero, may set the sub-layer level information of the sub-layer to predetermined level information, in the case where the level presence flag is zero and the sub-layer level presence flag of the i-th sub-layer is one, may include the level information of the sub-layer in the coded data in the target layer and include the sub-layer level information of the sub-layer in the coded data, and in the case where the level presence flag is zero and the sub-layer level presence flag of the i-th sub-layer is zero, may set the sub-layer level information of the sub-layer to the level information of a sub-layer specified by the i-th reference PTL information specifying index.

According to the above configuration, the situation where the sub-layer level information is undefined can be resolved even in the case where the level presence flag is zero and the sub-layer level presence flag is zero.

According to another sixteenth aspect of the present invention, in the image coding device in the other eleventh aspect, a VPS level presence flag may be added to the profile/level information, and the profile/level information coder, in the case where the VPS level presence flag is equal to "0", may perform coding such that the level information of i-th profile/level information can be derived from the level information of the other profile/level information.

According to the above configuration, it is possible to avoid the case where displaying of a sub-layer having a temporal ID of one is undefined because the manner of handling the level of the i-th sub-layer is apparent in the case where the level information of the i-th sub-layer does not exist in the profile/level information.

According to another seventeenth aspect of the present invention, an image decoding device that decodes hierarchically coded data into which image information related to an image having different quality per layer is hierarchically coded to restore an image in a target layer which is a decoding target includes a profile/level information decoder that decodes profile/level information indicating a profile of the hierarchically coded data, in which the profile/level information decoder may decode coded data that satisfies each of the following conditions in the profile/level information: the value of a profile space of a lower layer set≤the value of a profile space of a higher layer set, the value of a profile identifier of the lower layer set≤the value of a profile identifier of the higher layer set, the value of a tier flag of the lower layer set≤the value of a tier flag of the higher layer set, and the value of a level identifier of a higher layer set A≥the value of a level identifier of a lower layer set B.

According to the above configuration, the effect of preventing generation of coded data in which the profile/level of the lower layer and a profile/level incompatible with the profile/level of the higher layer are discontinuously configured is accomplished. In addition, the effect of reducing the complexity of the image decoding device is accomplished because the number of profile/levels that the image decoding device is to be compatible with can be reduced to a necessary minimum.

The image decoding device and the image coding device according to each aspect of the present invention may be realized by a computer, in which case a control program realizing the image decoding device and the image coding device with a computer by operating the computer as each means included in the image decoding device and in the image coding device and a computer-readable recording medium on which the control program is recorded also fall within the scope of the present invention.

The present invention is not limited to each embodiment described above. Various modifications can be carried out within the scope of the claims. In addition, an embodiment obtained by appropriately combining each technical means disclosed in different embodiments is also included in the technical scope of the present invention.

INDUSTRIAL APPLICABILITY

The present invention can be preferably applied to a hierarchical moving image decoding device decoding coded data into which image data is hierarchically coded and to a hierarchical moving image coding device generating coded data into which image data is hierarchically coded. In addition, the present invention can be preferably applied to the data structure of hierarchically coded data generated by the hierarchical moving image coding device and referenced by the hierarchical moving image decoding device.

REFERENCE SIGNS LIST

1 IMAGE DECODING DEVICE, HIERARCHICAL MOVING IMAGE DECODING DEVICE
10 HEADER DECODER
10E HEADER CODER
11 PICTURE DECODER
12 DECODED PICTURE BUFFER
13 REFERENCE PICTURE MANAGER
131 REFERENCE PICTURE SET CONFIGURING UNIT

132 REFERENCE PICTURE LIST DERIVING UNIT
13E REFERENCE PICTURE DETERMINER
101 NAL UNIT HEADER DECODER
102 VPS DECODER
103 SPS DECODER
104 PPS DECODER
105 SLICE HEADER DECODER
1011 LAYER ID DECODER
1012 NAL UNIT TYPE DECODER
1021 PTL (PROFILE/LEVEL) INFORMATION DECODER
1021a PROFILE INFORMATION DECODER
1021b LEVEL INFORMATION DECODER
1021c SUB-LAYER PROFILE PRESENCE FLAG DECODER
1021d SUB-LAYER LEVEL PRESENCE FLAG DECODER
1021e BYTE ALIGNMENT DATA DECODER
1021f REFERENCE PROFILE LEVEL SELECTOR
1022 REFERENCE PTL SPECIFYING INFORMATION DECODER
1023 PROFILE PRESENCE FLAG DECODER
301 ENTROPY DECODER
302 PREDICTION PARAMETER DECODER
303 INTER-PREDICTION PARAMETER DECODER
304 INTRA-PREDICTION PARAMETER DECODER
307 PREDICTION PARAMETER MEMORY
308 PREDICTED IMAGE GENERATOR
309 INTER-PREDICTION IMAGE GENERATOR
310 INTRA-PREDICTION IMAGE GENERATOR
311 INVERSE QUANTIZATION/INVERSE DCT UNIT
312 ADDER
2 IMAGE CODING DEVICE, HIERARCHICAL MOVING IMAGE CODING DEVICE
201 PREDICTED IMAGE GENERATOR
202 SUBTRACTER
203 DCT TRANSFORM/QUANTIZATION UNIT
204 ENTROPY CODER
205 INVERSE QUANTIZATION/INVERSE DCT TRANSFORM UNIT
206 ADDER
208 PREDICTION PARAMETER MEMORY
210 CODING PARAMETER DETERMINER
211 PREDICTION PARAMETER CODER
222 VPS CODER
2221 PTL INFORMATION CODER
2221a PROFILE INFORMATION CODER
2221b LEVEL INFORMATION CODER
2221c SUB-LAYER PROFILE PRESENCE FLAG CODER
2221d SUB-LAYER LEVEL PRESENCE FLAG CODER
2221e BYTE ALIGNMENT DATA CODER

The invention claimed is:

1. An image decoding device that decodes coded data, the image decoding device comprising:
a decoder configured to decode a sub-layer profile presence flag indicating whether profile information is present for a sub-layer, wherein
the decoder is configured to decode profile information for a i-th sub-layer, in a case that a value of the sub-layer profile presence flag for the i-th sub-layer is equal to one, wherein
in a case that the value of the sub-layer profile presence flag for the i-th sub-layer is equal to zero and a value of a variable i is equal to maxNumSubLayers minus one, the profile information for the i-th sub-layer is inferred to be equal to general profile information, and
in a case that the value of the sub-layer profile presence flag for the i-th sub-layer is equal to zero and the value of the variable i is less than maxNumSubLayers minus one, the profile information for the i-th sub-layer is inferred to be equal to profile information for a (i+1)-th sub-layer.

2. An image decoding method for decoding coded data, the image decoding method comprising:
decoding a sub-layer profile presence flag indicating whether profile information is present for a sub-layer, and
decoding profile information for a i-th sub-layer, in a case that a value of the sub-layer profile presence flag for the i-th sub-layer is equal to one, wherein
in a case that the value of the sub-layer profile presence flag for the i-th sub-layer is equal to zero and a value of a variable i is equal to maxNumSubLayers minus one, the profile information for the i-th sub-layer is inferred to be equal to general profile information, and
in a case that the value of the sub-layer profile presence flag for the i-th sub-layer is equal to zero and the value of the variable i is less than maxNumSubLayers minus one, the profile information for the i-th sub-layer is inferred to be equal to profile information for a (i+1)-th sub-layer.

3. An image coding device that codes image data, the image coding device comprising:
an encoder configured to encode a sub-layer profile presence flag indicating whether profile information is present for a sub-layer, wherein
the encoder is configured to encode profile information for a i-th sub-layer, in a case that a value of the sub-layer profile presence flag for the i-th sub-layer is equal to one, wherein
in a case that the value of the sub-layer profile presence flag for the i-th sub-layer is equal to zero and a value of a variable i is equal to maxNumSubLayers minus one, the profile information for the i-th sub-layer is inferred to be equal to general profile information, and
in a case that the value of the sub-layer profile presence flag for the i-th sub-layer is equal to zero and the value of the variable i is less than maxNumSubLayers minus one, the profile information for the i-th sub-layer is inferred to be equal to profile information for a (i+1)-th sub-layer.

* * * * *